United States Patent
Watanabe

(10) Patent No.: US 12,328,301 B2
(45) Date of Patent: Jun. 10, 2025

(54) ELECTRONIC APPARATUS AND NETWORK OF ELECTRONIC APPARATUS

(71) Applicant: Yukiko Watanabe, Kaohsiung (TW)

(72) Inventor: Hiroshi Watanabe, Kanagawa (JP)

(73) Assignee: Yukiko Watanabe, Kaohsiung (TW)

( * ) Notice: Subject to any disclaimer, the term of this patent is extended or adjusted under 35 U.S.C. 154(b) by 316 days.

(21) Appl. No.: 17/927,386

(22) PCT Filed: May 25, 2021

(86) PCT No.: PCT/JP2021/019838
§ 371 (c)(1),
(2) Date: Nov. 23, 2022

(87) PCT Pub. No.: WO2021/241590
PCT Pub. Date: Dec. 2, 2021

(65) Prior Publication Data
US 2023/0198961 A1 Jun. 22, 2023

(30) Foreign Application Priority Data

May 26, 2020 (JP) .................................. 2020-091795
Aug. 26, 2020 (JP) .................................. 2020-142812

(51) Int. Cl.
*H04L 9/40* (2022.01)
*H04L 9/32* (2006.01)

(52) U.S. Cl.
CPC ........ *H04L 63/0428* (2013.01); *H04L 9/3242* (2013.01)

(58) Field of Classification Search
CPC G09C 1/00; H04L 9/40; H04L 9/0866; H04L 9/3247; H04L 63/0428; H04L 9/3242
(Continued)

(56) References Cited

U.S. PATENT DOCUMENTS 6,826,591 B2 * 11/2004 French .................... H04L 67/10
709/200
7,266,682 B2 * 9/2007 Euchner ................ H04M 3/382
713/168
(Continued)

FOREIGN PATENT DOCUMENTS

JP 2009519473 A 5/2009
JP 2013131868 A 7/2013
(Continued)

OTHER PUBLICATIONS

Fatemeh Tehranipoor, Nima Karimian, Kan Xiao, John Chandy, "DRAM based Intrinsic Physical Unclonable Functions for System Level Security", in GLSVLSI'15 Proceedings of the 25th edition on Great Lakes Symposium on VLSI, pp. 15-20, 2015.

*Primary Examiner* — Amare F Tabor
(74) *Attorney, Agent, or Firm* — WPAT, PC

(57) ABSTRACT

A closed physical network can be realized by putting physical addresses of electronic apparatuses under the central management in the chip level. Simultaneously, the decentralized management can be realized logically by converting the dictionary recording identifications of chips on the closed physical network (inside the physical firewall) to a blockchain. By this way, the present invention is characterized by making the central management of physical nodes and the decentralized management of logical nodes coexist and improving management and security of the entire of the closed network effectively.

28 Claims, 69 Drawing Sheets

(58) Field of Classification Search
USPC .......................................................... 713/171
See application file for complete search history.

(56) References Cited

U.S. PATENT DOCUMENTS

| | | | |
|---|---|---|---|
| 8,762,642 B2* | 6/2014 | Bates | H04L 67/5683 711/117 |
| 9,292,710 B2 | 3/2016 | Kim et al. | |
| 10,176,127 B2 | 1/2019 | Watanabe | |
| 10,235,540 B2 | 3/2019 | Choi et al. | |
| 10,387,342 B2 | 8/2019 | Watanabe | |
| 10,581,841 B2 | 3/2020 | Watanabe et al. | |
| 10,693,636 B2 | 6/2020 | Watanabe et al. | |
| 10,769,309 B2 | 9/2020 | Choi et al. | |
| 10,825,511 B2* | 11/2020 | De | H01L 29/7885 |
| 11,128,471 B2* | 9/2021 | Haldar | H04L 9/50 |
| 11,184,339 B2* | 11/2021 | Zanpure | H04L 9/3239 |
| 12,063,309 B2* | 8/2024 | Petersen | H04L 9/3239 |
| 2006/0115081 A1* | 6/2006 | Buer | H04L 9/0861 380/44 |
| 2006/0190720 A1* | 8/2006 | Ozaki | H04L 63/0428 713/160 |
| 2008/0237506 A1 | 10/2008 | Ophey et al. | |
| 2010/0246818 A1* | 9/2010 | Yao | H04W 12/0433 380/270 |
| 2011/0145561 A1* | 6/2011 | Anil | H04L 69/04 713/150 |
| 2013/0047209 A1 | 2/2013 | Satoh et al. | |
| 2015/0156179 A1* | 6/2015 | Nica | H04L 9/0875 713/171 |

FOREIGN PATENT DOCUMENTS

| | | |
|---|---|---|
| JP | 2015139010 A | 7/2015 |
| JP | 2015201884 A | 11/2015 |
| JP | 2017028354 A | 2/2017 |
| WO | WO2011118548 A1 | 9/2011 |
| WO | WO2018147456 A1 | 8/2018 |
| WO | WO2018168723 A1 | 9/2018 |
| WO | WO2018174112 A1 | 9/2018 |

* cited by examiner input code: $(a(i), b(j))$   random number output code: $c(i,j) = mod(a(i) + b(j) + d(i,j), 2)$

| $a(i)$ | $b(j)$ | $d(i,j)$ | $c(i,j)$ |
|---|---|---|---|
| 0 | 0 | 0 | 0 |
| 0 | 1 | 0 | 1 |
| 1 | 0 | 0 | 1 |
| 1 | 1 | 0 | 0 |
| 0 | 0 | 1 | 1 |
| 0 | 1 | 1 | 0 |
| 1 | 0 | 1 | 0 |
| 1 | 1 | 1 | 1 |

{A ∩ B ∩ C} = The joint management range of A, B and C

{A ∩ B ∩ C̄} = the joint management range of A and B and out of the management range of C {A ∩ B̄ ∩ C̄} = The exclusive management range of A

ELECTRONIC APPARATUS AND NETWORK OF ELECTRONIC APPARATUS

CROSS REFERENCE TO RELATED APPLICATION

The application is a National Phase Entry of PCT application PCT/JP2021/019838, filed on May 25, 2021, which claims the benefit of Japan Patent application serial No. 2020-091795, filed on May 26, 2020, and serial No. 2020-142812, filed on Aug. 26, 2020, and the entire contents of which are incorporated herein by reference.

BACKGROUND OF THE INVENTION

1. Field of the Invention

The present invention is related to physical chip identification method to be used in communication among electronic apparatuses.

2. Description of the Related Art

In general, the information communication through internet is an exchange of cut and divided data into appropriately sized pieces (protocol data unit) among information terminals (nodes) on the network. Those pieces of divided data are attached with controlling information which is necessary to the management on the network. The arrangement of those pieces of data and the controlling information is called format. The format itself and the usage of the format is regulated with one of procedures called protocol. Any two information terminals exchanging communication information each other need to deal with data under a format which is consistent to those terminals each other to some extent.

Terms usually used to describe protocol data unit may be frame, packet, segment, and so forth. Those terms are used properly with regard to layers in the communication hierarchy.

The hierarchy structure of communication (communication hierarchy) is determined according to the concept design of the entire network system and the structure mentioned blow is regarded as general. For example, from the bottom of the layers, there are physical layer (layer-1), data link layer (layer-2), network layer (layer-3), transport layer (layer-4), and upper layer (layer-5). However, this hierarchy structure is one of examples and not beyond. Under a different concept design, for example, the upper layer may be further divided into three layers and the total layer number is seven, as well-known. Anyway, the protocol data unit is called a frame in the data link layer (layer-2), a packet in the network layer (layer-3), and a segment in the transport layer (layer-4).

Those five layers may be assumed to describe an example of the communication hierarch below.

To constitute a network as physical substance, indispensable may be information apparatuses serving as network nodes and signal transmission pathways connecting nodes each other. The signal transmission pathways may be wired or wireless. Moreover, there may be plural kinds of signals. For example, it may be roughly divided into electrical signal and optical signal. In other words, nodes may physically connect each other with wired or wireless electrical signal transmission pathway or optical signal transmission pathway. A layer which regulates physical connection and transmission method like this is the physical layer (layer-1).

Even while the connection structure of network is generally complicated, both ends of any signal transmission pathway may have to be terminated by two nodes, respectively. The protocol data unit is a mass of data to transmit through this signal transmission pathway. Accordingly, two nodes to terminate both ends of a signal transmission pathway (e.g., first and second nodes) must be subject to protocols which may be respectively consistent to some extent. If those protocols are inconsistent, this signal transmission pathway may be regarded as not connecting the first and second nodes.

FIG. 1 is a drawing to illustrate a concept of transmission method of protocol data unit. An original data to be converted (coded) to a protocol data unit is input to the first node 2001 constituting a part of network. The first node 2001 may be, for an example, a computational terminal having a console with keyboard, mouse, display and so forth, a tablet, a mobile phone, a smart phone, a terminal with card reader, a scanner, a digital camera with net connection function, sensors to be distributed anywhere, and so forth. All of those information apparatuses may obtain some kind of information from the external of the network, convert it to a protocol data unit, and then send it to the signal transmission pathway 1000. By this way, a node which has some kind of connection to the external of the network is regarded as a peripheral node. In the case of FIG. 1, the first node 2001 may be an example of a peripheral node.

In a peripheral node (e.g., the first node 2001), information input from the external of the network may be digitized. Subsequently, it may be converted to a protocol data unit (a frame) according to a predetermined format. Or, in the case that information digitized in advance is input to a peripheral node, it may be converted to a protocol data unit according to a predetermined format. Anyway, this protocol data unit is sent to another node which is subject to a format consistent to that this peripheral node (e.g., the first node 2001) is subject to some extent via the signal transmission pathway 1000. In the example of FIG. 1, the second node 2002 may be the node to receive the signal.

The node in the opposite side of this signal transmission pathway 1000 (e.g., the second node 2002) receives the above-mentioned protocol data unit and then execute the procedure of recovering the digital data before the conversion (i.e., decoding).

In the case that the above-mentioned first node 2001 is not a peripheral node, the first node 2001 may receive some kind of digital information from another node (e.g., a third node 2003) in the network. This digital data may be a protocol data unit coded by the third node 2003. The first node 2001 may decode this protocol data unit to the original digital data according to a predetermined format. Here, the predetermined format to which the first node 2001 is subject may be a format which is consistent to some extent to the format that the third node 2003 is subject to. However, in the case that this first node 2001 may serve as a relay apparatus as described below, the first node 2001 may append information related to the first node (e.g., information indicating that the protocol data unit transmitted via the first node) instead of decoding the protocol data unit and may then send the protocol data unit to the second node 2002 via the signal transmission pathway 1000. In this event, the format to which the second node is subject may be a format which is consistent to some amount to the format that the third node 2003 is subject to.

First of all, information input from the external of the network or from the third node 2003 to the first node 2001 may be converted to a protocol data unit according to a predetermined format, and then transmitted to the second node 2002 via the signal transmission pathway 1000. The second node 2002 may execute the inverse transformation (decode) of the received protocol data unit according to a predetermined format which may be consistent to some amount to the format to which the first node is subject, so as to reproduce the original data before input to the first node 2001. This is an essential configuration of transmission of signal data. Thereby, mass of data converted to a protocol data unit can be exchanged in the network.

In the above, the data transmission has been described in one direction from the first node 2001 to the second node 2002, but the usage of the protocol may be the same with the opposite direction of the transmission. For example, the first node 2001 and the second 2002 may be exchanged each other in FIG. 1. In that event, first of all, information input from the external of the network or from the third node 2003 to the second node 2002 may be converted to a protocol data unit according to a predetermined format and may then be transmitted to the first node 2001 via the signal transmission pathway 1000. The first node 2001 may execute the reverse transformation of the received protocol data unit, and then reproduce the original data before input to the second node 2002. The drawing may be omitted because it may be self-evident from FIG. 1.

FIG. 2 is a drawing to illustrate a relationship between layer hierarchy and data structure. The original data before transmitted may be cut into appropriately sized pieces. Hereinafter, these pieces of divided data may be simply called data. At the present, the layer in which the data exists is the upper layer (layer-5).

Next, a transmission control protocol header (TCP header) may be appended to this data. The TCP is an abbreviation for Transmission Control Protocol and a type of protocols. By this way, data attached with a TCP header is called a segment. The communication layer to deal with this segment is the transport layer (layer-4).

In the case that the communication corresponding to FIG. 1 is that in the transport layer (layer-4), the protocol data unit is a segment and the transforming protocol is TCP. If the first node 2001 receives data, then it may append a TCP header to the data according to the TCP format and may then form a segment. This segment is transmitted to the second node 2002 via the signal transmission pathway 1000. The second node 2002 receives this segment and then decodes it according to the TCP format to reproduce the original data. More concretely, the second node 2002 removes the TCP header.

In the network layer (layer-3), an internet protocol header may be appended to a segment. In this event, the protocol data unit is called a packet and the protocol is IP. The IP protocol may be IPv4 and IPv6 across versions.

In the case that the communication corresponding to FIG. 1 is that in the network layer (layer-3), the protocol data unit may be a packet and the transforming protocol may be IPv4 or IPv6. If the first node 2001 receives a data (a segment in this event), then it may append an IP header to the segment according to the format of IPv4 or IPv6 and may then form a packet. This packet is transmitted to the second node 2002 via the signal transmission pathway 1000. The second node 2002 receives this packet and then executes the reverse transformation (decode) of the packet according to the format of IPv4 or IPv6 to reproduce the original segment. More concretely, it may remove the IP header. Or it may further remove the TCP header to reproduce the original data.

In the data link layer (layer-2), an Ethernet protocol header may be appended to a packet. In this event, the protocol data unit may be called a frame and the protocol may be Ethernet.

In the case that the communication corresponding to FIG. 1 is that in the data link layer (layer-2), the protocol data unit may be a frame. If the first node 2001 receives a data (a packet in this case), it may append an Ethernet header to the packet according to the format of Ethernet and may then form a frame. In addition, a frame check sequence (FCS) may be appended in the format of Ethernet in order to check if the packet has been appropriately received. The frame formed by this way may be transmitted to the second node 2002 via the signal transmission pathway 1000. The second node 2002 may receive this frame and may then execute the revers transformation of the frame (decode) to reproduce the original packet. More concretely, the second node 2002 may check the FCS to confirm if the packet has been appropriately transmitted or not. The second node 2002 may also execute the procedure of restoration or retransmission as necessary. If it is confirmed that the packet has been appropriately transmitted, the second node 2002 may remove the Ethernet header and the FCS.

In the Ethernet standardization, the conversion in the lowest layer (layer-1), that is, the conversion to optical signal or to electrical signal may be defined. The frame having been converted may be forwarded to a line such as 10BASE-T etc.

Those communication hierarchy (communication layers or layers hereinafter) may have a nested relation and may then be completely independent each other. More concretely, as shown in FIG. 2, the format of segment (only with a TCP header attached to data) in the layer-4 (transport layer) involves the format of layer-5 (upper layer) with no conversion. This is because a segment is formed not by irreversibly combining a TCP header and an original data but by simply attaching a TCP header to an original data. In a similar way, the format of packet (only with an IP header attached to a segment) in the layer-3 (network layer) involves the format of layer-4 (transport layer) with no conversion. This is because a packet is formed not by irreversibly combining an IP header and a segment but by simply attaching an IP header to a segment. Furthermore, the format of frame (only with an Ethernet header and FCS attached to a packet) in the layer-2 (datalink layer) involves the format of layer-3 (network layer) with no conversion. This is because a frame is formed not by irreversibly combining an Ethernet header, an FCS and a packet but by simply attaching an Ethernet header and FCS to a packet.

In other words, no change happens in the upper communication layers even by replacing or changing protocols or formats in lower communication layers. For example, in FIG. 2, a TCP header and an original data (i.e., a segment) may be unchangeable even by replacing IPv4 to IPv6 in the IP header of the layer-3 (network layer). In other words, the layer-4 (transport layer) may be free from any change in the layer-3 (network layer). The layer-5 (upper layer) may be also free from any change in the layer-3 (network layer) as long as no change happens in the layer-4 (transport layer). In a similar way, the original data may be unchangeable even by replacing a TCP header with another one in the layer-4 (transport layer). That is, the layer-5 (upper layer) may be free from any change in the layer-4 (transport layer). Furthermore, a packet may also be unchanged even by replacing an Ethernet header with another one. For example, a packet may be unchangeable even by changing the protocol from Ethernet to point-to-point (PPP). Accordingly, the layer-3

(network layer) may be free from any change in the layer-2 (data link layer). The layer-4 (transport layer) may be also unchangeable as long as no change happens in the layer-3 (network layer). The layer-5 (upper layer) may be unchangeable as long as no change happens in the layer-4 (transport layer). Furthermore, suppose that something is changed in the layer-1 (physical layer). For example, the signal transmission pathway may be changed from an optical fiber to wireless LAN. Even in this event, the contents of information (frame) which are transmitted via wireless LAN may be the same as the contents of information (frame) which is transmitted via an optical fiber. In other words, the layer-2 (datalink layer) may be free from any change in the layer-1 (physical layer). The layer-3 (network layer) may be also unchangeable as long as no change happens in the layer-2 (datalink layer). No change happens in the layer-4 (transport layer) as long as no change happens in the layer-3 (network layer). No change happens in the layer-5 (upper layer) as long as no change happens in the layer-4 (transport layer). By this way, it may be found that no change happens in any upper communication layer even by changing something in any lower communication layer. This may be a design for suppressing any obstacle for coming technological innovation.

On the other hand, the present disclosure may be related to physical layer and data link layer in the bottom layers. Based on the reason like this, the present disclosure may not affect on any data to be transmitted.

The protocols adopted in the same layer may have to be consistent each other. However, they may be unnecessary to be consistent each other as long as they belong to different layers. In other words, to design hierarchy is to design the relationship among a plurality of protocols. In the above, the physical layer and the data link layer are regarded as different each other. However, in another concept of hierarchy, they may be regarded as one layer by making them subject to a common Ethernet protocol. In this event, the number of layers may be decreased by 1 and then to be four. Moreover, the formats of the transport layer (layer-4) and the network layer (layer-3) may be also combined and then called TCP/IP format. Or there may be an opposite concept of hierarchy to divide a layer. For example, in the OSI reference model, the upper layer is further divided into three such as a session layer (layer-5), a presentation layer (layer-6), and an application layer (layer-7) from the bottom.

In the case of FIG. 1 that information is input from the external of the network to the first node 2001, an original data has been divided into pieces having a predetermined length. The data may be formatted according to the TCP/IP format and then converted to packets. Those packets may be converted to frames according to the Ethernet format. In the physical layer (layer-1), those frames may be sent and received as wired, wireless, optical, or electronic signals) through physical substance of the signal transmission pathway 1000. Here, the first node 2001 and the second node 2002 may be information apparatuses having physical substances. Next, in the case that a packet is input from the third node 2003 in the network layer (layer-3) to the first node 2001, this packet may be converted to a frame according to the Ethernet format and then sent to the second node 2002 via the signal transmission pathway 1000. Here, all of the first node 2001, the second node 2002, and the signal transmission pathway 1000 may have physical substances. Subsequently, in the case that a segment is input from the third node 2003 in the transport layer (layer-4) to the first node 2001, this segment may be converted to a packet according to the IP format and then sent to the second node 2002 via the signal transmission pathway 1000. Here, any of the first node 2001, the second node 2002, and the third node 2003 may be logical substances and not related to any physical substances. For example, those may be virtual nodes allocated to operating systems, respectively. Thus, the signal transmission pathway 1000 may be also a virtual transmission pathway and not beyond and may have no relation to any physical substance. In other words, in the network of the TCP/IP format (network layer), both nodes and signal transmission pathways may be defined logically, and then be virtual substances and not related to any physical substances. On centrally, in the network of the Ethernet format (datalink layer), both nodes and signal transmission pathways may have physical substances. For example, it may be possible to answer to the question: "to which terminal is this node connected?" or "to which LAN cable is this signal transmission pathway is connected".

In FIG. 3, there is a fourth node 2004 relaying between the first node 2001 and the second node 2002. Some kind of data is input from the external of the network or from the third node 2003 to the first node 2001. The first node 2001 connects to the fourth node 2004 via the first signal transmission pathway 1001. The fourth node 2004 connects to the second node 2002 via a second signal transmission pathway 1002.

The connection of the first node 2001 and the fourth node 2004 via the first signal transmission pathway 1001 is almost similar to that of the first node 2001 and the second node 2002 via the signal transmission pathway 1000 as illustrated in FIG. 1. However, the fourth node 2004 works partially different. In other words, in the case that the fourth node 2004 serves as a relay between any two nodes (e.g., the relay between the first node 2001 and the second node 2002) as shown in FIG. 3, the fourth node 2004 may be able to transfer a protocol data unit that the first node 2001 input to the fourth node 2004 via the first signal transmission pathway 1001 to the second node 2002 via the second signal transmission pathway 1002 with no decode. Or the fourth node 2004 may transfer the protocol data unit with some kind of edit.

By this way, data input to the first node 2001 from the external of the network or from the third node 2003 is converted to a protocol data unit according to a predetermined format in the first node 2001. The protocol data unit is then transmitted to the fourth node 2004 via the first signal transmission pathway 1001. The fourth node 2004 may not execute the reverse transformation (decode) and transmit the protocol data unit to the second node 2002 via the second signal transmission pathway 1002. Or a part of the received protocol data unit (e.g., a header) may be edited and then transmitted to the second node 2002 via the second signal transmission pathway 1002. The second node 2002 may execute the reverse transformation of the received protocol data unit according to a predetermined format and may then reproduce the data before input to the first node 2001. Here, the predetermined format which the second node 2002 is subject to may be consistent to some extent to that which the first node 2001 is subject to.

In the case that the fourth node 2004 edits the received protocol data unit and then forward it to the second node 2002 through the second transmission pathway 1002, the protocol data unit is forwarded after the header corresponding to the present layer is appropriately edited, more in concrete. For example, in the case that the fourth node 2004 exists in the datalink layer (layer-2), a frame may be transmitted after an Ethernet header is edited. More concretely, at least a given identification of the fourth node 2004 serving as a relay may be added to the Ethernet header. The relay location is recognized as an address having physical substance (physical address). This physical address is particularly called MAC address. The MAC address is an address which is specified to an Ethernet apparatus (e.g., an Ethernet card). Or, in the cast that the fourth node 2004 exists in the network layer (layer-3), a packet may be transmitted after a TCP/IP header is edited. For example, at least a given identification of the fourth node 2004 serving as a relay may be added to the TCP/IP header. Anyway, when the second node 2002 receives a protocol data unit, it is able to monitor through which and how this protocol data unit has been transferred by doing this. The relay location is recognized as an address not having physical substance (logical address). This logical address is particularly called IP address. The IP address is, for example, an address which is specified to an operating system.

It may be self-evident that physical address and logical address differ each other. For example, an electronic apparatus constituting the fourth node 2004 may be replaced. In this event, the operating system of the electronic apparatus constituting the fourth node 2004 before the replacement (old electronic apparatus) must be re-installed to the electronic apparatus constituting the fourth node after the replacement (new electronic apparatus). On the other hand, the IP address which is specific to the operating system is handed over by the fourth node after the replacement. This is one of reasons that logical network (TCP/IP network) is adopted extensively.

In the example of FIG. 1 and FIG. 3, the first node 2001 and the second node 2002 may be exchanged. In other words, data input from the external of the network or from the third node 2003 to the second node 2002 may be converted to a protocol data unit there according to a predetermined format and may then be transmitted to the fourth node 2004 via the second signal transmission pathway 1002. The fourth node 2004 may transmit the received protocol data unit to the first node 2001 without the reverse transformation (decode) via the first signal transmission pathway 1001. Or the fourth node 2004 may edit the received protocol data unit according to a predetermined format and may then transmit it to the first node 2001. The first node 2001 may execute the reverse transformation of the received protocol data unit (decode) according to the predetermined format, and then return it to the original data before input to the second node 2002. Here, the predetermined format to which the first node 2001 is subject may be consistent to the format to which the second node 2002 is subject to some extent. The figures to illustrate it may be self-evident from FIG. 3 and thus omitted. Here, the edition with the predetermined method may imply, for example, that the physical address or the logical address of the fourth node 2004 is attached to the protocol data unit, and so forth.

There may be more than one signal transmission pathways connecting to nodes, respectively, in the network. In other words, as shown in FIG. 3, the fourth node 2004 connects to two signal transmission pathways (the first signal transmission pathway 1001 and the second signal transmission pathway 1002). FIG. 4 illustrates another example. In other words, the first node 2001 connects to four signal transmission pathways (the first signal transmission pathway 1001, the second transmission pathway 1002, the third signal transmission pathway 1003, and the fourth signal transmission pathway 1004) at an end of each signal transmission pathway. The other ends of those signal transmission pathways connect to the second node 2002, the third node 2003, the fourth node 2004 and the fifth node 2005, respectively. Furthermore, the fourth node 2004 connects to the sixth node 2006 via the fifth signal transmission pathway 1005. Of course, FIG. 4 illustrates a part or one of example of complicated network structures. In general, a large scale and complicated network structure may be able to be constructed by connecting a plurality of nodes to another plurality of nodes.

However, no matter how large and complicated the network structure is, each element of the network may be a signal transmission pathway, ends of which are terminated by two nodes. This may definitely imply, as mentioned above, that each element of the network comprises two nodes and a signal transmission pathway. The above-mentioned protocols may be defined per element like this. Accordingly, an aggregation of plurality of elements provided with the same protocol or similar protocols which are consistent each other to some extent may belong to a same communication layer. A plurality of elements belonging to a same communication layer may be able to form a local area network (LAN). The first invented LAN is a network by Ethernet and bunches datalink layer (layer-2). From such a historical background, LAN and Ethernet may be regraded almost as synonymous words.

Information apparatuses connecting to LAN as nodes may be allocated with intrinsic management numbers according to the Ethernet protocol (MAC address), respectively. Here, MAC is an abbreviation of media access controller. In other words, a frame may be formed by attaching MAC addresses of sender and receiver and FCS to a packet as an Ethernet header or a part of its header. Thus, in other words, a network formed by information apparatuses (having physical substance) connected each other with MAC addresses may be a network in the datalink layer, that is, LAN.

The first node 2001 and the second node 2002 may be information apparatuses connected each other with the Ethernet. (See FIG. 5.) Here, the protocol data unit may be a frame. In the case that a frame is transmitted between those two information apparatuses, both the information apparatuses of receiver (e.g., the second node 2002) and sender (e.g., the first node 2001) must be subject to the Ethernet protocol. In other words, the management number of the first node 2001 is the MAC address of sender and the management number of the second node 2002 is the MAC address of receiver. FIG. 5 illustrates an element of network and a part of more complicated network, indeed. For example, the first node 2001 may connect to four nodes of the second to the fifth (2002, 2003, 2004, 2005), as shown in FIG. 4. Here, it is assumed that all nodes are subject to a same protocol. For example, the first node may send the above-mentioned frame via the first to fourth signal transmission pathways (1001, 1002, 1003, and 1004). The MAC address of receiver, which is involved in the Ethernet header of the frame to be transmitted, may be the MAC address of the second node 2002 for example. The third node 2003 may check the MAC address of receiver of this frame and then not receive it. The fourth and the fifth nodes (2004 and 2005) may not receive it similarly. Only the second node 2002 may receive it. Furthermore, the second node 2002 may know that this frame was sent from the first node 2001 by checking the MAC address of sender.

Suppose that the first node 2001 codes a packet to form a frame and then send it to the second node 2002, and then, the second node 2002 receives the frame and then decodes it to reproduce the original packet. Referring to FIG. 1, for example, a packet may be input from the external of the network or from the third node 2003 to the first node 2001. The first node 2001 attaches the MAC addresses of the first node as sender and of the second node 2002 as receiver to this packet. Furthermore, an FCS may be attacked to it to form the frame. The frame formed by this way may be transmitted to the second node 2002 via the first signal transmission pathway 1000. If the frame arrives at an information apparatus of receiver (the second node 2002) according to the MAC address, the receiver may decode the frame according to the Ethernet protocol and then reproduce the digital information before input to the data link layer (packet). Here, the receiver may be permitted to request the repairing or the retransmission as necessary according to the FCS. In the case of no retransmission, the transmission of the packet in the datalink layer may be completed like this. To decode in the data link layer may be to remove excess codes attached to the original digital data (packet) such as MAC address and FCS according to the Ethernet protocol. Since the receiver (the second node 2002) may be able to confirm the managing information of the sender of the received packet, and the receiver may decide whether decoding or further transmitting it.

The reproduced digital information may be a piece of data in the TCP/IP format, that is, a packet. It may be also called an IP packet, which is equivalent to a digital data before coded by the first node 2001 as the sender. As mentioned above, a packet may be a unit of communication data in the network layer (layer-3). The protocol in the network layer may be an IP protocol (i.e., IPv4 or IPv6).

In the case that an element of datalink layer (layer-2) may be formed by FIG. 1 and FIG. 5, an Ethernet header may be like an envelope. The MAC address of receiver may be like an address of destination, written on the envelope. The MAC address of sender may be like an address of sender, written on the envelope. The FCS may be like a contents-certification. Here, the contents of the envelope may be a packet. Accordingly, to code a packet 10o with the Ethernet format may be to enclose the packet into an envelope on which addresses of sender and receiver are written. To decode a frame may be to open the envelope. The contents in the envelope and the data written on the envelope may be independent each other. This may correspond to the independency of layers, as mentioned above. For example, the contents of envelope may be unchangeable even while a house number or a name of town is changed owing to the land readjustment.

In the case that FIG. 1 and FIG. 5 forms an element of an upper layer by one (network layer), the envelope may be an IP header. The IP header may involve IP addresses as the addresses of sender and receiver in the network layer. The contents of the envelope may be a segment. To attach the IP header may be to enclose the segment into the envelope. On the other hand, to remove the IP header may be to open the envelope. Those IP addresses may be allocated with a certain relation to an upper layer by one (transport layer). In this event, the contents of the envelope may be a piece of divided data.

The MAC address is called physical address since each MAC address is allocated to an actual information apparatus (node having physical substance). Any piece of digital data linked to some kind of physical substance is accordingly allocated with a MAC address. In contrast, an IP address is not always related to physical substance. In other words, an IP address may be allocated to a node that an operating system and so forth logically define; and then called a logical address. By this way, a MAC address as well as an IP address may be attached, with a given format, to a piece of digital data (protocol data unit) which has gone through at least one information apparatus having physical substance while transmitting on the internet.

Thus, MAC address which is a management number of information apparatus is turned out to be used as like a backstage pass, in contrast to IP address which is an address on the internet (e.g., the destination of packet). In other words, suppose that information is sent to an internal of a lump of networks on the internet (e.g., LAN). Apparatuses inside this network, or stem nodes or routers which manage the network receive frames only from information apparatuses that have been registered in advance. The MAC address of sender may be examined to distinguish whether or not the frame comes from an apparatus registered in advance. Only if it is confirmed that the sender is registered in advance, the envelope arriving at the receiver may be opened (i.e., the frame is decoded) and then the packet may be received. Otherwise, the frame is not opened (i.e., the frame is not to be decoded.).

MAC address is allocated to an Ethernet card equipped into information apparatus as an intrinsic management number. It is standardized by Institute of Electrical and Electronics Engineers (IEEE) with the length being 48 bits (6 bytes) (MAC address standard). Accordingly, it is formed of sequences of 0 and 1, whose information quantity is more than 280 trillion. One bit among them is allocated to a so-called UL bit. In the case that a MAC address is a global address, UL bit is 1. Otherwise, UL bit is 0. In other words, in the case of global address (UL bit=1), the MAC addresses have to be allocated with no duplicate all over the world. It should be noted here that MAC addresses have to be allocated with no duplicate not only over information apparatuses that are used on active service but also over those having been disposed or lost. It is because the MAC addresses are respectively allocated to information apparatus with physical substance. Another bit among those 48 bits is allocated to a so-called IG bit. In the case that IG bit is 0, it indicates a unicast communication and otherwise a multicast communication. In the unicast communication, a frame is sent to a unique destination in the network of information apparatuses. In contrast, in the multicast communication, a frame may be sent to plural destinations in the network of information apparatuses. By this way, 46 bits after removing those two bits of UL bit and IG bit from the 48 bits is turned out the actual freedom of the MAC address to be practically allocated. It is about 70 trillion in numeric. The 48 bits including those two bits of UL bit and IG bit is divided by six 8-bits and then each 8 bits may be represented by hexadecimal.

In FIG. 6, a typical example of Ethernet card is illustrated. An Ethernet card 3000 comprises mainly a non-volatile memory 3010 storing a MAC address and a chip of operational processing unit for media access controller (MAC) 3020, e.g., MAC controller. The Ethernet cards are, in general, implemented into information apparatuses connected each other via LAN and so forth. For this sake, it is called LAN board or LAN card. However, the standardization of LAN card or LAN board almost conforms to the Ethernet format and then Ethernet card and LAN card may be called almost as synonyms. FIG. 6 illustrates an example wherein an Ethernet card is implemented to a printer, a router, or a desktop personal computer and so on. There is an Ethernet connector at the backside of Ethernet card. Thus, this connector is exposed at the backside of information apparatuses involving Ethernet card. A LAN cable may be inserted into this Ethernet connector. Or an antenna may be attached to the connector and then the corresponding information apparatus may be connected by wireless LAN. A basic configuration may be similar to this example in the case that an Ethernet board or card is connected to a different information apparatus.

On booting information apparatus, or on connecting wired and wireless information apparatus to the network, an operating system of the information apparatus reads an MAC address from a non-volatile memory 3010 equipped into the Ethernet card. A processor unit of the information apparatus writes this MAC address to a processor unit for media access controller (MAC), which is equipped into the Ethernet card. When a data is sent from this information apparatus (sender) to another information apparatus (receiver) connected to the network, this MAC address written into the processor unit for media access controller (MAC) is attached to a frame as MAC address of sender. By this way, the operating system may allocate MAC address to information apparatus with physical substance (actually, Ethernet card), and not regardless to any information apparatus.

It may be thus found that Ethernet card is an example of network cards to be used for connecting information apparatus to the network. In other words, an information apparatus requires at least one Ethernet card and at least one MAC address is able to be allocated to each Ethernet card. The number of MAC addresses of information apparatuses having been used (spent MAC addresses) as well as being used may be increased, as the number of information apparatuses connecting to the internet is increased all over the world.

FIG. 80 is an example of typical usage of MAC address. As mentioned above, the Ethernet card 3000 comprises a memory chip (e.g., non-volatile memory chip 3010) recording a MAC address and a chip of operational processor unit for media access controller (MAC) 3020. The backside of the card has the Ethernet connector (LAN connector). The Ethernet card is also called LAN card and equipped mainly in the backside of personal computer and so on. Thus, by connecting a LAN cable to the Ethernet connector, it may be possible that the personal computer and so on is connected to a local area network (LAN). This LAN cable may be a part or the whole of the signal transmission pathway 1000 which configures the internet.

When personal computer is turned on, information necessary to boot an operation system may be loaded to a main memory (e.g., DRAM) so that the central processing unit (CPU) can boot the operating system. If the operating system finds that an Ethernet card is equipped in the personal computer, the operating system may read a MAC address stored in a memory chip of the Ethernet card. This MAC address may be used by the chip of operational processing unit for media access controller (MAC) 3020.

The Ethernet card may have a physical substance. Accordingly, MAC address stored in an inner memory (e.g., non-volatile memory chip 3010) of the Ethernet card may be regarded as intrinsic to the Ethernet card having physical substance. The media access controller (MAC) may append this MAC address of the sender, the MAC address of the receiver, and a frame check sequence (FCS) to a packet to form a frame. Then, this frame may be sent to the receiver through the local area network comprising signal transmission pathways via the LAN connector. In other words, the frame may be sent and received via the signal transmission pathway. However, the MAC address may be problematic because of irregular edition, inappropriate edition, depletion, or duplicate.

As an example is illustrated in FIG. 81, MAC address is a binary sequence of 48 bits. The upper 24 bits (left half in the example of FIG. 81) is called vendor code 3071, and then allocated to every vendors. The last 2 bits of the vendor code 3071 are UL bit and IG bit. The bottom 24 bits (right half in the example of FIG. 81) is called serial number 3072 and then each vendor may allocate it to products with no duplicate.

On the other hand, the progress of information and communication industry has been rapid since the beginning of the 21st century. More recently, the further vast market is being made. It is expected that everything, such as home electric appliances, houses, cars besides information terminals, is connected to the network; that is, Internet of Things (IoT) comes very soon. It does not belong to any existing markets and may have a potential to change the social structure itself.

It may be regarded that, in such a super great Internet of Things like this, the number of information apparatuses connecting to the network may be from several trillions to several ten trillion. Then, a period of trillion node may begin soon. It may be expected in the concept of the trillion nodes that sensors connecting to the network are spread all over the world for collecting unprecedently detailed and great volume of data. Thus, a plenty of social problems may be solved by analyzing the collected data with advanced computing technology. This conceptual plan has been spread from an international conference called TSensors Summit held 2013.

What may happen, if the existing Ethernet system is expanded to the internet of things with no revision? The MAC addresses may be allocated to whole personal belongings as well as the conventional information apparatuses. Then, it may be spread all over the world. In other words, several trillions MAC addresses may have to be allocated simultaneously with no duplicate all over the world in the global mode (UL bit=1). However, this figure, several trillions, should be the number of information apparatuses connecting to the network on active service. The number of spent MAC addresses may become more than 10 trillion or more until the internet of things rises, if the entire information apparatuses having been used in the past as well as out of use owing to some kinds of reason are counted. As mentioned above, the limit of the number of MAC addresses is actually about 70 trillion. It may be just a matter of time that MAC address dries up.

One of solutions to avoid the problem of MAC address depletion may revise MAC address. For example, when an information apparatus is disposed, the MAC address allocated to it may be deleted and then re-allocated to another information apparatus. Or a MAC address of an information apparatus having not connected to the network more than five years may be regarded as disposed and then re-allocated to another information apparatus. Indeed, the MAC addresses are editable as necessary since they are stored in non-volatile memory chips. For example, in some of operating systems, the MAC address is editable with device manager. Or an application tool to revise MAC address (MAC address changer) may also appear on the market.

However, such an edit of MAC addresses must be done with no duplicate all over the world in the global mode (UL bit=1). Because it may cause a malfunction of the network or makes the network security vulnerable.

The nodes of the internet of things may comprise sensors to be used in trillion nodes as well as information apparatuses with which personal end users to connect to the network. If the world population is seven billion, then about 150 MAC addresses may surround a personal end user in average under the assumption that there are one trillion nodes all over the world. Among them, there may be less than 10 MAC addresses allocated to information apparatuses with which a personal end user uses to connect to the network. The residual 140 MAC addresses may be out of management. Of course, the number of nodes may be more than one trillion in the period of trillion nodes. Like this, the number of MAC addresses per person may be much more than 150 in advanced countries.

Some of those nodes may involve a system to control apparatuses surrounding a person as well as personal information. Even while a trained expert tries to control the entire nodes spread all over the world, it may be extremely hard to simultaneously control more than several trillion nodes. If it was capable, then it would be a difficult problem who would be approved to control the central management system responsibly. It may not be preferable that one of private companies executes the central control selfishly. It may not be realistic at present that artificial intelligence having more ability than human beings execute the central control.

Which kind of problem may occur if none is able to control such a huge network? For example, it may be able for a malevolent hacker to hijack a node out of appropriate management for abusing the node as another person. If such a spoofing is rampant, it may be a significant social problem. An expensive information apparatus may be protected by an advance security technology. However, as explained in the above briefing, the number of those information apparatuses under the control with the advanced security technology may be at most 10 per person in average. In contract, the advanced security technology cannot be used for protecting widespread sensors manufactured at lowest cost as possible. As mentioned above, the number of those sensors may be at least 140 per person in average. In other words, a network user in near future may be surrounded by at least 140 incognita sensors while using 10 secure information apparatuses.

Briefly speaking, sensors to be connected to the internet of things may be hacking devices. Those may be used for social wellness in good faith, whereas the essence may be an endeavor to solve a social problem by using hacking technologies. It may be an opposite side of the same coin as the attack by malevolent hackers.

Even though there are no malevolent hackers, the duplicate usage of a MAC address may cause a malfunction of the network. For example, suppose that two different sensors collect different information and then send them to a server. If those two different sensors accidentally have a same MAC address, the server may misunderstand that two inconsistent information comes from one sensor. For example, suppose that an object inspected (inspection object) by a first sensor is red and another object inspected by a second sensor is blue. If the first and second sensors' MAC addresses are overlap as a result of the duplicate, the information that this server receives may be that the color of an inspected object is blue and simultaneously red. If this is a system for auto-driving, what may happen? A traffic light on a certain cross-point may be red and simultaneously blue.

It may be impossible for logical address to fix such a problem. It is because a logical address is not related to any physical substance. In other words, as long as the internet of things is a network among nodes with physical substance, only the cumulative experience and effort of operating the network under TCP/IP format cannot appropriately manage the internet of things. By this way, it has been just revealed that problem to be solved for the industrial application of the internet of things (e.g., industry 4.0 and industrial internet) is essentially different from any expansion of the conventional information technology.

For example, there may be a plenty of manufacturing apparatuses in manufacturing line in factory. Those manufacturing apparatuses may cooperate each other to manufacture products. It is indispensable to optimize the cooperation of those manufacturing apparatuses as well as to optimize each manufacturing apparatus for improving the product yield. To improve such an optimization, the whole manufacturing apparatuses may be managed by a computer. For this sake, all apparatuses may have to be connected to the network. There may be small and large apparatuses. Large apparatuses may be divided into plurality of parts, and then each part may be connected to the network. The factory network may be enlarged as the factory is advanced and enlarged. In the conventional information technology, a computer program may execute the processes. In contract, the cooperation control may be managed by a computer program, whereas the manufacturing processes must be executed by equipment and apparatuses having physical substance.

Currently, information terminals having such physical substances are allocated with MAC addresses, respectively. Above-mentioned duplicate of MAC addresses may cause an unpredictable malfunction of the manufacturing line. Or a malevolent hacker may be capable of forcing the factory itself to stop the function by hacking. The breakdown of factory of main industry may be a national level security-issues. The damage cost may be equivalent to a large-scale national disaster or a direct attack by missile and so forth.

On the other hand, the conventional security of the information communication on the internet may, for example, mainly aim to protect data transmitting through the signal transmission pathway 1000 from theft by encryption as shown in FIG. 5 and to suppress hacking a stem node with a combination of accounts and passcodes. Anyway, it is an encryption technology. It is thus impossible to matter which kind of physical substance is connected to ends of the signal transmission pathway 1000 in FIG. 5. It is because the conventional internet is actually a logical network. However, on the internet of things, a sender of data and a receiver of data have to be identified as physical substances connecting to ends of a signal transmission pathway. Therefore, the physical identification becomes necessary to identify physical substances connecting to ends of a signal transmission pathway.

SUMMARY OF THE INVENTION

Briefly speaking like this, MAC address may be an editable digital identification of Ethernet card with physical substance. Then, there may be a method to regard MAC address as digital identification for the internet of things. However, there are problems, as shown previously, that MAC address is drying up soon and MAC address itself is editable. It is because, as shown in FIG. 6, MAC address is essentially a code of 48 bits stored in non-volatile memory.

(Spoofing) Indeed, logical addresses like IP address also may have such an inconvenience as well as the MAC address. Whether logical addresses or physical addresses, any of arbitral network addresses on the network must be aimed to be found out from any party to connect to it. Thereby, it is hard to be made secret by encryption, etc. Accordingly, in a usual case, it is possible for a hacker to find out the network address of his/her attacking target. It is unnecessary for the hacker to attack the security system of the attacking target. He/she may theft the network address of the attacking target so that he can impersonate a node of the attacking target. The attack like this is called "spoofing".

However, a situation where the spoofing can be available makes nonsense, if only the logical networks of nodes which have been logically defined are meaningful. In the case of IoT, on the other hand, a network of physical nodes (physical network)—of nodes having a physical substance—and a network of logical nodes (logical network)—of nodes having been defined without regard to any physical substances—may coexist. A logical address is an address of a logical node in the logical network. The MAC address had been expected to link a logical address to a physical node.

That is, if it is easy for a hacker to read and edit MAC addresses, then he/she can read a MAC address of a physical node which he/she is attacking and then copy it to his/her own device (hacker's physical node). Then, he/she may alter the MAC address of his/her attacking target. By doing this, the man-in-the middle attack becomes possible. For this aim, it is unnecessary for the hacker to break any software securities that are built on the logical network.

Or even if the MAC address was non-rewritable, then the hacker may read a logical address of his/her attacking target. The spoofing attack may be possible by copying the read logical address to his/her physical node, after forcing the attacking target malfunction by using an attack like the distributed denial of service attack (DDOS attack). A physical node to which this logical address is copied can be called falsification node. A falsification node can play a central role in order for a hacker to launch the man-in-the middle attack on a physical network.

It may be impossible to avoid the spoofing attack no matter how strong software security we can use if a logical network and a physical network coexist like this. A further problem is that the software security protects the hacker's communications by the encryption, after the hacker spoofed a physical node. Thus, it is very difficult to detect the man-in-the-middle attack. This is a common problem if only the software security is adopted to the network of the internet-of-things (IoT).

By this way, demanded is the technology to automatically detect a falsification node and then to automatically exclude it from an authorized network.

The present disclosure is therefore aim to use a new physical address which may be uniquely allocated to an actual physical substance and be non-editable with suppressing the risk of spoofing in the period of IoT; and then to provide more secure IoT network.

The present disclosure adopts the following methods in order to solve the above-mentioned problems.

The network of electronic apparatus relating to the present disclosure has the characteristics, which comprises the said first physical node is the first electronic apparatus, which has the first semiconductor chip, the first chip identification device, the first measuring device of chip identification, and the first inner memory, wherein, the said first semiconductor chip has the first cell array, wherein, the said first cell array generates the first specific random number using a predetermined method, the said first inner memory stores the first dictionary, the said first chip identification device has the first hash module and the said first cell array, the said second physical node is the second electronic apparatus, which has the second semiconductor chip, the second chip identification device, the second measuring device of chip identification, and the second inner memory, wherein, the said second semiconductor chip has the second cell array, wherein, the said second cell array generates the second specific random number using a predetermined method, the said second inner memory stores the second dictionary, the said second chip identification device has the second hash module and the said second cell array, the said third physical node is the third electronic apparatus, which has the third semiconductor chip, the third chip identification device, the third measuring device of chip identification, and the third inner memory, wherein, the said third semiconductor chip has the third cell array, wherein, the said third cell array generates the third specific random number using a predetermined method, the said third inner memory stores the third dictionary, the said third chip identification device has the third hash module and the said third cell array, the said third physical node sends the first security parameter to the said first hash module, the said first hash module generates the first security state from the said first specific random number and the said first security parameter, the said second physical node sends the second input signal to the said first physical node, the said first physical node inputs the said second input signal to the said first chip identification device, the said first chip identification device generates the first output signal from the said second input signal and (at) the said first security state, the said first physical node returns the said first output signal to the said second physical node, the said second physical node inputs the said first output signal to the said second measuring device of chip identification, the said second measuring device of chip identification defines the first set of input-output—the set of input and output signals—, made of (from) the said second input signal and the said first output signal, the said second physical node stores the said first set of input-output into the said second dictionary, the said fourth physical node is the fourth electronic apparatus, which has the fourth semiconductor chip, the fourth chip identification device, the fourth measuring device of chip identification, and the fourth inner memory, wherein, the said fourth semiconductor chip has the fourth cell array, wherein, the said fourth cell array generates the fourth specific random number using a predetermined method, the said fourth inner memory stores the fourth dictionary, the fourth chip identification device has the fourth hash module and the said fourth cell array, the said second physical node requests the said third physical node to issue the said first security parameter and to send it to the said fourth physical node, the said third physical node issues the said first security parameter and then sends it to the said fourth hash module according to the said request, the said fourth hash module generates the fourth security state from the said fourth specific random number and the said first security parameter, the said second physical node sends the said second input signal to the said fourth physical node, the said fourth physical node inputs the said second input signal to the said fourth chip identification device, the said fourth chip identification device generates the fourth output signal from the said second input signal and (at) the said fourth security state, the said fourth physical node returns the said fourth output signal to the said second physical node, the said second physical node inputs the said fourth output signal to the said second measuring device of chip identification, the said second measuring device of chip identification defines the fourth set of input-output as the set of input and output signals—, made of the said second input signal and the said fourth output signal, the said second physical node compares the said fourth set of input-output with the said first set of input-output, which is stored in the said second dictionary, the said fourth physical node is identified as the said first physical node, if the said fourth set of input-output is consistent with the said first set of input-output.

Or the present disclosure has the characteristics, wherein, the said first physical node, further, has the first key generator, the said fifth physical node is the fifth electronic apparatus, which has the fifth semiconductor chip, the fifth chip identification device, the fifth measuring device of chip identification, and the fifth inner memory, wherein, the said fifth semiconductor chip has the fifth cell array, wherein, the said fifth cell array generates the fifth specific random number using a predetermined method, the said fifth inner memory stores the fifth dictionary, the fifth chip identification device has the fifth hash module and the said fifth cell array, the said fifth measuring device of chip identification sends the 51-th input signal to the said first physical node, the said first physical node generates the 51-th output signal from the said 51-th input signal and (at) the said first security state, the said first physical node inputs the said 51-th output signal to the said first key generator, the said first key generator generates the first secret key and the first public key, the said first hash module generates the first hash value by hashing the said first public key and the said first dictionary, the said sixth physical node is the sixth electronic apparatus, which has the sixth semiconductor chip, the sixth chip identification device, the sixth measuring device of chip identification, the sixth inner memory, and the sixth key generator, wherein, the said sixth semiconductor chip has the sixth cell array, wherein, the said sixth cell array generates the sixth specific random number using a predetermined method, the said sixth inner memory stores the sixth dictionary, the sixth chip identification device has the sixth hash module and the said sixth cell array, the said third measuring device of chip identification sends the sixth security parameter to the said six hash-module, the said sixth hash-module generates the sixth security state from the said sixth specific random number and the said sixth security parameter, the said fifth measuring device of chip identification sends the 56-th input signal to the said sixth physical node, the said sixth physical node generates the sixth output signal from the said 56-th input signal and (at) the said sixth security state, the said sixth physical node inputs the said sixth output signal to the said sixth key generator, the said sixth key generator generates the sixth secret key and the sixth public key, the said first physical node encrypts the said first hash value and the said sixth public key using the said first secret key and thus generates the first electronic signature, and the said first physical node sends the said first hash value and the said first electronic signature to the sixth physical node.

Or the present disclosure has the characteristics, wherein, it comprises the seventh physical node and the eighth physical node, the said seventh physical node is the seventh electronic apparatus, which has the seventh semiconductor chip, the seventh chip identification device, the seventh measuring device of chip identification, and the seventh inner memory, wherein, the said seventh semiconductor chip has the seventh cell array, wherein, the said seventh cell array generates the seventh specific random number using a predetermined method, the said seventh inner memory stores the seventh dictionary, the seventh chip identification device has the seventh hash module and the said seventh cell array, the said seventh dictionary registers the seventh management range, comprising an assemble of plural sets of input-output, a physical node with its set of input-out belonging to the said seventh management range is under the control of the said seventh physical node, the said eighth physical node is the eighth electronic apparatus, which has the eighth semiconductor chip, the eighth chip identification device, the eighth measuring device of chip identification, and the eighth inner memory, wherein, the said eighth semiconductor chip has the eighth cell array, wherein, the said eighth cell array generates the eighth specific random number using a predetermined method, the said eighth inner memory stores the eighth dictionary, the eighth chip identification device has the eighth hash module and the said eighth cell array, the said eighth dictionary registers the eighth management range, comprising an assemble of plural sets of input-output, wherein, a physical node with its set of input-out belonging to the said eight management range is under the control of the said eighth physical node, a physical node under the management of either the said seventh physical node or the said eighth physical node belongs to the joint management range that the said seventh and eighth physical nodes jointly manage, the said seventh and/or eighth physical nodes exclude a physical node, which are registered in neither the said seventh dictionary nor the said eighth dictionary, from the said joint management range, and the said joint management range is jointly managed as one closed physical network.

The present disclosure may be capable of providing more secure IoT network by using non-editable physical chip identification to be uniquely allocated to actual physical substances with the low risk of spoofing attack in the era of internet of things.

FIG. 7 illustrates a basic structure of information apparatus 140. For example, a plurality of semiconductor chips (e.g., N chips, the first chip 110, the second chip 120 . . . the Nth chip 130) is equipped in the information apparatus 140. In FIG. 8, this information apparatus 140 is the first node 2001 connecting to the second node 2002 via the signal transmission pathway 1000. The chip 110 inside the first node 2001 connects to the signal transmission pathway 1000 via the external input/output (I/O) 50. However, the first chip 110 is equipped with a chip identification device 60.

The chip identification device 60 of the present disclosure generates an output signal in response to call received from the external input-output (I/O) 50 (input signal). The generated output signal is generated using a physical randomness. As an example, this call can be given by the operating system. Or, as another example, this call can be given by another electronic apparatus in the state of communication with the electronic apparatus having the chip identification device 60. Moreover, the output signal may be changeable with the change of input signal. This property decisively distinguishes the present disclosure from MAC address described in FIG. 6. In other words, MAC address is data stored in non-volatile memory chip 3010, and thus unable to change output in response to the change of input signal.

(Physically Unclonable Function) A technology of such a function has collected attention in recent years, which is called physically unclonable function (PUF). This identifies different semiconductor chips by using physical properties intrinsic to those chips, similarly to the identification of human being by using bio information such as fingerprints, retina and so forth. The necessary requirements may be (1) Different PUFs must output different outputs even if a same input is input to them. (2) Different outputs must be output if different inputs are input to a same PUF. (3) It is impossible to predict an output in response to unknown input even though a set of know inputs and outputs is theft. (4) The relation of input and output must be stable and reliable. Among them, the necessary requirement (4) is self-evident as long as PUF is a mass product.

In the case of IC products (products of semiconductor chips), there may be mainly two types of PUFs, one may adopt opto-chemical properties of package material (coating PUF) (See the patent literature 1), and the other may adopt a PUF which is dependent to chip itself (chip PUF). Particularly in recent years, theft of encryption key stored in chip and problems of chip counterfeit have collected people's attention and then the latter, the technology to equip PUF into a chip is more attractive. For example, an encryption key and a PUF data which PUF outputs in response to an input code naively selected are input to an active code generator and then the generated active code is stored in an inner memory. The active code may be generated only once before the shipment of chip or at the registration in advance. After that, the active code stored in chip as well as PUF data may be input to a key generator as required to generate the encryption key in the chip. In this method, neither encryption key nor input code used to generate the encryption key is stored in the inner memory. Accordingly, as long as the chip is not backed while executing the encryption, it must be impossible to theft the encryption key. On the other hand, it may be possible to theft the active code. However, even though stealing only the active code, it must be impossible to copy the encryption key without the PUF data. In other words, as long as the input code used to generate PUF data is unknown, two of the above necessary requirements (2) and (3) are useful to prohibit the copy of the encryption key. By this way, an advantage of PUF is to make it very hard to copy an encryption key. (Patent literature 1: Japanese Patent publication No. 2009-519473.)

However, hottest usage of PUF may be the individual authenticate of IC chip. The necessary requirement (1) is indispensable for this aim. That is, PUF is required to output an identification intrinsic to a chip (PUF data) in response to an input read signal (i.e., input code in this event).

Furthermore, on the internet of things, it is expected that the number of nodes is much larger than several trillions, and then the population to be identified by PUF has to become incommensurably large. In other words, the following necessary requirement should be added to the necessary requirements (1)-(4). That is, (5) the number of output patterns in response to an input must be as limitlessly large as practically infinite. By this way, it may enable for using PUF to realize the physical identification of chips in the extremely great internet of things.

Here, suppose that a coating PUF satisfies the necessary requirements (1)-(5). The read of coating PUF is executed by optically stimulating the package. This may just mean that the (electronic) chip identification is impossible via the network. Accordingly, the following necessary requirement should be added further. That is, (6) the chip identification in the network must be an electronic signal which is specific to a chip.

There may be two types of chip-PUFs satisfying the above necessary requirement (6) in the literature. One may be a circuit PUF with using circuit variance. The other may use the variance of microstructures other than circuit (manufacturing PUF) (Patent Literature 2). The circuit PUF is further divided into two types; one may use a wiring delay of circuits (delay PUF) (Patent Literature 3) and the other may use the circuit metastability (metastability PUF) (Patent Literature 4). The delay PUF may use uncontrollable variance related to the operation time of plurality of circuits which are integrated in IC in a same design specification. Typical examples of circuits to be used here may be an arbiter circuit, a glitch circuit, a ring oscillation circuit and so forth. Typical examples adopted in the metastability PUF may be mainly a static random-access memory (SRAM hereinafter) and a latch circuit (butterfly PUF). (Patent Literature 2: Japanese Patent publication No. 2015-201884.) (Patent Literature 3: PCT Patent publication No. WO2011118548A1.) (Patent Literature 4: Japanese Patent publication No. 2013-131868.)

However, a weak point of circuit PUF is that an individual difference is too small, which is a disadvantage in satisfying the necessary condition (5). Additionally, the output is unstable, which is a disadvantage in satisfying the necessary condition (4). Furthermore, the output of circuit PUF is too sensitive to an external environment like temperature change to be tough to a fault attack. It may be accordingly forced to add an excess amplifier, a temperature sensor and so forth. By this way, a design load is increased and then the limitation to the length of PUF data is limited. In other words, it is very hard to satisfy the necessary condition (5). While the length of PUF data itself is short, the number of chips to be authenticated is limited even though output is random.

In manufacturing PUF, the manufacturing variance of interlayer via to be integrated on purpose may be adopted. It has a potential to resolve a plenty of the weak points of circuit PUF. However, since special structures unseen in the conventional semiconductor products is necessary to be integrated, the load on manufacturing process is generally enlarged. By this way, it is turned out that the hurdle of being widespread over the whole of IoT is high.

Moreover, it has been proposed to adopt the reliability of devices (Patent Literature 5). However, the reliability of devices itself is too low to satisfy the necessary requirement (4). In addition, it is also reported to use the capacitor variance of dynamic random-access memory (DRAM hereinafter) on the power-on (Non-Patent Literature 5). This may have a problem common with a latch circuit PUF. In other words, the individual difference is too small to be tough to the fault attack with the usage of the environment change. (Patent Literature 5: Japanese Patent publication No. 2015-139010.) (Non-Patent Literature 1: Fatemeh Tehranipoor, Nima Karimian, Kan Xiao, John Chandy, "DRAM based Intrinsic Physical Unclonable Functions for System Level Security", in GLSVLSI'15 Proceedings of the 25th edition on Great Lakes Symposium on VLSI, pp. 15-20, 2015.)

As mentioned above, even while there may still be problems to be independently solved, it may be regarded that PUF is efficient to realize physical identification of smallest element of nodes having physical substance (semiconductor chip) instead of using MAC address in mutual connections on the network. In order to be a PUF, a sufficient condition must be satisfied as well as the said necessary conditions (1)-(6); which is "physically copy-inhibit (physically unclonable)". However, this sufficient condition is not indispensable to well-define a physical authentication in the network. The present disclosure doesn't aim to realize a PUF and is to make secure physical authentication in the network. Accordingly, the chip identification device proposed in this disclosure does not always satisfy the sufficient condition for PUF, "physically unclonable".

For an example, as shown in FIG. 8, suppose that the first node 2001 equipped with the first chip 110 having the chip identification device 60 of the present disclosure exchanges data (communicate) with the second node 2002 via the signal transmission pathway 1000.

For example, the second node 2002 gives the signals A, B, C, . . . to the chip identification device 60 equipped into the first node 2001 via the signal transmission pathway 1000 as input codes, in order to identify the first node 2001 connected to the second node 2002 in some kind of format. The chip identification device 60 respectively returns the signals A1, B1, C1 . . . to the second node 2002 via the signal transmission pathway 1000. Here, the second node 2002 regards that "the first node 2001 is a device returning the signals A1, B1, and C1 in response to the input of the signals A, B, and C, respectively". In this event, a sequence represented with (A, B, C . . . : A1, B1, C1 . . . ) may be called communication series. Or in another example, the second node 2002 regards that the first node 2001 is a device returning the signal F1, A1, and K1 in response to the input of the signal F, A, and K, respectively. The communication series in this event can be represented by (F, A, K . . . : F1, A1, K1 . . . ). However, such a communication may not be executed on all possible input signals. Since the number of patterns of input signals is limitless, it may be impractical that all possible inputs are input to a same device. Rather, the limitless number of the input patterns may be convenient to make the number of devices connecting to the first node 2001 in the network limitless. Thus, when connecting the first node 2001 to the second node 2002 at the first time, the second node 2002 registers the first node 2001. It may be preferable that this registration is executed by a regular user of the second node 2002 or a person to whom the regular user of the second node 2002 transfers the authority.

(Communication in the physical layer) In the example of FIG. 9, a regular user 92 of the second node 2002 uses the second node 2002 by using the first node 2001 that the regular user 92 owns. The first node 2001 and the second node 2002 communicates (connects) each other using the communication series 80 via the first signal transmission pathway 1000; and then cooperate to execute what the regular user 92 of the second node 2002 wants to do. However, the regular user 92 of the second node 2002 may not commit the communication series 80. If he commits, the management and usage of the second node 2002 may be complicated so as to degrade the convenience of the internet of things.

If the first node 2001 has MAC address, and if the first and second nodes (2001 and 2002) connect each other in the Ethernet format, then it may be supposed that the chip identification device 60 is unnecessary. However, as mentioned above, we need to know the problem that, if the mutual authenticate of nodes having physical substances is executed by the Ethernet format, then the MAC address is editable and vulnerable to the malevolent hacking. From such a viewpoint, the necessity of the present disclosure may be noticed as follows:

Suppose the case that a remote attacker attacks the first node 2001 shown in FIG. 9 by remote. For example, the remote attacker may irregularly replace the first node 2001 with a fake node that he owns. Here, it is required that the fake node completely imitates the communication series 80 without using the chip identification device 60 equipped in the first node 2001. It may be inspected whether or not this is possible. If impossible, it may be proved that the chip identification formula of the present disclosure can protect the hijack of apparatus. As a presumption for this, it should be assumed that one who irregularly tries to replace the first node 2001 with a fake node (remote attacker) cannot actually take the first node 200 in his hand. This may be a natural requirement on the internet of things. In other words, the remote control is assumed by the hijack on the internet of things. The aim of the remote attacker is to remotely control the second node 2002 by using the fake node that he owns at hand. To take the first node 2001 of FIG. 9 in his hand, he has to move to the location that the first node 2001 regularly connecting to the second node 2002 exists and then take it in secret. This clearly shows that this attack cannot be completed in the network. In other words, it may be identical to that the remote control of the second node is impossible without being noticed by the regular user of the second node 92. When a fake node is connected to the second node 2002 in the network, the second node 2002 inputs an input signal (R, L, A, . . . ) to the fake node via the network in order to identify the fake node. Suppose then that the fake node returns an output signal (R3, L3, A3, . . . ) to the second node 2002. A fake communication series (R, L, A, . . . : R3, L3, A3, . . . ) is thus formed. In other words, the remote-attacker must completely fit the fake communication series to the regular communication series 80, e.g., (R, L, A, . . . :R1, L1, A1, . . . ). That is, if (R3, L3, A3, . . . ) is successfully fit to (R1, L1, A1, . . . ), the remote-attack may be succeeded. For example, the remote-attacker may fit (R3, L3, A3, . . . ) to the registration code stored in the inner memory of the second node 2002.

There may be basically two methods of the remote attack. The first method is to theft an input code and a registration code from information which is stored in the inner memory of the second node 2002. For example, suppose that the remote attacker succeeds in stealing the (R1, L1, A1) and the input code (R, L, A). In this event, the remote attacker is able to remotely control the second node 2002 irregularly by replacing the first node 2001 with the fake node that he owns. To protect the system from such a remote attack, the system manager must strictly protect the inner memory of the second node 2002.

It may be preferable that a trained expert strictly protects the second node 2002 in which inner memory input and registration codes are stored. Like this, the second node 2002 may be centered, play a central role, and be under the central control by security supervisors. This is called stem node. On contrast, nodes connecting to a stem node and out of the central control by security supervisors are called peripheral nodes. In FIG. 10, three peripheral nodes (the first peripheral node 410, the second peripheral node 420, and the third peripheral node 430) connect to the stem node 400. The stem node 400 stores the input code 402 and the list of registration codes 403 in the inner memory 401. On contrast, the peripheral nodes store neither registration codes nor input codes and respectively include chips having different chip identification devices. For example, FIG. 7 is an example of a basic structure of peripheral node. Moreover, a set of the input code 402 and an element of the list of registration codes 403 stored in the inner memory 401 of the stem node 400 can compose a communication series associated to a peripheral node.

As mentioned above, the first method of the remote attack may be blocked by protecting the stem node storing information about the communication series under the central control. However, in the case that the number of nodes connecting to the network is more than several trillions, it may be impossible to strictly protect and manage the entire apparatuses in a similar way to the stem nodes. This may expose the limitation of the central control. Then, the remote-attacker may try to hijack an apparatus out of the central control, in the example of FIG. 10, at least one of the first peripheral node 410, the second peripheral node 420, the third peripheral node 430, . . . . This is the second method of the remote attack. However, this attack may also fail since those peripheral nodes do not store the pair of input code and registration code (communication series 80) in the inner memory.

For example, the remote attacker may naively select and send a signal (X, Y, Z) to the first peripheral node 410 and then receive the response (X1, Y1, Z1). Here, the first peripheral node 410 may be equipped with a chip identification device. In the case that the signal (X, Y, Z) differs from the input code 402 (P, S, T) that the stem node 400 uses to connect to the first peripheral node 410, the response (X1, Y1, Z1) that the remote attacker receives may differ from the registration coded 402 (P1, S1, T1) stored in the stem node 400. It is presumed here that a chip identification device equipped in a peripheral node has (the property of input independence) in which a chip identification device outputs different outputs in response to different inputs. Thus, as long as the chip identification device has (the property of input independence), the second method of the remote attack must fail. Here, what may happen if the peripheral nodes and the stem node adopt the mutual communication of the Ethernet format? The remote attacker may be able to easily get the MAC address from the inner memory of the Ethernet card (e.g., the non-volatile memory chip 3010 in FIG. 6) equipped into the peripheral node. By this way, it is turned out meaningful that the chip identification device of the present disclosure replaces the MAC address.

The residual problem here may be that the set of signals (X, Y, Z) naively selected by the remote attacker accidentally coincides with the input code 402 (P, S, T) stored in the inner memory 401 of the stem node 400. To avoid such an accident, the number of elements of input codes should be as large as possible and further should be confidential to anyone other than the administrators of the stem server 400. Then, this information should be strictly protected by the administrators of the stem node 400. Moreover, it may be preferable to occasionally change it. When this change is made, the stem node 400 should re-register the peripheral nodes connecting to the stem node 400. To reduce the frequency of re-registration like this, the number of elements of input codes should be as large as possible. The input codes may serve as passcodes while satisfying this requirement.

In other words, the format of mutual communication with using the chip identification device of the present disclosure is to govern the mutual communication among nodes having physical substances as similar to the Ethernet format. On the other hand, the nodes composing the network are divided into nodes storing information related to mutual communication under the central control (stem nodes) and the others (peripheral nodes). The peripheral nodes are equipped with the chip identification devices of the present disclosure instead of storing information related to mutual communication and return output in response to a predetermined input. (The property of input independence) must be satisfied, that is, a different input causes a peripheral node to return a different output. (The property of input independence) is described in detail below.

Here, it may be preferable that an input code is used commonly to inspect the identification ID of various peripheral nodes. In this event, the input code may not be particularly necessary to independently access each of aimed peripheral nodes. From such a condition, the input code described in the present disclosure may be called a "common passcode" hereinafter. By this way, the above-mentioned stem node may therefore have at least one common passcode.

In the case that the above-mentioned stem node 400 is a computer (personal computer and so son), the first to third nodes which connect to this, 410, 420, 430, are peripheral nodes to be used by connecting to the computer. For example, they may be a mouse, a keyboard, a microphone, and so forth. As mentioned above, the stem node that is the mainbody of the computer should be responsibly administrated by an administrator with advanced anti-virus software. The invention related to the present disclosure aims to protect the mainbody of the computer from irregular replacement of peripheral nodes (mouse, keyboard, microphone and so on). By this way, the peripheral nodes that anti-virus software protecting the mainbody of the computer cannot protect may be protected from the remote attack.

In the case that the above-mentioned stem node 400 is a server to play a central role of network service, for example, the first, second, and third peripheral nodes (410, 420, and 430, respectively) may be terminals of end users to use this network service. For example, they may be a smart phone, a tablet, a computing terminal, a remote controller of smart electrical apparatus, a controlling panel of auto-driving car, or other wearable terminals. As mentioned above, it should be presumed that the stem nodes are responsibly administrated by trained experts with a perfect command of advanced security software. One of aims of the present disclosure is to prohibit the irregular access to server (stem node) by the irregular replacement (hijack) of terminals of end users (smart phone, tablet, computing terminal, other wearable terminals and so on). By this way, the whole system may be able to be protected from remote attack going through innumerable information terminals in the network, which even trained experts cannot protect with a perfect command of advance security software.

In the case that the above-mentioned stem node 400 is a data center to play a central role of cloud-sensing service, for example, the first, second, and third peripheral nodes (410, 420, and 430, respectively) may be sensors to collect data that the data center requires. As mentioned above, the number of sensors may be innumerable and distributed widespread all over the world. Accordingly, it may be actually impossible to protect all of the entire sensors from the remote attack by the central control. The examples of those sensors may be innumerable, i.e., GPS, virus monitor, thermometer, seismograph, socket-type visible light communication device, biosensor, various smart meters and so on. As mentioned above, it should be presumed that the stem nodes are responsibly administrated by trained experts with a perfect command of advanced security software. One of aims of the present disclosure may be to prohibit the irregular access to stem nodes by the irregular replacement (hijack) of those sensors. By this way, the innumerable sensors in the network for cloud-sensing may be able to be protected from the remote attack, which even trained experts cannot protect with a perfect command of advance security software.

As one of characteristics of the present disclosure, peripheral nodes out of the central control (e.g., the first node 410, the second node 420, and the third node 430) may not store input data such as the above-mentioned passcode and registration code. It may be characteristic to divide the entire nodes into "stein node" which stores data required for authenticate communication (e.g., common passcodes or registration codes) and "peripheral node" which does not store it. Simultaneously, it may be characteristic that "stem node" which stores data required for authenticate communication (e.g., common passcodes or registration codes) is under central control and "peripheral code" which does not store it is equipped with chip identification device of the present disclosure. However, it may be a common nature with the Ethernet format to govern mutual communication among nodes having physical substances.

As shown in FIG. 11, at least one of the above-mentioned common passcodes may be stored in the first stem node 1400 and sent to peripheral nodes to identify those peripheral nodes. For example, the first stem node 1400 sends the first common passcode 1410 to the first, second and third peripheral nodes (410, 420 and 430, respectively). Those peripheral nodes may regard the first peripheral node 1400 as "what sends the first common passcode 1410".

As shown in FIG. 12, the first peripheral node 410, the second peripheral node 420, and the third peripheral node 430 return the first identification 4101, the second identification 4201, and the third identification 4301, respectively, to the first stem node 1400 in response to this input of the first common passcode 1410. The first stem node 1400 regards the first peripheral node 410, the second peripheral node 420, and the third peripheral node 430 as respectively "what return the first identification 4101, the second identification 4201, and the third identification 4301 in response to the first common passcode 1410". Here, any two of the first, second and third identifications (4101, 4201 and 4301, respectively) may be different each other. Furthermore, the first stem node 1400 may be capable of using another common passcode. This may be helpful for more advanced security administration. By this way, it may be preferable that each stem node uses a plurality of common passcodes.

Thus far, (the property of output independence) has been presumed that different chip identification devices output different outputs even to a same input code. (The property of output independence) may be described in detail bellow.

In actual network, there may be innumerable peripheral nodes and the number of stem nodes may be more than one. For example, FIG. 13 illustrates an example of network comprising two stem nodes (the first stem node 1400 and the second stem node 2400) and five peripheral nodes (the first peripheral node 410, the second peripheral node 420, the third peripheral node 430, the fourth peripheral node 440, and the fifth peripheral node 450). A network unit comprises the first stem node 1400 as central and the fourth peripheral node 440 and the fifth peripheral node 450. The other network unit comprises the second stem node 2400 as central and the first peripheral node 410, the second peripheral node 420, and the third peripheral node 430. Here, these network units connect each other via the connection of the first stem node 1400 and the second stem node 2400. Furthermore, in the network units, the fourth peripheral node 440 and the fifth peripheral node 450 connect only to the first stem node 1400, while the first peripheral node 410, the second peripheral node 420, and the third peripheral node 430 connect only to the second stem node 2400. On the other hand, the fourth peripheral node 440 connects to both the first stem node 1400 and the second stem node 2400.

In other words, in the network structure of the present disclosure, topology to connect plurality of network units may be defined by the connection of stem nodes belonging to different network units each other and the connection of stem nodes and peripheral nodes belonging to different network units each other. In particular, in the topology of network of the present disclosure, it may be characteristic that no connection of peripheral nodes belonging to a same network unit or to different network units each other.

The connection used here is the authentication connection that nodes mutually authenticate each other by the above-mentioned authentication procedure and not a simple link. Unless otherwise specially noted below, the connection may imply the term of authenticate connection to discuss the network of information apparatuses or electronic apparatuses, which have physical substances. Furthermore, the term of (authentication) connection in this meaning may involve a connection among devices (modules or chips) in one packaged system.

For example, a vehicle comprises plurality of controlling systems inside. They are regarded as an integrated system, wherein plurality of subsystems such as driving system, braking system, navigation system, auto-driving system if auto-driving vehicle, and so forth co-work. These subsystems may respectively correspond to the above-mentioned network units, or plurality of co-working network units. Thus, it may be found that a vehicle is a network comprising plurality of network units. Furthermore, the smallest unit of peripheral and stem nodes, which compose each network unit is a semiconductor chip. The peripheral nodes may, for example, be sensors to sense temperature of engine, to sense acceleration that parts of vehicle body feel, to sense residual quantity of fuel, and more various sensors to be took into consideration. A stem server may be an arithmetic processing unit to analyze and use information to be collected by those sensors. Other than vehicles, airplanes, trains, factories, power plants, and facilities and devices, which relate to social infrastructure such as power transmission lines and so forth, may be regarded as one packaged system as well. Accordingly, there may be a network which is to be a target of the present disclosure, as long as a semiconductor chip is used as a part of an electronic apparatus comprising that network.

As one of characteristics of the present disclosure, in such a network comprising plurality of stem nodes and plurality of peripheral nodes, stem nodes are permitted to directly connect each other while peripheral nodes not to directly connect each other. This is because peripheral nodes out of central control do not store input data such as common passcode. Instead, peripheral nodes are able to indirectly connect each other via stem nodes.

For example, the first peripheral node 410 and the second peripheral node 420 are able to indirectly connect each other via the second stem node 2400. The fourth peripheral node 440 and the fifth peripheral node 450 are able to indirectly connect each other via the first stem node 1400. The third peripheral node 430 and the fourth peripheral node 440 are able to indirectly connect each other via the first stem node 1400 and the second stem node 2400, which are connected each other. By this way, data flowing through plurality of peripheral nodes may be monitored by plurality of stem nodes. According to the present discloser, it is turned out possible to concentrate the resource for central control only on stem nodes.

For example, a concrete example of FIG. 13 may be a combination of an auto-driving vehicle and a smart house. For example, one network unit comprising the first stem node 1400, the fourth peripheral node 440, and the fifth peripheral node 450 may be parts to compose an auto-driving vehicle together. Simultaneously, the other network unit comprising the second stem node 2400, the first peripheral node 410, the second peripheral node 420, and the third peripheral node 430 may be pars to compose a smart house together. For example, in the case that a battery of the auto-driving vehicle compensates that of the smart house at the time of disaster, a sensor to grab the situation of the battery of the smart house (e.g., the fourth peripheral node 440) may be equipped into the auto-driving vehicle. By this way, the fourth peripheral node 440 can connect both of the first stem node 1400 and the second stem node 2400. Or a taxi system in which plurality of auto-driving vehicles are linked to co-work may be another example of the present disclosure.

As shown in FIG. 14, in the network with the present disclosure, the above-mentioned topology permits one peripheral node (e.g., the first peripheral node 410) connect to plurality of stem nodes (e.g., the first stem node 1400, the second stem node 2400 and the third stem node 3400). The first stem node 1400, the second stem node 2400, and the third stein node 3400 store the first passcode 1410, the second passcode 2410, and the third passcode 3410, respectively. In other words, the first peripheral node 410 regards the first stem node 1400 as "what inputs the first passcode 1410", the second stem node 2400 as "what inputs the second passcode 2410", and the third stem node 3400 as "what inputs the third passcode 3410". In response to those inputs, the first stem node 1400 regards the first peripheral node 410 as "what returns the first identification 11", the second stem node 2400 regards the first peripheral node 410 as "what returns the second identification 12", and the third stem node 3400 regards the first peripheral node 410 as "what returns the third identification 13". Here, the data related to the communication authentication (common passcode, or identification to be returned in response to common passcode, and so on) may be stored in stem nodes and not in peripheral nodes. In peripheral nodes, the chip identification devices of the present disclosure may be stored.

Among them, for example, the first stem node 1400 and the second stem node 2400 directly connect each other, while neither the first stem node 1400 nor the second stem node 2400 directly connect to the third stem node 3400. Here, none proves that the third stem node 3400 is not a remote attacker. Thus, it is significantly important that the data related to connection authentication (common passcode) is not stored in the first peripheral node 410. For example, when the first peripheral node 410 is firstly registered to the first stem node 1400, the first stem node 1400 may be able to limit the first peripheral node 410 to connect to another stem node after the first stem node 1400. It is because the external I/O of the first peripheral node 410 transfers the received signals to the first stem node 1400, and then the first stem node 1400 may be able to monitor the entire inputs to the first peripheral node 410.

Here, if a code coincident to the first passcode 1410 is found, the first stem node 1400 may execute an emergency treatment. For example, the first stem node 1400 may terminate the first peripheral node 410 from the network or use the first peripheral node 410 only for monitoring the movement of the remote attacker. In the case that the second stem node 2400 registers the first peripheral node 410 next to the first stem node 1400, the second stem node 2400 requires the first stem node 1400 to permit the second stem node 2400 to register the first peripheral node 410 in advance. For this, it is necessary that the first and second stem nodes have been connected each other in advance. If the first stem node 1400 permits the second stem node 2400 to access to the first peripheral node 410, the first peripheral node 410 receives the second passcode 2410 and then returns the identification 12 to the second stem node 2400. Thus, the second stem node 2400 registers the first peripheral node 410. Hereinafter, the second stem node 2400 and the first peripheral node 410 may be able to execute the authentication connection with no permission of the first stem node 1400. Next, in order that the third stem node 3400 connects to the first peripheral node 410, the first stem node 1400, or both of the first stem node 1400 and the second stem node 2400 is necessary to permit the first peripheral node 410 to receive the third common passcode 3410 in advance. By this way, the first stem node 1400, or both of the first stem node 1400 and the second stem node 2400 may be authorized to limit the connection of the third stem node 3400 and the first peripheral node 410. In other words, in the case that non-permitted code is input to the first peripheral node 410, the connection may be denied or limited. The execution of this authority may be granted to regular administrators of the first stem node 1400 or those of both of the first stem node 1400 and the second stem node 2400.

Next, the requirements that the chip identification method of the present disclosure should satisfy may be explained.

(The property of output independence) At first, let us input the same input signal (Q) to two different chip identification devices (21 and 22), as illustrated in FIG. 15. Thus, the first chip identification device 21 outputs the output signal A. The second identification device 22 outputs the output signal B. However, the output signal A and the output signal B are different. The output signals, thus, must be different as long as the chip identification devices are different, even while the input signals are identical. This feature is necessary to the examples of using a common passcode (FIGS. 10, 12). That is, even though the identical input signals are input to two different chip identification devices, the output signals to be output from those different chip identification devices should be different.

For example, as illustrated in FIG. 11, the first stem node 1400 inputs the first common passcode 1410 to the first peripheral node 410, the second peripheral node 420, and the third peripheral node 430, to which different chip identification devices are respectively equipped. The output signals to be output from those peripheral nodes, as illustrated in FIG. 12, the first identification 4101, the second identification 4201, and the third identification 4301, respectively. Here note that any two among the first identification 4101, the second identification 4201 and the third identification 4301 are different each other.

(The property of input independence) To the contrary, if different input signals are input to the same chip identification device, then the outputs are different with regard to input signals. For example, as illustrated in FIG. 16, if the input signal C is input to the chip identification device 60, then the output signal A is output. If the input signal D is input to the chip identification device 60, then the output signal B is output. Here note that the output signals A and B are different each other as long as the input signals C and D are different. However, the input signals C and D are from an identical source or respectively from reciprocally different sources. In the case that those input signals are from reciprocally different sources, this feature is necessary, as illustrated in FIG. 14, so that different stem nodes input different passcodes to a same peripheral node and then those different stem nodes respectively receive different identifications from the same peripheral node. More concretely, the first stem node 1400 inputs the first common passcode 1410 to the first peripheral node 410, and then the first peripheral node 410 outputs the first identification 11 to the first stem node 1400. The second stem node 2400 inputs the second common passcode 2410 to the first peripheral node 410, and then the first peripheral node 410 outputs the second identification 12 to the second stem node 2400. The third stem node 3400 inputs the third common passcode 3410 to the first peripheral node 410, and then the first peripheral node 410 outputs the third identification 13 to the third stem node 3400. It is not necessary to say that the above identifications 11, 12, and 13 are all different.

That is, FIG. 13 is an example of network structures which uses (the property of input independence) and (the property of output independence) at the same moment. Actually, in most of cases, the number of stem nodes may be more than two and the number of peripheral nodes may be more than five. FIG. 13 is a simple example and not beyond.

(The property of output unpredictability) As illustrated in FIG. 17, let us suppose it has been known that n output signals R1 to Rn are obtained with respect to n input signals Q1 to Qn, respectively, wherein those input signals are input to the same chip identification device 60. In this event, it is impossible to predict the output signal Rn+1 to be obtained by giving the same chip identification device 60 the input signal Qn+1 that is different from all of n input signals Q1 to Qn from the set of (Q1, R1), (Q2, R2), . . . , (Qn, Rn), without giving this Qn+1 to the same chip identification device 60. However, n is an integer larger than or equal to 2. This condition may be broken if the chip identification device 60 generates an output with some kind of algorithm, that is, software outputs an identification. Accordingly, it is turned out that the chip identification device 60 is required to generate an output signal using physical randomness.

As mentioned above, the output unpredictability may be illustrated more in concrete. At first, a first group of inputs comprising plurality of input signals is given. A first group of outputs comprising plurality of output signals to be obtained by respectively inputting the plurality of input signals to a chip identification device is also given. Furthermore, a second group of inputs comprising plurality of input signals not belonging to the first group of inputs is given. Even though any set of elements of the first group of inputs and the first group of outputs is known; it is probabilistically hard to predict N output signals to be respectively output by the chip identification device in response to the N input signals belonging to the second group of inputs before the N input signals belonging to the second group of inputs are input to the chip identification device. For example, if N inputs are selected, then the prediction must be repeated N-times. Here, the term of predictable means that the prediction is succeeded considerable times. On the other hand, it may be regarded as unpredictable if the average probability of success in prediction is less than 1/(N+1).

(The property of input-output reliability) As illustrated in FIG. 18, actually, the input signal error 31 ($\Delta Q$) mixes into the input signal Q owing to uncontrollable noise related to a controlling circuit to control the input signal Q. In reply to the input signal error 31 ($\Delta Q$) and uncontrollable noise related to a controlling circuit to control output signal, the output signal R is mixed with output signal error 32 ($\Delta R$). Here, it is required that the absolute value of the difference between two different input signals (e.g., Q1 and Q2) is larger than the absolute value of the maximum of the input signal error 31 ($\Delta Q$). Moreover, the absolute value of the difference between R1 which is the output signal to the input signal Q1 and R2 which is the output signal to the input signal Q2 is required to be larger than the output signal error 32 ($\Delta R$).

(Practical limitlessness of output) Nodes having physical substances and connecting to the network are called physical nodes. Nodes not having physical substances and connecting to the network are called logical nodes. Let us discuss the limitation of the number of physical nodes actually connecting to the internet.

In the case that everything is connected to the internet, which kind of limitation is necessary for the number of physical nodes? Suppose that each physical node includes at least one chip that includes a chip identification device of the present disclosure. With this regard, the chip identification device of the present disclosure executes the identification of said physical node by utilizing physical randomness which is specific to the chip included therein.

Even though a chip including the chip identification device of the present disclosure satisfies (the property of output unpredictability), can we always deny two different chips accidentally have an identical physical randomness? If such an accidental coincidence occurs, the outputs from those two different chip identification devices are identical in response to a same input; and then (the property of input independence) is lost. A probabilistic care is only the way to answer to this problem.

For example, X is the number of cases relating to randomness which is specific to a chip and Y is the number of the whole physical nodes connecting to the network. Thus, the probability that outputs from two different chip identification devices are accidentally coincide in response to a same input is increased as Y is increased and decreased as X is increased. Accordingly, this probability can be considered a proportional to Y/X. It is required that Y/X becomes as small as the probability is practically zero. In other words, X is required to be larger than Y. Moreover, the error rate which is acceptable in practice is 3.4/one million according to the idea of six sigma having been usually used in quality control. Therefore, it X is required to be larger than one-million times of Y.

(Property of persistency to chip) The output from a chip identification device of the present disclosure must be an electronical signal which is specific to a chip comprising said chip identification device.

(Physically non-editable property) It must be impossible to alter physical randomness which is specific to a chip by applying some kind of external stimulation to said chip. In other words, the physical randomness specific to a chip must be unchangeable or stable even while some kind of stimulation is applied from the external to the chip. Or the physical randomness specific to a chip is tolerant to any change in external environment. It is then required that output from chip identification device is stable. If a physical randomness specific to a chip can be replaced with randomness caused by a random number given separately, then the chip may be able to be replaced with another one on the network. It may be self-evident that such a manipulation is an advantage of attackers. However, some kind of external stimulation may be electric field, electro-magnetic field, heating, temperature change, humidity change, blowing, vibration and so forth, which usually may not so strong to break the package of chips.

The chip identification device of the present invention must satisfy all of the above-mentioned seven properties—(The property of output independence), (The property of input independence), (The property of output unpredictability), (The property of input-output reliability), (Practical limitlessness of output), (Property of persistency to chip) and (Physically non-editable property) at the same moment.

(Inspection) In order to improve the network existing before the present invention so that the existing network satisfies all requirements of the present invention, the existing peripheral nodes connected to a stem node may be replaced with peripheral nodes having chip identification devices of the present invention. Here, it is necessary to inspect whether or not this replacement is certainly made. Or it is necessary to inspect whether or not a peripheral node having a chip without the chip identification device of the present invention is irregularly used in the network. The inspection described here may be carried out as a part of periodical test of the stem node. Moreover, it may be carried out at the registration of the peripheral nodes.

One of most effective method to this inspection is to actually remotely attack a peripheral node to be examined by using a stem node under the central control. In the case that a chip composing the peripheral node to be examined (inspection object or examination object) does not involve the chip identification device of the present invention, it may store the correspondence table of the input codes 42 and the registration codes 43 (See FIG. 19) in its inner memory. For example, one of input codes corresponds to plurality of registration codes in the list. Those registration codes respectively correspond to outputs in response to a common passcode to be input to plurality of peripheral nodes. In general, the number of common passcodes is not always one; and then the correspondence list turns out being as shown in FIG. 19. If the number of input codes is only one, the correspondence list may be the upper half of FIG. 19 for example. FIG. 10 is an example that the number of input codes 402 is one. Anyway, the inner memory of node having the chip identification device of the present disclosure does not record such codes. In the network of the present disclosure, only stem node may regularly store such a code correspondence table shown in FIG. 19. The input code 402 in FIG. 10 corresponds to the input code 42 in FIG. 19, while the registration code 403 in FIG. 10 corresponds to the registration code 43 in FIG. 19.

A concrete procedure of the inspection process is explained by using FIG. 21. At first, let us start with the step to find a peripheral node to be examined. Next, the inner memory of the peripheral node to be examined may be read. Here, it may be checked if a part of the codes read here is equivalent to at least one of the input codes stored in the stem node. For example, it may be the input code 42 in FIG. 19 or the input code 402 in FIG. 10. If not, it may be further checked if a part of the codes read here is equivalent to at least one of the registered codes. For example, it may be the registration code 43 in FIG. 19 or the registration code 403 in FIG. 10. If not, then the examined peripheral node may be regarded as certificated. Those not regarded as certificated may be regarded as irregular and then terminated. Thus, it may be possible to automatically remove irregular peripheral nodes. Subsequently, a next peripheral node to be examined may be look for. If all peripheral nodes have been examined, the process may go to the end. If a peripheral node having not been examined is found, the inner memory of this peripheral node may be read. The subsequent procedures may be similar.

Another concrete procedure of the examination process is explained by using FIG. 21. At first, let us start with the step to find a peripheral node to be examined. Next, the inner memory of the peripheral node to be examined may be read. Here, it may be checked if a part of the codes read here is equivalent to at least one of the input codes stored in the stem node. For example, it may be the input code 42 in FIG. 19 or the input code 402 in FIG. 10. If not, then the examined peripheral node may be regarded as certificated. Otherwise, it may be further checked if a part of the codes read here is equivalent to at least one of the registered codes. For example, it may be the registration code 43 in FIG. 19 or the registration code 403 in FIG. 10. If equivalent, then the examined peripheral node may be regarded as irregular. Otherwise, it may be regarded as certificated. Subsequently, a next peripheral node to be examined may be looked for. If all peripheral nodes have been examined, the process may go to the end. If a peripheral node having not been examined is found, the inner memory of this peripheral node may be read. The subsequent procedures may be similar.

The inspection methods shown in FIG. 20 and FIG. 21 may differ with respect to the inspection standard. Those figures may be only two examples to be composed with association to the present disclosure. More inspection methods may be composed with respect another inspection standard. For example, the orders of comparing input codes and registration codes may be able to be exchanged in those figures.

There may be an inspection method called MAC address filtering in the Ethernet format. However, the essence of the inspection methods of the present disclosure, e.g., the inspection methods shown in FIG. 20 and FIG. 21, is to divide peripheral nodes and stem nodes, and then inspect in stages whether or not those peripheral nodes store input and registration codes that are stored in the stem nodes. The MAC address filtering has no such a characteristic. Accordingly, the inspection methods of the present disclosure concretely differ from the MAC address filtering.

By this way, the whole nodes configuring the network with using the chip identification method mentioned above are divided, for example as illustrated in FIG. 13, into the group of stem nodes (e.g., 1400, 2400) maintained and managed by trained security experts and the group of peripheral nodes (e.g., 410, 420, 430, 440, and 450) which cannot be managed by those security experts. Here note that any two of those peripheral nodes cannot connect each other and each of those peripheral nodes can be connected to a stem node. Thus, a network unit comprising a stem node and plurality of peripheral nodes connected directly to the stem node is formed. A stem node can be connected to another stem node as necessary, while two of peripheral nodes can be connected indirectly each other via a stem node. Thus, a network unit can be connected to another network unit. FIG. 13 is an example that two network units associate each other via the connection of a stem node of one network unit and a stem node of another network unit. Actually, it is possible to configure a network comprising greater number of stem nodes and greater number of network units. Moreover, the connection of nodes having physical substance (e.g., information apparatuses or electronic apparatuses) on the network may be identical to the authentication connection in which those nodes having physical substance authenticate each other by the above-mentioned authenticate operation.

All peripheral nodes have respectively different chip identification devices. (Any two of those chip identification devices are different each other). As illustrated in FIG. 11 and FIG. 12, the stem node 1400 holds at least one specific common passcode 1410. As illustrated in FIG. 10, the common passcode 1410 that the stem node 1400 outputs are strictly stored in an inner memory of the stem node 1400 as input code (e.g., 402). As illustrated in FIG. 12, the peripheral nodes (410, 420, and 430) to which the common passcode 1410 is input may return to the stem node 1400 the specific identifications (4101, 4201, and 4301), respectively. Any two of identifications to be returned here are different each other. Accordingly, as illustrated in FIG. 15, the chip identification device of the present invention, which is embedded to the peripheral nodes, is required to satisfy (the property of output independence). As illustrated in FIG. 10, the stem node 1400 may compare output signals returned from the peripheral nodes with the registration codes (e.g., 403) strictly stored in the inner memory in response to the input code (e.g., 402), respectively, as necessary.

As illustrated in FIG. 14, it may be approved that a peripheral node is connected to plurality of stem nodes. In this event, one peripheral node (e.g., 410) may receive plurality of common passcodes (e.g., 1410, 2410, and 3410) and may be required to output different identifications (e.g., 11, 12, and 13) with regard to those common passcodes, respectively. Accordingly, the chip identification device of the present invention, which is equipped to peripheral nodes, as illustrated in FIG. 16, is required to satisfy (The property of input independence).

(Method to identify chip) Subsequently, let us consider the condition for the chip identification device of the present invention. At first, in the case that the chip identification device is formed by software, the output signal in response to the input signal must be generated by some kind of algorithm. Accordingly, once the remote attacker decodes the algorithm, he may be able to counterfeit the registration codes 43 as long as he knows the input code. By this way, this remote attacker may be able to hijack at least a part of peripheral nodes and then to irregularly access a stem node. To avoid such an illegal access, as illustrated in FIG. 17, the chip identification device of the present invention must satisfy (The property of output unpredictability). However, as long as the program is designed with an algorithm, any program cannot satisfy (The property of output unpredictability). In other words, a perfect random number cannot be generated with any program. Therefore, the chip identification device must adopt physical randomness.

The chip identification device mentioned above may be embedded into a chip with modules of other functions or may be produced as a standalone product having only chip identification function. Moreover, it may be preferable that the chip identification device generates an output code (identification code) according to physical randomness, every when receiving an input code (common passcode). It is prohibited that common passcodes are stored in the memory of peripheral nodes. In the case that an electric apparatus is formed with plurality of chips, as illustrated in FIG. 7, at least one chip among those chips is required to hold the chip identification device of the present disclosure. Moreover, the chip identification device itself may be an electric apparatus made of chip. By this way, the above-mentioned network is a network of peripheral nodes and stem nodes, which network elements (nodes) are electronic apparatuses respectively having at least one chip.

The requirements for the chip identification device of the present disclosure may correspond to the necessary conditions for PUF, mentioned above, respectively. For example, (The property of output independence) may be consistent to (1) different peripheral nodes have to output different outputs even if a same input is input to them. (The property of input independence) may be consistent to (2) different outputs have to be output if different inputs are input to a same peripheral node. (The property of output unpredictability) may be consistent to (3) it is impossible to predict output in response to unknown input even though a set of know input and output is theft. (The property of input-output reliability) may be consistent to (4) the relation of input and output have to be stable and reliable. (Practical limitlessness of output) may be consistent to (5) the number of output patterns to an input is as large as practical infinity. (Property of persistency to chip) may be consistent to (6) the chip identification on the network must be an electronic signal which is specific to a chip. As long as the present disclosure is the chip identification device, it is self-evident that (6) is satisfied. Furthermore, the present disclosure requires (7) (Physically non-editable property) physical randomness which is specific to a chip is non-editable from the external. Accordingly, the chip identification device of the present disclosure is composed to satisfy all of those seven conditions, as illustrated below.

The chip identification device of the present disclosure, which satisfies all of the above necessary conditions, may be able to be composed of plurality of identification cells distributed on a cell array of semiconductor device. Here, those identification cells may be assumed to output signal "1" or "0" for example.

However, as long as whether signal output by each identification cell corresponds to "1" or "0" is probabilistic and the probability is free from any algorithm, this may be regarded as physically random. In other words, the physical random combination of "1" and "0" may be generated. By this way, the above third necessary condition, that is, (the property of output unpredictability) is satisfied. Here, letting "1" and "0" respectively correspond to black and white, those signals may be plotted on a checker-board pattern, in which white and black are randomly located, as shown in FIG. 22.

The random combination of "1" and "0" is identical to a random digital number. To be digital should be identical to that the fourth necessary condition, i.e., (the property of input-output reliability), is satisfied.

To satisfy the fifth necessary condition, that is, to make the number of output patterns in practice, limitlessly large, the number of cells on cell array may be required to be as large as possible.

The first and second necessary conditions, that is, (the property of input independence) and (the property of output independence) may be satisfied with respect of how to utilize this white-black random checkerboard pattern. The sixth necessary condition, that is, (Property of persistency to chip) may be satisfied if the probability to generate random combination of "1" and "0" is specific to a chip. The seventh necessary condition, i.e., (Physically non-editable property), is identical to that this random combination is unable to be altered with a usual utilization of chip. It may be concretely explained below.

FIG. 23 is an example of cell array to realize FIG. 22. There are L word lines 503 along the row direction, which is along the vertical direction in this figure. Perpendicular to those word lines, there are M bit lines 902 along the column direction. The identification cells 977 that is an element of chip identification device are distributed at cross-points of the L word lines 503 and the M bit lines 902.

FIG. 24 is a part of the array for identification cells 960 in FIG. 23, which comprises N word lines 503 and N bit lines 902. In general, the N may be a natural number, smaller than L and M or equal to L or M. As an example of input code (P, S, T . . . ), (a(1), b(1), a(2), b(2), . . . , a(N), b(N)) may be considered. This input code is divided to sequence a and sequence b. Then, (a(1), a(2), . . . a(N)) is made correspond to the row numbers in the order from the first row. Simultaneously, (b(1), b(2), . . . b(N)) is made correspond to the column numbers in the order from the first column. The element of matrix data d(i,j) may be regarded as related to output signal of identification cell 977 at the i-th row and the j-th column in response to input composed of combination of a(i) and b(j). For example, d(i,j) is "1" or "0", where i and j are natural numbers from 1 to N. However, a combination of natural numbers (i, j) corresponds to the address of identification cell 977. In the example of FIG. 24, the element of d(5, N−2) is illustrated. Here note that the ensemble {d(i,j)} that is an aggregation of elements d(i,j) is a random code composed of random aggregation of "0" and "1". If the value of d(i,j) being "1" corresponds to black and "0" to white, then the white and black random pattern is obtained on checkerboard, as shown in FIG. 22.

It may be thus possible to make an input code correspond to an address of identification cells by dividing the input code to two parts and then alternatively allocating those elements to rows and columns. The dividing method of input code may be subject to a predetermined format. Of course, it is self-evident that another example is to exchange the sequences {a(i)} and {b(j)} in the above. There are innumerable methods. The method to alternatively extract the sequences a and b from input code, as demonstrated here, is an example and not beyond. Furthermore, the numbers of elements of the sequences {a(i)} and {b(j)} are unnecessary to be always the same. However, it is presumed that the sum of the numbers of rows and columns of the array of identification cells 960 is at least larger than the number of the whole elements of input code, such that the whole elements of input code is able to be input. Here, the above-mentioned input code may be represented by {a(i),b (j)}, where i and j are independent natural numbers. Thus, output code {c(i,j)} may be generated from the sequences {a(i)} and {b(j)} and the random code {d(i,j)} with utilizing some kind of method. A combination of the input code {a(i), b(j)} and the output code {c(i,j)} corresponds to the communication series 80 shown in FIG. 9. A physical random number may be adopted as an example of this random code {d(i,j)}.

As an example related to the present disclosure, mainly, a method to generate output code {c(i,j)} from the first input sequence {a(i)}, the second input sequence {b(j)} and physical random number {d(i,j)} is illustrated with using the figures as follows.

As an example, the elements of sequences {a(i)} and {b(j)} are assumed to be "0" or "1", and then a modulo mod(x,y) is adopted to generate the output code c(i,j):

$$c(i,j)=\mathrm{mod}(a(i)+b(j)+d(i,j),2) \qquad \text{Eq. 1}$$

FIG. 25 is a chart of relationship among the sequences {a(i)} and {b(j)} and the output code {c(i,j)} which is output on the basis of Eq. 1. It may be easily supposed that the ratio of "0" and "1" would be unchangeable in average by using this method. This is a necessary condition to stabilize information quantity treated by the communication series 80. In other words, it is required that the information quantity input to the right-hand side of Eq. 1 is almost equivalent to that output from the left-hand side of Eq. 1. In other hand, in the case that the information quantities of input and output are substantially different, the information quantity defined by Eq. 1 is determined by smaller one. As a result, the information quantity is lost by this amount. The loss of information quantity may cause an obstruction to the fifth necessary condition; (5) the number of output patterns to an input should be limitlessly large. Accordingly, such a situation should be avoided as possible. To satisfy this necessary condition (5), it is certainly required that the number of cases of random number is large as regarded as practically almost limitless.

FIG. 26 is a conceptual illustration for explaining an example of basic structure to realize the mechanism described by Eq. 1. In other words, physical random number {d (i, j)} is generated by random number generator 601. The stem node 400 inputs the input code {a(i), b(j)} to a code generator 602 as a common passcode, and then the code generator 602 generates output code {c(i,j)}. In this example, both the random number generator 601 and the code generator 602 are components of the chip identification device 600. On the other hand, the code generator 602 may be located in the external of the chip identification device 600 in another example, while it is not to be illustrated in the drawing because it is self-evident. Anyway, the random number generator 601 has to be equipped in chip at least as cheap as possible. In this disclosure, the method conceptually illustrated in FIG. 22 may be adopted as an example of the random number generator 601. As shown in Eq. 1, the code generator 602 may adopt a kind of algorithm (residue) but simultaneously involve physical randomness with the physical random number {d (i, j)} which corresponds to said physical randomness specific to chip. Accordingly, the above necessary condition (3), that is, (the property of output unpredictability) is certainly satisfied. Furthermore, to involve the entire elements of input code, the sum of the numbers of row and column of the random number generator 601 is at least equal to or larger than the sum of the elements of {a(i)} and {b(j)}.

FIG. 27 is a drawing to illustrate another example of the present disclosure. In other words, the stem node 400 sends the input code (P, S, T . . . ) to a scrambler 604. By this way, the input code (P, S, T, . . . ) is converted to (P', S', T', . . . ). This converted code is regarded as an input code (P', S', T', . . . ) and then input to the chip identification device 600 mounted as a module in a peripheral node. Here note that, while not specially illustrated in drawing, a peripheral node connecting to the stem node 400 mounts at least a chip equipped with the chip identification device 600. The chip identification device 600 returns an identification (P1, S1, T1, . . . ) in reply to the input of the input code (P', S', T', . . . ). Next, (1) this identification (P1, S1, T1, . . . ) is output to the stem node 400. Or, (2) this identification (P1, S1, T1, . . . ) is returned to the scrambler 604 and then the scrambled identification (P1', S1', T1' . . . ) is returned to the stem node 400. Or, while it may be not particularly noted since it may be self-evident, (3) the identification (P1', S1', T1', . . . ) is converted to the identification (P1", S1", T1", . . . ) by a second and different scrambler and then returning it to the stem node 400. In the method of (3), at least two independent scramblers are necessary.

Anyway, it may be preferable that the scrambler 604 is embedded to the same chip with the chip identification device 600 in cost. FIG. 28 illustrates an example of basic structure of the scrambler 604. In this example, the scrambler 604 comprises a random number generator 605 and a code generator 606. The detailed description of the random number generator 605 and the code generator 606, which compose the scrambler 604, is similar to FIG. 26 and then omitted here. Furthermore, the code generator 606 may be located in the external of the scrambler 604, while it may not be specially illustrated in the drawing since it is self-evident.

FIG. 29 is an example or a part of the array for identification cells 960 comprising the identification cells 977 in FIG. 23. On contrary to FIG. 23, the row is along the horizontal direction and the column is along the vertical direction. In this example, the number of rows is N+K and the number of columns is N. The area composed of the upper K rows and the N columns is allocated to the cell array for scrambler 614 composing the scrambler 604. The area composed of the lower N rows and the N columns is allocated to the cell array for chip identification device 611 composing the chip identification device 600. Of course, the essence of the present disclosure is unchangeable even though replacing the rows and the columns.

FIG. 30 is a drawing to explain another example of the method to realize the random number generator 605 composing the scrambler 604. At first, {a(j)+b(j)} is input at each column, where j is the column number. Next, according to Eq. 2, the elements of physical random number d(i,j) along the row direction at a given j are summed up and then divided by 2 to obtain the remainder at the given j, where i is the row number. Then, the a(j)+b(j) is added to the remainder at the column number (j) and further divided by 2 to obtain a reminder which is regarded as an intermediate output {f(j)}. By this way, the input code {a(j), b(j)} is converted to the intermediate code {a(i), f(j)} by involving the physical random number by the scrambler 604. This {a(i), f(j)} is regarded as the next input code and then input to the chip identification device 600. Then, according to Eq.

3, the output code {c(i,j)} is output. Furthermore, {b(j)} may be a dummy, while it is not illustrated because it is self-evident.

$$f(j)=\mod(a(j)+b(j)+\mod(\Sigma_{i=1}^{K}d(i,j),2),2) \qquad \text{Eq. 2}$$

$$c(i,j)=\mod(a(i)+f(j)+d(i+K,j),2) \qquad \text{Eq. 3}$$

Here note that it is unnecessary for a stem node to manage a choice of the row number of the scrambler 604, K, and the row number of the chip identification device 600, N. For example, an owner or a regular administrator of a peripheral node may voluntarily determine it when the peripheral node is registered. The determined (N, K) may be stored in an inner memory and so forth in the peripheral node. Or, on contrary, the (N, K) may be able to be stored in an inner memory and so forth of the stem node.

It may not always be necessary for the stem node to know the (N, K). However, after the peripheral node is registered and then connected to the network that the stem node administrates, at the network maintenance etc. the (N, K) may be able to be inspected by the stem node and then updated as necessary. At that time, the peripheral node may be re-registered using the updated (N, K).

If the (N,K) is altered, the intermediate code {a(i),f(j)} generated by the scrambler 604 becomes different from the previous one even though inputting an identical input code {a(i),b(j)}. Accordingly, the output code {c(i,j)} that the chip identification device 600 outputs may also differ.

As an example, a stem node may recode (N, K) having been revised at the previous maintenance. At the coming maintenance, the (N, K) stored in the inner memory of a peripheral node may be read and then compared with the (N, K) stored in the stem node at the previous maintenance. If they are inconsistent, this chip (mounted in this peripheral node) may be regarded as irregularly accessed and then the peripheral node with this chip may be disconnected from the network or alert may be sent to the administrator of the peripheral node. By this way, (N, K) may be able to play a role of security buffer. Moreover, since physical random number {d(i,j)} is adopted in the method based on Eqs. 1-3, the leakage of the security buffer (N, K) may not be a problem.

The code generation is executed on the basis of Eqs. 1-3. Then, in the case that an operational processing unit equipped in a peripheral node having the code generator 602 is adopted to generate codes, it may be preferable that the whole or a part of the intermediate code {f(j)} generated between the scrambler 604 and the chip identification device 600 is stored in a resistor inside the operational processing unit, in order to avoid the leakage of the intermediate code {f(j)} to the external of the operational processing unit. In other words, it is prohibited to output the intermediate code {a(i),f(j)} comprising the sequence {a(i)}, which is a part of input code, and the intermediate output {f(j)} to the external of the peripheral node.

Moreover, it is extremely hard to extract the intermediate code {f(j)} confined in the operational processing unit or chip, using reverse-engineering by the remote control, from the register generating codes. It is because the register is a very small dynamical memory. For example, it may be 32 bits or at most 64 bits in a usual personal computer. On the hand, the memory capacity necessary to store the whole intermediate output {f(j)} is N bits. Accordingly, a large enough N may force the code generator to divide the intermediate code {f(i,j)} into plurality of segments, every of which segment may be one-by-one stored in the register. Here note that R is the bit number that the register can use to generate a code at once. For example, in FIG. 30, the first to the R-th columns may correspond to the segment-1, the R+1 th to the 2R th columns may correspond to the segment-2, the 2R+1 th to the 3R th columns may correspond to the segment-3, . . . . Each segment of the intermediate output {f(j)} may be generated on the basis of Eq. 2 and then stored in the register. In other words, as long as N is large enough, the memory area of register in which the intermediate output {f(j)} is tried to be stored may be overwritten every when the segment is updated. Accordingly, it may be impossible to steal the whole of the intermediate output {f(j)} by remote control even during the code generation.

Or the code generation is executed on the basis of Eqs. 1-3. Then, in the case that an operational processing unit equipped in a peripheral node having the code generator 602 is adopted to generate codes, it may be preferable that the whole or a part of the intermediate code {f(j)} generated between the scrambler 604 and the chip identification device 600 is stored in an inner memory inside the peripheral node to avoid the leakage of the intermediate code {f(j)} to the external of the peripheral node. In other words, it is prohibited to output the intermediate code {a(i),f(j)} comprising the sequence {a(i)}, which is a part of the input code, and the intermediate output {f(j)} to the external of the peripheral node.

Or the code generation is executed on the basis of Eqs. 1-3. Then, in the case that a peripheral circuit on a same chip is adopted to generate codes, it may be prohibited that the intermediate code {f(j)} generated between the scrambler 604 and the chip identification device 600 is output to the external of the chip. In other words, it is prohibited to output the intermediate code {a(i),f(j)} comprising the sequence {a(i)}, which is a part of the input code, and the intermediate output {f(j)} to the external of the chip.

Anyway, it is preferable that the intermediate output {f(j)} is automatically erased or overwritten after the generation of output code {c(i, j)}. It is also noted that the physical random number {d(i,j)} (i=1, . . . K) is adopted to generate the intermediate code {f(i)} from the input code {a(i),b(j)}. Thus, as long as the element number of {d(i,j)} (i=1, . . . K) is large enough, it is practically impossible to predict the intermediate output {f(j)} from the input code {a(i),b(j)}. Moreover, it is also noted that another physical random number {d(i,j)} (i=K+1, . . . K+N) different from the previous one is adopted to generate the output code {c(i,j)} from the intermediate code {a(i),f(j)}. Thus, as long as the element number of the physical random number {d(i,j)} (i=K+1, . . . K+N) is large enough, it is practically impossible to predict the output code (c(i,j)).

For example, let us consider with an example of FIG. 29. The bit capacity of the cell array for scrambler 614 (row number: K) and the cell array for chip identification device 611 (row number: N) may be considered as follows. At first, the number of cases of input code is two to the power of 2N. The number of cases of the physical random number {d(i,j)} of the cell array for scrambler 614 is two to the power of NK. On the other hand, the number of cases of the physical random number {d(i,j)} of the cell array for chip identification device 611 is two to the power of Y, where Y is the square of N. The number of cases of the output code {c(i,j)} is two to the power of Z, where Z is the square of N.

Next, the requirement to determine (N, K) may be considered. The input codes used in general digital crypto-lines may be 128 to 256 bits. This bit number have been increased annually because of encryption security, but it may transit from 256 bits to 512 bits in the coming 10 years. Then, the case of N=K=512 may be discussed as an example. In this event, the number of cases of input code is two to the power of 512, which has been an extremely large integer. It may be regarded as practically infinity. The number of cases corresponding to the physical random numbers of the scrambler $\{d(i,j)\}$, the number of cases corresponding to the chip identification device $\{d(i+N,j)\}$, and the number of cases corresponding to the output code $\{c(i,j)\}$ must be further larger, i.e., all to be two to the power of the square of 512. Of course, it is a practical infinity. Here note that since the square of 512 is 262,144, 262 kbits may be good enough to a chip identification device and a scrambler. This bit capacity is smaller by 6 orders than the bit capacity per die in the conventional DRAM product (4 Gbit), i.e., much less than one-to-1,000,000. Furthermore, this physical random number $\{d(i+N,j)\}$ also corresponds to the physical randomness specific to the chip.

In the case of N=K=128, the number of cases of input code is two to the power of 256, i.e., about 10 to the power of 77. As mentioned above, it may be regarded that the number of communication nodes is more than one trillion (10 to the power of 12) all over the world in the internet of things. While 10 to the power of 77 is not the infinity, it is much larger than the number of nodes all over the world. Then, the possibility that two input codes are accidentally identical is about ten to the power of −65 even if the number of nodes is one trillion, which is extremely small and then can be regarded as practically zero. The number of cases corresponding to the physical random numbers of the scrambler $\{d(i,j)\}$, that corresponding to the chip identification device $\{d(i+N,j)\}$ and that corresponding to the output code $\{c(i,j)\}$ may be further larger, i.e., all to be two to the power of the square of 128. Of course, it may be practically infinity. Here note that since the square of 128 is 16,384, 16 kbits may be good enough to a chip identification device and a scrambler. This bit capacity is smaller by 5 orders than the bit capacity per die in the conventional DRAM product (4 Gbits), i.e., less than one-to-100,000. By this way, even though the intermediate code $\{f(j)\}$ was stolen, the physical randomness would disable for predicting the output code $\{c(i,j)\}$ from the physical random number $\{d(i,j)\}$ (j=K+1 ... K+N). Furthermore, since the security buffer (N, K) is able to be updated as required, the intermediate code to be generated in response to the same input code $\{a(j),b(j)\}$ may be updated as required.

By this way, even though the intermediate code $\{f(j)\}$ was stolen, the physical randomness would disable for predicting the output code $\{c(i,j)\}$ from the physical random number $\{d(i,j)\}$ (j=K+1, ... K+N). Furthermore, since the security buffer (N, K) is able to be updated as required, the intermediate code to be generated in response to the same input code $\{a(j),b(j)\}$ may be updated as required.

FIG. 31 is a drawing to illustrate an example of a memory chip comprising the cell array for scrambler 614 and the cell array for chip identification device 611. Those areas and a memory area are configured together along the direction of word line 503 that they share. FIG. 32 is a drawing to illustrate another example of a memory chip comprising the cell array for scrambler 614 and the cell array for chip identification device 611. Those three areas (involving the memory area) are configured together along the direction of bit line 902 that they share. By this way, the essence of the present disclosure may be unchangeable even by exchanging the word line 503 and the bit line 902.

FIG. 33 is a drawing to illustrate an example of identification cell 977. The capacitors 982 are distributed at crosspoints of word lines 503 and bit lines 902. In general, the capacitor comprises an insulating film sandwiched by two conducting layers, which store charge by applying electric field therebetween. Here note that electric current usually doesn't flow as long as the applied electric field is DC. However, if the applied electric field is too high, the insulating film is broken to cause electric current flow even with DC. It may be possible to apply electric field on capacitors 982 at selected cross-points by applying voltage between word line 503 and bit line 902. Furthermore, both DC and AC voltages may be capable of breaking the insulating film.

This breakdown may occur probabilistically and then cause physical randomness. The electric current easily flows through broken identification cells even at low electric field, e.g., "1" in terms of (semiconductor) memory. It corresponds to black in FIG. 22. On contrary, the electric current hardly flows at low electric field, e.g., "0" in terms of (semiconductor) memory. It corresponds to white in FIG. 22. It may be possible to roughly control this possibility by tuning applied electric field and detailed condition of capacitor (physical property, structure, size and so on). If the possibility can be tuned to be about 50%, white and black random checkerboard pattern may be obtained, as shown in FIG. 22.

FIG. 34 is an example of current-voltage characteristics to be used for the inspection of breakdown. The horizontal axis is an absolute value of read voltage to be applied on an identification cell 977 (capacitor 982 in the example of FIG. 33) for read. The vertical axis is an absolute value of electric current flowing through identification cell 977 in response to the read voltage. Here, the electric field applied on identification cell may be high if the voltage is high and low if the electric field is low. In a broken identification cell, very high electric current may flow even at low voltage. On the other hand, in unbroken identification cell, least electric current may flow even at high voltage. To distinguish this difference, it is preferable to introduce breakdown judge current value 933 and non-breakdown judge current value 934 at breakdown judge voltage 932. In other words, when read voltage whose absolute value is equivalent to the breakdown judge voltage 932 is applied on an identification cell 977, the identification cell 977 is regarded as broken if the absolute value of the electric current flowing though the said identification cell 977 is higher than the breakdown judge current value 933. The identification cell 977 is regarded as non-broken if the absolute value of the electric current flowing though the said identification cell 977 is lower than the non-breakdown judge current value 934.

To actually read, first of all, the address of the cell to be read may have to be selected. To select the address (of a cell), as shown in FIG. 23, the row of the cell may be selected by the row decoder 972 and the column of the cell may be selected by the column decoder 973. The combination of the row number and the column number of the cell is the address. In an example of FIG. 35, this address is represented binary at the first line. The read voltage is applied between the word line 503 and the bit line 902, which correspond to the selected address, in a manner explained in FIG. 34, and then data at the corresponding address may be read ("1" or "0"). After reading, the address to be selected is changed and then data of the next identification cell may be read. This procedure may be repeated until the whole identification cells in the array for identification cells 960 are read.

There is a definite gap between the breakdown judge current value 933 and the non-breakdown current value 934. Thus, the cells through which the read current flowing is in this gap may be regarded as neither broken nor unbroken. The identification cells like this may be neither "0" nor "1"

in terms of semiconductor memory and then represented by "X". FIG. 35 illustrates an example of the binary addresses and the corresponding data of identification cells. At the third line, for example, there may be "1", "1", "0", "1", "X", "0", "0", "1" ... "0" from the left. Thus, the data of the fifth identification cell from the left may be "X".

Next, it may be expected that the lines of "0" and "1" and the corresponding addresses are plotted with white and black on checkerboard pattern as shown in FIG. 22. Here note that "0" is converted to white and "1" to black. However, "X" which is neither "0" nor "1" generates neither white nor black on checkerboard, and then unable to form the white and black checkerboard pattern as shown in FIG. 22. Then, it is required to exclude the identification cells corresponding to "X" before plotting on checkerboard.

For example, the addresses of identification cells corresponding to "X" (e.g., 100 in binary in the example of FIG. 35) may be stored in buffer. The data of identification cell corresponding to each address may then be compared with addresses stored in the buffer. If the corresponding address is found in the buffer, the data at the corresponding address may not be read. Through such a procedure, the data of identification cell corresponding to "X", as shown in the fourth line of FIG. 35, is excluded. Thus, a combination of address and data comprising only "0" and "1" is obtained. At last, the white and black checkerboard pattern is obtained, as illustrated in FIG. 22.

Meanwhile, there may be, in general, two modes of soft breakdown and hard breakdown in the above-mentioned breakdown phenomena of insulating film. The soft breakdown mode occasionally occurs as a previous step to hard breakdown mode. The electric current at read voltage may be lower than in hard breakdown mode and higher than in non-breakdown mode. Furthermore, the soft breakdown mode may sometimes transit to non-breakdown mode or to hard breakdown mode during the repetition of voltage apply, that is, unstable. However, once transiting to hard breakdown mode, the state is returned to neither non-breakdown mode nor soft breakdown mode. By the method illustrated in FIG. 34 and FIG. 35, the hard breakdown mode which is more stable is regarded as "1" in terms of semiconductor memory and the soft breakdown mode as "X". The gap between the breakdown judge current value 933 and the non-breakdown judge current value 934 may be used to label (an address in) soft breakdown mode "X". Thus, by excluding data of cells in soft breakdown mode with the above-mentioned method, the white and black pattern on checkerboard shown in FIG. 22 may be stable (unchangeable) even during the repetition of voltage apply and then reproducible of the pattern. This may be an advantage to satisfy the fourth necessary condition (4) the relation of input and output must be stable and reliable. Like this, it may be preferable that the broken identification cell is in the hard breakdown mode.

In general, it is difficult to artificially make preponderate either of transition from soft to hard breakdown modes or from non-breakdown to soft breakdown modes by applying electrical stress. Accordingly, in some case the ratio of soft breakdown mode labeled "X" may be lower than a predetermined level, or in other case, this ratio may be higher than it. However, if the number of identification cells in soft breakdown mode is higher than a definite amount, the quantity of data may be reduced and then the reduction of the pattern may cause the lack of information quantity. Furthermore, in terms of information entropy, it is preferable that the ratio of "0" and "1" is about 50% in order to maximize physical randomness. Then, it may be necessary that voltage pulse for applying electrical stress on cell may be repeated to reduce the ratio of soft breakdown mode "X" and to tune the ratio of "0" and "1" within a given level. The pulse application method may be illustrated below.

As an example, the method of FIG. 36 may be illustrated. After the first breaking pulse is applied, the breakdown inspection is executed with the method illustrated in FIG. 34. If the ratio of "X" is higher than a definite amount, the second breakdown pulse is subsequently applied and the breakdown inspection is executed again with the method illustrated in FIG. 34. If the ratio of "X" is still high, then the third breakdown pulse is applied and then the breakdown inspection is executed again. This procedure may be repeated until the ratio of "X" becomes lower than a predetermined value. It may be also necessary to define the upper bound of the repetition number of this procedure. In the case that the ratio of "X" cannot be lower than a definite amount even though the number of the repetition reaches the upper bound, the chip under inspection is regarded as defective and then disposed. In the case that the chip passes the inspection, as mentioned above, the addresses of identification cells labeled "X" are stored in buffer and then the data of the corresponding identification cells are excluded. However, if the number of identification cells is large enough, it may be possible to assure physical randomness with large enough quantity of information even while there may be some amount of soft breakdown ratio. In this event, the process to inspect the ratio of "X" may be omitted.

Here note that some of "X" may transit to hard breakdown "1" while plurality of pulse is applied, since "X" corresponds to soft breakdown. If the ration of transition from "0" to "X" is not low, the ratio of "0" may become lower and the ratio of "1" may become higher. In other words, even though the ratio of "0" is higher just after the first pulse, the ratio of "1" may be gradually increased while plurality of pulses is applied. By this way, it may be possible to make the ratio of "0" and "1" close to 50% while decreasing the ratio of data to be excluded ("X") by optimizing the number of pulses, the period of pulse, and the method to increase the amplitude of pulse. The cells that fail in the inspection may be disposed as defective, as mentioned above. By this way, only confirming articles may be shipped as certified products having physical randomness with enough quantity of information and stable data of "0" and "1".

As another example of repeating the application of breaking pulse, FIG. 37 is illustrated. Different from the example of FIG. 36 is that breaking pulse is incremented at every pulse. The other illustrations may be similar to FIG. 36 and then omitted.

Another method to exclude the soft breakdown mode of "X" is to select only the identification cells of "X" and then repeat application of pulse voltage until they transit to hard breakdown mode of "1". The method to apply the breakdown voltage may be, for example, those of FIG. 36 or FIG. 37. It may be preferable to execute this method while the ratio of "0" is still higher than that of "1" by a given amount.

In another example, it may be possible that hard breakdown is made superior to soft breakdown by tuning cell structure of identification cells. For example, as shown in FIG. 38, the cell structure comprising the first conductor 1053, the second conductor 1052, the insulating film 910, and the conductive tip 1051 may be considered. The first conductor 1053 is connected to the first electrode 1055, and the second conductor 1052 is connected to the second electrode 1054. The first electrode 1055 connects to one of word line 502 and bit line 902, and the second electrode 1054 connects to the other. The molecular structure of the insulating film 1050 around the conductive tip 1051 may be unstable because of mechanical stress, and then easy to break. Furthermore, the electric field likely concentrates around the conductive tip 1051 when the breaking pulse is applied, which may easily cause hard breakdown. However, since the depth of the conductive tip 1051 varies in the manufacturing, the breakdown possibility of the insulating film 1050 between the conductive tip 1051 and the second conductor 1052 may vary among cells. It may be possible to maximize physical randomness of "0" and "1" by further optimizing the above-mentioned application of breaking pulse.

FIG. 39 is a drawing to illustrate another example of identification cell 977. There are diode elements at cross-points of word lines 503 and bit lines 902. More concretely, an example may be PN junction 986 (in FIG. 39). Another example may be Schottky junction 987 (in FIG. 40). If high voltage stress is applied on diode, the diode is probabilistically broken. Whether or not broken is physically random and can be inspected by applying read voltage in the reverse direction. In a broken cell, the electric current is easy to flow if a reverse read voltage is applied on the diode, which may, for example, correspond to "1" in terms of semiconductor memory. In a non-broken cell, the electric current is hard to flow even if a reverse read voltage is applied, which may, for example, correspond to "0" in terms of semiconductor memory. The voltage (both of stress and read) may be applied between word line 503 and bit line 902, which are selected.

As mentioned above, in the case that element composing identification cells 977 respectively connected to word line 503 and bit line 902 is diode such as PN junction 986 and Schottky junction 987, the read voltage is a reverse bias. On the other hand, in the case that elements composing identification cells 977 respectively connected to word line 503 and bit line 902 are capacitor 982, the direction of read voltage may not matter, i.e., either of forward or reverse. From this viewpoint, the breakdown inspection of diode may be illustrated, as similar to FIG. 34. Here, the read voltage to be applied between two electrodes sandwiching diode is an absolute value. In other words, in the cases of PN junction and Schottky junction, those absolute values may be a reverse voltage and reverse current. Besides, detailed illustration may be similar to that of capacitor and then omitted.

FIG. 41 is a drawing to illustrate a case that the identification cell 977 is a transistor 983. In general, a transistor comprises two adjoining diffusion layers on the surface of semiconductor substrate and a gate capacitor. The gate capacitor is formed of a lamination comprising a gate electrode and a gate insulating film on the semiconductor substrate. In this example, one of those two diffusion layers is connected to the bit line 902. The gate electrode is connected to the word line 503. In other words, in this example, it is possible to adopt a factor of physical randomness, i.e., the breakdown of gate insulating film. In the case of the dielectric breakdown (i.e., the breakdown of gate insulating film), for example, a voltage stress may be applied to the word line 503 to the bit line 902. This voltage stress, for example, may be a pulse as shown in FIG. 36. As another example, it may be a pulse as shown in FIG. 37. The read, as shown in FIG. 34, may be executed to sense the electric current flowing between the bit line 902 and the word line 503 by applying the breakdown judge voltage 932 between the bit line 902 and the word line 503.

FIG. 42 illustrates a case that the identification cell 977 is a DRAM cell which comprises a transistor 983 and a capacitor 982. Here, the method adopting the dielectric breakdown of the capacitor 982 is illustrated. More concretely, a transfer voltage to turn the transistor 983 on is applied between the word line 503 and the bit line 902. In that interval, a high voltage stress is applied on the bit line 902. As an example, this high voltage stress may be pulses shown in FIG. 36 and FIG. 37. To read, as shown in FIG. 34, the electric current flowing through the bit line 902 may be sensed while the transfer voltage is applied on the word line 503. The absolute value of the transfer voltage should be higher than the absolute value of the voltage applied on the bit line, and the voltage difference between them must be sufficient to turn the transistor 983 on. In the case of breaking the gate insulating film of the transistor 983, a method similar to FIG. 41 may be possible. Thus, the gate insulating film may be broken at the side connected to the bit line 902. Anyway, the breakdown probabilistically occurs to cause physical randomness.

It should be noted that a conventional DRAM cell may be adopted as the identification cell 977 with no change. In other words, in the case that the chip identification device of the present disclosure is appended to a DRAM chip, a part of memory cell area may be sufficient for chip identification device and then no additional cost in the manufacturing is necessary. The bit capacity for identification device area may be much smaller than the capacity of generic memories as well as DRAM.

As mentioned above, a necessary bit capacity may be roughly evaluated in the case of N=K=512 in the example of FIG. 29. It is turned out that 262 kb is sufficient to configure a chip identification device. This memory capacity is smaller by six digits, i.e., one-to-1,000,000, than the bit capacity per die of the conventional DRAM product (4 Gb). In the case of N=K=128, 16 kb is sufficient to configure a chip identification device. This memory capacity is smaller by 5 digits, i.e., one-to-100,000, than the bit capacity per die of the conventional DRAM product (4 Gb).

The price of DRAM, currently, has transits from 2.5US$ to 3US$. Since it is possible that DRAM cell is adopted as identification cell 977 with no change, the price of chip identification device may be at most 0.003 US cents per chip with sufficient quantity of information of physical random number even while (the property of input-output reliability) is ensured by excluding soft breakdown cells labeled "X".

FIG. 43 is a drawing to illustrate another example of identification cell 977. There are select transistors 984 used to control non-volatile memories at cross-points of word line 503 and bit line 902. The non-volatile memory cell is a gate lamination structure comprising silicon, tunnel film, charge storage layer, inter-layer dielectric film and control gate between two diffusion layers on a first conductive type semiconductor substrate or a first conductive type well. The said select transistor 984 is formed by replacing the whole or a part of the inter-layer dielectric film of this memory cell with an inter-layer conductor. Or it is also formed with a conductive via implanted into a hole opened through inter-layer dielectric film. Anyway, it is possible to apply high electric stress on tunnel film of select transistors 984 at selected cross-points by applying high voltage on selected word line connecting to control gate. Here, the breaking of tunnel film and the read may be executed in a similar way to those of gate insulating film of transistor 983. Moreover, the breakdown of tunnel film is probabilistic and causes physical randomness. In other words, since the illustration may be almost same by replacing the gate insulating film of transistor 983 with the tunnel film, it may be omitted here.

FIG. 44 is a drawing to illustrate another example of identification cell 977. There are resistors 985 at cross-points of word line 503 and bit line 902. An electrical stress may be applied on resistors 985 at selected cross-points by applying high voltage between word line 503 and bit line 902.

Or as in FIG. 92, it may be a variable resistance memory cell 989 comprising a transistor 983 and a variable resistor 981. In the case that the resistance of this variable resistor 981 is controllable with voltage application, this variable resistance memory cell 989 is an ReRAM. In the case that the resistance of this variable resistor 981 is controllable with heating, this variable resistance memory cell 989 is a PCRAM. Or as in FIG. 93, it may be a magnetic resistance memory cell 990 comprising a transistor 983 and a magnetic resistor 980. In the case that this magnetic resistor 980 is a GMR film, this magnetic resistance memory cell 990 is an MRAM. In the case that this magnetic resistor 980 is a STT film, this magnetic resistance memory cell 990 is an STT-MRAM. Or, as in FIG. 94, it may be a non-volatile memory cell having a charge storage layer 988. However, the charge storage layer may be either charge trapping layer or floating gate. Or, as in FIG. 95, it may be a non-volatile memory cell having a charge storage layer 988, plurality of which are arrayed on a NAND-type layout with bit line contacts being a purpose removed from adjoining cells therein. Or as in FIG. 96, it may be a ferroelectric random-access memory (FRAM) comprising a transistor 983 and a ferroelectric capacitor 991.

In general, a resistor is formed by sandwiching high resistive conducting material with two terminals. It may be probabilistically disconnected by applying high electric field on it, and then the corresponding cross-point between word line 503 and bit line 902 may be non-conductive (short). In the case that it is not short (non-short), the cross-point between word line 503 and bit line 902 is conductive. It is decided by physical randomness, which address is short or non-short. By this way, a random pattern on checkerboard like FIG. 22 may be obtained.

By applying read voltage on the resistor 985, it may be determined whether or not the resistor is broken. In an identification cell which is short, the electric current hardly flows, which corresponds to "0" in terms of semiconductor memory. In an identification cell which is not short, the electric current easily flows, which corresponds to "1" in terms of semiconductor memory. Such a short of resistor is similar to breakdown of conductor, which may be caused by electromigration and so on, for example. In other words, the electromigration probabilistically occurs. The cells with electromigration corresponds to "0" in terms of semiconductor memory. The other cells correspond to "1" in terms of semiconductor memory.

FIG. 45 is current-voltage characteristics to be used to inspect the short. The horizontal axis is the absolute value of read voltage to be applied on resistor 985 for read. The vertical axis is the absolute value of electric current to flow through resistor 985 in response to the read voltage. In a cell which is non-short, high electric current flows even at low voltage. On the other hand, in a cell which is short, the electric current hardly flows even at high voltage. To distinguish this difference, the non-short judge current value 743 and the short judge current value 744 at the short judge voltage 742 are introduced. In other words, it may be judged as non-short if the absolute value of electric current flowing through resistance 985 is higher than the non-short judge current value 743 when read voltage, whose absolute value is equivalent to the short judge voltage 742, is applied on resistor 985. It may be judged as short if the absolute value of the electric current is lower than the short judge current value 744.

There is a definite gap between the non-short judge current value 743 and the short judge current value 744 in the inspection method of FIG. 45. Thus, the identification cells 977 through which the absolute value of read electric current is in this gap are regarded as neither short nor non-short. The identification cells 977 like this may be represented "X" because it may be neither "0" nor "1" in terms of semiconductor memory. Thus, an example of binary addresses and corresponding data of identification cells 977 may be like FIG. 35, as similar to the case that identification cells 977 are capacitors 982. At the third line, as an example, there may be "1", "1", "0", "1", "X", "0", "0", "1" . . . "0" from the left. Thus, the data of the fifth identification cell from the left is labeled "X". The method to obtain white and black checkerboard pattern like FIG. 22 by excluding cells labeled "X" may be similar to the case of capacitor 982. Then, the detailed illustration is omitted here.

To actually read, first of all, the address of cell to be read must be selected. To select the address, as shown in FIG. 23, the row number of the cell is selected by the row decoder 972 and the column number of the cell is selected by the column decoder 973. The combination of the row number and the column number of the cell is the address. In the example of FIG. 35, this address is represented by binary. The read voltage is applied between the word line 503 and the bit line 902 corresponding to the selected address in a manner explained in FIG. 45, and then the data at the corresponding address is read ("1" or "0"). After reading, the address to be selected is changed and then the data of the next identification cell is read. This procedure is repeated until the whole identification cells in the array for identification cells 960 are read.

FIG. 46 is a drawing to illustrate an example of resistor 985 which comprises a first conductor 1053, a second conductor 1052, an insulating film 910, and a conductive junction 970. The first conductor 1053 is connected to a first electrode 1055. The second conductor 1052 is connected to a second electrode 1054. The first electrode 1055 is connected to one of word line 503 or bit line 902. The second electrode 1054 is connected to the other. The thickness of conductive junction 970 varies in the manufacturing. Thus, the resistance may be fluctuated and then the possibility of short may vary. Accordingly, it may be preferable to make the possibilities of short and non-short 50%-to-50% by repeating voltage stress. Here note that the concrete method of the repetition of pulse application is, for example, similar to the methods of FIG. 36 and FIG. 37.

In general, the high resistive portion of conductive junction 970 may be heated by electrical stress. This causes electromigration easy to occur. Once electromigration occurs, the corresponding portion of the conductive junction 970 disconnects (short). After the disconnection, for example, the conductive junction 970 is reformed to be like the conductive tip 1051, as shown in FIG. 38. In addition, the oxidation may be advanced at high temperature, an insulating film 1050 may come into the portion of short, i.e., between the conductive tip 1051 and the second conductor 1052. By this way, the non-short state may transit to short one.

If the repetition of electric stress is further continued, the dielectric breakdown may occur at the short portion of the oxide film. Thus, the short state may transit to non-short one.

It is difficult to artificially manipulate the priorities of the transitions from non-short to short and from short to non-short. The intermediate state between short and non-short is represented "X". Accordingly, in some case the ratio of the intermediate state labeled "X" may be lower than a predetermined level, or in other case, this ratio may be higher than it. However, if the number of identification cells in the intermediate state is higher than a definite amount, the quantity of data is reduced and the reduction of patterns may cause the lack of information quantity. Therefore, the method to repeatedly apply voltage pulse causing electric stress on cell is necessary. As an example, after the first pulse voltage is applied, the breakdown inspection may be executed by the method illustrated in FIG. 45. Thus, if the ratio of "X" is higher than a definite amount, the second breaking pulse is applied subsequently and then the breakdown inspection is executed again by the method of FIG. 45. If the ratio of "X" is still large, the third pulse voltage is applied and then the breakdown inspection is executed by the method of FIG. 45. This procedure is repeated until the ratio of "X" becomes less than a predetermined value. The upper bound number of the repetition of this procedure is also determined in advance. In the case that the ratio of "X" is not less than a predetermine value even at the upper bound number of the repetition, the corresponding chip identification device is regarded as defective. In the case that the chip identification device passes the inspection, as mentioned above, the addresses of cells labeled "X" are stored in a buffer and then the data of corresponding cells is excluded. In the case of failure in the inspection, the chip identification device is disposed. However, if the number of cells is large enough, it is possible to ensure large enough physical randomness even though the ratio of intermediate state is large. In this event, the process to inspect the ration of "X" may be omitted.

On the other hand, to maximize physical randomness, it is preferable that the ratio of "0" and "1" is about 50% to 50%. The cells labeled "X" may probabilistically transit to "0" during the repetition of pulse voltage. Accordingly, even though the number of "1" is large at the first pulse, the ratio of "0" may gradually increase while plurality of pulses is applied. Here, the concrete method of the repetition of pulse may be, for example, similar to the method of FIG. 36 and FIG. 37.

It may be thus possible that the ratio of "0" and "1" becomes close to about 50% while reducing the ratio of data to be excluded ("X") by optimizing the number of applying pulses, the period of pulse, and the increment method of pulse amplitude. In the case of failure, as mentioned above, the corresponding chip having the failed chip identification device may be disposed as defective. Thus, it is possible to ship only the confirming chips having enough physical randomness and stable data of "0" and "1".

FIG. 47 is another example of resistor 985 adopted in FIG. 44. This is able to be formed simultaneously with metal wiring pattern. Accordingly, it is preferable that conductor 930 is composed of as same material as the conventional metal wiring, and at least a part of pattern shape is like a corner of rectangular, as shown in FIG. 47. This bended portion like the corner of rectangular may tend to collect heat and then to be disconnected owing to electromigration. For example, the first electrode 1055 connects to the word line 503 and the second electrode 1054 connects to the bit line 902.

Furthermore, it is preferable that bended portion like a corner of rectangular as shown in FIG. 47 is thinner than the conventional metal wire. For example, such a structure may be formed by masking the portions other than bended like a corner of rectangular with resist and then sliming only the bended portion through oxidation process.

It is also possible to bend plurality of portions of conductor 930. FIG. 48 is a drawing to illustrate an example having nine portions bended like a corner of rectangular. Thus, it is possible to control possibility of short with tuning wiring pattern. However, the first electrode 1055 connects to word line 503 and the second electrode 1054 connects to bit line 902.

A conductive via as shown in FIG. 49 is, for example, formed by making hole going through insulating film 910 (via) from the side of the first electrode 1053 and then burying a conductive material therein. This is an example of the conduction junction 970 as shown in FIG. 46. Here suppose that the process of forming conductive via is optimized to make target depth of conductive via equivalent to distance between the first conductor 1053 and the second conductor 1052. If it is formed on target by chance, the conductive via may be fit to between the first conductor 1053 and the second conductor 1052, as the cell in the center of FIG. 49.

However, in general, the aspect ratio and hole's diameter of the conductive via may unavoidably vary in the manufacturing, as illustrated in FIG. 50. This variance also causes depth of the conductive via to vary. Thus, the length of conducive junction 970 may be short in some cell and then disconnect (short) between the first conductor 1053 and the second conductor 1052, as shown in FIG. 38. In other cells, those conductors may connect each other (non-short), as shown in FIG. 46. For example, there may be short, connecting (non-short), connecting (non-short) from the left in this example of FIG. 49.

If the conductive junction 970 of identification cell 977 selected by the word lines 503 and bit lines 902 is short, the electric current may not flow, e.g., correspond to "0" in terms of semiconductor memory. On contrary, if non-short, the electric current may flow, e.g., correspond to "1" in terms of semiconductor memory. Regarding "0" as white and "1" as black, the white and black random pattern is obtained like FIG. 22.

Here note that since the variance of via depth is a manufacturing variance in mass-production process, it may be free from any algorithm. Accordingly, it may be regarded as physical randomness. Furthermore, the electrical stress is not always necessary to obtain white and black random checkerboard pattern like FIG. 22.

However, the ratio of short and non-short is inspected after forming conductive via. Then, if it is far from a predetermined value, then it is possible to recover the expected ratio by applying electrical stress. For example, in the case of short (e.g., identification cell at the left end of FIG. 49), a part of insulating film between the bottom of via and the second conductor 1052 (e.g., the insulating film 1050 in FIG. 38) is broken while repeating electrical stress and then the short state is transited to non-short. On contrary, in the case of non-short (e.g., the center of FIG. 49), the electromigration occurs while repeating electrical stress and then the non-short state is transited to short.

However, it is difficult to artificially manipulate priorities of dielectric breakdown and electromigration. Then, in the case that data "1" is superior, only the cell of data "1" may be selected to apply electrical stress on them. On contrary, in the case that data "0" is superior, only the cells of data "0" may be selected to apply electrical stress on them. By this way, it may be preferable that electrical stress like this is repeated until the ratio of "1" and "0" becomes close to a predetermined value, while inspecting this ratio of "1" and "0". Thus, the stress pulse to be repeatedly applied on a group of selected cells may be, for example, like FIG. 36 and FIG. 37.

To actually read, first of all, the addresses of cells to be read must be selected. To select the addresses, as illustrated in FIG. 23, the row numbers are selected by the row decoder 972 and the column numbers are selected by the column decoder 973. The combination of those numbers of rows and columns may be the selected addresses. In the example of FIG. 35, this address is represented by binary. Thus, read voltage is applied by the method illustrated in FIG. 45 between word line 503 and bit line 902, which connect to a cell corresponding to a selected address, and then data of the corresponding address ("1" or "0") may be read. Thus, this procedure may be repeated until the data of the whole identification cells in the array for identification cells 960 shown in FIG. 23 are read.

In the above-mentioned example, in FIG. 38 or FIG. 46, the first electrode 1055 connects to one of bit line 902 and word line 503. The second electrode 1054 connects to the other. However, it may be possible that the constructure related to the present disclosure is not only this but also as follows. As illustrated in FIG. 51 for example, one of the first electrode 1055 and the second electrode 1054 connects to a gate electrode 955 through two control gates (a first control gate 996 and a second control gate 997). The other of the first electrode 1055 and the second electrode 1054 is grounded, connected to a source line or an arbitral terminal linked to another circuit. The bit line 902 connects to the second control gate 997 and the word line 503 to the first control gate 996. Or, as illustrated in FIG. 52, one of the first electrode 1055 and the second electrode 1054 is grounded, connected to a source line or an arbitral terminal linked to another circuit. The other connects to the gate electrode 955 through two control gates (the first control gate 996 and the second control gate 997). The bit line 902 connects to the first control gate 996 and the word line 503 to the second control gate 997.

FIG. 53 and FIG. 54 are drawings to illustrate a case that capacitor 982 is adopted as identification cell. As illustrated in FIG. 53 for example, one of the first electrode 1055 and the second electrode 1054 connects to the gate electrode 955 through two control gates (the first control gate 996 and the second control gate 997). The other of the first electrode 1055 and the second electrode 1054 is grounded, connected to a source line or an arbitral terminal linked to another circuit. The bit line 902 may connect to the second control gate 997 and the word line 503 to the first control gate 996. Or, as illustrated in FIG. 54, one of the first electrode 1055 and the second electrode 1054 is grounded, connected to a source line or an arbitral terminal linked to another circuit. The other connects to the gate electrode 955 through two control gates (the first control gate 996 and the second control gate 997). The bit line 902 connects to the first control gate 996 and the word line 503 to the second control gate 997.

FIG. 55 and FIG. 56 are drawings to illustrate an example that PN junction 986 is adopted as identification cell. As illustrated in FIG. 55 for example, one of the first electrode 1055 and the second electrode 1054 connects to the gate electrode 955 through two control gates (the first control gate 996 and the second control gate 997). The other of the first electrode 1055 and the second electrode 1054 is grounded, connected to a source line or an arbitral terminal linked to another circuit. The bit line 902 connects to the second control gate 997 and the word line 503 to the first control gate 996. Or, as illustrated in FIG. 56, one of the first electrode 1055 and the second electrode 1054 connects to the gate electrode 955 through two control gates (the first control gate 996 and the second control gate 997). The other is grounded, connected to a source line or an arbitral terminal linked to another circuit. The bit line 902 connects to the first control gate 996 and the word line 503 to the second control gate 997.

FIG. 57 and FIG. 58 are drawings to illustrate an example that Schottky junction 987 is adopted as identification cell. As illustrated in FIG. 57 for example, one of the first electrode 1055 and the second electrode 1054 connects to the gate electrode 955 through two control gates (the first control gate 996 and the second control gate 997). The other of the first electrode 1055 and the second electrode 1054 is grounded, connected to a source line or an arbitral terminal linked to another circuit. The bit line 902 connects to the second control gate 997 and the word line 503 to the first control gate 996. Or, as illustrated in FIG. 58, one of the first electrode 1055 and the second electrode 1054 connects to the gate electrode 955 through two control gates (the first control gate 996 and the second control gate 997). The other is grounded, connected to a source line or an arbitral terminal linked to another circuit. The bit line 902 connects to the first control gate 996 and the word line 503 to the second control gate 997.

FIG. 59 and FIG. 60 are drawings to illustrate an example that resistor 985 is adopted as identification cell. As illustrated in FIG. 59 for example, one of the first electrode 1055 and the second electrode 1054 connects to the gate electrode 955 through two control gates (the first control gate 996 and the second control gate 997). The other of the first electrode 1055 and the second electrode 1054 is grounded, connected to a source line or an arbitral terminal linked to another circuit. The bit line 902 connects to the second control gate 997 and the word line 503 to the first control gate 996. Or, as illustrated in FIG. 60, the bit line 902 connects to the first control gate 996 and the word line 503 to the second control gate 997. Furthermore, another example of resistor 985 may be conductor 930 shown in FIG. 47 and FIG. 48. It may be possible to adopt conductor as resistor or fuse by manipulating it to be thin or bended like a corner of rectangular. Or it may be also possible to adopt conductive junction 970 as conductor 930.

FIG. 61 and FIG. 62 are drawings to illustrate an example that transistor 983 is adopted as identification cell. As illustrated in FIG. 61 for example, the gate of the transistor 983 connects to the gate electrode 955 through two control gates (the first control gate 996 and the second control gate 997). The source and drain of the transistor 983 are grounded, connected to a source line, or an arbitral terminal linked to another circuit. Here, the bit line 902 connects to the second control gate 997 and the word line 503 to the first control gate 996. Or, as illustrated in FIG. 62, the bit line 902 connects to the first control gate 996 and the word line 503 to the second control gate 997.

FIG. 63 and FIG. 64 are drawings to illustrate an example that DRAM cell comprising transistor 983 and capacitor 982 is adopted as identification cell. As illustrated in this FIG. 63, the gate of the transistor 983 connects to the gate electrode 955 through two control gates (the first control gate 996 and the second control gate 997). One of source and drain of the transistor 983 is grounded, connected to a source line or an arbitral terminal linked to another circuit. The other connects to one of two terminals of the capacitor 982. The other terminal of the capacitor 982 is grounded, connected to a source line or an arbitral terminal linked to another circuit. Here, the bit line 902 connects to the second control gate 997 and the word line 503 to the first control gate 996. Or, as illustrated in FIG. 64, the bit line 902 connects to the first control gate 996 and the word line 503 to the second control gate 997.

FIG. 65 and FIG. 66 are drawings to illustrate an example that select transistor 984 is adopted as identification cell. As illustrated in FIG. 65 for example, the gate of the select transistor 984 connects to the gate electrode 955 through two control gates (the first control gate 996 and the second control gate 997). The source and drain of the select transistor 984 are grounded, connected to a source line or an arbitral terminal linked to another circuit. Here, the bit line 902 connects to the second control gate 997 and the word line 503 to the first control gate 996. Or, as illustrated in FIG. 66, the bit line 902 connects to the first control gate 996 and the word line 503 to the second control gate 997.

FIG. 67 is an example that diffusion layers of adjoining select transistors 984 along bit line direction are connected. This is called NAND type configuration, and then a bit line contact is excluded from between cell transistors. However, since those cell transistors are identification cells 977 and not non-volatile memory cells, it is different from so-called NAND flash and is a NAND-type identification cell array. Here note that the identification cell is a select transistor 984 and, in particular, the breakdown of capacitor comprising tunnel film is adopted. FIG. 68 is another example of NAND-type identification cell array. In this example, the transistor 983 is adopted as identification cell. Here note that, in particular, the breakdown of capacitor comprising the gate insulating film is adopted. Accordingly, the operation method is similar and then outlined below. Meanwhile, even though a bit contact is removed from between cells, the bit lines are not removed. Accordingly, even in NAND-type cell array, the identification cells 977 are distributed at cross-points of bit lines and word lines.

FIG. 69 is an example of the above-mentioned array for identification cells 960. The page buffer 790 also plays a role of the page buffer for the array of NAND-type non-volatile memory cells. The page buffer 790 includes a bit line connection gate 791 to turn on/off the connection to bit line 902. Furthermore, the page buffer 790 comprises circuits to govern a sense-amplifier, a latch up and so forth inside.

The above-mentioned example may be equipped with a memory cell of NAND flash. However, it may be also possible that the present disclosure is equipped with volatile memories such as DRAM, SRAM and so on, or different kinds of non-volatile memories such as NOR flash, magnetic random-access memory (MRAM), spin-torque type magnetic random-access memory (STT-MRAM), phase-change random access memory (PCRAM), resistive change random access memory (ReRAM), ferroelectric random-access memory (FRAM) and so on. With any memory cells to be equipped with, the essence of the present disclosure is unnecessary to be revised. In other words, the memories to be equipped with the array for identification cells 960 related to the present disclosure may share at least one of bit line and word line for addressing as necessary, and not beyond. It is independent of any kind of memories.

As an example, to apply voltage pulse on identification cell 977, the following method may be executed. At first, a positive potential is applied to a select gate in the side of bit line (SGS) and then a drain select transistor (SGD) at the bit line side 9811 is turned on. In the case that there are word lines between the word line linking to a cell to be broken and the drain select transistor at the bit line side 9811, similarly, a positive voltage is also applied to those word lines and then all of the corresponding cell transistors (identification cells 977) is turned on. Here note that a potential of bit line linking to the cell to be applied with breaking pulse is zero volt. Next, a word line linking to the cell to be applied with breaking pulse is selected and then the breaking pulse is applied thereon. An example of the method to apply breaking pulse may be, for example, those illustrated in FIG. 36 or FIG. 37. In addition, in the case that there is a plurality of chip identification codes, different blocks of chip identification should be respectively allocated to different identification codes. In this event, the methods of FIG. 36 or FIG. 37 may be tested with one of chip identification devices to determine the pulse frequency and then this frequency may be stored in a memory area on chip (or buffer). The breaking pulse may thus be applied in another area of chip identification with the frequency stored here. In the event, the inspection of breaking ratio between pulses may be omitted.

FIG. 70 is an illustration of an example of voltage pulse to be applied when the inspection of breakdown related to the present disclosure is carried out. First of all, a word line associated to an identification cell 977 (cell transistor) to be read is selected and then a voltage higher than zero volt is applied thereto. In the case that there are other word lines between the selected word line and the drain select transistor (SGD) 9811, a positive potential is applied to those word lines and then the associated identification cells (cell transistors) are turned on. A predetermined positive potential which is zero volt or lower than that to the selected word line is applied to the bit line. The potential difference between the selected word line and the bit line may be, for example, about the breakdown judge voltage 932 of FIG. 34. Simultaneously, a positive potential is applied to the gate of the drain select transistor (SGD) 9811, and then the drain select-transistor (SGD) 9811 is turned on. Next, the potential of the bit line connection gate 791 is reduced to zero volt. Thus, the bit line connection transistor 7910 is turned off, and then the bit line is disconnected from the inspection circuit in the page buffer 790. If the insulating film of the selected identification cell 977 is broken and then conductive, the potential of the bit line may be increased. On contrary, if not conductive, the potential of the bit line may be unchanged. Next, a positive potential is applied to the bit line connection gate 791 and then the bit line connection transistor 7910 is turned on. Subsequently, the potential change of the bit line may be inspected inside the page buffer 790. The potential difference owing to the conductive and non-conductive states of the insulating film of the identification cell 977 is amplified in the page buffer 790 and then stored as data of high and low in latch up circuit. In other words, the insulating film of the selected identification cell 977 may be regarded as broken if the potential of the bit line is higher than a predetermined potential (e.g., the breakdown judge voltage value 9330). The insulating film of the selected identification cell 977 may be regarded as non-broken if the potential of the bit line is lower than a predetermined potential (e.g., the non-breakdown judge voltage value 9340). Here, the breakdown judge voltage value 9330 and the non-breakdown judge voltage value 9340 respectively correspond to the breakdown judge current value 933 and the non-breakdown judge current value 934 in FIG. 34. In this example, the breakdown corresponds to a conductive state and the non-breakdown corresponds to a non-conductive state.

Another example of voltage pulse to be used in the breakdown inspection related to the present disclosure is illustrated with FIG. 71. At first, one of word lines, which links to an identification cell 977 (cell transistor) to be read, is selected and then zero voltage is given thereto. In the case that there are other word lines between the selected word line and the drain select transistor 9811, similarly, a positive voltage is also applied to those word lines, and the associated identification cells (cell transistors) are turned on. A predetermined positive potential is applied to the bit line. The potential difference between this selected word line and the bit line may be, for example, about the breakdown judge voltage 932 of FIG. 34. Simultaneously, a positive potential is applied to the gate of drain select transistor 9811 and then the drain select transistor 9811 is turned on. Next, the potential of bit line connection gate 791 is reduced to zero volt. Thus, the bit line connection transistor 7910 is turned off and the bit line is then disconnected from the inspection circuit inside the page buffer 790. If the insulating film of the selected identification cell 977 is broken to be conductive, the potential of the bit line is decreased. On contrary, if not conductive, the potential of the bit line is unchanged. Next, a positive potential is applied to the bit line connection gate 791 and the bit line connection transistor 7910 is then turned on. Subsequently, the potential change of the bit line is inspected in the page buffer 790. The potential difference of the bit line owing to the conductive and non-conductive states of insulating film of identification cell 977 is amplified in the page buffer 790 and then stored as data of high and low in the latch up circuit. In other words, the insulating film of selected identification cell 977 may be regarded as broken if the potential of the bit line is lower than a predetermined potential (e.g., the breakdown judge voltage value 9331). The insulating film of selected identification cell 977 may be regarded as non-broken if the potential is higher than a predetermined potential (e.g., the non-breakdown voltage value 9341). Here note that the breakdown judge voltage value 9331 and the non-breakdown judge voltage value 9341 respectively correspond to the breakdown judge current value 933 and the non-breakdown judge current value 934 of FIG. 34. Here note that the breakdown is a conductive state and the non-breakdown is a non-conductive state.

It may be possible to allocate a block next to plurality of blocks of non-volatile memory to chip identification device array. For example, the layout shown in FIG. 31 and FIG. 32 may be possible. Like this, although the chip identification device and the non-volatile memory device differ each other, the chip area may be saved by sharing bit lines 902 or word lines 503.

In the example of physically random combination composed on the semiconductor cell array, as shown in FIG. 22, for example, the number of "1" and "0" is counted at each row and then the rows having more "1" is regarded as black. The rows having more "0" is regarded as white. Or, if the binary sum of "1" and "0" at each row shows "1" at the first digit, the corresponding row is regarded as black. On contrary, if the binary sum shows "0" at the first digit, the corresponding row is regarded as white. Or, it may be possible to determine "1" or "0" at each row with regard to some kind of property related to each row.

Like this, a value related to each row ("1" or "0") is determined according to some kind of operations. The result related to each row may be recorded in an alternation cell 979. For example, any kind of binary bit operation may be possible. Or, it may be preferable that only the last digit of the summation of "0" and "1" at each row is recorded to an alternation cell 979. Or it may be possible that the numbers of "0" and "1" are compared at each row and then the superior may be recorded to an alternation cell 979. The alternation cell 979 is a memory cell, fuse and so on. However, the memory cell may be either non-volatile or volatile. For example, in the case of non-volatile memory, it may be preferable that the memory cell has a floating gate. Or it may be preferable that the memory cell adopts change in magnetoresistance, phase transition, and resistivity of resistor layer. In the case of volatile memory, the memory cell may adopt charge quantity stored in a capacitor or a specialized circuit (like SRAM).

Anyway, the white and black random checkerboard pattern of FIG. 22 is converted to a random pattern of horizontal lines as shown in FIG. 73. This is similar to the conversion from two-dimensional code to barcode. The information quantity per a same row number is decreased by this conversion. However, an enough randomness is ensured as long as the number of rows is large enough and one of ratios of white and black does not dominate the other.

Here, FIG. 23 is formed to reproduce FIG. 22 by distributing some kind of identification cells 977 on cross-points of checkerboard lattice. As mentioned above, the identification cell 977 may be anyone to distinguish the first and second outputs such as memory cell, resistor, capacitor, diode, switching cell, and some kind of transistors. Here note that the row number may be N and the column number may be M, where both N and M are required to be large integers for FIG. 22 to ensure sufficient randomness.

Subsequently, (a(1), a(2), . . . , a(N)) may be considered as an example of input code (P, S, T . . . ). As shown in FIG. 74, the elements of (a(1), a(2), . . . , a(N)) respectively correspond to the alternation cells 979 from the first row in the order of row. However, the i-th data (I/O) may correspond to an element of d(i). The {d(i)}, an ensemble of elements d(i), may be a random code formed of a random aggregation of 0 and 1. In a similar manner, the above input code may be represented by {a(i)}, where i is an integer ranging from 1 to N. Subsequently, the output code {c(i)} is generated from the input code {a(i)} and the random code {d(i)} by some kind of method. The pair of the input code {a(i)} and the output code {c(i)} may correspond to the communication series 80 of FIG. 9.

As mentioned above, however, as long as FIG. 22 is a physical random pattern of white and black, the necessary condition that {d(i)} is a random code formed of a random aggregation of 0 and 1 may be satisfied. Of course, in the above-mentioned examples, the essence of the present disclosure may be unchanged even by replacing row and column.

As an example, here, the modulo operation mod (x,y) may be adopted to generate the output code {c(i)}. This may be a reminder after dividing x by y. FIG. 75 may be a chart illustrating the relation of sequence {a(i)}, physical random code {d(i)} and output code {c(i)} to be output according to the equation (4). Accordingly, this physical random code {d(i)} corresponds to said physical randomness proper to a chip.

$$C(i)=\mathrm{mod}(a(i)+d(i),2) \qquad \text{Eq. 4}$$

This may be similar to but simpler than Eq. 2 because of no column element j. Moreover, it is easily regarded that this method cause no change of ratios of 1 and 0 before and after the conversion. This is a necessary requirement to stabilize the quantity of data to be dealt with the communication series 80. In other words, it is required that the quantity of information to be input to the right-hand side of Eq. 4 and the quantity of information to be output from the left-hand side of Eq. 4 are almost equivalent. In other words, in the case that the quantities of input and output information substantially differ each other, the quantity of information determined by Eq. 4 is determined by the smaller one, and as a result, information entropy (physical randomness) may be lost by at least the difference due to this reduction.

FIG. 76 is a conceptual illustration for an example of basic configuration to realize the mechanism described in Eq. 4. In other words, the physical random number $\{d(i)\}$ is generated by the random number generator 601, the input code $\{a(i)\}$ is input as a common passcode from the stem node 400, and then the output code $\{c(i)\}$ is generated by the code generator 602. In this example, both the random number generator 601 and the code generator 602 are components of the identification device 600. On the other hand, while it may not particularly noted since it may be self-evident, it is possible in another example that the code generator 602 is set in the external of the chip identification device 600. Anyway, it is at least required that the random number generator 601 is equipped in chip at as low cost as possible. As an example of the random number generator 601 in the present disclosure, the methods conceptually illustrated in FIG. 73 and FIG. 74 may be adopted. It may be possible to configure the code generator 602 by a program, as conceptually illustrated in Eq. 4. Here, although some kind of algorithm is adopted to generate codes, it is characteristics of the present disclosure that physical randomness which is specific to a chip is involved with the physical random number $\{d(i)\}$. However, it is presumed that the row number of the random number generator 601 is at least equal to or larger than the element number of $\{a(i)\}$, in order to input the whole element of the input code.

FIG. 27 is an illustration of an example of the utilization method of the scrambler 604 to operate according to Eq. 4. Here, the input code (P, S, T, ...) is sent from the stem node 400 to the scrambler 604. Thus, the input code (P, S, T, ...) is converted to (P', S', T', ...). This converted code is input, as the input code, to the chip identification device 600 equipped into a peripheral node as a module. Here note that, in FIG. 7, the peripheral node connecting to the stem node 400 mounts at least a chip having the identification device 600. The chip identification device 600 returns the identification (P1, S1, T1, ...). Next, (1) this identification (P1, S1, T1, ...) is output to the stem node. Or, (2) this identification (P1, S1, T1, ...) is returned to the scrambler and then the identification converted again, (P1', S1', T1', ...), is returned to the stem node 400. Or, while it may be not particularly noted since it may be self-evident, (3) the identification (P1', S1', T1', ...) is converted to the identification (P1", S1", T1", ...) by using a second and different scrambler and then the identification (P1", S1", T1", ...) is returned to the stem node 400. In the method (3), at least two independent scramblers are necessary.

FIG. 77 illustrates a part or the whole of cell array comprising the identification cells 977 and the alternation cells 979 of FIG. 72, where the number of rows is N+K. This N+K may be less than or equal to the number of the whole bit lines on chip, or less than or equal to the number of the whole word lines on chip. Here, the upper area of K rows may be allocated to the cell array for scrambler 614 and the bottom area of N rows to the cell array for chip identification device 611. This set of (N, K) can be used as a security buffer, as similar to an example related to FIG. 29.

First of all, the summation of $\{a(i)\}$ and $\{d(i)\}$ may be divide by 2 and the remainder may be output as the intermediate output $\{f(i)\}$, as illustrated in Eq. 5.

$$f(i)=\mathrm{mod}(a(i)+d(i),2) \qquad \text{Eq. 5}$$

Here, $\{f(i)\}$ is the output related to the cell array for scrambler 614, where i is an integer ranging from 1 to N.

Subsequently, replacing the sequence $\{a(i)\}$ with an intermediate code $\{f(i)\}$ in Eq. 5, the Eq. 6 is obtained, where the left-hand side is the output $\{c(i)\}$ of the code generator 602.

$$c(i)=\mathrm{mod}(f(i)+d(i),2) \qquad \text{Eq. 6}$$

In the case that the alternation cell 979 is a fuse, for example, FIG. 73 may be really formed by configuring fuse at each row of FIG. 72. For example, the disconnected fuses may be regarded as black row, and the non-disconnected fuses as white row. This white/black random horizontal pattern may be replaced by the pattern of non-disconnection/disconnection of fuses configured along the vertical direction. Moreover, the non-disconnection/connection may be determined by some kind of property related to each row.

The determination method of non-disconnection/disconnection of fuses may be not only to count the number of white and black at each row. It may be possible to disconnect the fuses corresponding to rows wherein irreversible errors occur due to circumstances beyond control, and not to otherwise. This example may be sufficient as long as the occurrence of those irreversible errors is physically random. Furthermore, in the case of the present example, it may be approval that the ratio of disconnection to non-disconnection is far from 50%.

A row having an irreversible error is replaced with another row which is called a redundancy row and not used for semiconductor device. In contrary, the other rows are used for at least a part of mass-product semiconductor device. This is a usual method to prohibit the shipment of defective chips. It is noted here that a combination of rows to be and not to be replaced with redundancy rows is physically random. In other words, though a new chip area is not used for the chip identification device 600, it turns out being possible to output a physical randomness by utilizing a chip area of row replacement for avoiding the shipment of defective chips (area for redundancy rows).

By the way, it is unusual that each row of memory cell array is allocated with a fuse. Therefore, a row number corresponding to a row having an irreversible error due to some kind of reasons is stored in a memory separately given (redundancy memory). Then, it may be checked if a selected memory cell to be accessed belongs to the redundancy memory or not. A cell not belonging to the redundancy memory may be actually accessed and another belonging to the redundancy memory may not be accessed and the corresponding low is replaced with a redundancy row. Thus, in order to utilize physical randomness of generation of irreversible error in memory cells due to some kind of reasons, the memory area for the redundancy may be adopted and the alternation cells 979 shown in FIG. 72 and so forth are not used.

However, it may be required that the row number N is large enough, in order to output sufficient physical randomness with this method. Here, if L is the number of rows belonging to the redundancy, the L is an integer substantially larger than 1 and much smaller than N.

The semiconductor products satisfying the above-mentioned necessary conditions may be, for example, the dynamic random-access memory (DRAM). In this event, the above-mentioned identification cell 977 may be a cell of DRAM. In the case of a typical 4 Gb DRAM product, for example, while the total number of bit lines is about 6,550,000, the number of rows having been prepared to replace rows wherein irreversible errors occur due to circumstances beyond control may be, for example, about 153,000 (the number of bit lines related to the redundancy). Here, the bit line direction has been fit to the row direction of FIG. 72. On contrary, the word lines may be fit to the row direction of FIG. 72. Anyway, the number of cases related to the redundancy is turned out equivalent to the permutation of 153,000 among 6,550,000, and then be about 5.6E+1,042,102 by the calculation. This is a tremendously large number and then regarded as infinity in actual.

Next, if the word line direction is fit to the row direction of FIG. 72, in the case of a typical 4 Gb DRAM product, the redundancy may, for example, comprise 3,044 word lines, while there are about 4,400,000-word lines. The permutation of 3,044 among 4,400,000 is turned out about 1.6E+20222. Even though the number of cases is substantially smaller than in the case of bit lines redundancy, the number of cases of word line redundancy is still tremendously large. Anyway, it may be possible to obtain actually infinite physical randomness by adopting the redundancy memory having been installed for the product management of general-purpose DRAM, though any chip area is not saved for the chip identification device 600.

Thus, in the general-purpose DRAM products, the fuse memory is installed in advance for the product management, the number of redundancy lines is sufficiently large as well as the bit lines, and as a result the obtained physical randomness may be also sufficiently large. Accordingly, it may be possible that the chip identification device adopts the whole redundancy area on chip, whereas it may be also possible that the identification device 600 adopts a part of redundancy area on chip. In this event, the number of row N may be smaller than the total number of bit lines or word lines on chip.

In the chip having identification function, related to the present disclosure, as shown in FIG. 78 for example, at least the chip identification device 600 and the input-output controller 800 are equipped therein. This input-output controller 800 comprises an input-output control circuit, a word line control circuit, a bit line control circuit, a buffer for data input-output and so on.

Furthermore, the chip 400 having chip identification function, related to the present disclosure, as shown in FIG. 79 for example, may comprise at least the chip identification device 600, the identification device controller 880, the input-output controller 810, the scrambler 890, and the intermediate code buffer 900. This input-output controller 810 may comprise the input-output control circuit and the buffer for data input-output but neither the word line control circuit nor the bit line control circuit. The scrambler 890 may comprise the scrambler 604 of FIG. 27. The intermediate code generated by the scrambler 604 may be stored in the intermediate code buffer 900, which is independent from the input-output controller 810, and not be output to the external of the chip 400 even though the output is required from the external. This is to confine the intermediate code inside the chip. The identification device controller 880 may include the word line control circuit, the bit line control circuit, and the data buffer. Furthermore, the identification device controller 880 may also include the inner memory to record the addresses corresponding to the mode "X" described in FIG. 35. A similar memory area may be involved into the scrambler 890 as necessary.

The input-output controller 810 transfers the input code ensembles of {a(i)} and {b(j)} to the scrambler 890 once the input code ensembles of {a(i)} and {b(j)} are input from the external input-output (I/O) 50. Here, the intermediate code {f (i, j)} generated according to Eq. 2 is temporarily stored in the intermediate code buffer 900 and then transferred to the identification device controller 880. The identification device controller 880 commands the word line control circuit, the bit line control circuit, and the data buffer etc. inside, to generate the output code {c (i, j)} from the random code {d (i, j)} received from the chip identification device 600 and the intermediate code {f(i, j)} according to Eq. 3. Then, the generated output code is temporarily stored in the data buffer. The input-output controller 810 outputs the output code {c (i, j)} to the external of the chip 400 via the external input-output (I/O) 50. By this way, it is possible to confine the intermediate output {f(i, j)} inside the chip.

Or, if the input code {a(i)} is input from the external input-output (T/O) 50, the input-output controller 810 transfers the input code {a(i)} to the scrambler 890. Here, the intermediate code {f(i)} generated according to Eq. 5 is temporarily stored in the intermediate code buffer 900 and then transferred to the identification device controller 880. The identification device controller 880 commands the word line control circuit, the bit line control circuit, the data buffer and so on inside to generate the output code {c(i)} in response to the random number code {d(i)} received from the chip identification device 600 and the intermediate code {f(i)} according to Eq. 6. Then, the generated output code {c(i)} is temporarily stored in the inner data buffer. The input-output controller 810 outputs the output code {c(i)} to the external of the chip 400 via the external input-output (I/O) 50. Thus, it is possible to confine the intermediate output {f(i)} inside the chip.

The identification cell 977 may be anyone of devices simultaneously manufactured in the generic semiconductor fabrication process and their parts such as MOS-type transistors, DRAM cells, non-volatile memory cell transistors, phase change memory cells, resistivity change memory cells, magnetoresistance change memory cells, PN junctions, Schottky junction, capacitors, insulating films, resistors and so on. Or a specially designed microstructure may also be possible to be adopted for the identification cell 977.

In the case that the identification cells 977 are probabilistically broken, the breaking method may be executed by applying electrical stress to selected cells. Thus, the whole addresses on chip are selected or only a part of addresses is selected as necessary, and then the breaking pulse is applied thereto.

If the ratio of "1" and "0" becomes almost same in FIG. 22, the randomness of the horizontal pattern in FIG. 73 may be increased. Thereby, in the case that the cell array to be used for the chip identification device is limited due to some kind of circumstances beyond control, or in the case that the chip identification device for a small bit capacity product is manufactured, it should be required to make the ratio of "1" and "0" as same as possible in FIG. 22. For example, there is the method that breaking pulse is applied in stages to tune the ratio of "1" and "0", as shown in FIG. 36 or FIG. 37. First of all, the first pulse voltage is applied and then the inspection is executed. Thus, if the number of non-broken cells is larger, the second pulse is applied. If the number of non-broken cells is still larger after the inspection, the third pulse voltage is further applied and then the inspection is executed. Thus, by applying the breaking pulse in stages, as shown in FIG. 36 or FIG. 37, the number of non-broken cells is gradually decreased and the number of broken cells is gradually increased. If the difference between them becomes less than a definite quantity, the application of breaking pulse may be stopped.

Or, the pulse voltage is applied to the whole cells of the chip identification device, and then the inspection is executed. Thus, if the number of non-broken cells is larger, only the non-broken cells are selected and then the pulse voltage is applied thereto. If the number of non-broken cells is still larger after the inspection, only the non-broken cells are selected again and then the pulse voltage is applied thereto. In this event, it may be preferable that the repetition of breaking pulse is applied on only non-broken cells. With or without the incrementation of breaking pulse in stage, the non-broken cells are broken in stages and then the ratio of "0" and "1" becomes close each other. If the difference between them becomes less than a definite quantity, the application of the breaking pulse may be stopped.

After the end of breaking pulse, there may be "X" that is neither "0" nor "1". In the case like this, the cells of "X" may be excluded by the method illustrated in FIG. 35.

In general, it may be not always true that only one chip is involved in electronic apparatus. The first, second . . . fifth peripheral nodes constituting an example of network as shown in FIG. 13 may comprise at least one chip. As an example, in FIG. 7, the information apparatus 140, which is a peripheral node, may comprise the first chip 110, the second chip 120 . . . the N-th chip 130. It may be unnecessary that all chip is equipped with the chip identification device of the present disclosure. In the example of FIG. 7, only the first chip 110 includes the chip identification device 60.

BRIEF DESCRIPTION OF THE DRAWINGS

FIG. 120 is the drawing to illustrate an example of the method to realize the chip identification device of the present invention.

FIG. 121 is the drawing to illustrate an example of the method to realize the chip identification device of the present invention.

FIG. 122 is the drawing to illustrate an example of the method to realize the chip identification device of the present invention.

FIG. 123 is the drawing to illustrate an example of the method to realize the chip identification device of the present invention.

FIG. 124 is the drawing to illustrate an example of the method to realize the chip identification device of the present invention.

FIG. 125 is the drawing to illustrate an example of the method to realize the chip identification device of the present invention.

FIG. 126 is the drawing to illustrate an example of the realization method that the present invention prevents the spoofing.

FIG. 127 is the drawing to illustrate an example of the method to use the signature node of the present invention.

DETAILED DESCRIPTION OF THE INVENTION

Below, the most preferable embodiments are described concretely.

As mentioned above, it may be possible that the chip identification device related to the present disclosure realizes the individual authentication of semiconductor chip with physical substance by using various methods. On the other hand, the semiconductor chip plays a central part of electronic or information apparatuses like heart in human body, and further regarded as a smallest component. Accordingly, it may be expected that physical authentication of electronic and information apparatuses is realized with chip identification satisfying the necessary condition (1)-(7) to realize chip authentication.

Figure 1:
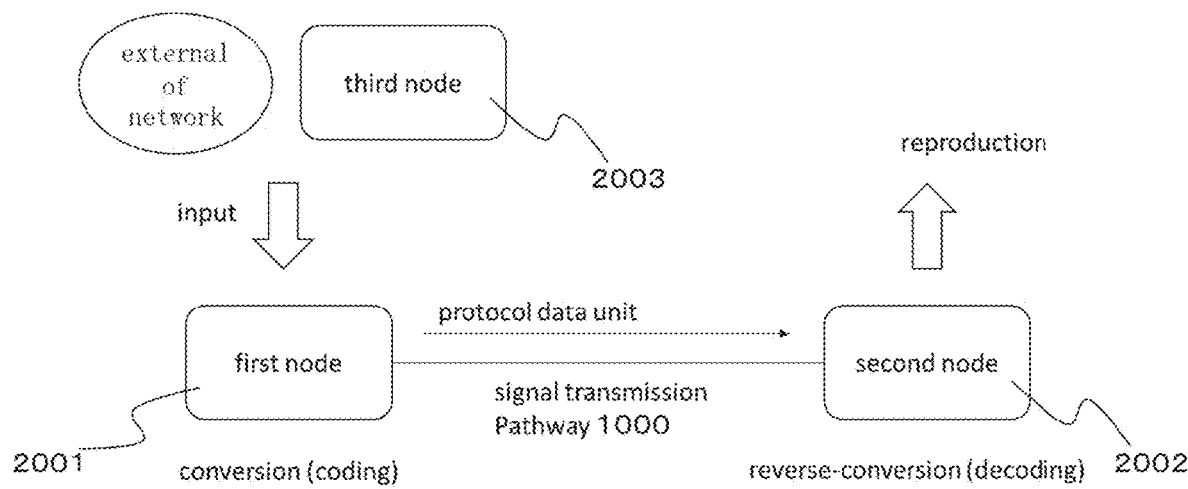
FIG. 1 is the drawing to illustrate an example of the transmission method of protocol data unit.
Figure 2:
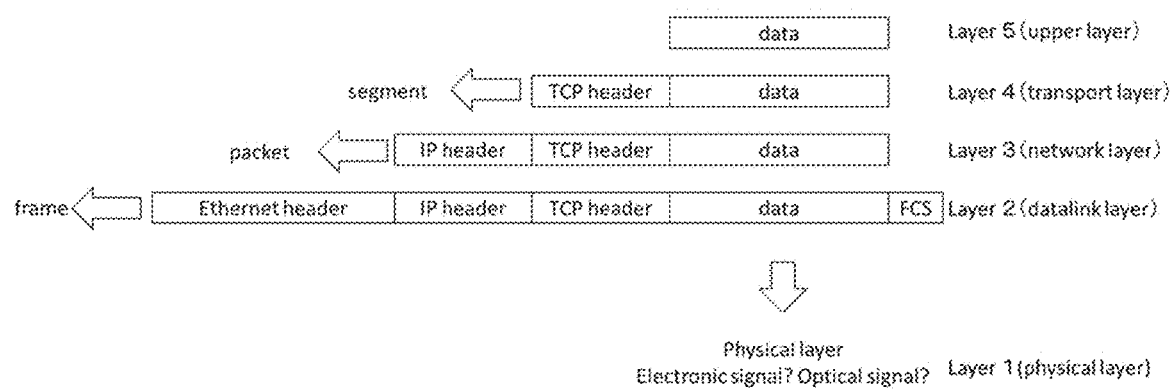
FIG. 2 is the drawing to illustrate the communication hierarchy.
Figure 3:
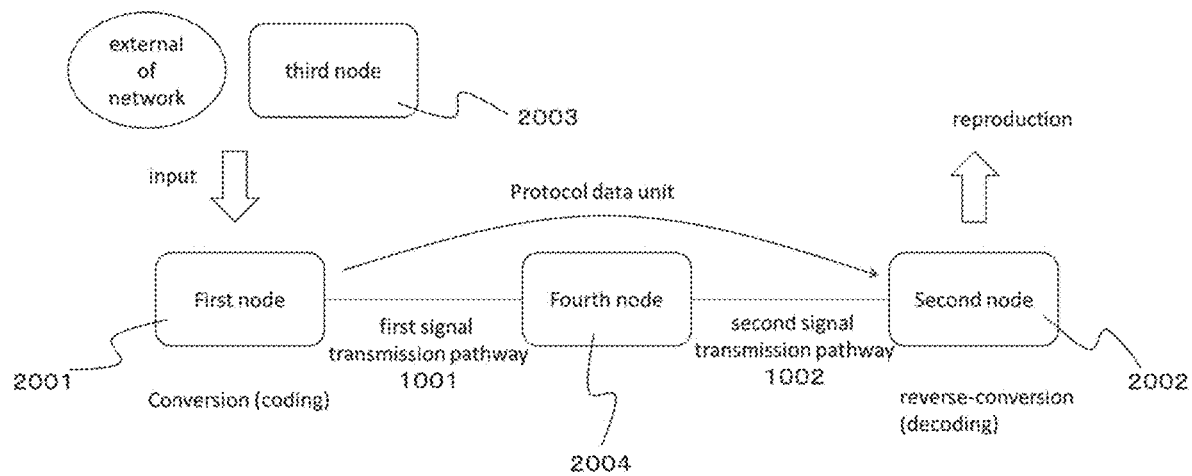
FIG. 3 is the drawing to illustrate an example of the transmission method of protocol data unit.
Figure 4:
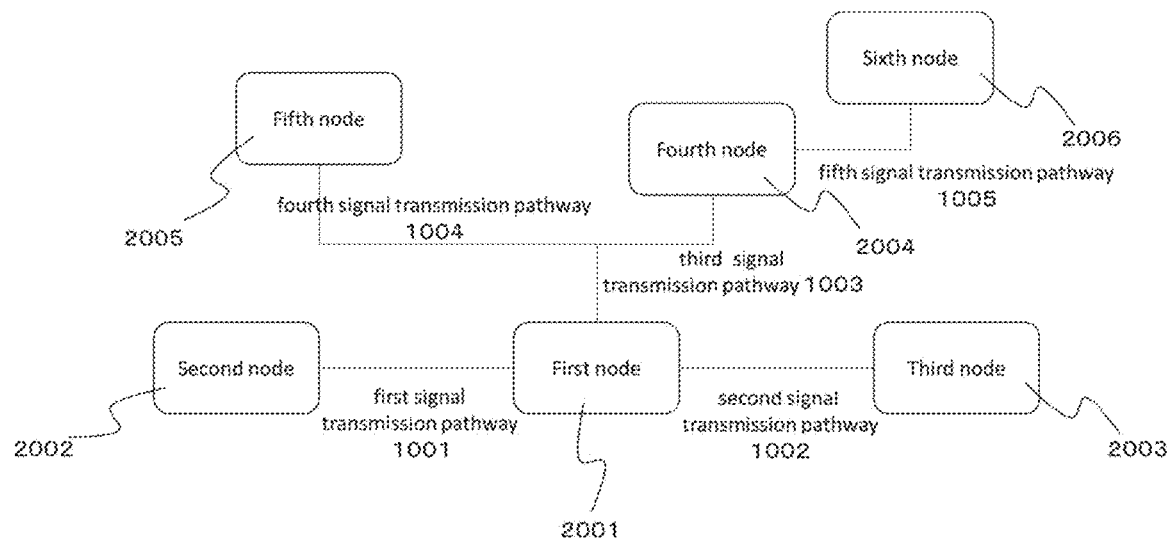
FIG. 4 is the drawing to illustrate an example of network comprising plurality of communication nodes and plurality of signal transmission pathways.
Figure 5:
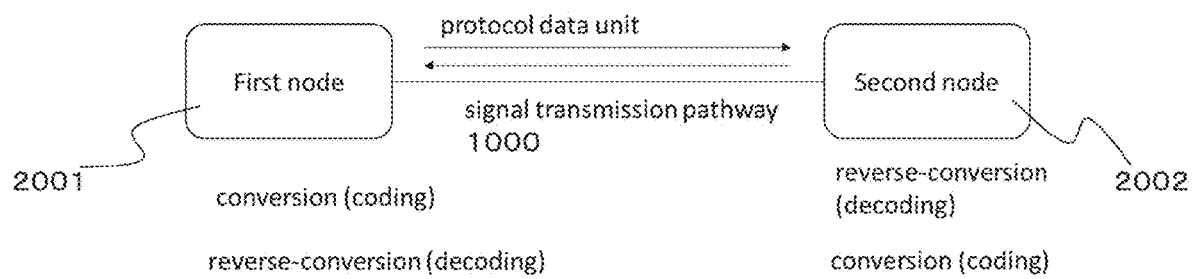
FIG. 5 is the drawing to illustrate an example of smallest unit (element) of communication network.
Figure 6:
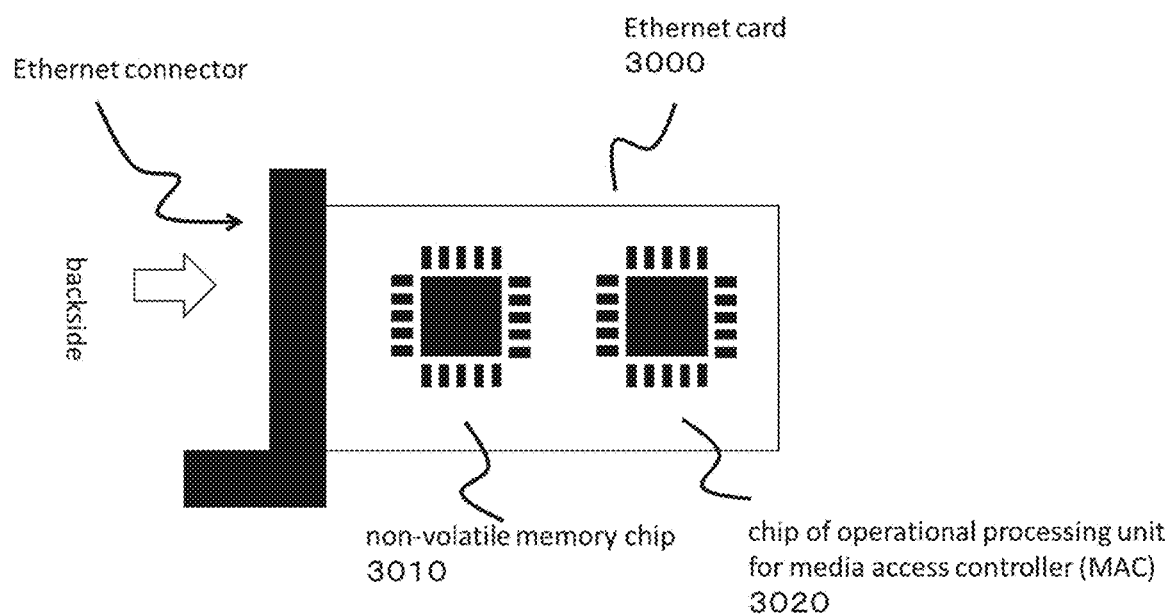
FIG. 6 is the drawing to illustrate an example of basic configuration of Ethernet card.
Figure 7:
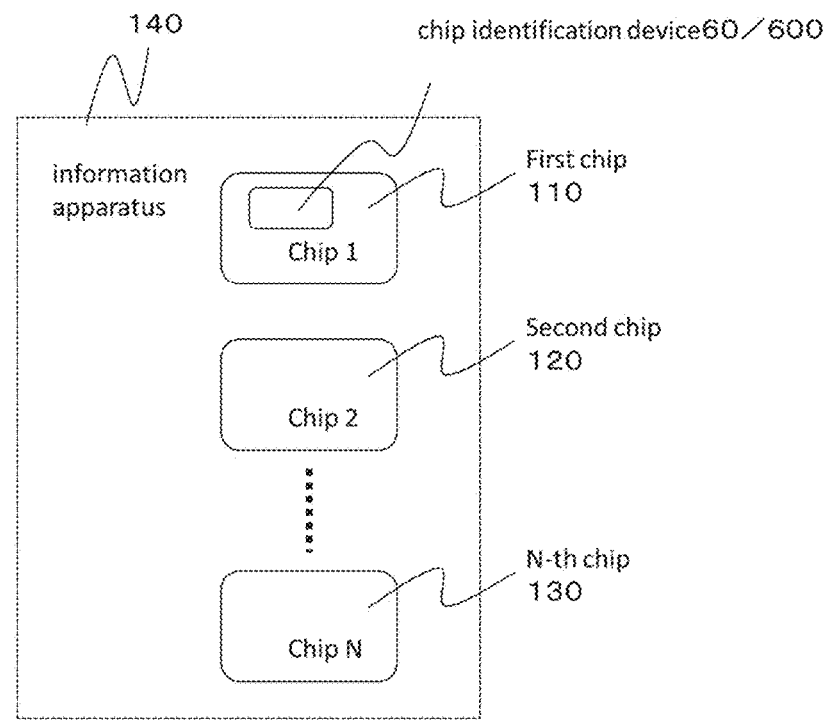
FIG. 7 is the drawing to illustrate an example of peripheral node equipped with a chip including a chip identification device.
Figure 8:
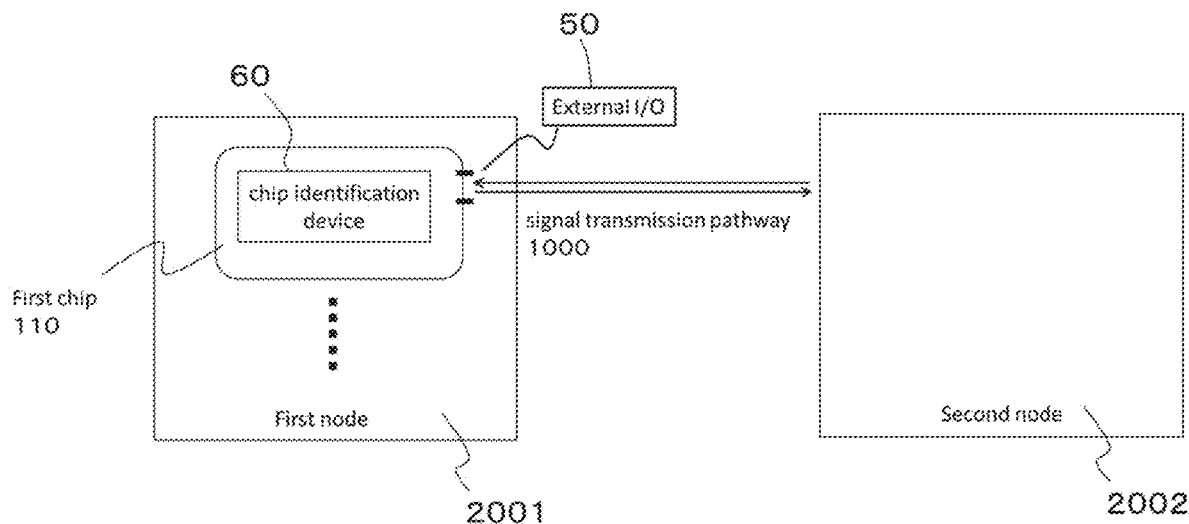
FIG. 8 is the drawing to illustrate an example of the connection method of apparatus having a chip equipped with the chip identification device of the present disclosure.
Figure 9:
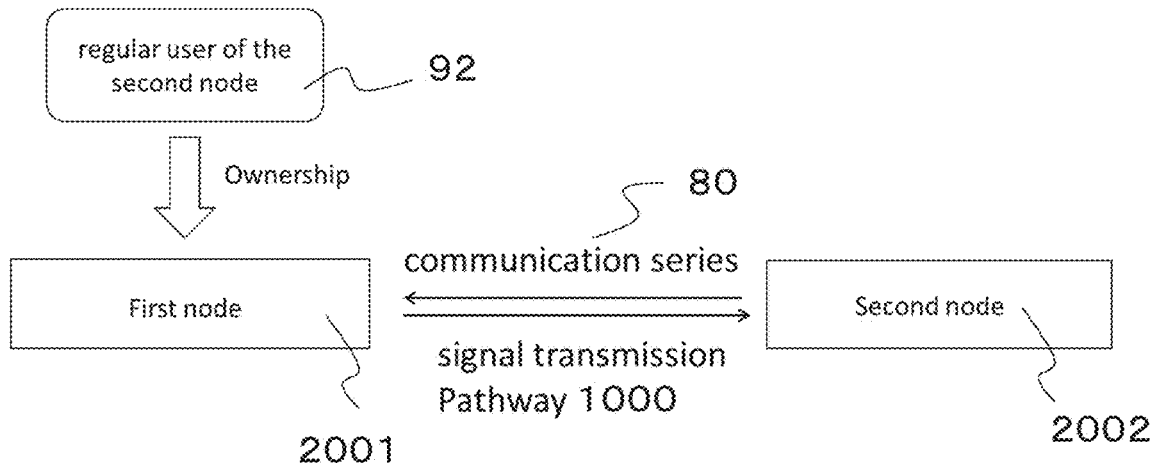
FIG. 9 is the drawing to illustrate an example of the method that a regular user uses an apparatus including a chip equipped with the chip identification device of the present disclosure on the network.
Figure 10:
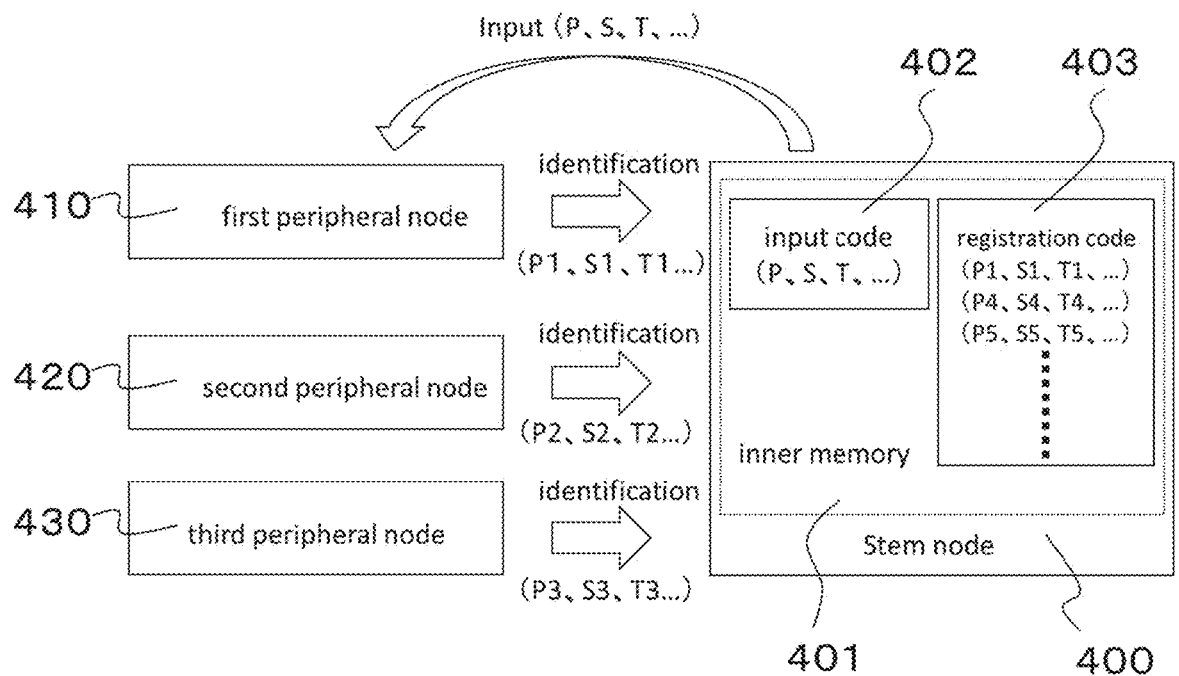
FIG. 10 is the drawing to illustrate an example of the method that a peripheral node including a chip equipped with the chip identification device of the present disclosure is connected to a stem node.
Figure 89:
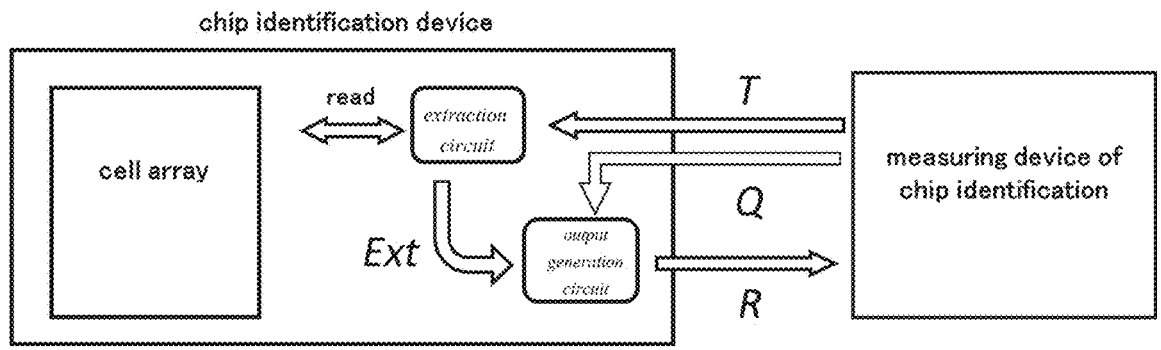
FIG. 89 is the drawing to illustrate an example of the method to generate output identification code from input identification code with regard to the measuring device of chip identification and the chip identification device.

In FIG. 89, a procedure wherein a measuring device of chip identification inputs an input identification code Q to a chip identification device and then receives an output identification code R from the chip identification device is illustrated. As an example, said chip identification device is included in the first to third peripheral nodes (410, 420, and 430) as shown in FIG. 10. The said measuring device of chip identification is included in the stem node 400 as shown in FIG. 10.

Figure 33:
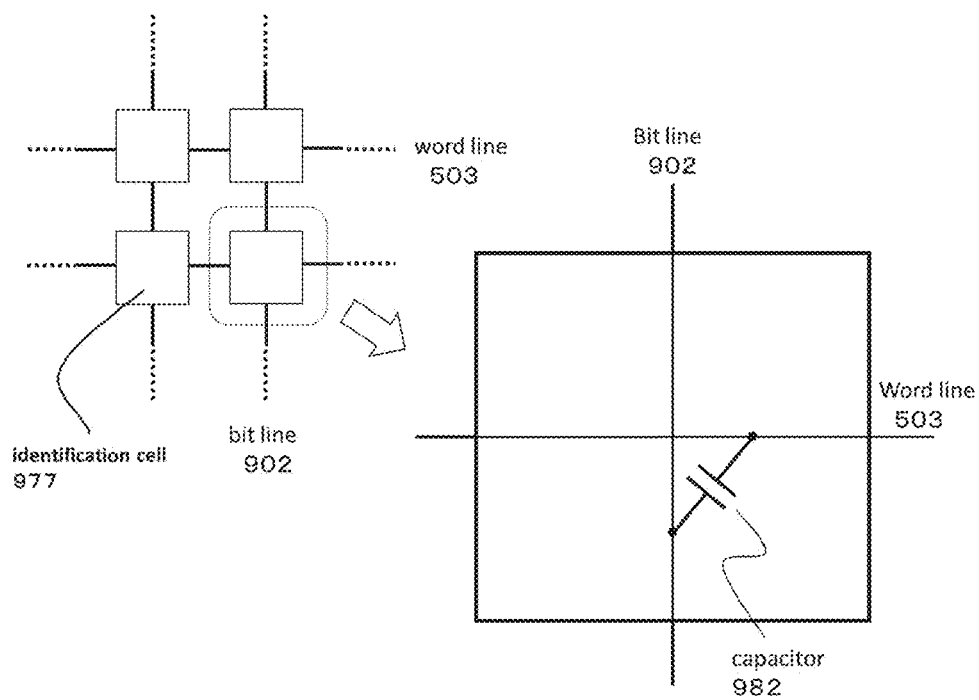
FIG. 33 is the drawing to illustrate an example of identification device (Capacitor).
Figure 34:
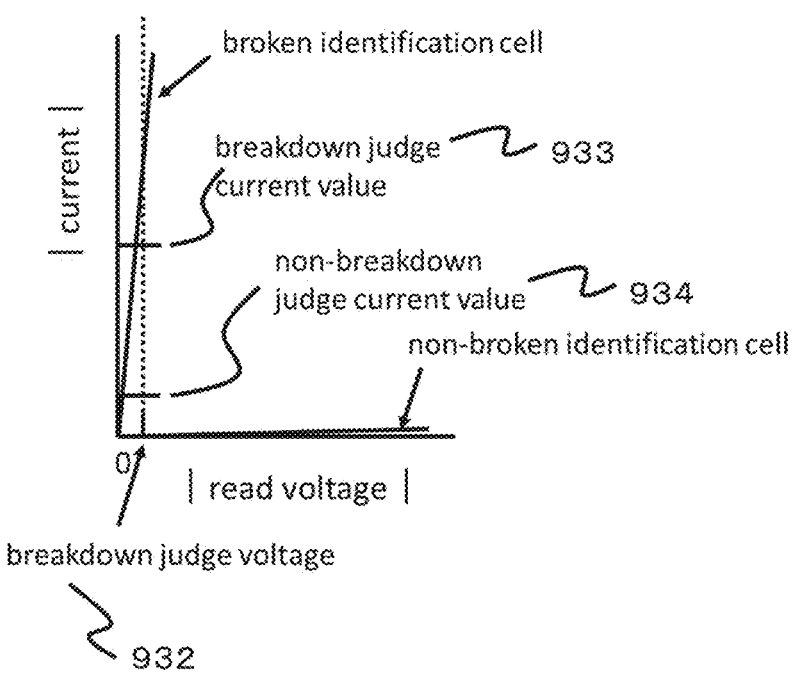
FIG. 34 is the drawing to illustrate an example of the method to read data from identification cell.
Figure 39:
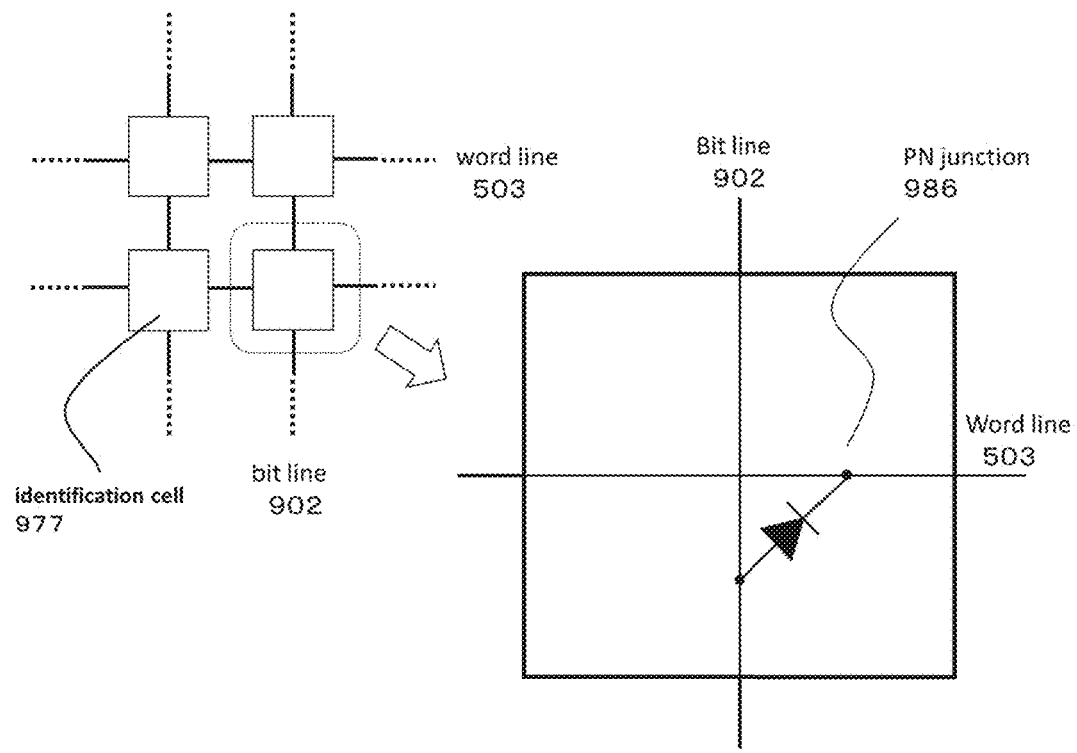
FIG. 39 is the drawing to illustrate an example of identification device (PN junction).
Figure 40:
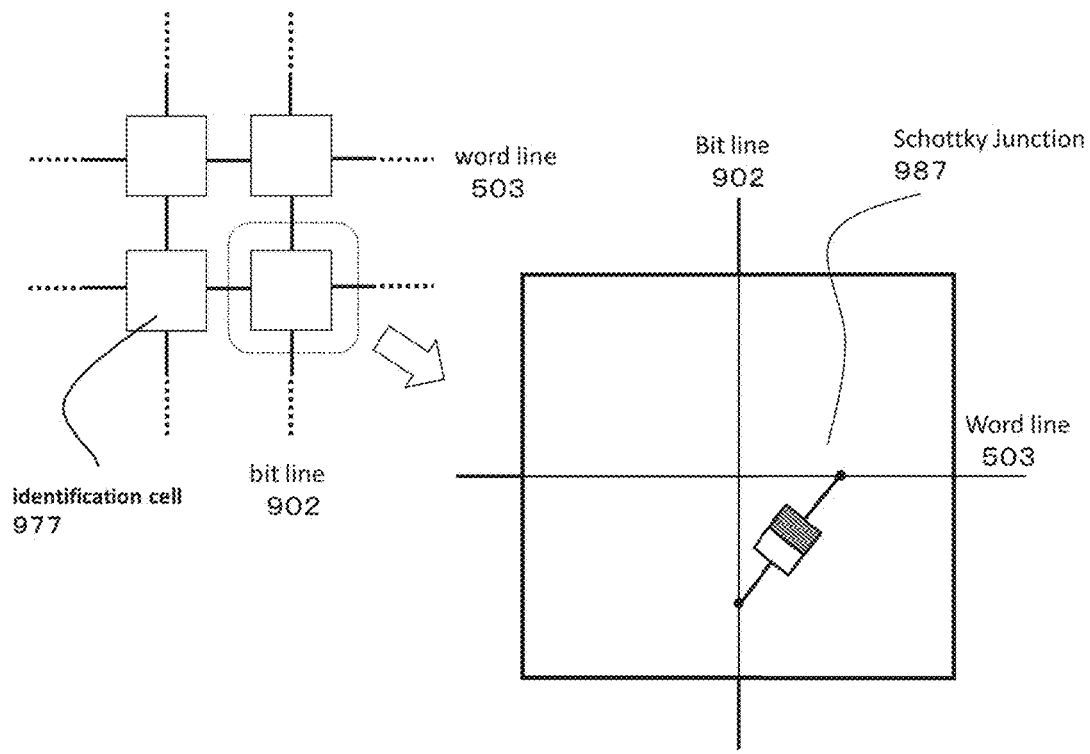
FIG. 40 is the drawing to illustrate an example of identification device (Schottky junction).
Figure 41:
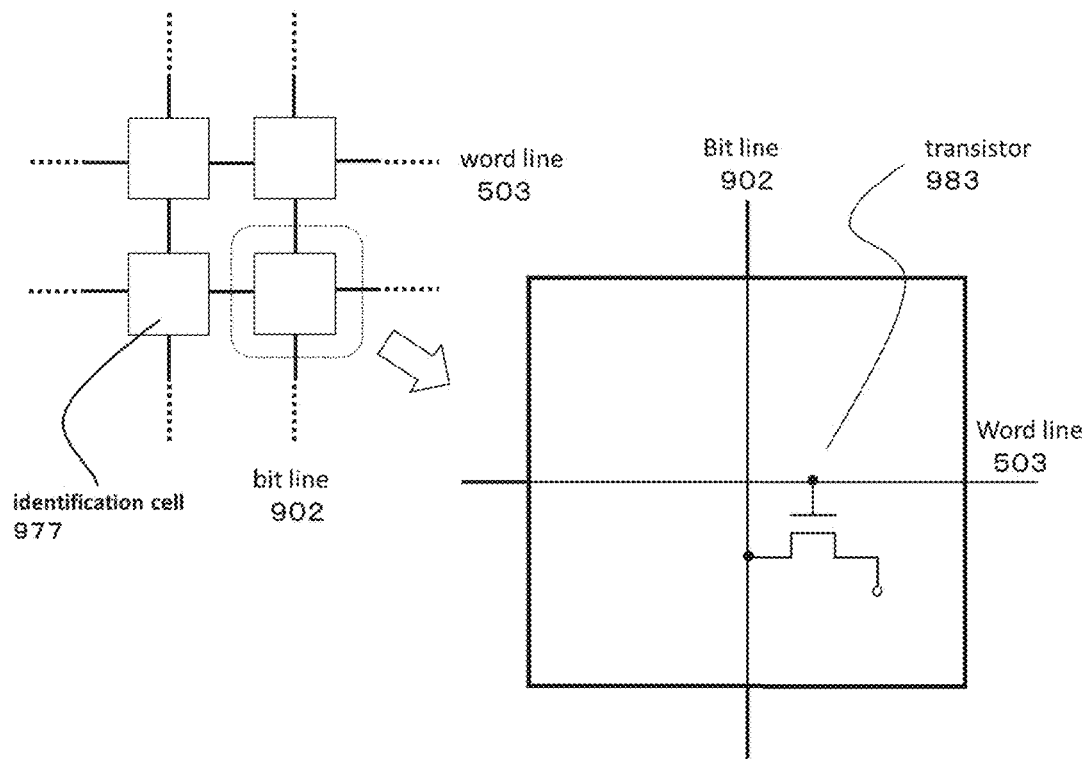
FIG. 41 is the drawing to illustrate an example of identification device (field-effect transistor).
Figure 42:
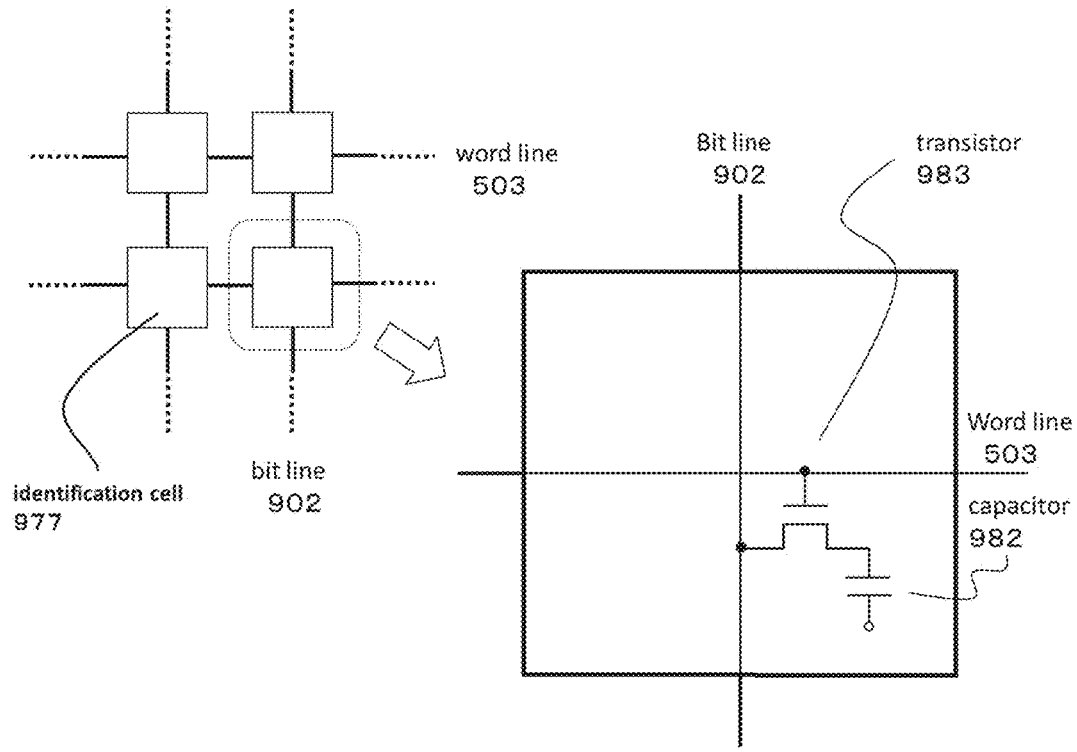
FIG. 42 is the drawing to illustrate an example of identification device (DRAM).
Figure 43:
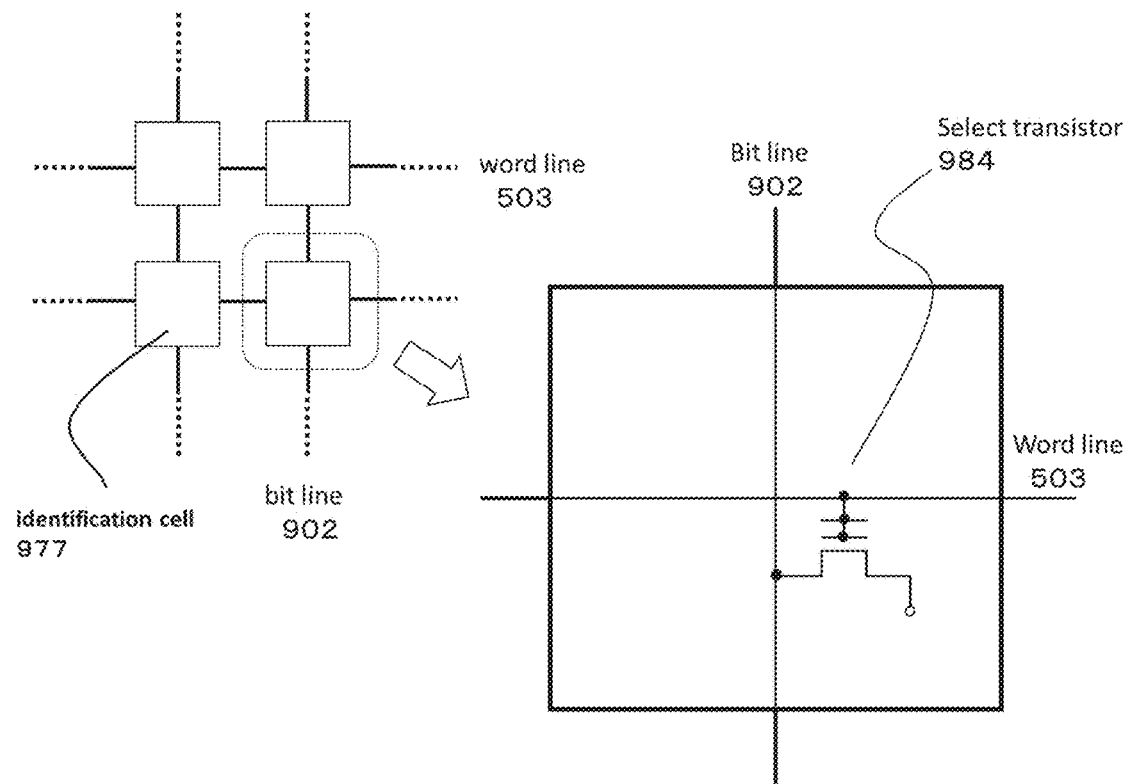
FIG. 43 is the drawing to illustrate an example of identification device (select transistor).
Figure 44:
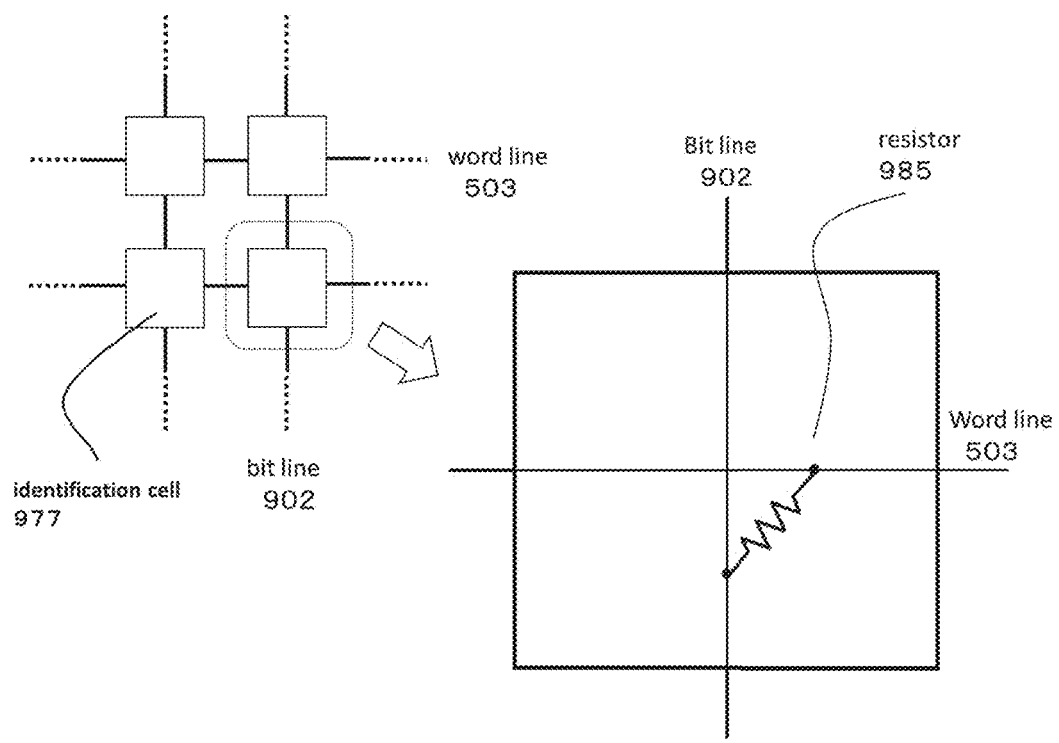
FIG. 44 is the drawing to illustrate an example of identification device (resistor).
Figure 45:
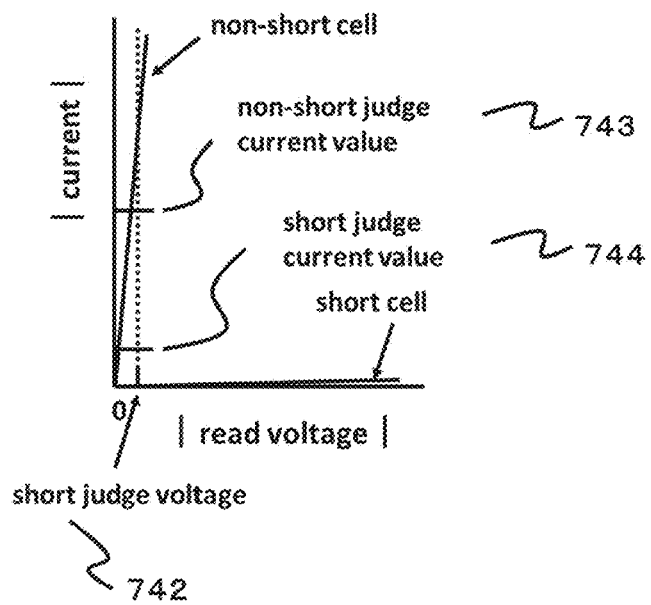
FIG. 45 is the drawing to illustrate an example of the method to read data from identification cell.
Figure 46:
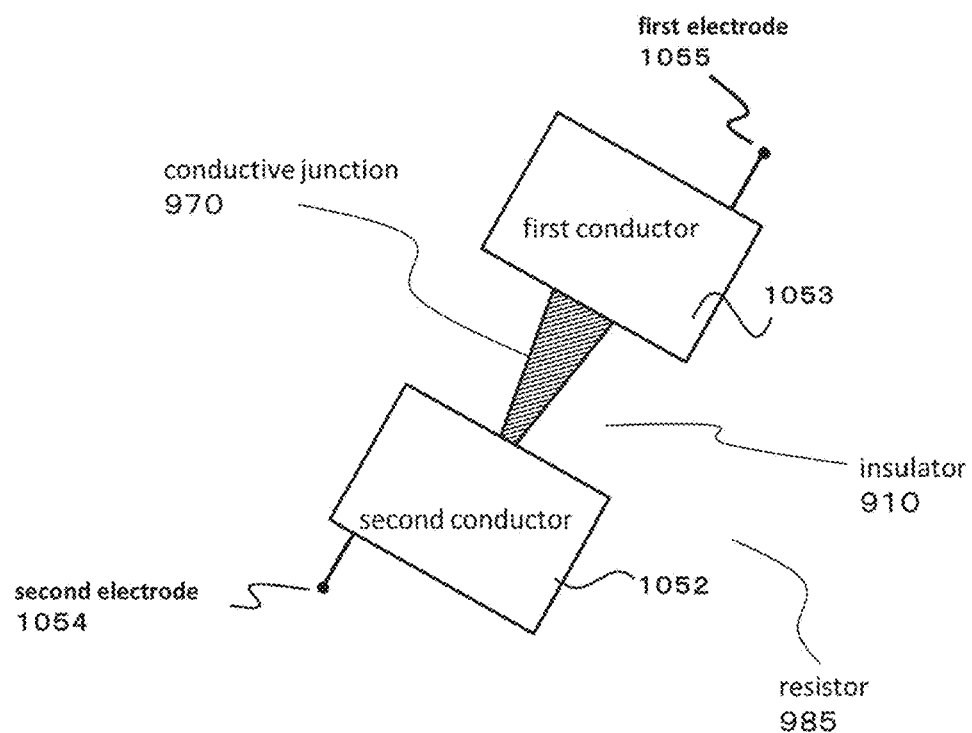
FIG. 46 is the drawing to illustrate an example of identification device (conductive junction).
Figure 47:
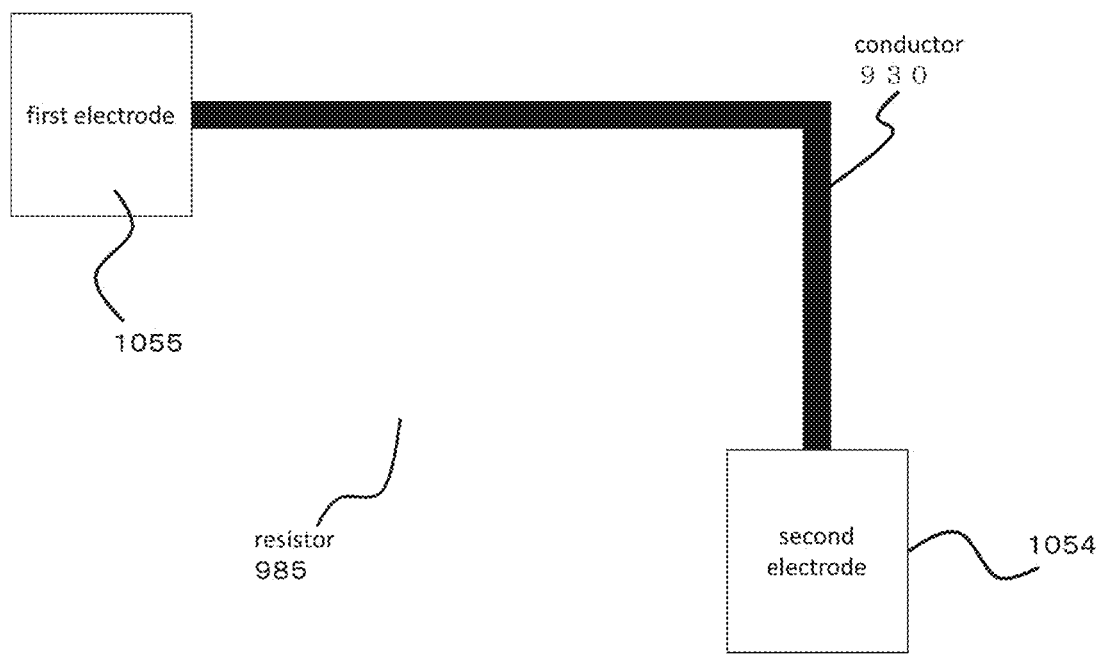
FIG. 47 is the drawing to illustrate an example of identification device (conductor).
Figure 48:
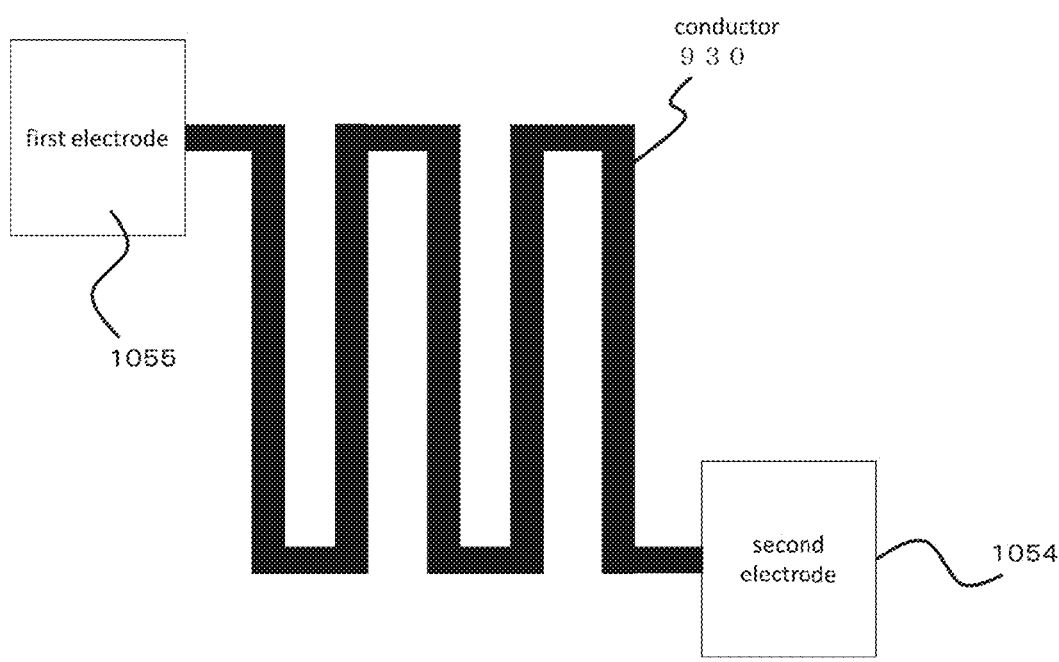
FIG. 48 is the drawing to illustrate an example of identification device (conductor).
Figure 49:
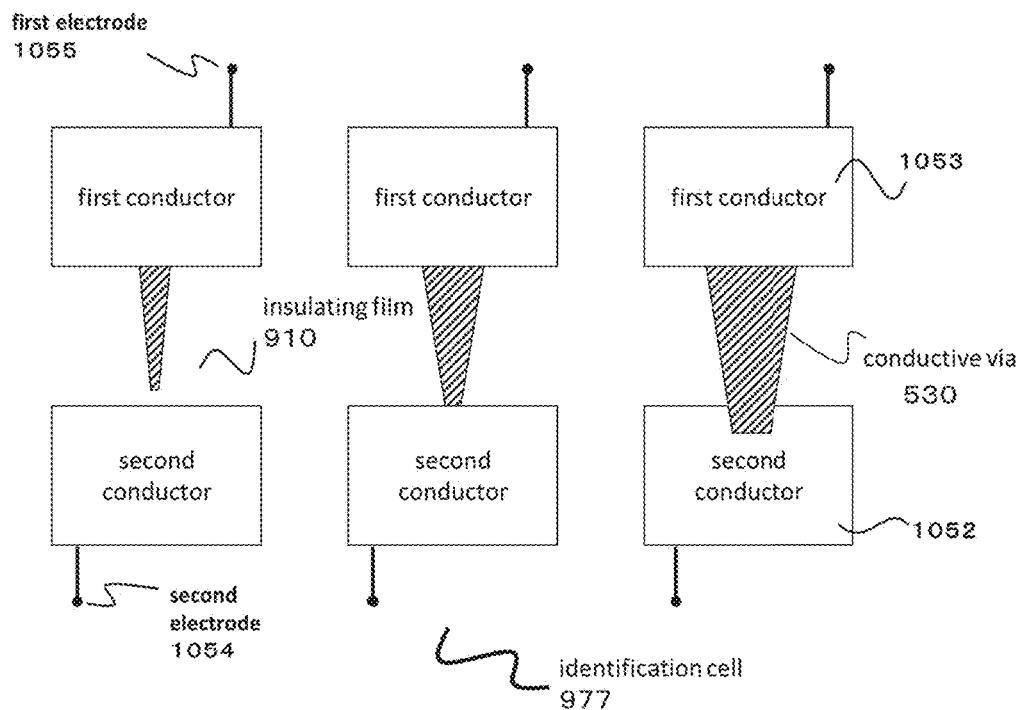
FIG. 49 is the drawing to illustrate an example of identification device (conductive via).
Figure 50:
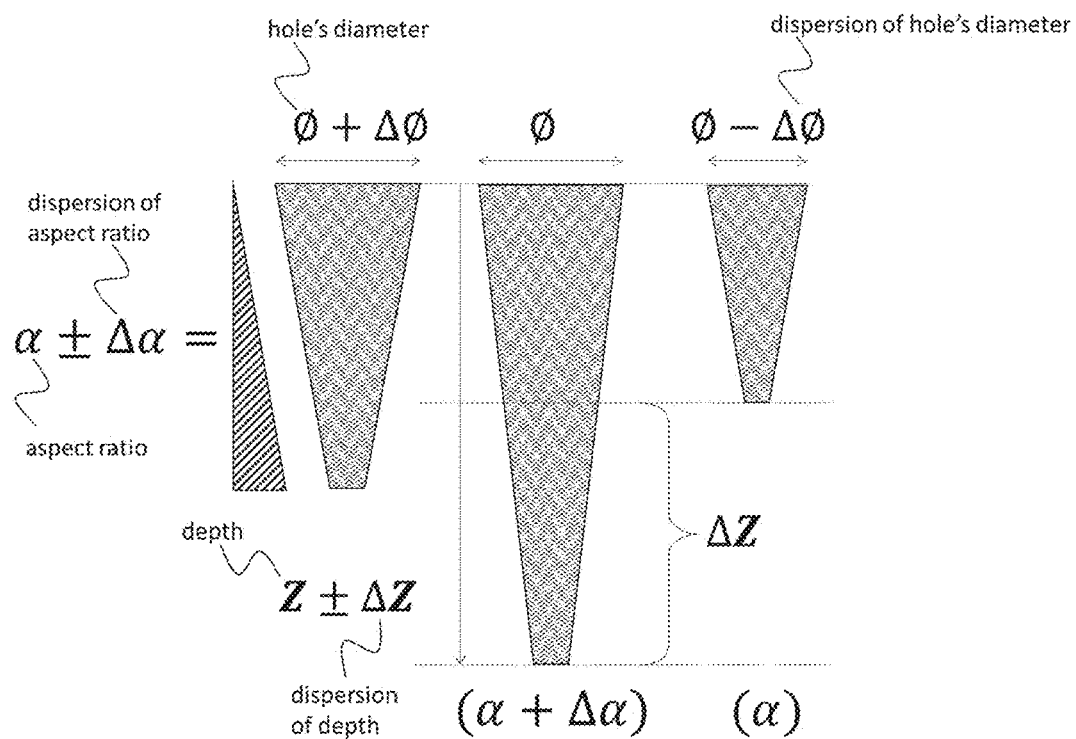
FIG. 50 is the drawing to illustrate the mechanism that an example of identification cell (conductive via) generates physical randomness.
Figure 51:
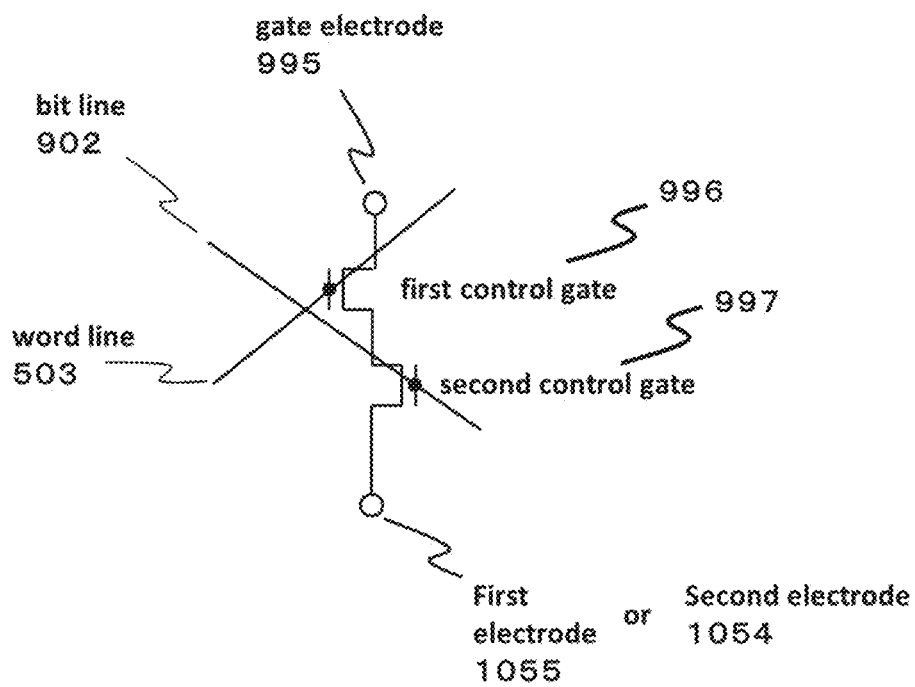
FIG. 51 is the drawing to illustrate an example of the method to select an identification cell.
Figure 52:
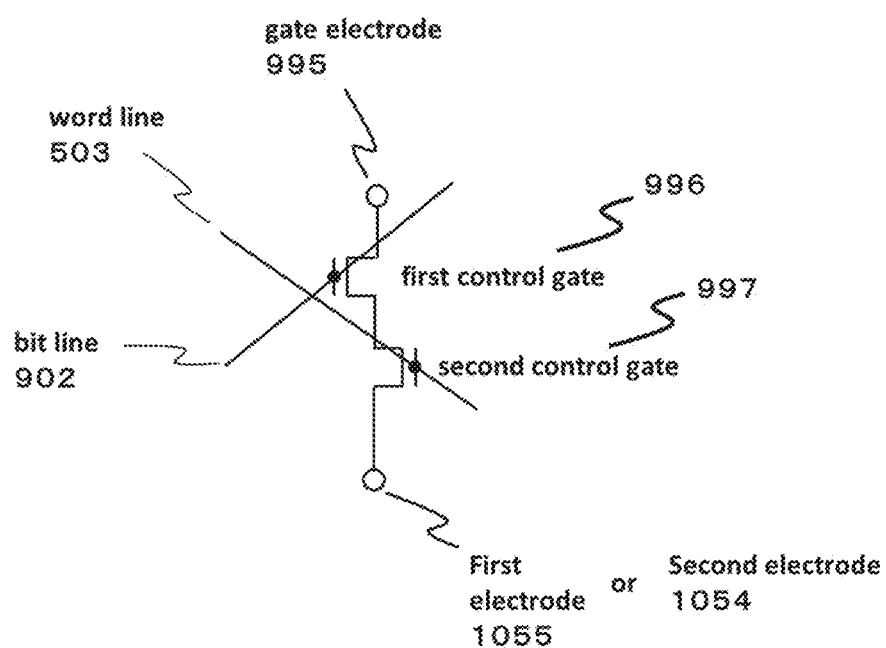
FIG. 52 is the drawing to illustrate an example of the method to select an identification cell.
Figure 53:
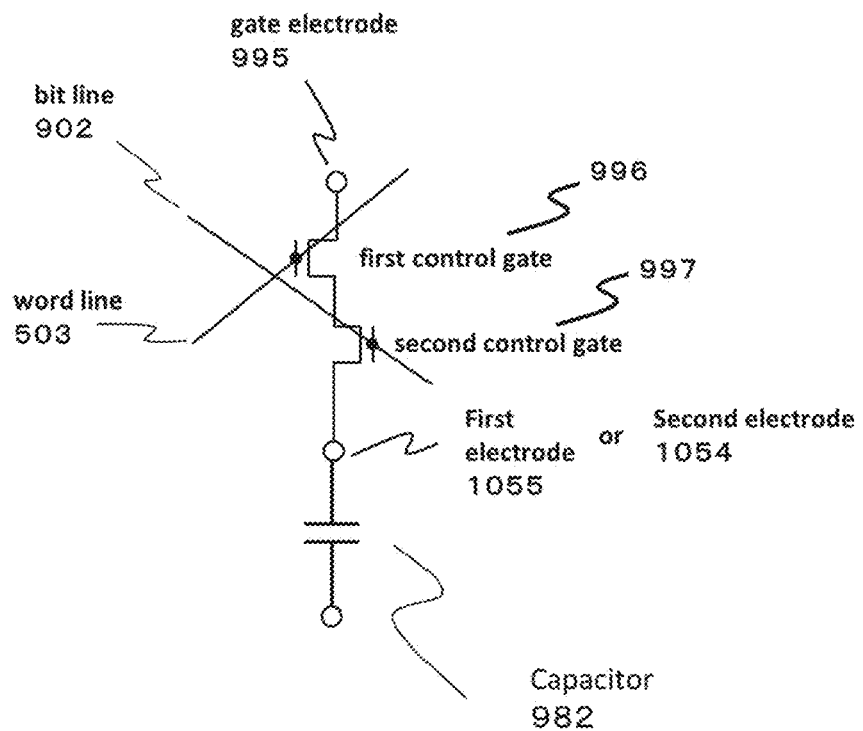
FIG. 53 is the drawing to illustrate an example of identification device (capacitor).
Figure 54:
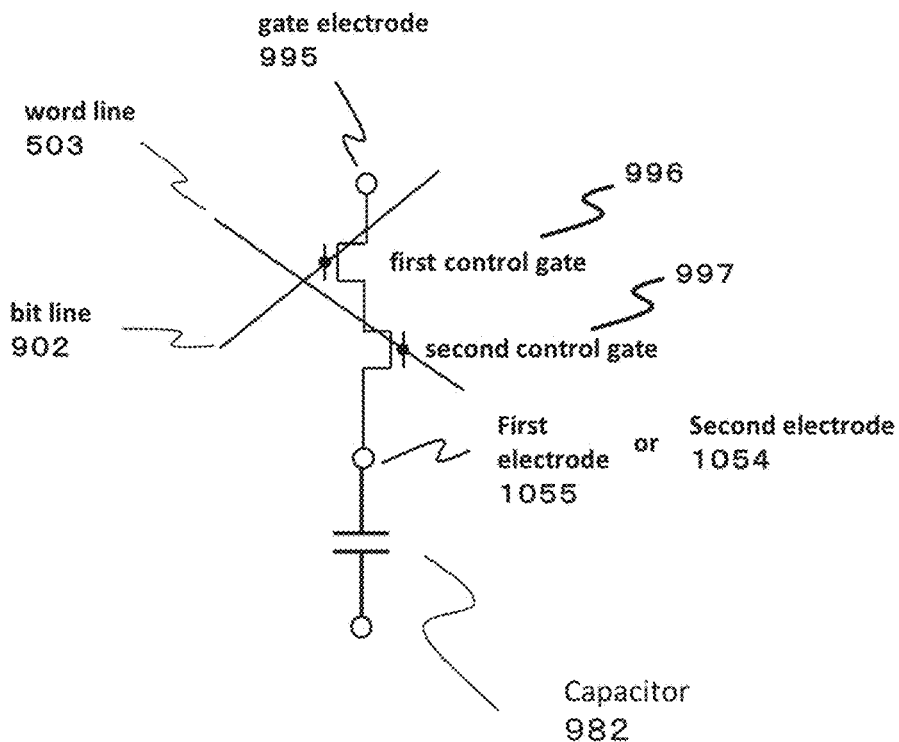
FIG. 54 is the drawing to illustrate an example of identification device (capacitor).
Figure 55:
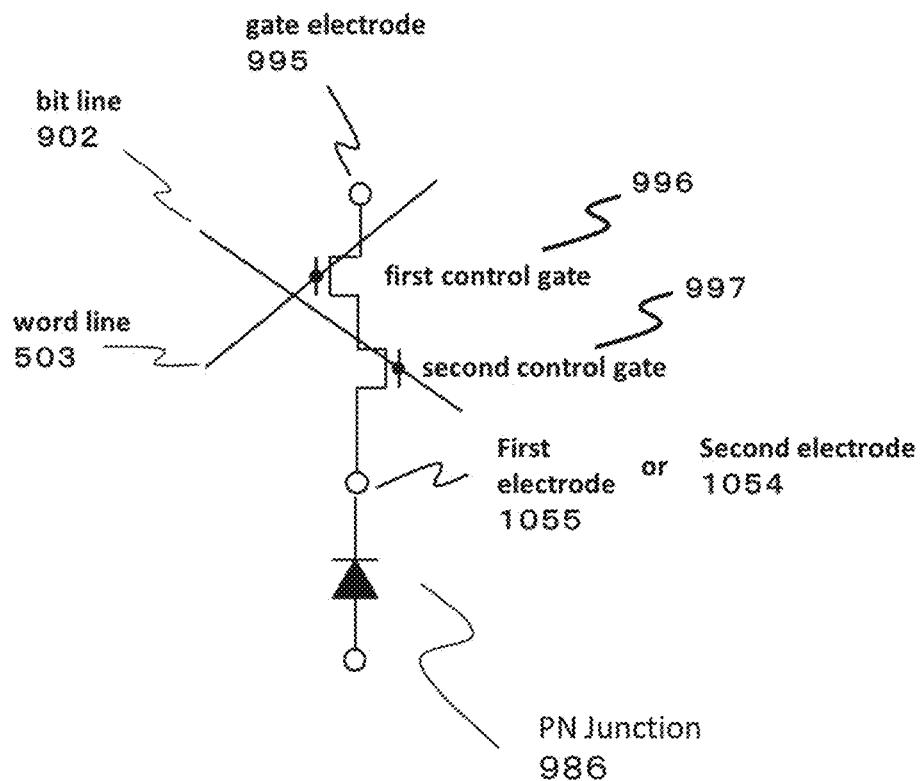
FIG. 55 is the drawing to illustrate an example of identification device (PN junction).
Figure 56:
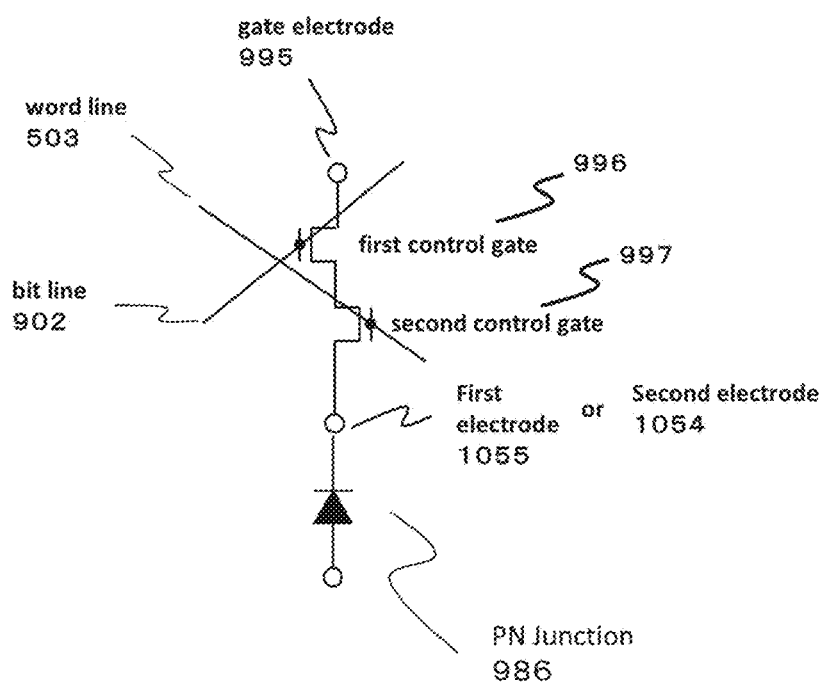
FIG. 56 is the drawing to illustrate an example of identification device (PN junction).
Figure 57:
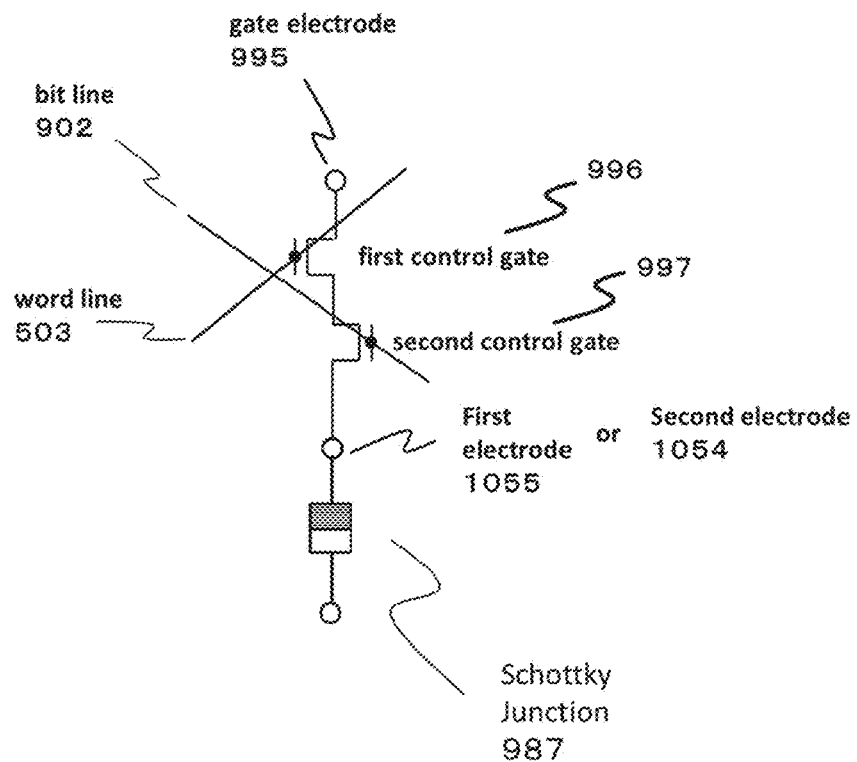
FIG. 57 is the drawing to illustrate an example of identification device (Schottky junction).
Figure 58:
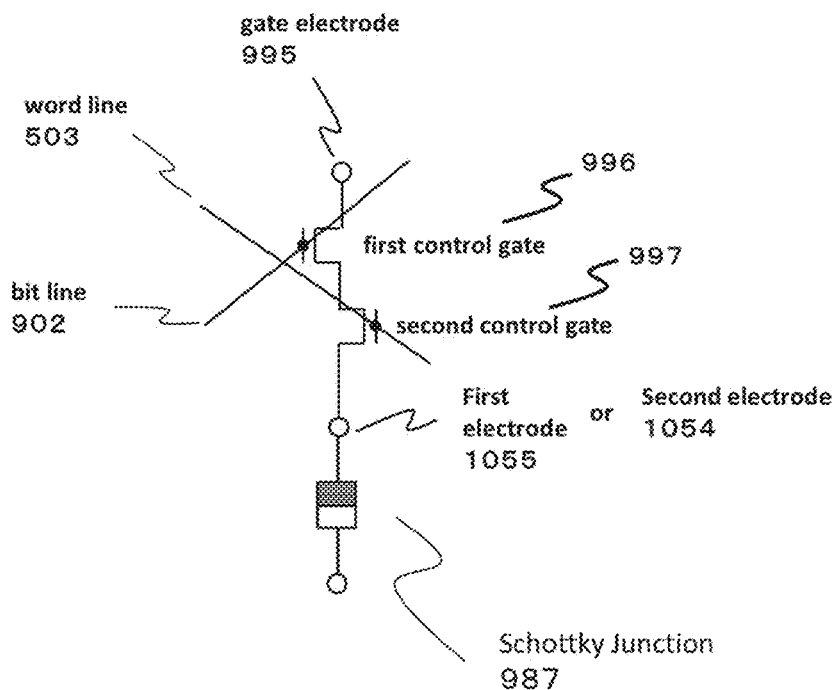
FIG. 58 is the drawing to illustrate an example of identification device (Schottky junction).
Figure 59:
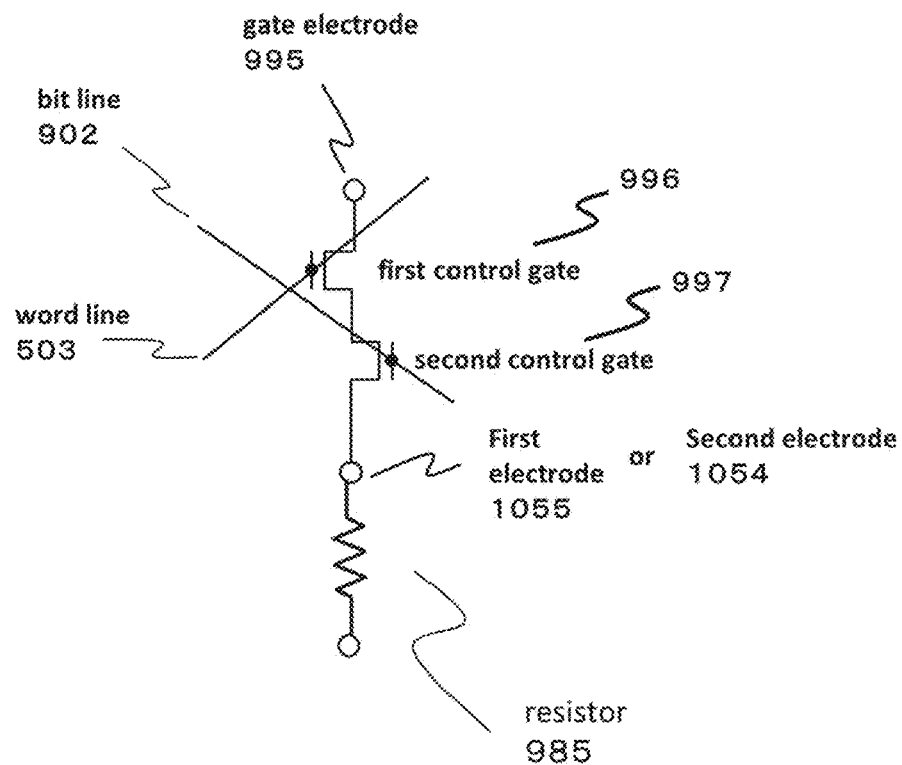
FIG. 59 is the drawing to illustrate an example of identification device (resistor).
Figure 60:
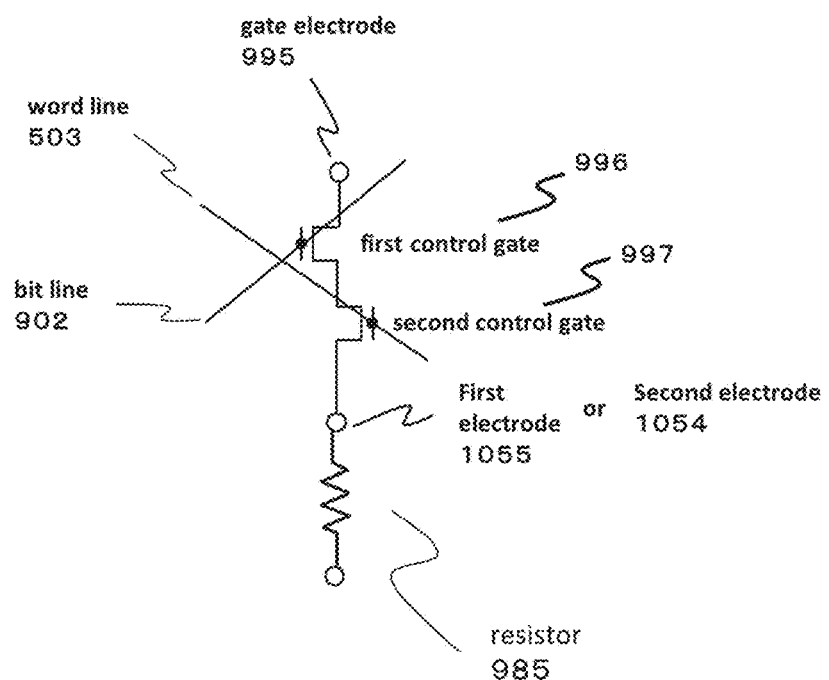
FIG. 60 is the drawing to illustrate an example of identification device (resistor).
Figure 92:
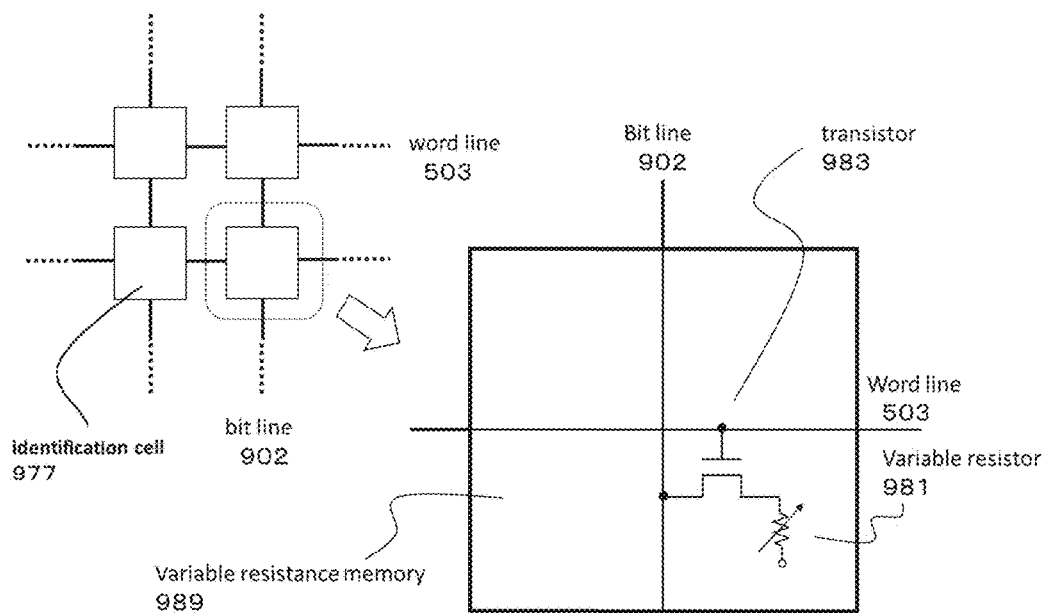
FIG. 92 is the drawing to illustrate an example that the identification cell of the present disclosure is a variable resistance memory cell comprising a transistor and a variable resistor.
Figure 93:
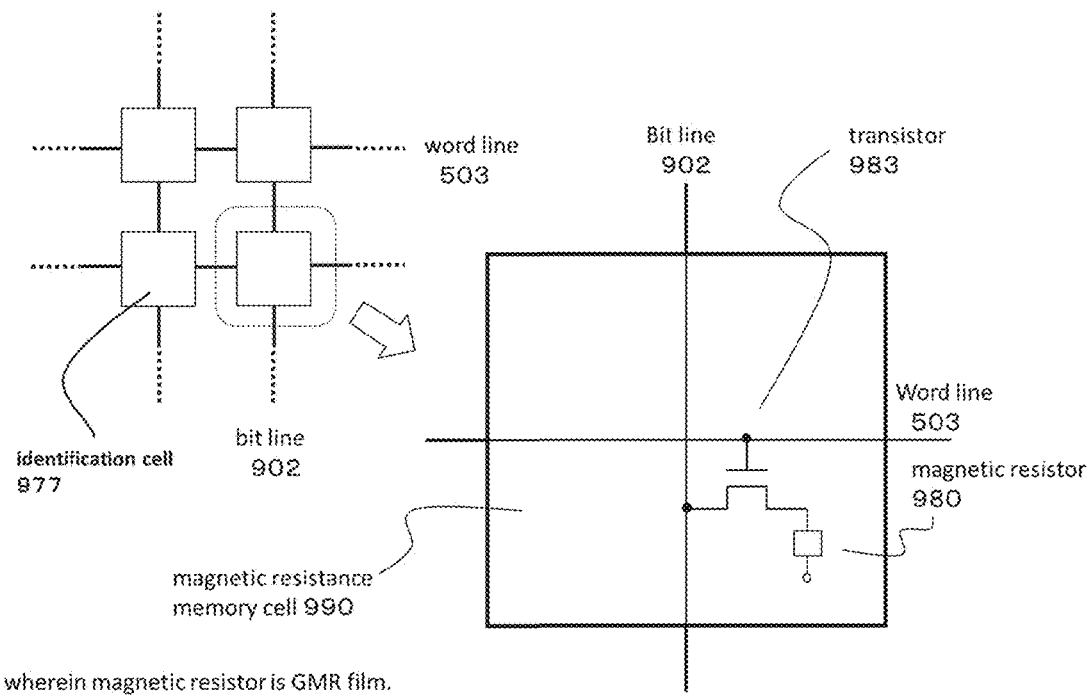
FIG. 93 is the drawing to illustrate an example that the identification ell of the present disclosure is a magnetic resistance memory cell comprising a transistor and a magnetic resistor.
Figure 94:
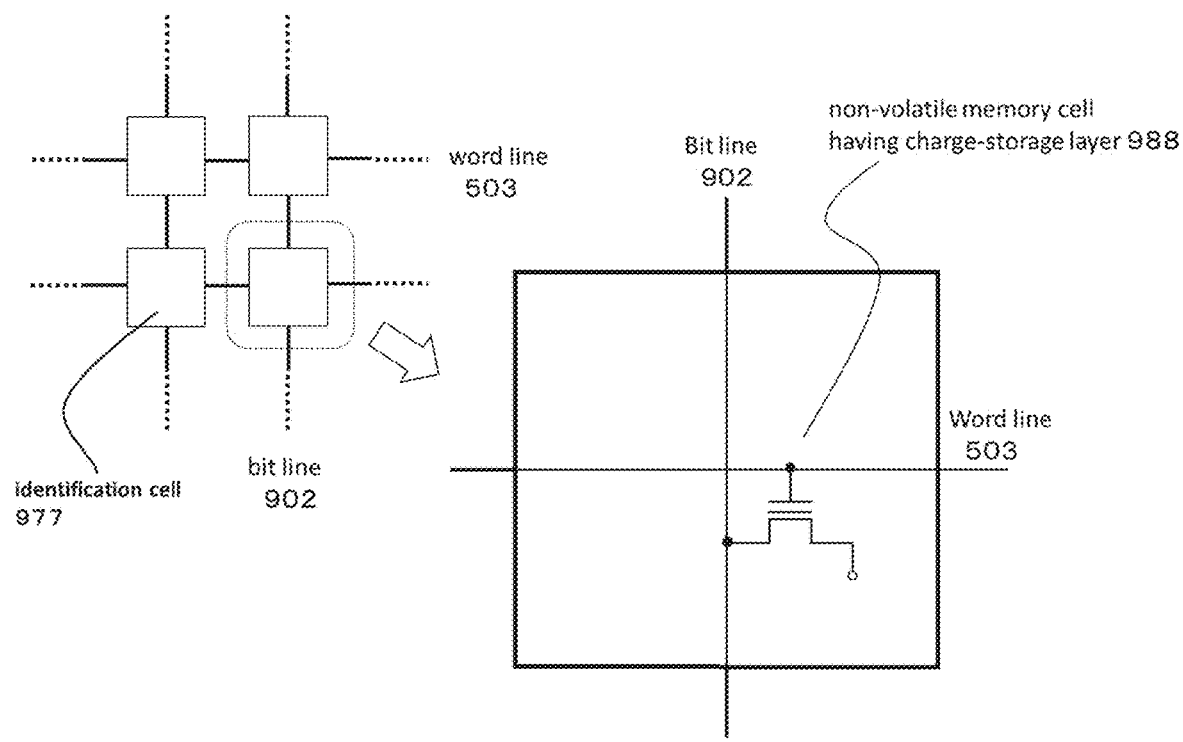
FIG. 94 is the drawing to illustrate an example that the identification ell of the present disclosure is a non-volatile memory cell comprising a transistor having a charge-storage layer.
Figure 95:
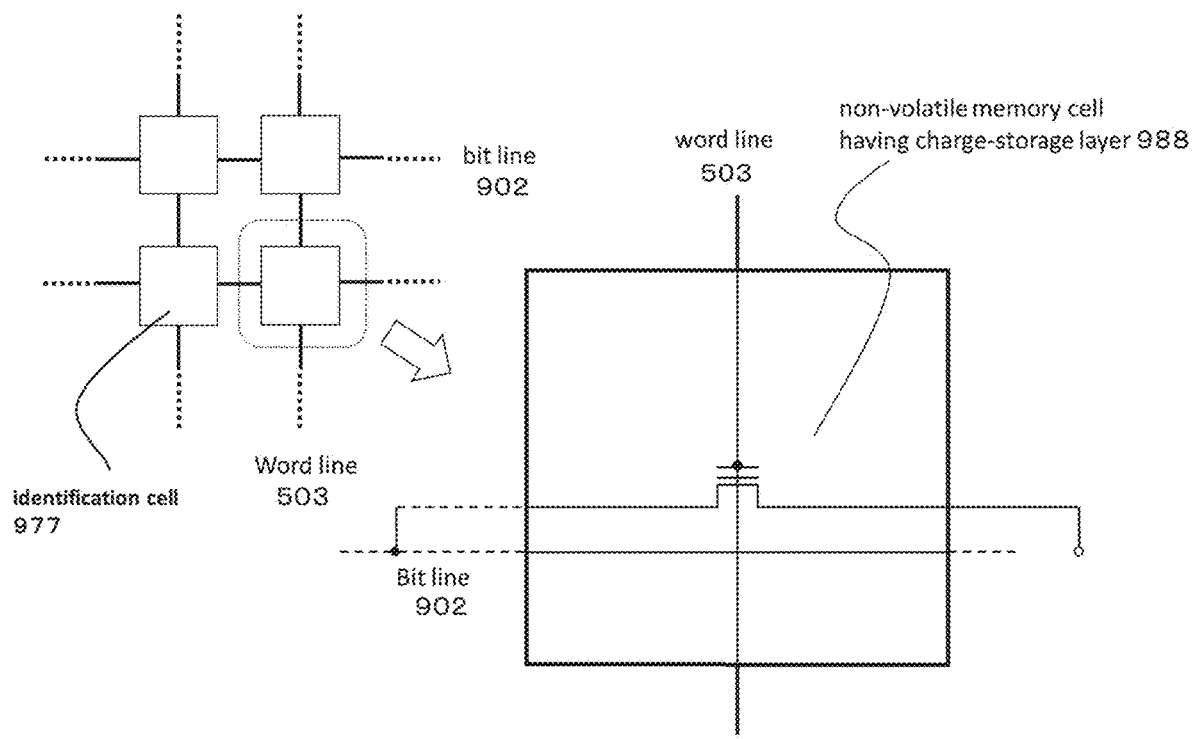
FIG. 95 is the drawing to illustrate an example of that the identification cells of the present disclosure are non-volatile memory cells respectively comprising transistors having charge storage layer and arrayed in the NAND-type layout.
Figure 96:
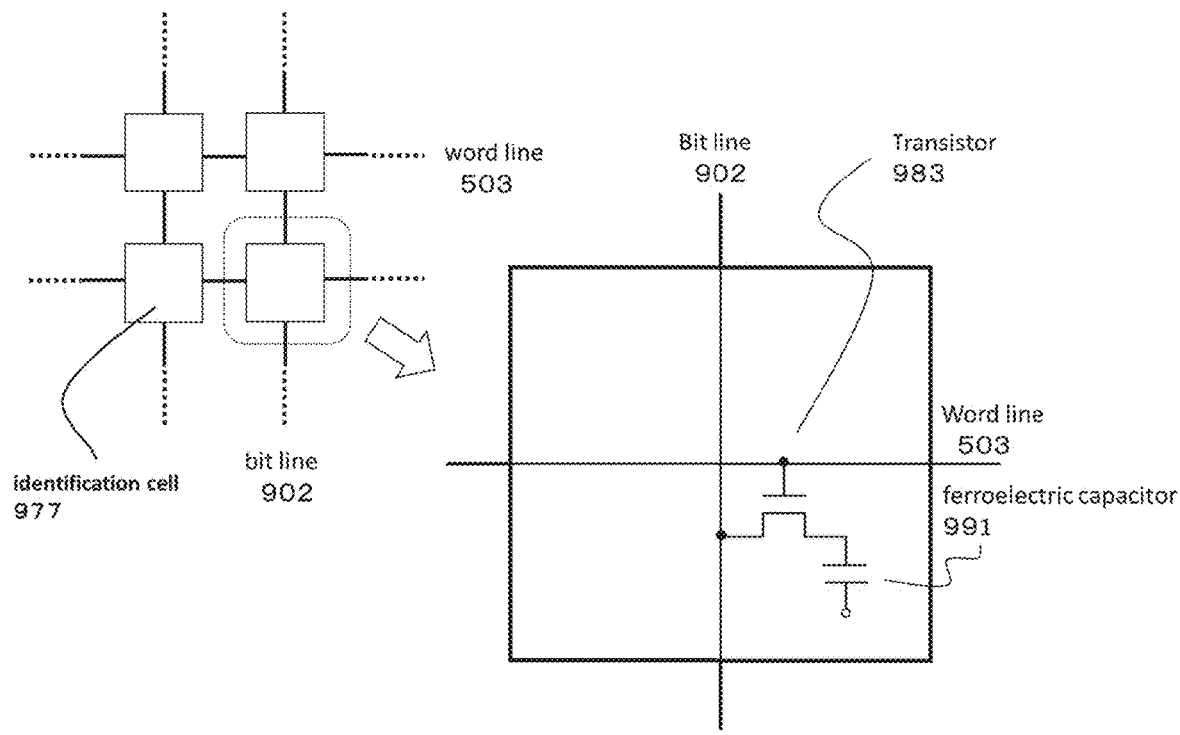
FIG. 96 is the drawing to illustrate an example that the identification cell of the present disclosure is a ferroelectric memory cell comprising a transistor and a ferroelectric capacitor.
Figure 98:
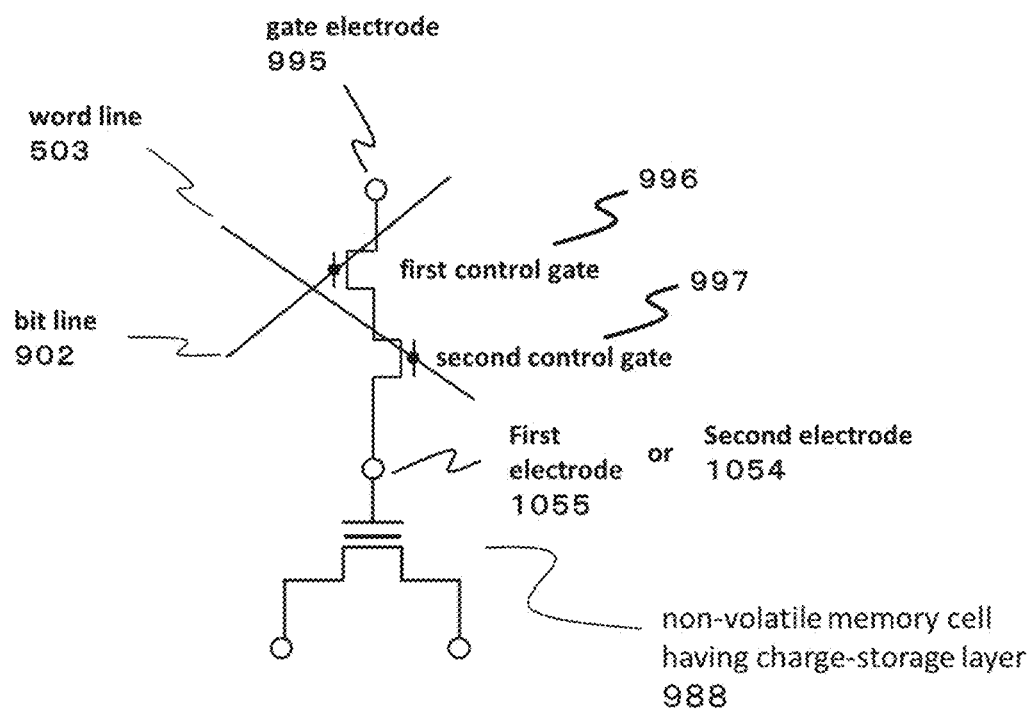
FIG. 98 is the drawing to illustrate an example of identification cell (non-volatile memory cell having charge-storage layer).
Figure 99:
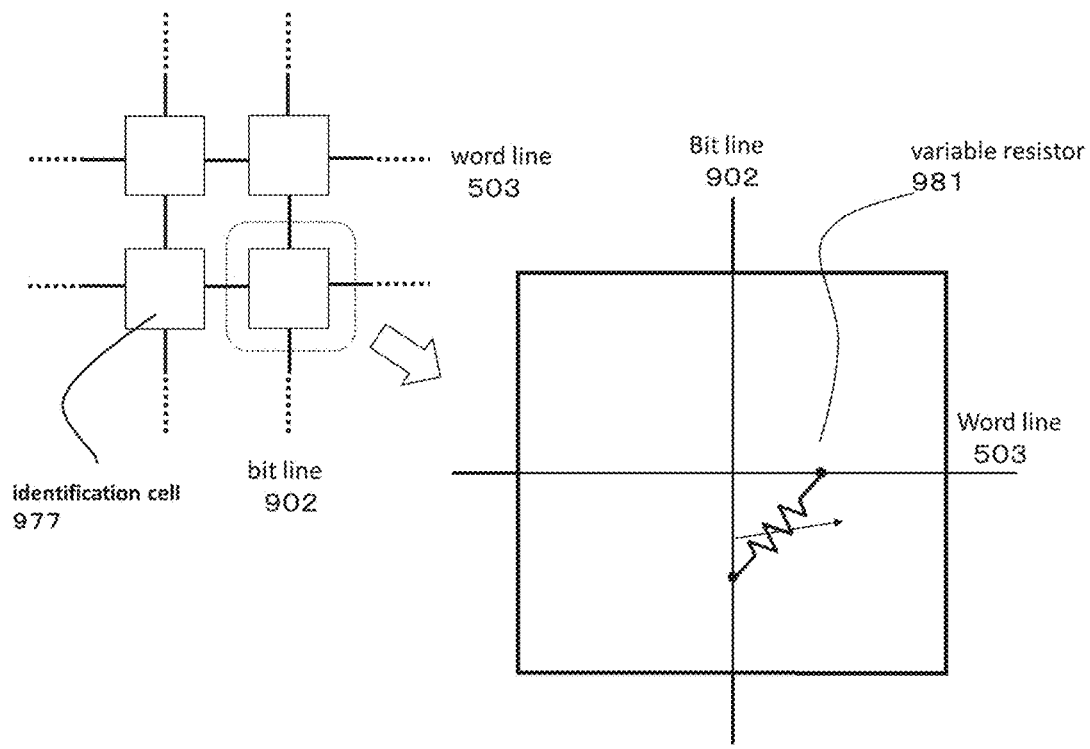
FIG. 99 is the drawing to illustrate an example that the identification cell of the present disclosure is a variable resistance memory cell comprising a variable resistor.
Figure 100:
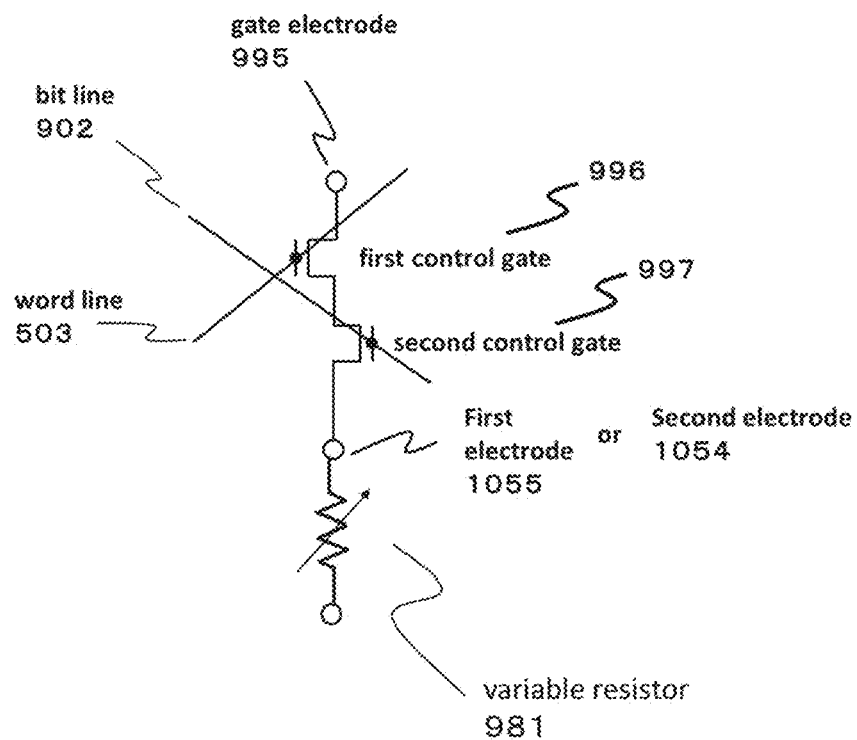
FIG. 100 is the drawing to illustrate an example of identification cell (variable resistor).
Figure 101:
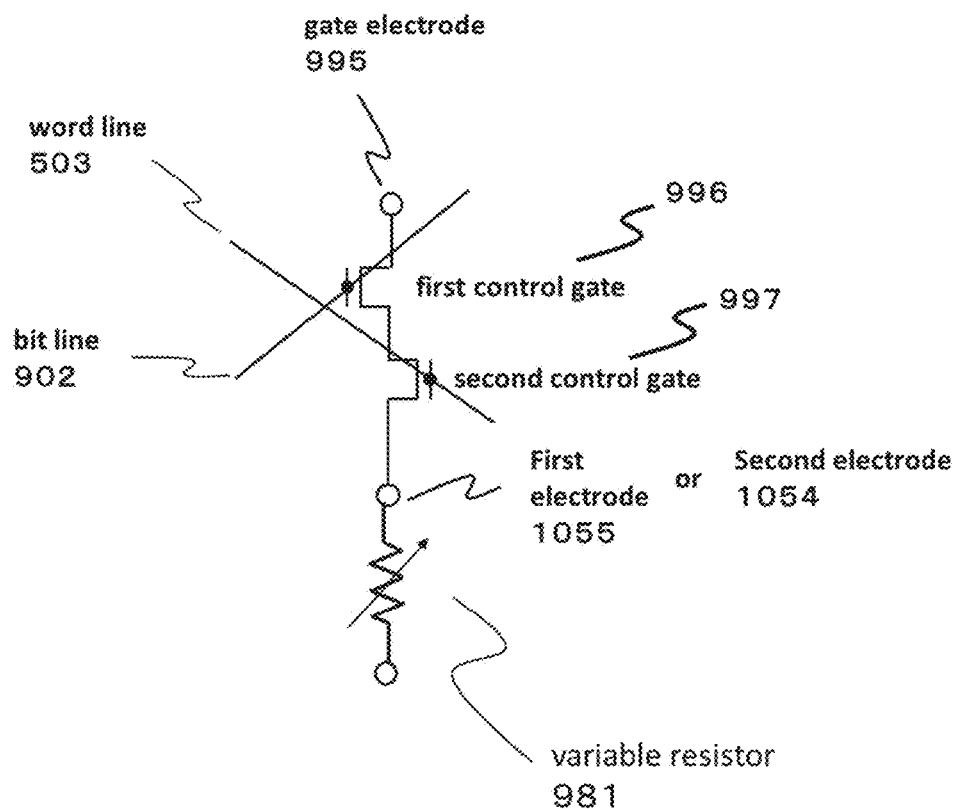
FIG. 101 is the drawing to illustrate an example of identification cell (variable resistor).

The chip identification device includes a cell array, which comprises plurality of cells. For example, said cells may be PN junctions as shown in FIGS. 39, 55 and 56. Or, said cells may, for example, be Schottky junctions as shown in FIGS. 40, 57 and 58. Or, said cells may, for example, be transistors as shown in FIGS. 41-43, 61-66, 92 and 93. Or, said cells may, for example, be DRAM cells comprising transistors and capacitors as shown in FIGS. 42, 63 and 64. Or, said cells may, for example, be select transistors as shown in FIGS. 43, 65 and 66. Or, said cells may, for example, be resistors as shown in FIGS. 44, 59 and 60. Or, said cells may, for example, be ReRAM cells or PCRAM cells, which comprise transistors and a variable resistor as shown in FIG. 92. Or said cells may, for example, be MRAM cells or STT-MRAM cells, which comprise transistors and a magnetic resistor as shown in FIG. 93. Or said cells may, for example, be charge storage layer non-volatile memory cells as shown in FIGS. 94, 98 and 99. Or, said cell may, for example, be cells comprising capacitors as shown in FIGS. 33, 53 and 54. Or, said cells may, for example, be cells comprising variable resistors as shown in FIGS. 99-101.

A chip identification device includes a whole bit line group comprising plurality of bit lines and a whole word line group comprising plurality of word lines, in order to read data from said cell array. The whole bit line group is further divided into plurality of bit line groups. However, the number of those bit line groups is less than the number of bit lines in the whole bit line group. The whole word line group is further divided into plurality of word line groups. However, the number of those word line groups is less than the number of word lines in the whole word line group.

A sub-block is made of a bit line group and a word line group on said cell array. Or a sub-block is made of a bit line group and the whole word line group. Or a sub-block is made of a word line group and the whole bit line group. Anyway, said cell array can be thus divided into plurality of sub-blocks. However, the number of sub-block (A) is smaller than the number of the whole cells comprising the cell array. Moreover, a sub-block includes a given number of cells (B) and the product of A and B is equal to the number of the whole cells forming the cell array.

The plurality of sub-blocks is further divided into two groups. One is a redundant sub-block group and the other is a regular sub-block group. The sub-blocks belonging to said redundant sub-block group are all redundant sub-blocks. The sub-blocks belonging to said regular sub-block group are all regular sub-blocks. Thus, said cell array comprises plurality of redundant sub-blocks and plurality of regular sub-blocks. Or said cell array comprises plurality of sub-blocks.

If a predetermined test finds at least one failure bit in a regular sub-block, then the regular sub-block is called a failure sub-block. A redundant sub-block may take a place of the found failure sub-block. In concrete, if a bit line and a word line, which are associated to a first cell belonging to a failure sub-block, are selected simultaneously, then the bit line associated to the first cell is replaced with a bit line associated to a second cell belonging to a redundant sub-block and the word line associated to the first cell is replaced with a word line associated to the second cell.

If a bit line and a word line, which are associated to a third cell belonging to the failure sub-block including the first cell are selected simultaneously, then the bit line associated to the third cell is replaced with a bit line associated to a fourth cell belonging to the redundant sub-block including the second cell and a word line associated to the third cell is replaced with a word line associated to the fourth cell. However, if the first and third cells are different each other, then the failure sub-block must be replaced with the redundant sub-block such that the second and fourth cells are different each other.

The generation distribution of failure bits on the cell array may define which regular block includes a failure bit to be a failure sub-block and to be replaced with arbitral redundant sub-block among the whole regular sub-blocks. However, the term of failure bit, which may or may not be generated artificially, is a generic name of any bits which exhibit characteristics deviating more than a designed range. The generation reason may be many and various and thereby such a failure bit is generated probabilistically at any cell on the cell array. Accordingly, the distribution of failure bits on the cell array may be regarded as physical randomness and be able to be read as physical random number from the said cell array with a given method. The read physical random number may be converted with a given regulation as necessary and then may be output from a chip including the cell array. By this way, it may be able to extract a physical random number which is specific to a chip from the chip.

It is preferable that the distribution of failure bits is as stable as possible even with change in external environment. It is also preferable that the distribution of failure bits is as unchangeable as possible even though time has passed. In order to do that, it may be preferable to measure the said failure bit distribution once and then to save it to an inner memory and so forth in a chip. However, it may be required as a condition that this inner memory is as stable to the change of the external environment as possible and is as unchangeable to the time elapsed as possible.

On the other hand, the plurality of sub-blocks, i.e., the plurality of regular sub-blocks and the plurality of redundant sub-blocks, are distributed on the cell array according to the respectively allocated block addresses with a given method. The cell array is thus converted to a block array. A block address on this block array corresponds to a block address of the sub-block on the block array.

Since the distribution of failure bits on the said cell array is physically random, the combination of selecting plurality of failure sub-blocks among a group of the whole regular sub-blocks is physically random. Or the combination of selecting plurality of redundant sub-blocks among a group of the whole redundant sub-blocks to take a place of the plurality of failure sub-blocks is physically random.

It is thus found that the combination of selecting plurality of failure sub-blocks among a group of the whole blocks is a physical randomness which is specific (specific random number) to a chip (i.e., semiconductor chip). Or it is found that the combination of selecting plurality of redundant sub-blocks among the whole redundant sub-blocks to take a place of the plurality of failure sub-blocks is a physical randomness or a physical random number which is specific (specific random number) to a chip (i.e., semiconductor chip). It is unnecessary to distinguish them, because they are identical even while the counting method is different. There may be other methods to evaluate physical randomness. However, they are unnecessary to be distinguishable each other since the difference between them is not practical.

Anyway, it is called "extraction" to extract a physical random number which is specific to a chip including the cell array from the chip in some or any way. Such a chip includes an extraction circuit to extract a specific physical random number. In addition, the chip identification device may be a chip from which a specific physical random number is extracted. In other words, the chip identification device includes the extraction circuit. Furthermore, the chip identification device includes an output generation circuit to generate an output identification code from an input identification code. The output generation circuit may be an incorporated circuit or a firmware as an example.

Figures 25, 26:
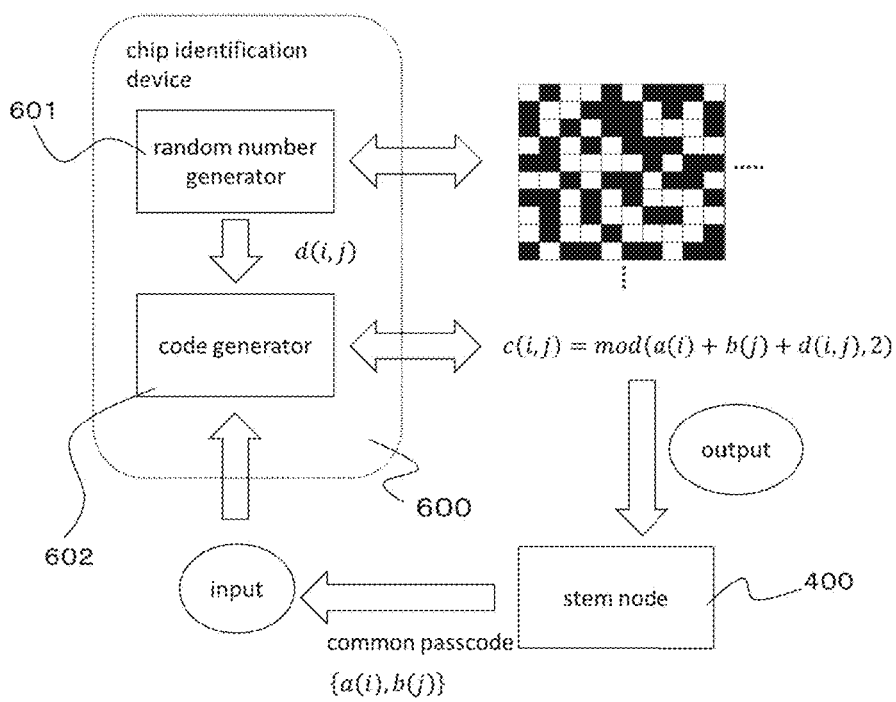
FIG. 25 is the drawing to illustrate an example of the relation of input code, output code and random number.
FIG. 26 is the conceptual drawing to illustrate an example of the basic configuration to describe an example of the utilization method of chip identification device.
Figure 76:
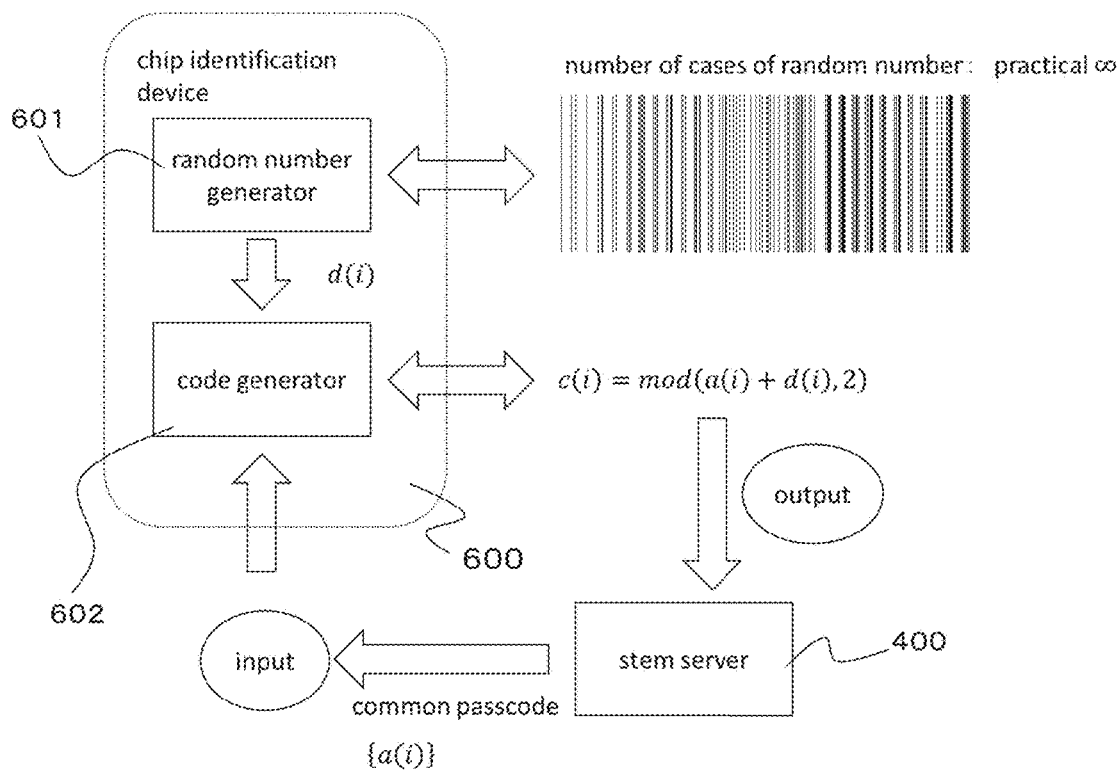
FIG. 76 is the conceptual drawing to illustrate an example of the basic configuration to describe an example of the utilization method of chip identification device.

The physical random number extracted like this may be a physical random number (or specific random number) {d(i, j)} as shown in FIG. 26 as an example. Or it may be a physical random number {d(i)} as shown in FIG. 76 as another example.

Figure 11:
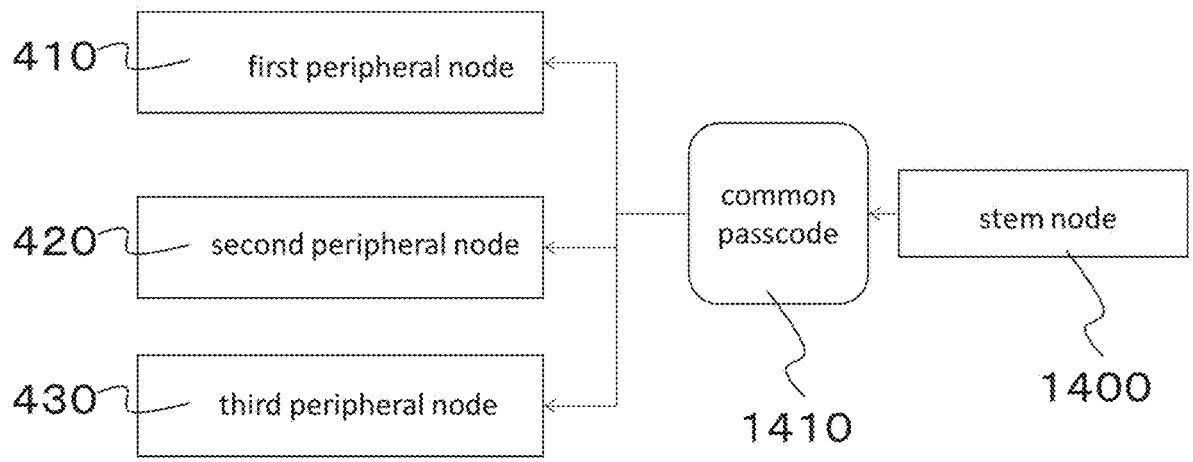
FIG. 11 is the drawing to illustrate an example of the method that a stem node sends a common passcode to a peripheral node including a chip equipped with the chip identification device of the present disclosure.
Figure 12:
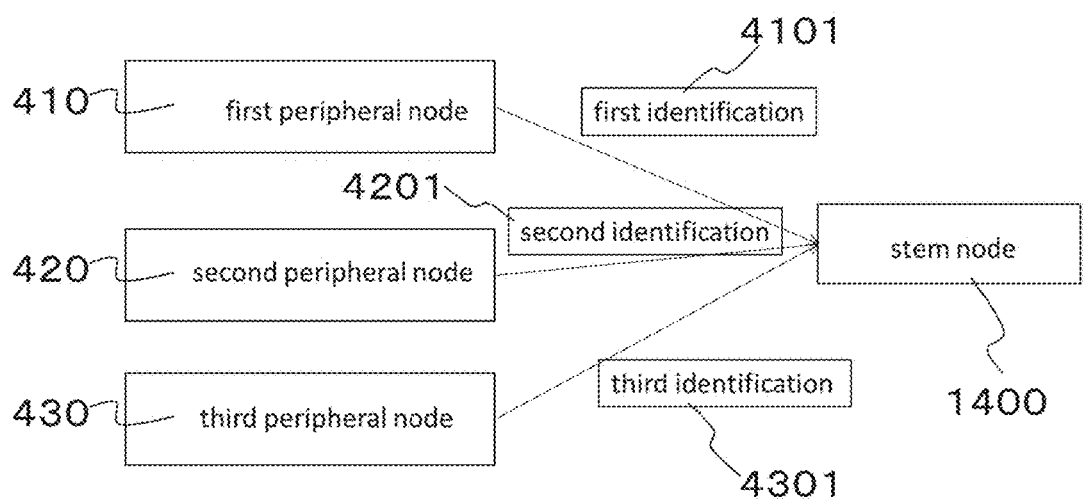
FIG. 12 is the drawing to illustrate an example of the method that an identification code is sent from a peripheral node including a chip equipped with the chip identification device of the present disclosure to a stem node.
Figure 13:
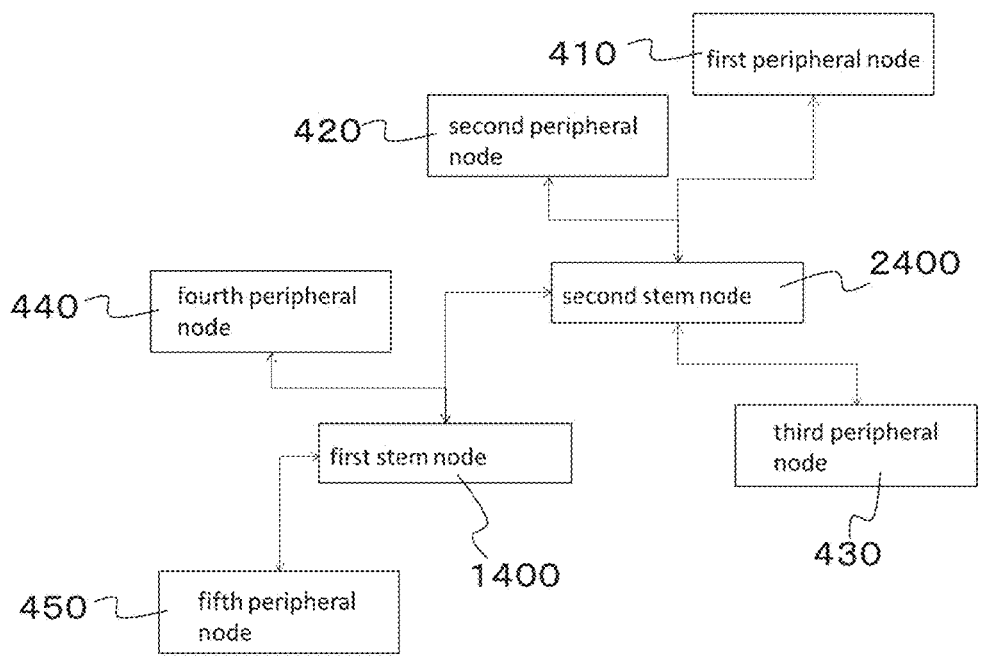
FIG. 13 is the drawing to illustrate an example of network comprising plurality of stem nodes which are divided to the first network unit and the second network unit and plurality of peripheral nodes including a chip equipped with the chip identification device of the present disclosure; wherein the network includes a topology having a connection between stem servers of the first and second network units.
Figure 14:
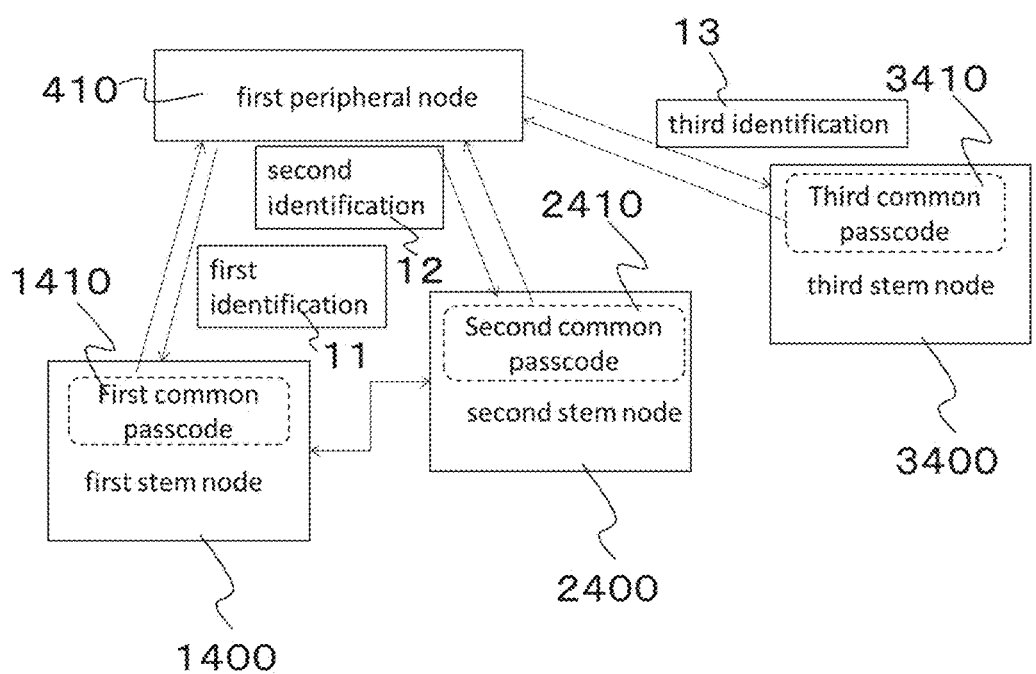
FIG. 14 is the drawing to illustrate a topology including at least one of plurality of peripheral nodes in the first network unit; wherein the at least one of plurality of peripheral nodes is respectively connected to at least of one of stem nodes in plurality of second network units.
Figure 15:
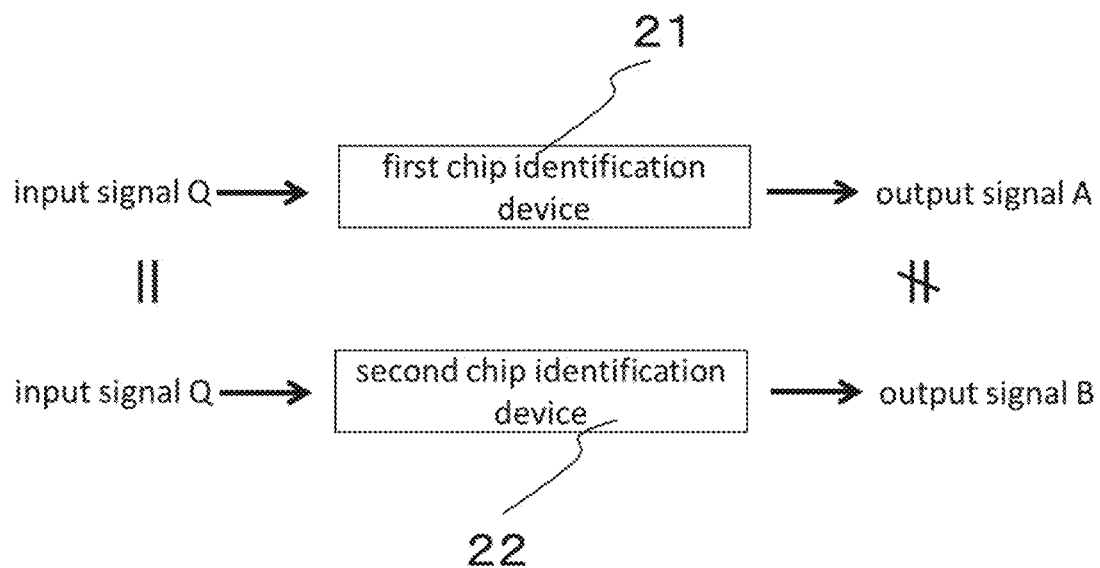
FIG. 15 is the drawing to illustrate an example of (the property of output independence) that the chip identification device of the present disclosure should satisfy.
Figure 16:
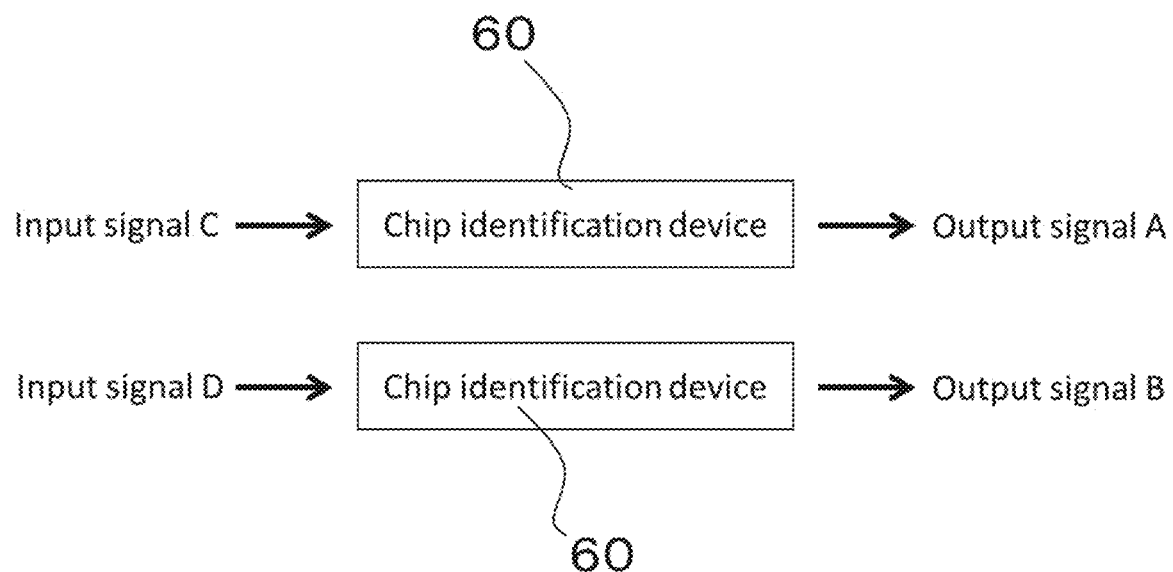
FIG. 16 is the drawing to illustrate an example of (the property of input independence) that the chip identification device of the present disclosure should satisfy.
Figure 17:
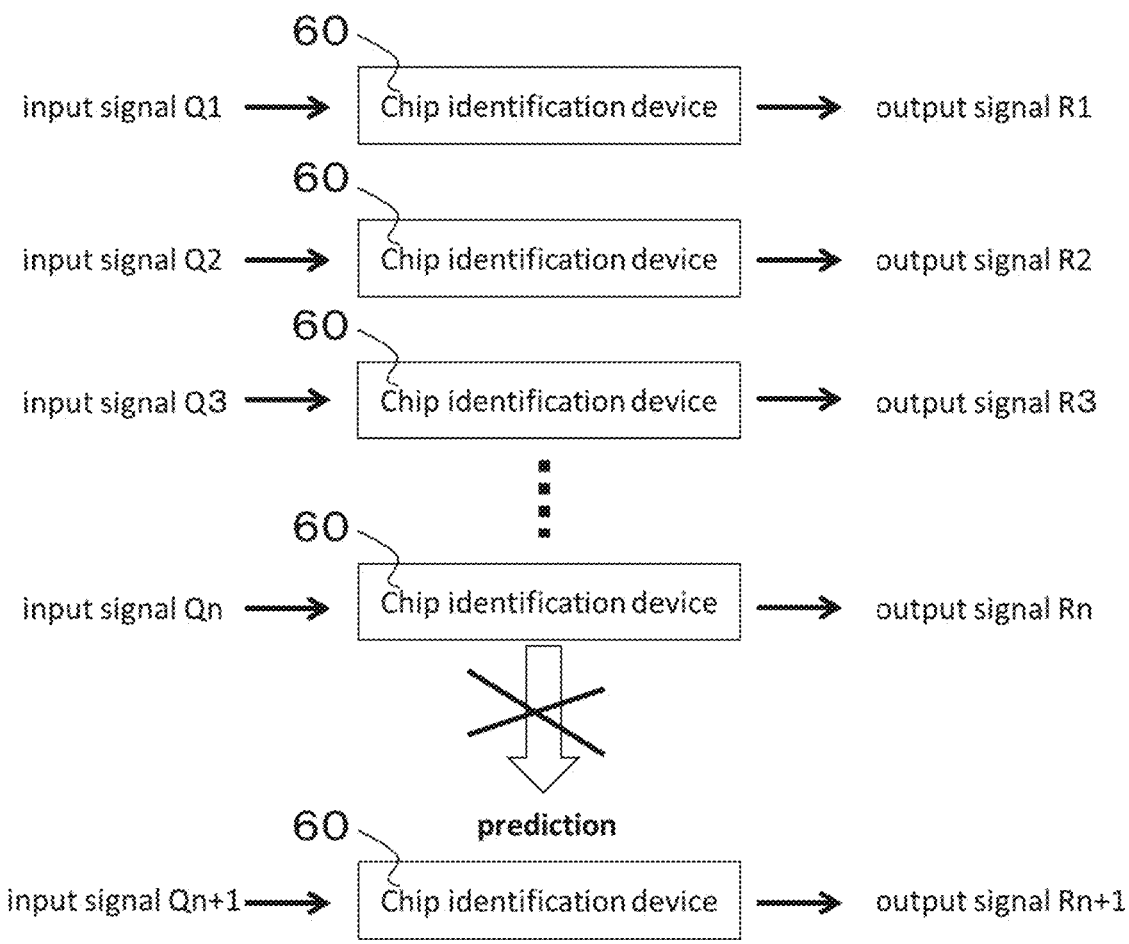
FIG. 17 is the drawing to illustrate an example of (the property of output unpredictability) that the chip identification device of the present disclosure should satisfy.
Figure 18:
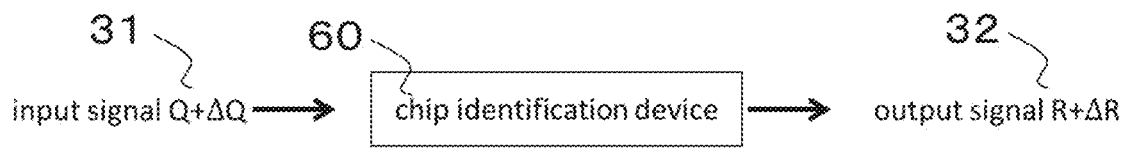
FIG. 18 is the drawing to illustrate an example of (the property of input-output reliability) that the chip identification device of the present disclosure should satisfy.

For example, the chip identification device may include the first chip identification device or the second chip identification device, as shown in FIG. 15. Or it may include the chip identification device 60 as shown in FIGS. 16-18. For example, the measuring device of chip identification may be the stem node 400 as shown in FIG. 10, the stem node 1400 as shown in FIGS. 11-14, the stem node 2400 as shown in FIGS. 13-14, and the stem node 3400 as shown in FIG. 14.

In general, it is further preferable that the chip identification is as stable as possible no matter how the external environment that the chip is left has been changed. Moreover, it is preferable that the distribution of failure sub-blocks is as unchangeable as possible even though time has passed. It is self-evident that this condition can be satisfied as long as those failure bits are irreversibly generated on the cell array before the assembly and not generated after the assembly. Or it may be preferable to measure the said failure sub-block distribution once and then to save it to an inner memory and so forth in a chip. However, it may be required as a condition that this inner memory is as stable to the change of the external environment as possible and is as unchangeable to the time elapsed as possible. The inner memory like this may be, as an example, fuse memory. It may be possible to perform the said measurement at test before the shipment.

In addition, conditions that the chip identification device of the present disclosure must satisfy is described using drawings as follows.

(The first embodiment) In FIG. 89, the chip identification device has a cell array, an extraction circuit, and an output generation circuit. The cell array comprises plurality of identification cells. The identification cells may be, for example, as shown in FIGS. 33, 38-44, 46-49, 51-68, 92-101, and so forth. The measuring device of chip identification inputs a special test code for extracting physical random number, T, and an input identification code, Q, to the chip identification device. The special test code for extracting physical random number, T, is passed to the extraction circuit in order to read (extract) a physical random number to be generated on the cell array. The special test code for extracting physical number, T, may include an indication code which may instruct, for example, an extraction area on the cell array and an execution mode of extraction. As an example, the extraction area is identical to a regular sub-block group. Or, as another example, the extraction area is identical to a redundant sub-block group.

The extraction circuit may extract the physical random number, and then the extraction result Ext may be input to the output generation circuit. The extraction result Ext is the output of physical random number, which is specific to the chip identification device, according to the indication code. More concretely, it is the output of physical random number from the cell array included in the chip identification device. Accordingly, the extraction result Ext is a physical random number code with an indication. However, the output generation circuit generates an output identification code R from the input identification code Q and the extraction result Ext according to the function GEN1 as shown in Eq. 7 and then output it to the measuring device of chip identification. Like this, the measuring device of chip identification executes the identification of the chip identification device from the special test code for extracting physical random number, T, the indication code, the input identification code Q, and the output identification code R.

$$R = GEN1(Q, Ext) \quad \text{Eq. 7}$$

In the output generation circuit, a program may be changeable or not. In the case that the program is changeable in the output generation circuit, the function GEN1 may be, for example, a program stored in rewritable non-volatile memory, or an incorporated circuit of FPGA. On the other hand, in the case that the program is not changeable in the output generation circuit, the function GEN1 may be, for example, a program stored in ROM and so forth or an incorporated circuit wherein gate connection is unchangeable.

As long as the physical random code is specific to a chip identification device, the output identification codes to be output from two different arbitrary chip identification devices cannot be identical. As an example, the chip identification device may include the chip identification device as shown in FIGS. 15-18. In addition, a plurality of chip identification devices which are different each other is included in peripheral nodes as shown in FIGS. 10-14.

As an example, the measuring device of chip identification is included in the stem node 400 as shown in FIG. 10. The input as shown in FIG. 10 may include, as an example, the special test code for extracting physical random number, T, the indication code, and the input code C. The identification as shown in FIG. 10 may include, as an example, the output identification code R. The common passcode 1410 as shown in FIG. 11 may include, as an example, the special test code for extracting physical random number, T, the indication code, and the input code C. The first to third identification (4101-4301) as shown in FIG. 12 may respectively include, as an example, the output identification codes R. It is noted here that the first to third identifications (4101-4301) respectively output from the first to third peripheral nodes (410-430) which include different chips each other are different each other, since the said extraction results Ext having been included to generate the said output identification code (R) are respectively specific to chips.

(1) (The property of output independence) As an example, the input signal Q as shown in FIG. 15 may include the special test code for extracting physical random number, T, and the identification code as well as the input code. The output signals A and B as shown in FIG. 15 may be, as an example, the output identification codes R. It is noted here that the extraction results Ext output from the first and second chip identification devices (21, 22) are different each other if the first and second chip identification devices (21, 22) are different each other. Thereby, the output signals A and B are different each other and then said (the property of output independence) is satisfied.

(2) (The property of input independence) As an example, the input signals C and D as shown in FIG. 16 may respectively include the special test codes for extracting physical random number, T, and the indication codes as well as the input codes. The output signals A and B may be, as an example, the output identification codes R. It is noted here that the output signals A and B are different each other if the input signals C and D include different input codes. Or the output signals A and B are different each other if different indication codes are input to the chip identification device 60. Or the output signals A and B are different each other if different special test codes for extracting physical random number, T, are input to the chip identification device 60. Thereby, it may be self-evident that said (the property of input independence) is satisfied.

(3) (The property of output unpredictability) The extraction result Ext included to generate the output identification code R is to be extracted from the distribution of failure bits on the cell array. Accordingly, it is generated physically-randomly and specific to a chip. Therefore, it is impossible for any algorithm to predict the output identification code R. This feature is independent of the elements of input codes, the ordering of those elements, and indication codes. Therefore, it is self-evident that said (the property of output unpredictability) is satisfied.

Figure 22:
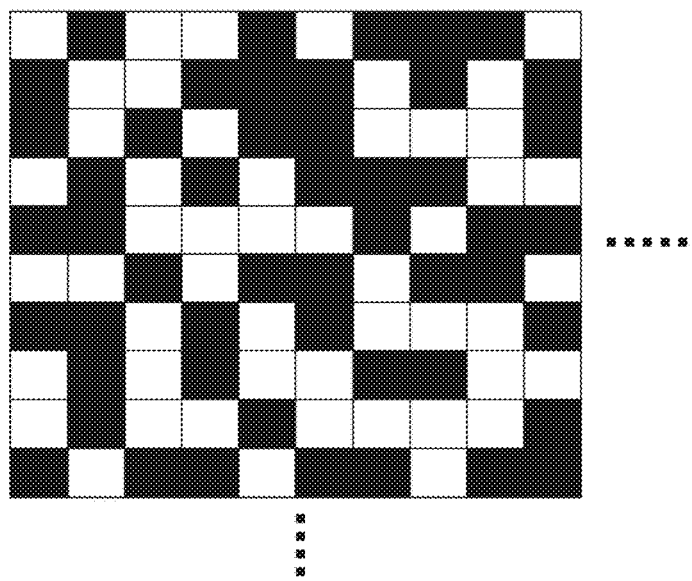
FIG. 22 is the drawing to illustrate an example of data allocated on checkerboard.
Figure 73:
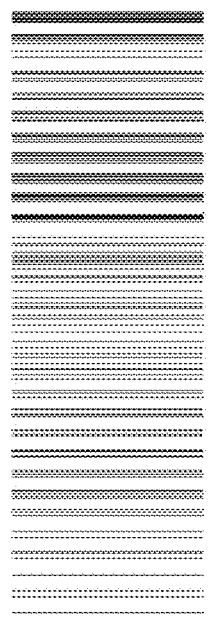
FIG. 73 is the drawing to illustrate the randomness of data of alternation cells.

(4) (The property of input-output reliability) As mentioned above, the extraction result Ext is to be extracted from the distribution of failure bits on the cell array. The distribution of failure bits may be able to be represented by binary by at least one of methods mentioned above or by other identical methods. The result may be deemed as a digital pattern as shown in FIGS. 22 and 73. It is well-known that any data having been represented by binary like this satisfies Shannon's condition at every time of digital processes executed by a circuit of CMOS inverters operating appropriately. Therefore, it is self-evident that said (the property of input-output reliability) is satisfied.

(5) (The practical limitlessness of output) The number of output patterns in response to an input, i.e., the number of cases of physical randomness can be determined by the number of cases that plurality of failure sub-blocks are generated among the regular sub-block group. In the case that a memory cell array of mass-product for general-purpose memory is used, the number of regular sub-blocks composing the regular sub-block group is sufficiently large. And, even though the generation rate of failure bits satisfies the condition of six sigma (failure rate is less than 3.4/one million), the number of patterns is sufficiently large. Therefore, it is self-evident that said (the practical limitlessness of output) is satisfied.

(6) (The property of persistency to chip) The output identification code R is an electronic signal which is specific to the chip identification device. Therefore, it is self-evident that said (the property of persistency to chip) is satisfied.

(7) (Physically non-editable property) The output identification code R, mentioned above, is physically non-editable (un-editable) if the physical random code is non-editable. Therefore, it is self-evident that said (physically non-editable property) is satisfied.

(P-CID) It is thus self-evident that the (1)-(7) are all satisfied. Therefore, it may be regarded that a combination of the output identification code R, the input signal Q, and the special test code for extracting physical random number, T, mentioned above, is an example of the physical chip identification (P-CID).

Figure 90:
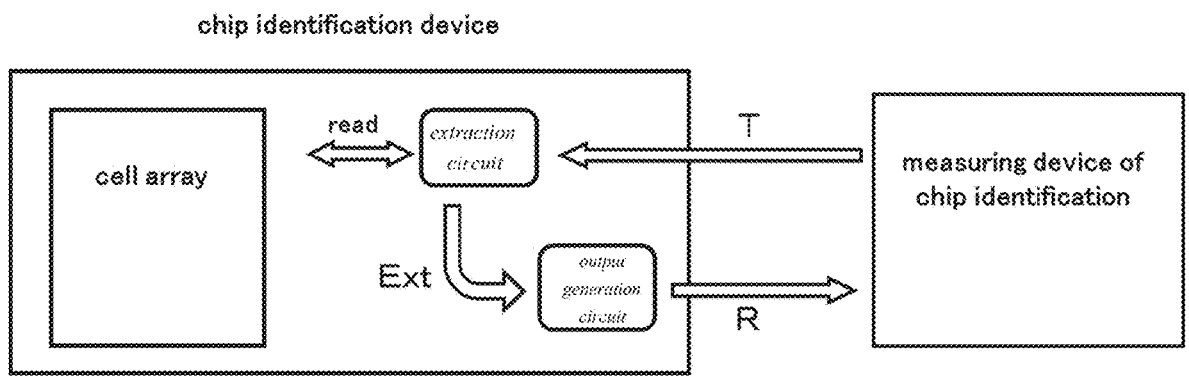
FIG. 90 is the drawing to illustrate an example of the method to generate output identification code from input identification code with regard to the measuring device of chip identification and the chip identification device.

(The second embodiment) In FIG. 90, the said chip identification device has a cell array, an extraction circuit, and an output generation circuit. The said cell array comprises plurality of identification cells. The said identification cells may include, for example, as shown in FIGS. 33, 38-44, 46-49, 51-68, 92-101, and so forth. The measuring device of chip identification inputs a special test code for extracting physical random number, T, to the chip identification device. The special test code for extracting physical random number, T, is passed to the extraction circuit in order to read (extract) a physical random number to be generated on the cell array. The special test code for extracting physical random number, T, may include an indication code etc., which may be, for example, an extraction mode to indicate an extraction area on the cell array and an operation mode of extraction. As an example, the extraction area is identical to the regular sub-block group. Or, as another example, the extraction area is identical to the redundant sub-block group. Or the extraction area may be a separately given area of extraction. In this example, the input identification code Q is omitted from FIG. 89. Accordingly, the function used in equation 7, GEN1, is converted to GEN2 as shown in Eq. 8:

$$R = \text{GEN2}(\text{Ext}) \qquad \text{Eq. 8}$$

The common explanation with (The first embodiment) may be omitted in the followings.

Figure 23:
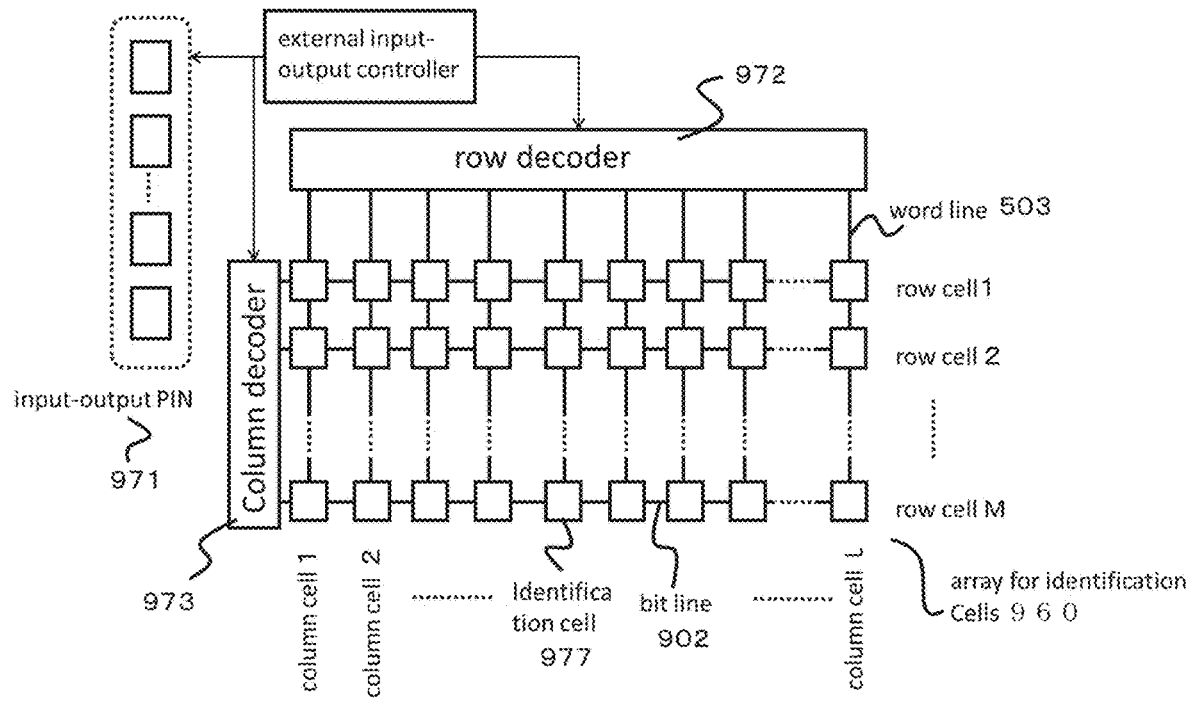
FIG. 23 is the drawing to illustrate an example of the layout of identification cells distributed on the checkerboard pattern comprising L rows and M columns.
Figure 24:
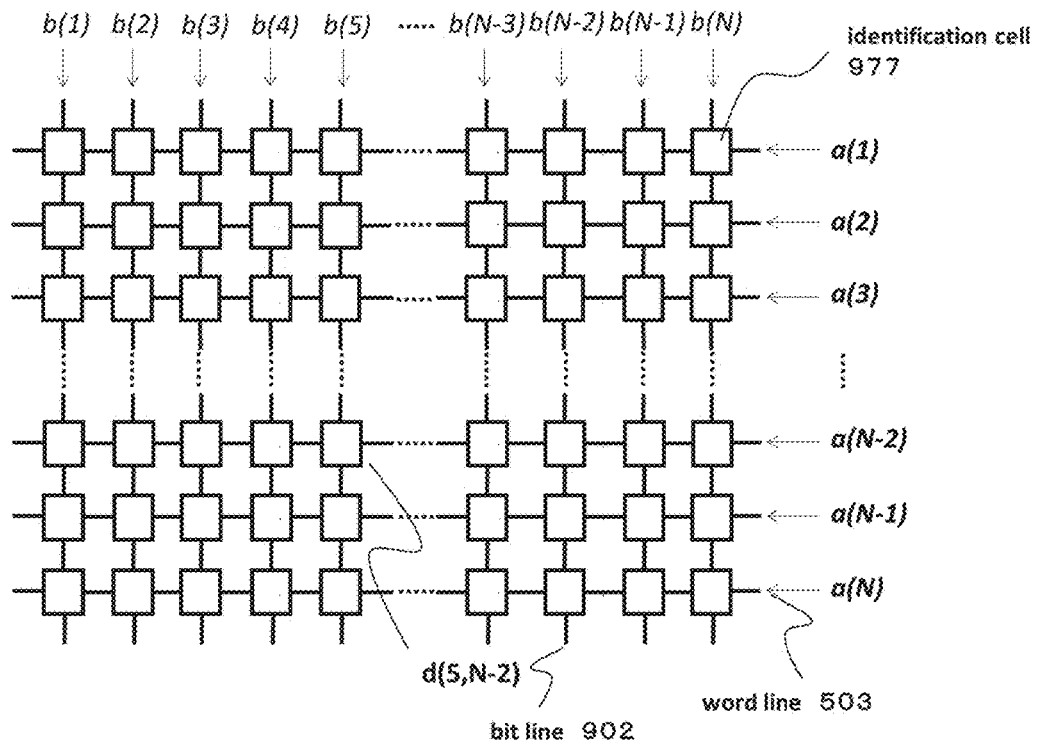
FIG. 24 is the drawing to illustrate an example of the method to input an input code.

The extraction circuit may extract the physical random number and then input its result, the extraction result Ext, into the output generation circuit. The extraction result Ext is a physical random number to be output, which is specific to the chip identification device, according to the indication code. More concretely, it is a physical random number to be output from the cell array included in the chip identification device. The cell array may be, as an example, as shown in FIGS. 23 and 69. An identification cell composing the said cell array may include cells as shown in FIGS. 33, 38-44, 46-49, 51-68, and 92-101. Accordingly, the extraction result Ext is a physical random number code with an indication. However, the output generation circuit generates an output identification code R from the extraction result Ext according to the function GEN2 as shown in Eq. 8 and then output it to the measuring device of chip identification. Like this, the measuring device of chip identification executes the identification of the chip identification device using the special test code for extracting physical random number, T, the indication code, and the output identification code R. However, the indication code or the special test code for extracting physical random number may include a part or all of the functions of the omitted input identification code Q.

In the output generation circuit, a program may be changeable or not. In the case that the program is changeable in the output generation circuit, the function GEN2 may be, for example, a program stored in rewritable non-volatile memory. Or it may be, for example, an incorporated circuit of FPGA. On the other hand, in the case that the program is not changeable in the output generation circuit, the function GEN2 may be, for example, a program stored in ROM and so forth. Or it may be, for example, an incorporated circuit wherein gate connection is unchangeable.

As long as the output identification code, R, is specific to a chip identification device, the output identification codes R to be output from two different chip identification devices cannot be identical in response to a same input C. As an example, the chip identification device may include the chip identification device as shown in FIGS. 15-18. The chip identification device may include, as an example, the cell array, the extraction circuit, and the output generation circuit. As an example, plurality of different chip identification devices may be respectively included into plurality of peripheral nodes as shown in FIGS. 10-14.

As an example, the measuring device of chip identification may 1% be included in the stem node 400 as shown in FIG. 10. The input as shown in FIG. 10 may include, as an example, the special test code for extracting physical random number, T, and the indication code. The identification as shown in FIG. 10 may include, as an example, the output identification code R. The common passcode 1410 as shown in FIG. 11 may include, as an example, the special test code for extracting physical random number, T, and the indication code. The first to third identifications (4101-4301) as shown in FIG. 12 may respectively include, as an example, the output identification codes R. It is noted here that the first to third identifications (4101-4301) respectively output from the first to third peripheral nodes (410-430) which include different chips each other are different each other, since the extraction results Ext having been included to generate the output identification codes R are respectively specific to those different chips.

(1) (The property of output independence) As an example, the input signal Q as shown in FIG. 15 may include the special test code for extracting physical random number, T, and the identification code. The output signals A and B as shown in FIG. 15 may be, as an example, the output identification codes R. It is noted here that the extraction results Ext output from the first and second chip identification devices (21, 22) are different each other if the first and second chip identification devices (21, 22) are different each other. Thereby, the output signals A and B are different each other and then said (the property of output independence) is satisfied.

(2) (The property of input independence) As an example, the input signals C and D as shown in FIG. 16 may respectively include the special test codes for extracting physical random number, T, and the indication codes. The output signals A and B as shown in FIG. 16 may be, as an example, the output identification codes R. It is noted here that the output signals A and B are different each other if the input signals C and D include different indication codes each other. Or the output signals A and B are different each other if different special test codes for extracting physical random number, T, are input to the chip identification device 60. Thereby, it may be self-evident that said (the property of input independence) is satisfied.

(3) (The property of output unpredictability) The extraction result Ext included to generate the output identification code R is to be extracted using the distribution of failure bits on the cell array. Accordingly, it is generated physically-randomly and specific to a chip. Thereby, it is impossible for any algorithm to predict the extraction result Ext. This feature is independent of indication codes. Therefore, it is self-evident that said (the property of output unpredictability) is satisfied.

(4) (The property of input-output reliability) As mentioned above, the extraction result Ext is to be extracted using the distribution of failure bits on the cell array. The distribution of failure bits may be able to be represented by binary using at least one of methods mentioned above. The result may be regarded as a digital pattern as shown in FIGS. 22 and 73. It is well-known that any data having been represented by binary satisfies Shannon's condition at every time of digital process executed by a circuit of CMOS inverters operating appropriately. Therefore, it is self-evident that said (the property of input-output reliability) is satisfied.

(5) (The practical limitlessness of output) The number of output patterns in response to an input, i.e., the number of cases of physical randomness, can be determined by the number of cases that plurality of failure sub-blocks are generated among the regular sub-block group. In the case that the cell array is a memory cell array of mass-product of general-purpose memories, the number of regular sub-blocks composing the regular sub-block group is sufficiently large. Even though the rate of the failure bit generation satisfies the condition of six sigma (failure rate is less than 3.4/one million), the number of patterns is sufficiently large. Therefore, it is self-evident that said (the practical limitlessness of output) is satisfied. Let us explain it using examples more concretely as below.

(6) (The property of persistency to chip) The output identification code R is an electronic signal which is specific to the chip identification device. Therefore, it is self-evident that said (the property of persistency to chip) is satisfied.

(7) (Physically non-editable property) The output identification code R, mentioned above, is physically non-editable (un-editable) if the physical random code is non-editable. Therefore, it is self-evident that said (physically non-editable property) is satisfied.

(P-CID) Thereby, it is self-evident that said (1)-(7) are all satisfied. Therefore, it may be regarded that a combination of the output identification code R and the special test code for extracting physical random number T, mentioned above, is an example of the physical chip identification (P-CID).

Figure 91:
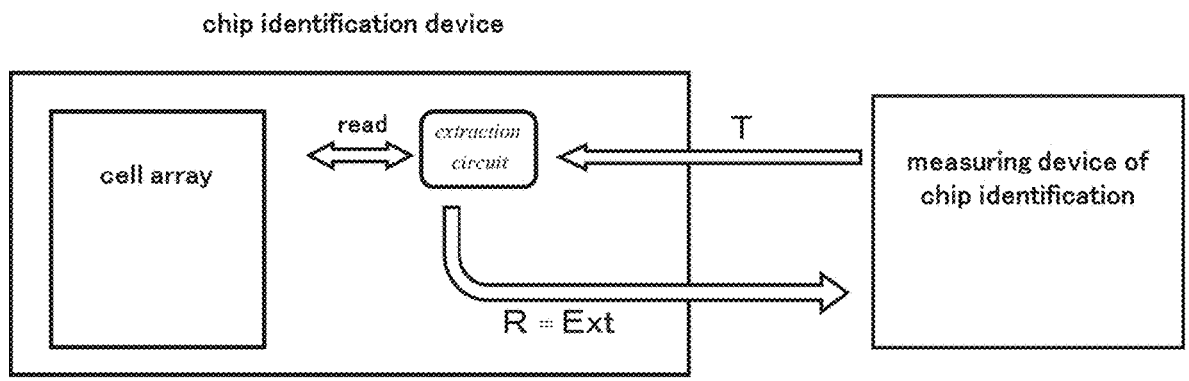
FIG. 91 is the drawing to illustrate an example of the method to generate output identification code from input identification code with regard to the measuring device of chip identification and the chip identification device.

(The third embodiment) In FIG. 91, the said chip identification device has a cell array, an extraction circuit, and an output generation circuit. The cell array comprises plurality of identification cells. The identification cells may have, for example, as shown in FIGS. 33, 38-44, 46-49, 51-68, 92-101, and so forth. The measuring device of chip identification inputs a special test code for extracting physical random number, T, to the chip identification device. The special test code for extracting physical random number, T, is passed to the extraction circuit in order to read (extract) a physical random number to be generated on the cell array. The special test code for extracting physical number, T, may include an indication code etc., which may be, for example, an extraction mode to indicate an extraction area on the cell array and an operation mode of extraction. As an example, the extraction area may be the regular sub-block group. Or, as another example, the extraction area may be the redundant sub-block group. Or the extraction area may be a separately given area. In this example, the output generation circuit is further omitted from FIG. 90. Accordingly, the function used in the equations 7 and 8, GEN1 and GEN2 are omitted to convert the equation 8 into the equation 9:

$$R = \text{Ext} \qquad \text{Eq. 9}$$

This is a dummy function doing nothing actually. The common explanation with (The first embodiment) may be omitted in the followings.

According to the equation 9, the extraction circuit extracts the physical random number. However, the extraction result Ext may be the output identification code R. More concretely, the physical random number may be read from the cell array included into the chip identification device. Accordingly, the extraction result Ext is a physical random number code with an indication. Like this, the measuring device of chip identification executes the identification of the chip identification device using the special test code for extracting physical random number, T, the indication code, and the output identification code R. However, the indication code or the special test code for extracting physical random number, T, may include a part or all of the functions of the omitted input identification code Q.

As long as the output identification code, R, is specific to a chip identification device, the output identification codes to be output from two different arbitrary chip identification devices cannot be identical in response to a same input code C. As an example, the chip identification device may include the chip identification device as shown in FIGS. 15-18. The chip identification device may include, as an example, the cell array, the extraction circuit, and the output generation circuit. As an example, plurality of different chip identification devices may be respectively included into plurality of peripheral nodes as shown in FIGS. 10-14.

As an example, the measuring device of chip identification is included in the stem node 400 as shown in FIG. 10. The input as shown in FIG. may include, as an example, the special test code for extracting physical random number, T, and the indication code. The identification as shown in FIG.

10 may include, as an example, the output identification code R. The common passcode 1410 as shown in FIG. 11 may include, as an example, the special test code for extracting physical random number, T, and the indication code. The first to third identifications (4101-4301) as shown in FIG. 12 may respectively include, as an example, the output identification codes R. It is noted here that the first to third identifications (4101-4301) respectively output from the first to third peripheral nodes (410-430) which respectively include different chips each other are different each other, since the extraction results Ext having been included to generate the output identification coded (R) are respectively specific to the chips.

(1) (The property of output independence) As an example, the input signal Q as shown in FIG. 15 may include the special test code for extracting physical random number, T, and the identification code. The output signals A and B as shown in FIG. 15 may be, as an example, the output identification codes R. It is noted here that the extraction results Ext are different if the first and second chip identification devices (21, 22) are different each other. Thereby, the output signals A and B are different each other and then said (the property of output independence) is satisfied.

(2) (The property of input independence) As an example, the input signals C and D as shown in FIG. 16 may respectively include the special test codes for physical random number, T, and the indication codes. The output signals A and B as shown in FIG. 16 may be, as an example, the output identification codes R. It is noted here that the output signals A and B are different each other if the input signals C and D use different indication codes. Thereby, it may be self-evident that (the property of input independence) is satisfied.

(3) (The property of output unpredictability) The extraction result Ext included to generate the output identification code R is to be extracted using the distribution of failure bits on the cell array. Accordingly, it is generated physically-randomly and specific to a chip. Therefore, it is impossible for any algorithm to predict the extraction result Ext. This feature is independent of the indication codes. Therefore, it is self-evident that said (the property of output unpredictability) is satisfied.

(4) (The property of input-output reliability) As mentioned above, the extraction result Ext is to be extracted using the distribution of failure bits on the cell array. The distribution of failure bits may be able to be represented by binary with at least one of methods mentioned above. The result may be a digital pattern as shown in FIGS. 22 and 73. It is well-known that any data having been represented by binary satisfies Shannon's condition at every time of digital process executed by a circuit of CMOS inverters operating appropriately. Therefore, it is self-evident that said (the property of input-output reliability) is satisfied.

(5) (The practical limitlessness of output) The number of output patterns in response to an input, i.e., the number of cases of physical randomness can be determined by the number of cases that plurality of failure sub-blocks are generated among the regular sub-block group. In the case that the cell array is a memory cell array of mass-product of general-purpose memory, the number of regular sub-blocks composing the regular sub-block group is sufficiently large. Even though the generation rate of failure bits satisfies the condition of six sigma (failure rate is less than 3.4/one million), the number of the patterns is sufficiently large. Therefore, it is self-evident that said (the practical limitlessness of output) is satisfied. Let us explain it using examples more concretely as below.

(6) (The property of persistency to chip) The output identification code R is an electronic signal which is specific to the chip identification device. Therefore, it is self-evident that said (the property of persistency to chip) is satisfied.

(7) (Physically non-editable property) The output identification code R mentioned above is physically non-editable (un-editable) if the physical random code is non-editable. Therefore, it is self-evident that said (physically non-editable property) is satisfied.

(P-CID) Thereby, it is self-evident that the (1)-(7) are all satisfied. Therefore, it may be regarded that a combination of the output identification code R and the special test code for extracting physical random number T, mentioned above, is an example of the physical chip identification (P-CID).

(The fourth embodiment) The physical chip identification (P-CID) of the present disclosure can be generated by the chip identification device 60/600 as shown in FIGS. 7, 8, and 15-18. In concrete, an input code is input from the external to a chip composing the chip identification device. A physical random number is then extracted from a cell array inside the chip. The P-CID is generated from the input code and the physical random number. In this event, (1) (The property of output independence), (2) (The property of input independence), (3) (The property of output unpredictability), (4) (The property of input-output reliability), (5) (The practical limitlessness of output), (6) (The property of persistency to chip), and (7) (Physically non-editable property) are all satisfied.

As mentioned above, an input code to be input from the external to a peripheral node in order to generate a P-CID may be generated using, as an example, a digital code information such as passcode, PIN code, barcode, and two-dimensional code, etc., some kind of biometric information to identify a regular user of said application such as finger print information, finger vein information, retina information, DNA information, and so forth, voice and image information and so forth extracted from voice and picture of the said regular user to identify him or her, some kind of physical information and so forth extracted from physical characteristics of the regular user to identify him or her and further some kind of personal information to identify the regular user, etc., which are used to boot some kind of applications executing on an information terminal connecting to the network.

As another example, said input code may be generated using: a digital code information such as passcode, PIN code, barcode, and two-dimensional code, and so forth, some kind of biometric information to identify a regular user of said application such as: finger print information, finger vein information, retina information, DNA information, and so forth, voice and image information and so forth, extracted from voice and picture of the said regular user to identify him or her, some kind of physical information and so forth, extracted from physical characteristics of a regular user to identify him or her, and further some kind of personal information to identify the regular user, and so forth, which are requested as necessary by some kind of applications executing on an information terminal connecting to the network.

As another example, furthermore, said input code may be generated using a digital code information such as passcode, PIN code, barcode, and two-dimensional code, etc., some kind of biometric information to identify a regular user of said application such as finger-print information, finger vein information, retina information, DNA information, etc., voice and image information etc. extracted from voice and picture of the said regular user to identify him/her, some kind of physical information etc. extracted from physical characteristics of a regular user to identify him/her, and further some kind of personal information to identify the regular user, etc., which are used to boot an information terminal connecting to the network, into which some kind of applications are installed to execute.

Or, as another example further, said input code is a special test code for extracting a physical random number which is generated through some kind of physical process in a manner wherein the physical random number is specific to a chip configuring chip identification device. However, the special test code for extracting physical random number is a code to indicate at least an access mode, an address, and an operation mode for data on the cell array inside the chip.

Or said input code may be configured by a combination of above-mentioned plurality of input codes.

As an example, the input code may be the input identification code Q as shown in FIG. 89. Or the input code may be included into the input identification code Q as shown in FIG. 89. Or the input code may be included into the special test code for extracting physical random number T as shown in FIG. 89. Or the input code may be included into the indication code in the first embodiment.

As an example, the input code may be included into the special test code for extracting physical random number T as shown in FIG. 90 or 91. Or, the input code may be included into the indication code in the second or third embodiment.

(The fifth embodiment) The physical chip identification (P-CID) of the present disclosure can be generated by the chip identification device 60/600 as shown in FIGS. 7, 8, and 15-18. In concrete, an input code is input from an external to a chip composing the chip identification device. A physical random number is then extracted from a cell array inside the chip. The P-CID is thus generated from the input code and the physical random number. In this event, (1) (The property of output independence), (2) (The property of input independence), (3) (The property of output unpredictability), (4) (The property of input-output reliability), (5) (The practical limitlessness of output), (6) (The property of persistency to chip), and (7) (Physically non-editable property) are all satisfied.

Figure 82:
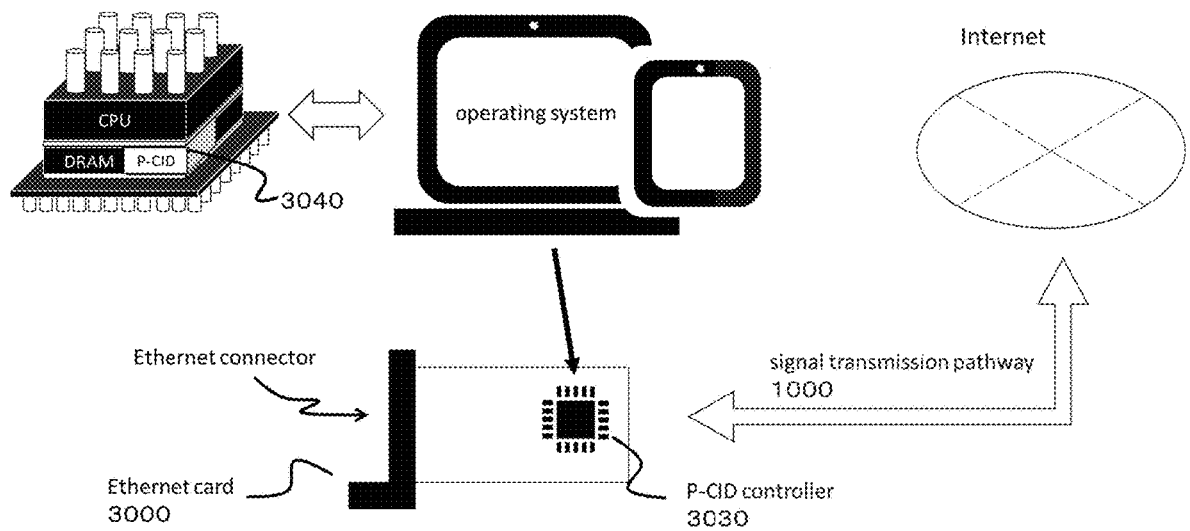
FIG. 82 is the drawing to illustrate an example of the communication method with the utilization of the chip identification (P-CID) of the present disclosure.

In FIG. 82, instead of recording MAC address in the inner memory of Ethernet card, a chip identification device 3040 of the present disclosure (labeled P-CID in this figure) may be equipped in the main memory (DRAM etc.) co-working with CPU etc. In this event, the P-CID related to the present disclosure may be a physical chip identification which is linked to this CPU. Thereby, the MAC address recoded in an Ethernet card can be replaced.

In general, the P-CID may not be always a format of Ethernet type. For example, it may be preferable that a P-CID generated by a peripheral node as mentioned above is generated in response to an input code from a stem node. Or it may be preferable that a chip identification device generates a P-CID in response to an input code configured in the operating system of peripheral node in advance. In this event, an input code to be input to chip identification device may be a passcode to be input for booting the operating system or made related to the passcode. Or, the input code may be a passcode, a PIN code and so forth to recover from a sleep-mode or made related to them. Thus, the chip of operational processing unit for media access controller (MAC) 3020 of Ethernet card may be replaced by P-CID controller 3030.

Figure 81:
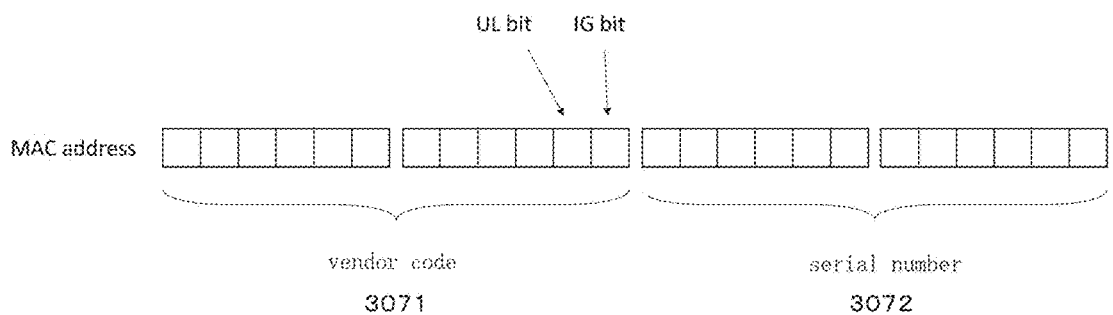
FIG. 81 is the drawing to illustrate an example of the standard of MAC address.
Figure 83:
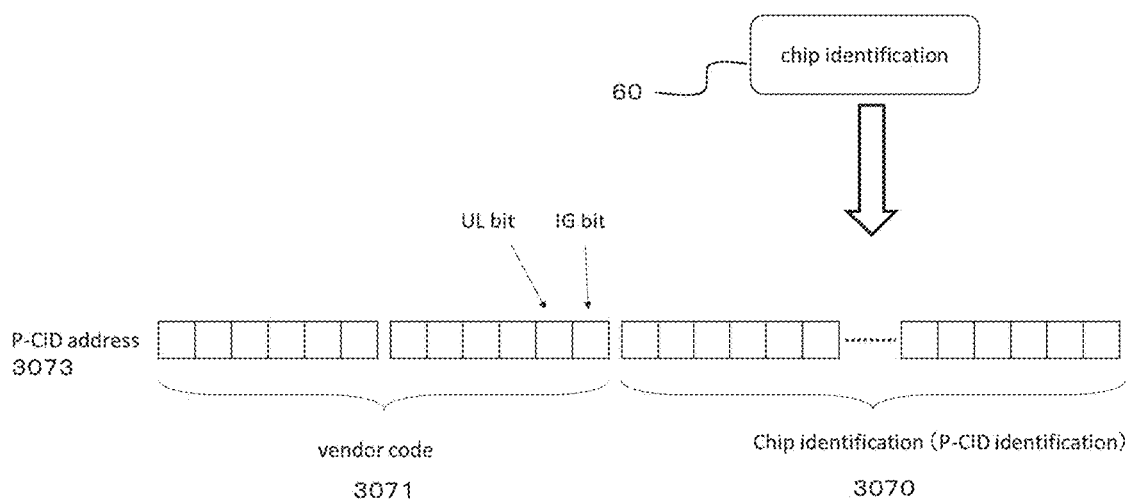
FIG. 83 is the drawing to illustrate an example of physical address format with the utilization of the chip identification (P-CID) of the present disclosure.

As illustrated in FIG. 83, as an example, it may be preferable that the P-CID 3070 may be generated by the chip identification related to the present disclosure, and then replace the bottom 24 bits of MAC address (serial number 3072 in FIG. 81). In other words, the MAC address' vendor code 3071 having been widespread used may be used even with P-CID. Thus, the P-CID address 3073 may be generated, as shown in FIG. 83. It may be possible that the receiving node judges whether a received frame adopts MAC address or P-CID of the present disclosure by checking an indication bit to be mentioned below.

Figure 74:
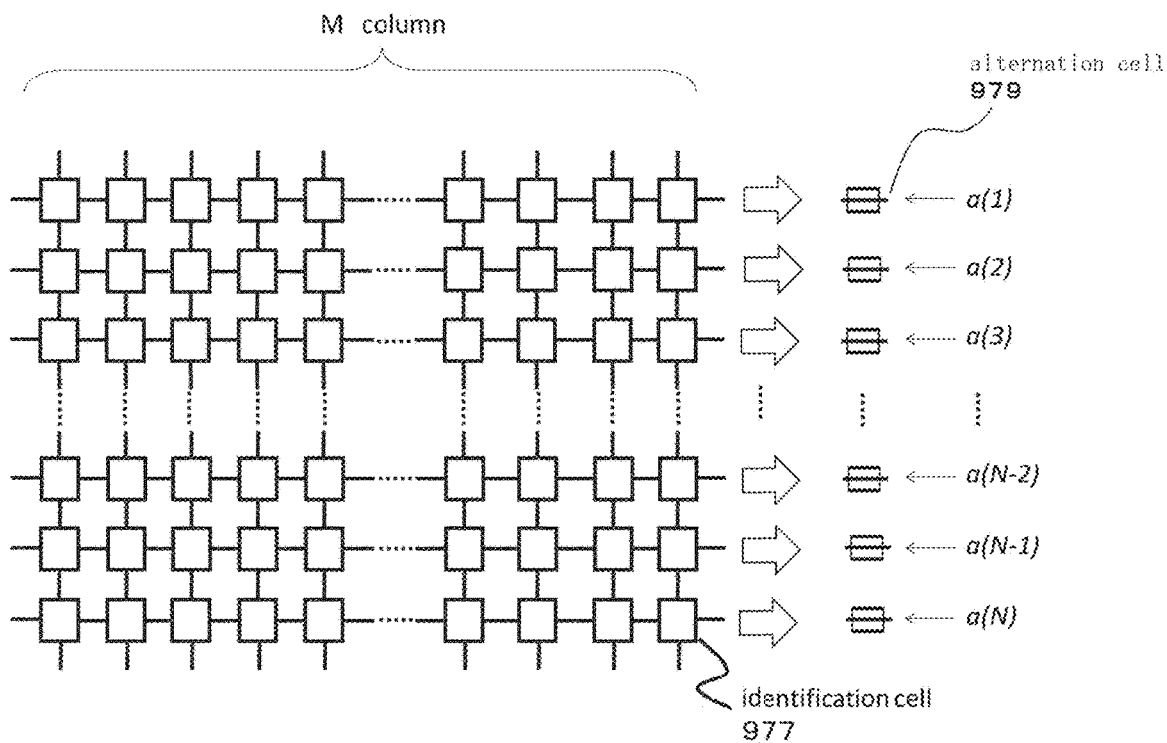
FIG. 74 is the drawing to illustrate an example of the method to input an input code.

In general, the bit number of P-CID 3070 may be determined by the number of the identification cells 977 composing a chip identification device. For example, in the case that an array for identification cells 960 is similar to the configuration in FIG. 23, the bit number of P-CID may be the product of the row number L and the column number M. Accordingly, the bit number of P-CID address may be the sum of the product of L and M, and 24. Or, in the case of configuration similar to FIG. 29, the number of bits of P-CID may be determined by the square of N. Accordingly, the bit number of P-CID address may be the sum of the square of N and 24. Or, in the case of configuration similar to FIG. 74, the number of bits of P-CID may be N. Or, in the case of configuration similar to FIG. 77, the number of bits of P-CID may be N. Or, in the case that the redundancy of DRAM is adopted, the bit number of P-CID may be determined by the bit number of memory area for the redundancy. That is, a necessary bit number may be easily determined from information quantity to be calculated with permutation.

Figure 29:
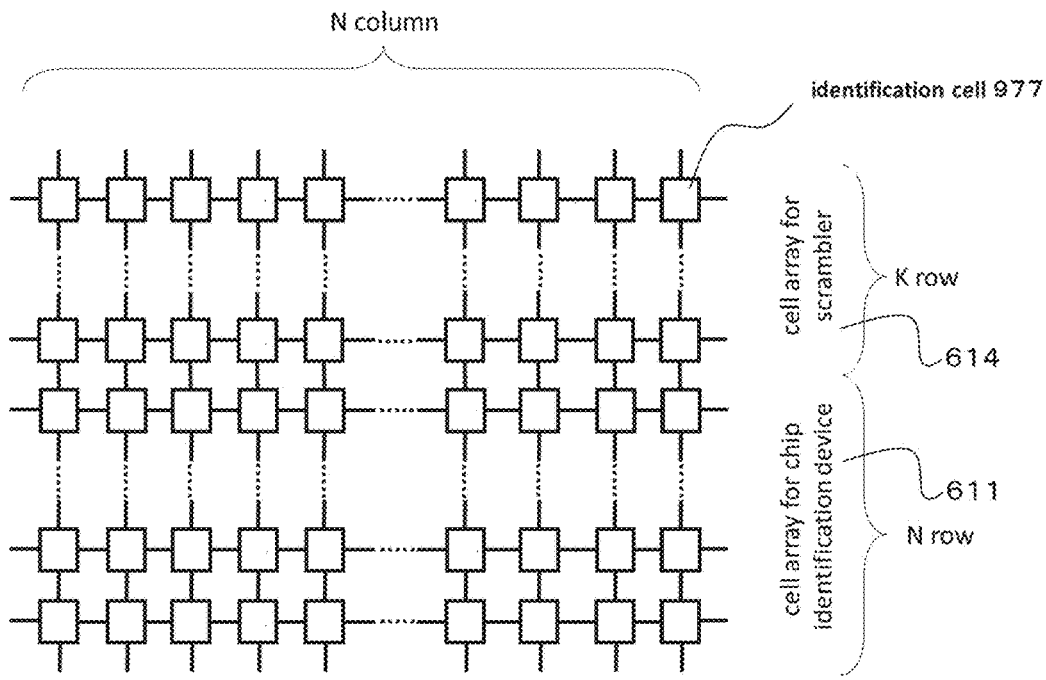
FIG. 29 is the drawing to illustrate an example of the cell array including both scrambler and chip identification device.
Figure 35:
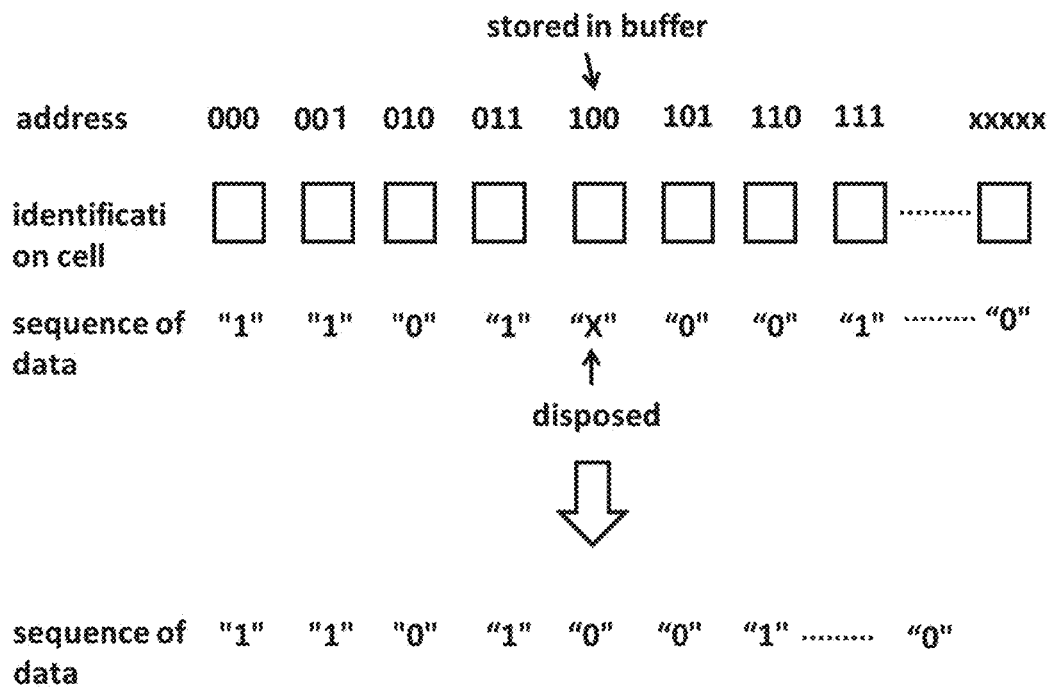
FIG. 35 is the drawing to illustrate an example of the error correction method of data read from identification cell.
Figure 36:
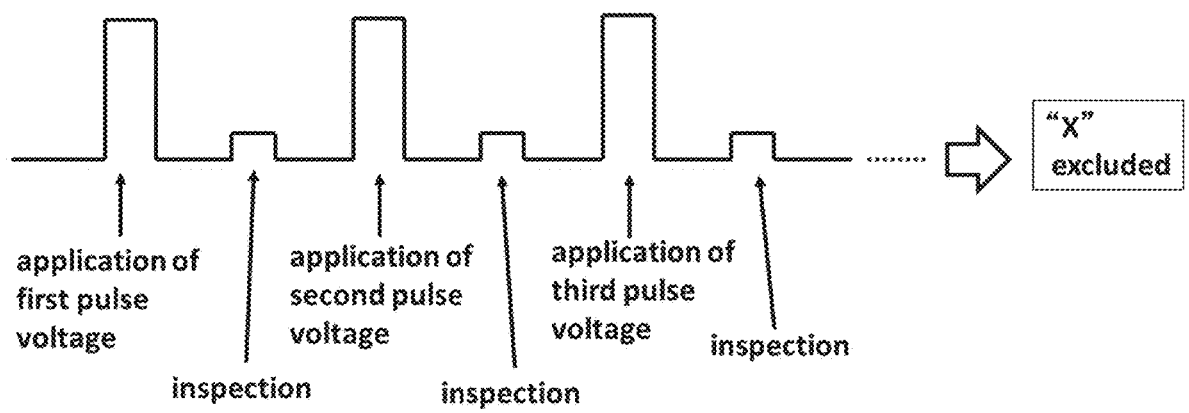
FIG. 36 is the drawing to illustrate an example of the method to apply break pulse.
Figure 37:
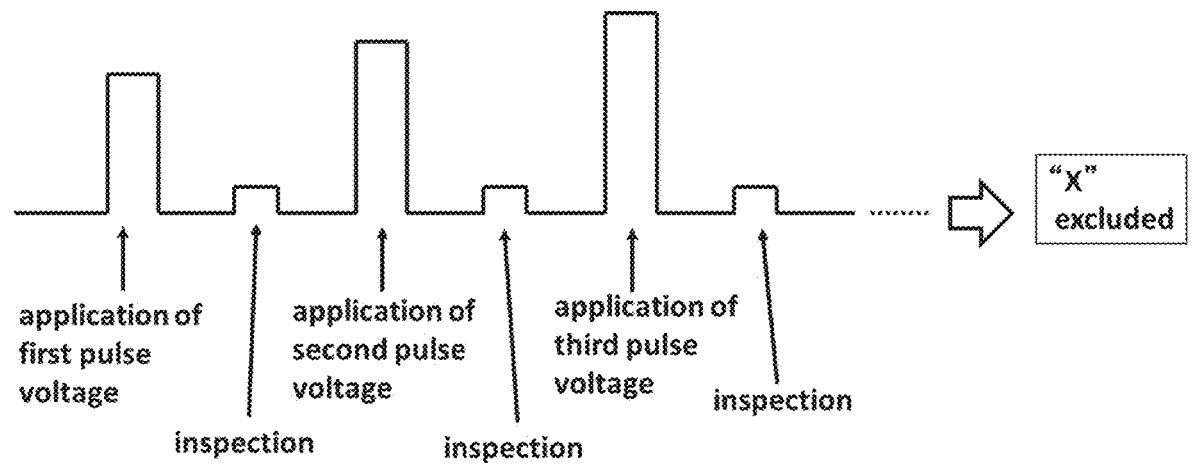
FIG. 37 is the drawing to illustrate an example of the method to apply break pulse.
Figure 38:
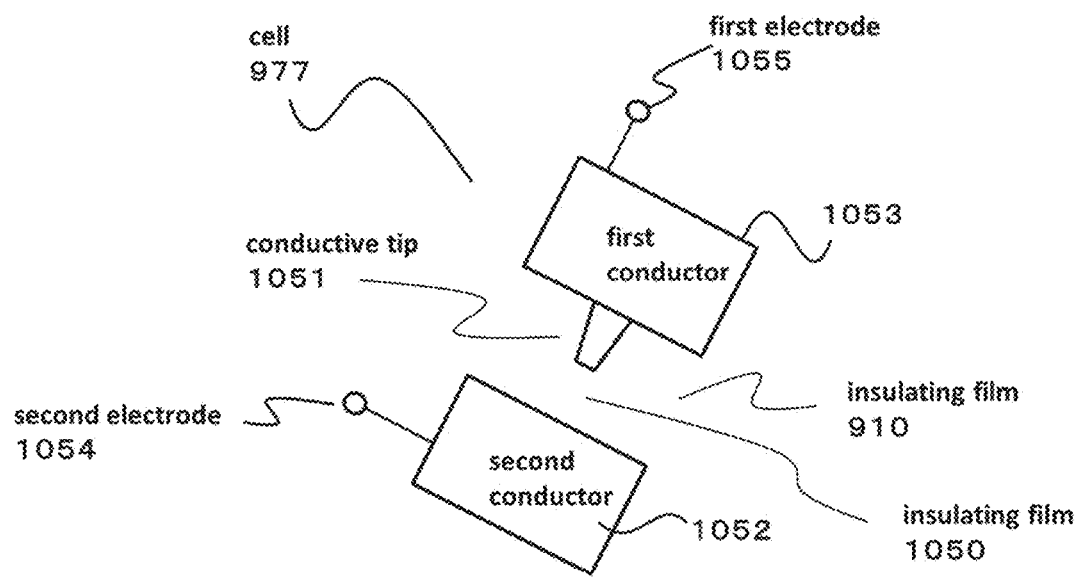
FIG. 38 is the drawing to illustrate an example of identification device (conductive tip).

However, in the cases of configuration similar to the above-mentioned FIG. 23 or FIG. 29, the number of bits of P-CID may become smaller than in the ideal case due to the inclusion of soft breakdown mode "X", as shown in FIG. 35. In the case that the upper bound of possibility of such breakdown modes has been known in advance by a pre-inspection or some kind of another method, it may be preferable that the number of bits of P-CID is revised taking into account additional bit numbers converted from a margin corresponding to this upper bound. Thus, the bit number of P-CID may be determined by using the number of cross-points of white and black checkerboard pattern as shown in FIG. 22.

Figure 84:
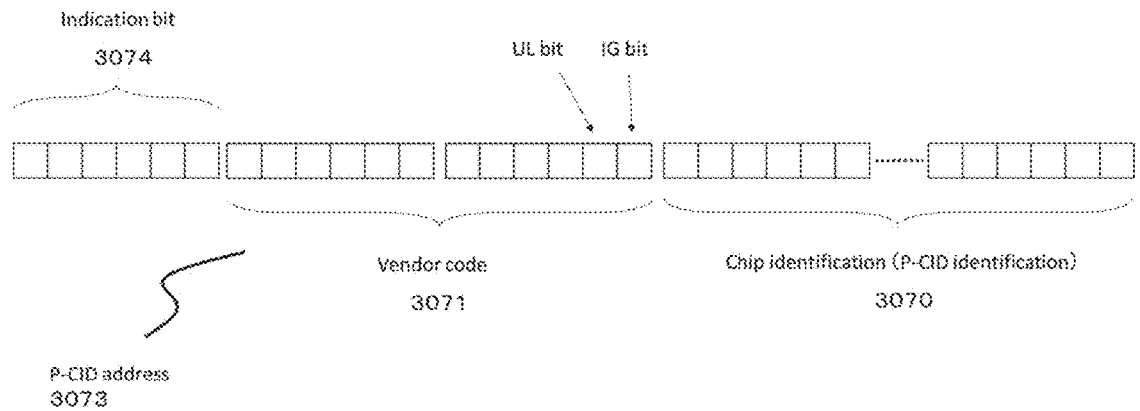
FIG. 84 is the drawing to illustrate an example of physical address format with the utilization of the chip identification (P-CID) of the present disclosure.
Figure 85:
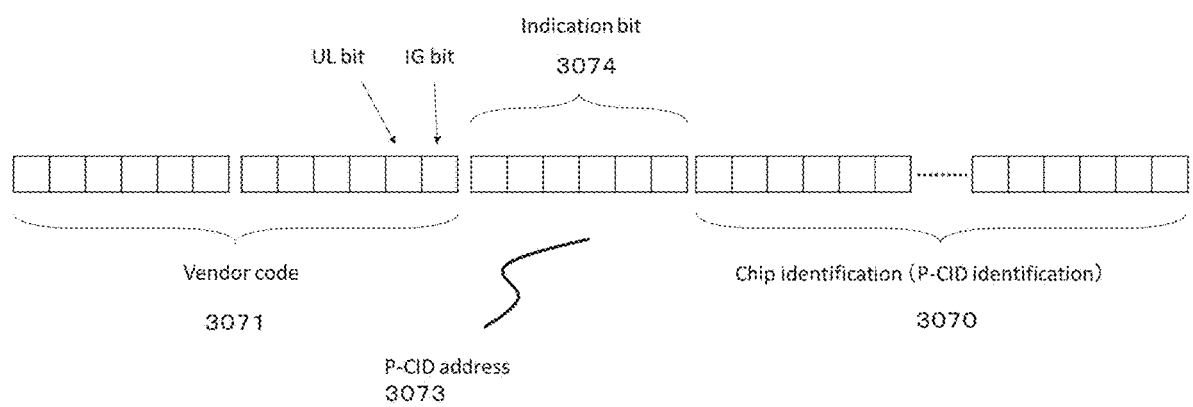
FIG. 85 is the drawing to illustrate an example of physical address format with the utilization of the chip identification (P-CID) of the present disclosure.

The bit number of P-CID may be either larger or smaller than 24 bits of serial number. Or it may be possible to be equal to 24 bits of serial number. In the case that it is smaller than 24 bits, it may be preferable that the utilization of P-CID is restricted to a closed physical network. For example, the P-CID may be able to be used for administrating manufacturing line in a factory instead of serial number. By this way, the bit number of P-CID may not always be determined as a definite number. Accordingly, it may be preferable that several bits are appended for indicating the number of bits of P-CID after the preamble. Those bits to indicate the bit number of P-CID (indication bit 3074) may be before (upper) or after (lower) the vendor code 3071. FIG. 84 illustrates an example that the indication bit 3074 is appended before (upper) the vendor code 3071. FIG. 85 illustrates an example that the indication bit 3074 is appended after (lower) the vendor code 3071. Both in FIG. 84 and FIG. 85, it has been assumed that the length of indication bit 3074 is 6 bits. However, in general, the length of indication bit 3074 may not always be 6. Anyway, it may be able to judge if a received frame is subject to P-CID format by checking the presence of indication bits.

By the introduction of indication bit 3074, the number of addresses that P-CID address can deal with may be variable. Accordingly, it may be possible that arbitrary administrator can configure a closed physical network by using a short P-CID address and then save the bit numbers to be allocated to a data area of protocol data unit. As a result, the quantity of information to be carried by one protocol data unit may be increased. This means that the quantity of information to be carried at one data communication is increased. Or, in the case that arbitrary vendor forwards a limited number of products, it may be possible that a short P-CID address is used and then saved bits may be allocated to a data area of protocol data unit.

In the case of the internet of things, the number of global addresses may be extremely large. To cope with this problem, using the indication bit 3074, the bit number of P-CID address may be increased, and then the number of addresses that P-CID address deals with may be increased. Thus, as the bit number of P-CID address is increased, the quantity of information to be carried by one protocol data unit may be decreased. This means that the quantity of information to be carried at one data communication is decreased. However, in the future that the internet of things, which demands innumerable physical addresses, will come, the regulation of protocol data unit may be revised to cope with the progress of the network technology. Thus, it may be very probable that the bit number to be allocated to one protocol data unit is increased. In the case that MAC address continues being used, it may be difficult to flexibly cope with such a change. However, in the case of P-CID address with indication bit of the present invention, it may be possible to flexibly cope with a drastic increase of the number of physical addresses.

When turning on a personal computer, information necessary for central processing unit (CPU) to boot the operating system may be loaded to main memory (e.g., DRAM). Here note, if the operating system finds an Ethernet card or a chip identification device 3040, the operation system may read physical chip identification (P-CID 3070) from the chip identification device 3040, and then write it to P-CID controller 3030 involved into the Ethernet card. The P-CID controller 3030 may send and receive frames attached with P-CID addresses shown in FIGS. 83-85 via signal transmission pathway 1000 in the data link layer.

(The sixth embodiment) The physical chip Identification (P-CID) can be generated by the chip identification device 60/600 as shown in FIGS. 7, 8, and 15-18. In concrete, an input code is input from an external to a chip composing a chip identification device. A physical random number is then extracted from a cell array inside the chip. The P-CID is thus generated from the input code and the physical random number. Therefore, (1) (The property of output independence), (2) (The property of input independence), (3) (The property of output unpredictability), (4) (The property of input-output reliability), (5) (The practical limitlessness of output), (6) (The property of persistency to chip), and (7) (Physically non-editable property) are all satisfied.

Figure 86:
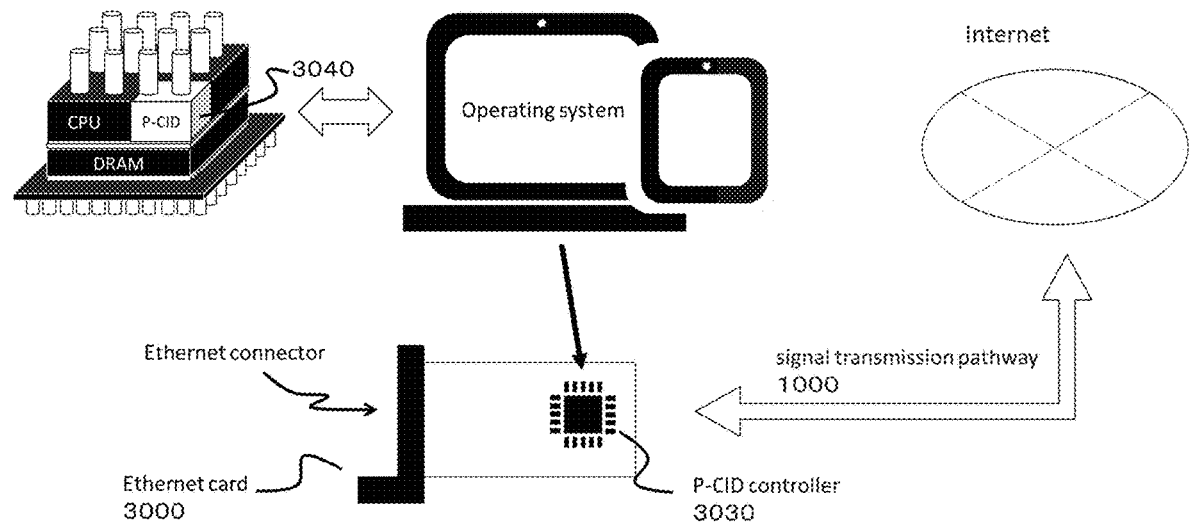
FIG. 86 is the drawing to illustrate an example of the communication method with the utilization of the chip identification (P-CID) of the present disclosure.

FIG. 86 is another example of an embodiment wherein the chip identification device of the present disclosure is adopted as physical chip identification (P-CID). A MAC address is not stored in an inner memory of an Ethernet card and the physical chip identification device of the present disclosure (depicted P-CID in the figure) is equipped into a central processing unit (CPU). In this event, it is unnecessary to record MAC address in Ethernet card so that it may be possible to remove a non-volatile memory chip from Ethernet card. As mentioned above, in the case that the chip identification device of the present disclosure is mix-loaded to central processing unit (CPU), it may be preferable that an identification cell composing the chip identification device of the present disclosure conforms a standard CMOS process. For example, it may be preferable that the identification cells are a field-effect transistor 983 in FIG. 41. Or it may be PN junction 986 in FIG. 39, Schottky junction 987 in FIG. 40, or wiring patterns of FIGS. 47 and 48. In the above-mentioned example, an identification generated by chip identification device 3040 may be regarded as physical chip identification (P-CID) from the contrast with MAC address. In general, the P-CID is not always an identification of Ethernet format. For example, it may be preferable that P-CID generated by a peripheral node as mentioned above is generated in response to an input code from a stem node. Or it may be preferable that the chip identification deice generates P-CID in response to an input code prepared in the operating system of peripheral node in advance. In this event, an input code to be input to the chip identification device may be a passcode to boot the operating system or correlated to the passcode. Or, the input code may be a passcode, PIN code and so forth to recover from sleep-mode or correlated to those codes. Thus, a chip of operational processing unit for media access controller (MAC) 3020 may be replaced with P-CID controller 3030.

When turning on a personal computer, information necessary for central processing unit (CPU) to boot the operating system may be loaded to main memory (e.g., DRAM). Here, if the operating system finds an Ethernet card or chip identification device 3040, the operation system may read physical chip identification (P-CID 3070) from chip identification device 3040, and then write it to P-CID controller 3030 involved into the Ethernet card. The P-CID controller 3030 may send and receive frames attached with P-CID address shown in FIGS. 83-85 via signal transmission pathway 1000 in the data link layer.

(The seventh embodiment) In the above embodiments, the chip of operational processing unit for media access controller (MAC) 3020 is replaced with P-CID controller 3030. However, it may be noted that the present embodiment doesn't use MAC address, therefore the Ethernet format may be necessary to be revised. A sudden revision in the format like that may cause a chaos or confusion. Accordingly, a converter from physical chip identification (P-CID) to MAC address, that is, the P-CID/MAC convertor 3050 may be necessary to be used during transition period of network format. A typical example may be illustrated below, which responds to such a transient demand.

Figure 87:
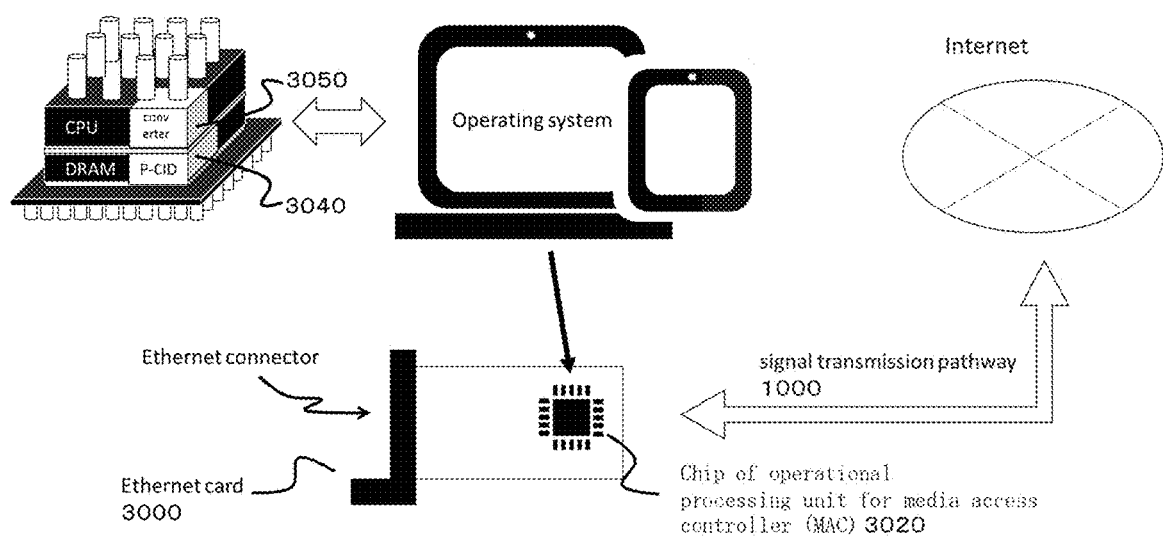
FIG. 87 is the drawing to illustrate an example of the communication method with the utilization of the chip identification (P-CID) of the present disclosure.

FIG. 87 is another example of an embodiment wherein the chip identification device of the present disclosure is adopted as the physical chip identification (P-CID). A MAC address is not stored in an inner memory of an Ethernet card and the physical chip identification device of the present disclosure (depicted P-CID in the figure) is equipped into a main memory. This chip identification device 3040 generates a physical chip identification (P-CID). Furthermore, the central processing unit (CPU) has a function of the P-CID/MAC converter 3050 which rules the conversion from P-CID address 3073 generated using this P-CID to MAC address. With this regard, it is unnecessary to record MAC address in Ethernet card and then it may be possible to remove non-volatile memory chip therefrom. In the case that main memory device is DRAM, the identification cells may be DRAM cells as shown in FIG. 42, 63, or 64 for example. It may be preferable to adopt the two-dimensional code type random number code, as illustrated in FIG. 22. Or, in the example of FIG. 74 wherein alternation cells 979 are used, it may be preferable to adopt the barcode type random number code, as illustrated in FIG. 73 wherein the identification cells are DRAM cells. Or it may be preferable that the barcode type random number code as illustrated in FIG. 73 may be adopted by using fuse memory for the redundancy of DRAM. In the above-mentioned example, the identification generated by chip identification device 3040 may be particularly regarded as physical chip identification (P-CID) from the contrast with MAC address. The P-CID 3070 is not always an identification of the Ethernet format. For example, it may be preferable that P-CID generated by a peripheral node as mentioned above is generated according to an input code from the external. Or it may be preferable that the chip identification device generates the P-CID according to an input code having been prepared in an operating system of a peripheral node in advance. In this event, an input code to be input to the chip identification device may be a passcode to boot the operating system or correlated to the passcode. Or, the input code may be a passcode, PIN code and so forth to recover from sleep-mode or correlated to those codes. However, the present example has a function to rule the conversion from P-CID address generated using P-CID to MAC address, as mentioned above. Thus, a chip of operational processing unit for the media access controller (MAC) 3020 may be used in Ethernet card and not replaced with the P-CID controller 3030. Moreover, the P-CID/MAC convertor 3050 may not always be a device having physical substance and may be a kind of program to execute when loaded to CPU at the booting. Or it may be a firmware to execute a similar operation. Of course, it may be embedded into CPU as a part of module.

When turning on a personal computer, information necessary to boot the operation system may be loaded to main memory (e.g., DRAM), the central processing unit (CPU) may boot the operating system. Here, If the operating system finds an Ethernet card or a chip identification device 3040, the operating system may read a physical chip identification (P-CID 3070) from the chip identification device 3040, and then forward it to the P-CID/MAC convertor 3050 embedded in the CPU. The P-CID/MAC convertor 3050 may convert a P-CID address to be generated from this P-CID into a MAC address. The operating system may write it to a chip of operational processing unit for media access controller (MAC) 3020. Thus, the media access controller (MAC) may send and receive frames via signal transmission pathway 1000 in the conventional Ethernet format. Although not illustrated since it may be self-evident, the chip identification device 3040 may be equipped into CPU as illustrated in FIG. 86, while the P-CID/MAC convertor 3050 is installed to the CPU.

Figure 88:
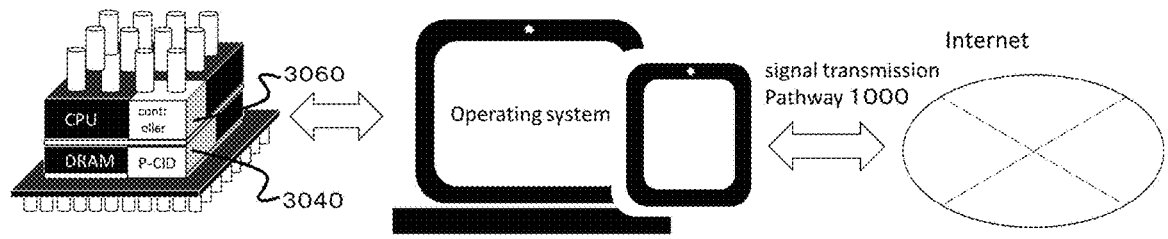
FIG. 88 is the drawing to illustrate an example of the communication method with the utilization of the chip identification (P-CID) of the present disclosure.

(The eighth embodiment) FIG. 88 is another example of an embodiment that the chip identification device of the present disclosure is adopted as physical chip identification (P-CID). The MAC address is not stored in the inner memory of Ethernet card and the physical chip identification device of the present disclosure 3040 (depicted P-CID in the figure) is equipped into the main memory (e.g., DRAM). This chip identification device 3040 generates a physical chip identification (P-CID). Furthermore, this central processing unit (CPU) generates a P-CID address from this P-CID and has a function of the P-CID controller 3060 to rule the configuration of frames using methods as illustrated in FIGS. 83, 84, 85 and so forth. With this regard, it is unnecessary to record MAC address in Ethernet card and then it may be possible to remove non-volatile memory chip. Furthermore, the P-CID controller 3060 may replace the chip of operational processing unit for the media access controller (MAC) 3020. For example, it is preferable that P-CID generated by a peripheral node as mentioned above is generated according to an input code from a stem node. Or it is preferable that the chip identification device generates a P-CID according to an input code set in the operating system of a peripheral node in advance. In this event, the input code to be input to the chip identification device may be a passcode to be input when booting the operating system or related to that passcode. Thus, it may be preferable to remove the Ethernet card. In the case that main memory device is DRAM, the identification cells may be DRAM cells as shown in FIGS. 42, 63, and 64 for example. It may be preferable to adopt the two-dimensional code type random number code, as illustrated in FIG. 22. Or, in the example of FIG. 74 wherein alternation cells 979 are used, it may be preferable that identification cells are DRAM cells and the barcode type random number code as illustrated in FIG. 73 is adopted. Or it may be preferable that the barcode type random number code as illustrated in FIG. 73 is adopted by using a fuse memory to be used for redundancy of DRAM. In the present example, an identification generated by the chip identification device 3040 may be regarded as physical chip identification (P-CID) from the contrast with MAC address. Moreover, the P-CID controller 3060 is unnecessary to be a device having physical substance. It may be a kind of program to be loaded to CPU and then to execute at the booting. Or it may be a firmware to execute a similar operation. Of course, it may be embedded into CPU as a part of module.

When turning on a personal computer, the information necessary to boot the operation system may be loaded to main memory (e.g., DRAM), the central processing unit (CPU) may boot the operating system. Here note that if the operating system finds a chip identification device 3040, the operating system may read physical chip identification (P-CID) generated by the chip identification device 3040, and then forward it to the P-CID controller 3060 that is mounted in CPU. The P-CID controller 3060 may send and receive frames via signal transmission pathway 1000 using this P-CID. Although not illustrated since it may be self-evident, the chip identification device 3040 may be equipped into CPU as illustrated in FIG. 86, while the P-CID controller 3060 is installed to CPU.

Recently, a communication chip having a function of Ethernet card appears on the market as well as Ethernet card (or LAN card). The communication chip like this may be equipped into electronic apparatuses or information apparatuses, which are smaller than personal computers. Or it may be also possible to be integrated with a SIM card. The chip identification device of the present disclosure may be possible to be embedded into a chip and generate a physical chip identification (P-CID). Accordingly, it may be able to be used in a communication chip or a SIM card as well as an alternation of Ethernet card (or LAN card).

(The ninth embodiment) (Mutual authentication) The physical chip identification (P-CID) of the present disclosure can be generated by the chip identification device 60/600 as shown in FIGS. 7, 8, and 15-18. In concrete, an input code is input from an external to a chip composing the chip identification device. A physical random number is then extracted from a cell array inside the chip. The P-CID is thus generated from the input code and the physical random number. Therefore, (1) (The property of output independence), (2) (The property of input independence), (3) (The property of output unpredictability), (4) (The property of input-output reliability), (5) (The practical limitlessness of output), (6) (The property of persistency to chip), and (7) (Physically non-editable property) are all satisfied.

Figure 78:
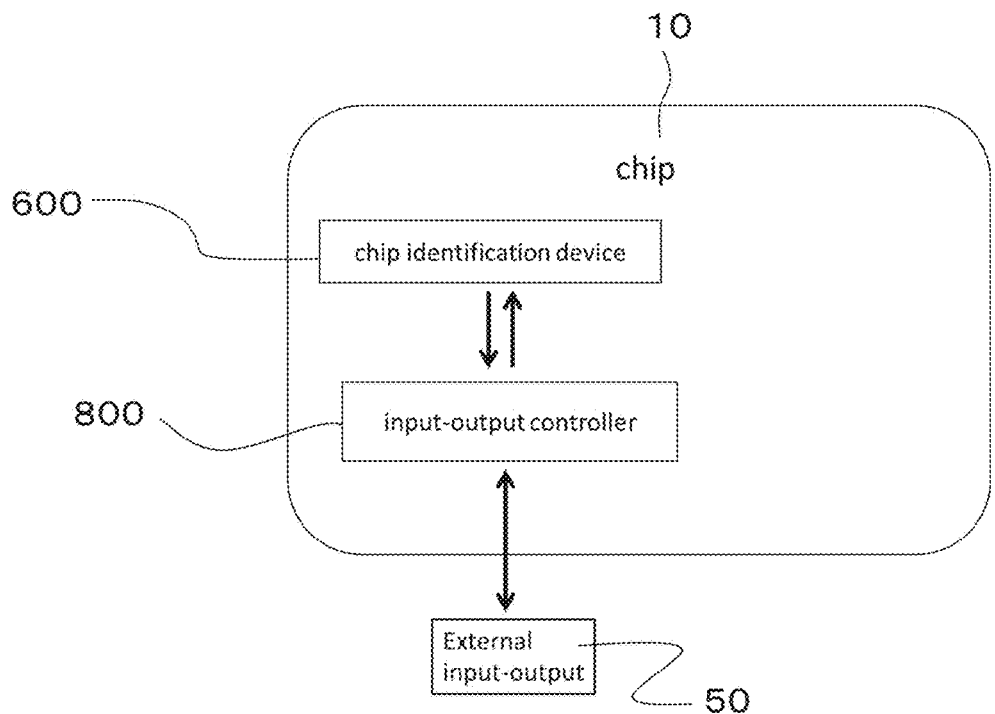
FIG. 78 is the drawing to illustrate an example of semiconductor chip including chip identification device.
Figure 79:
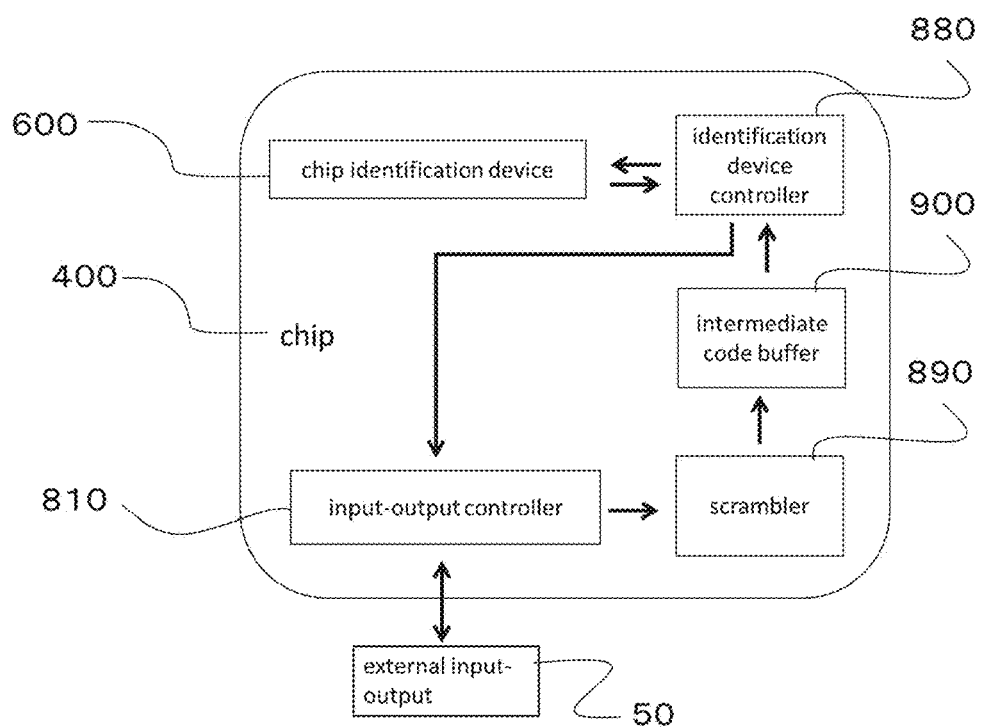
FIG. 79 is the drawing to illustrate an example of semiconductor chip including scrambler and chip identification device.
Figure 80:
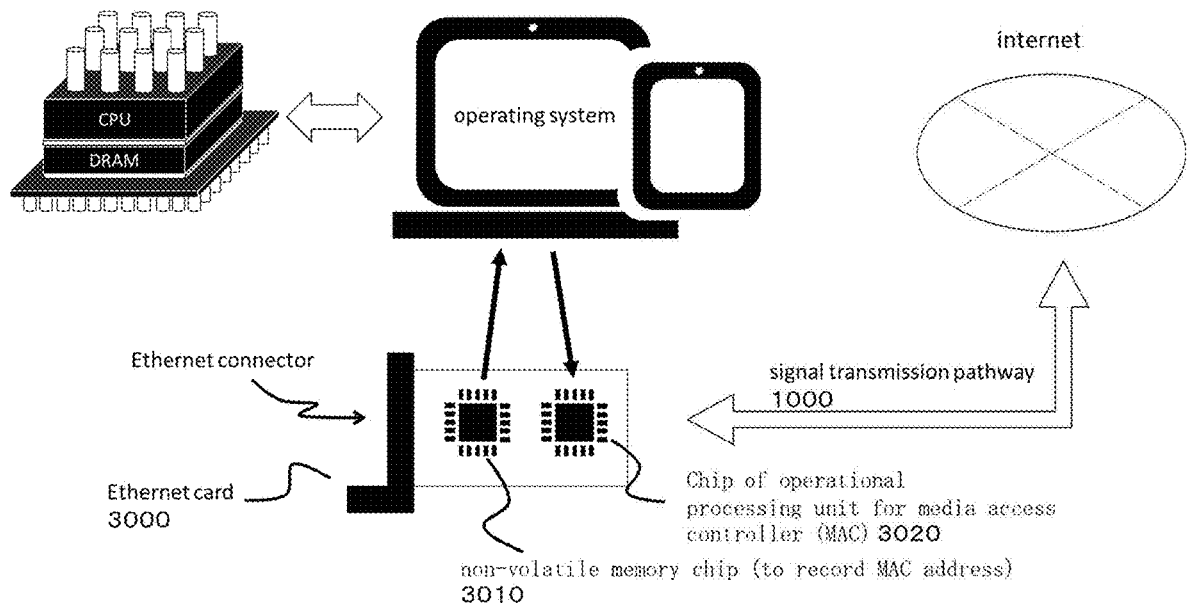
FIG. 80 is the drawing to illustrate a typical example of the communication method of Ethernet standard.
Figure 102:
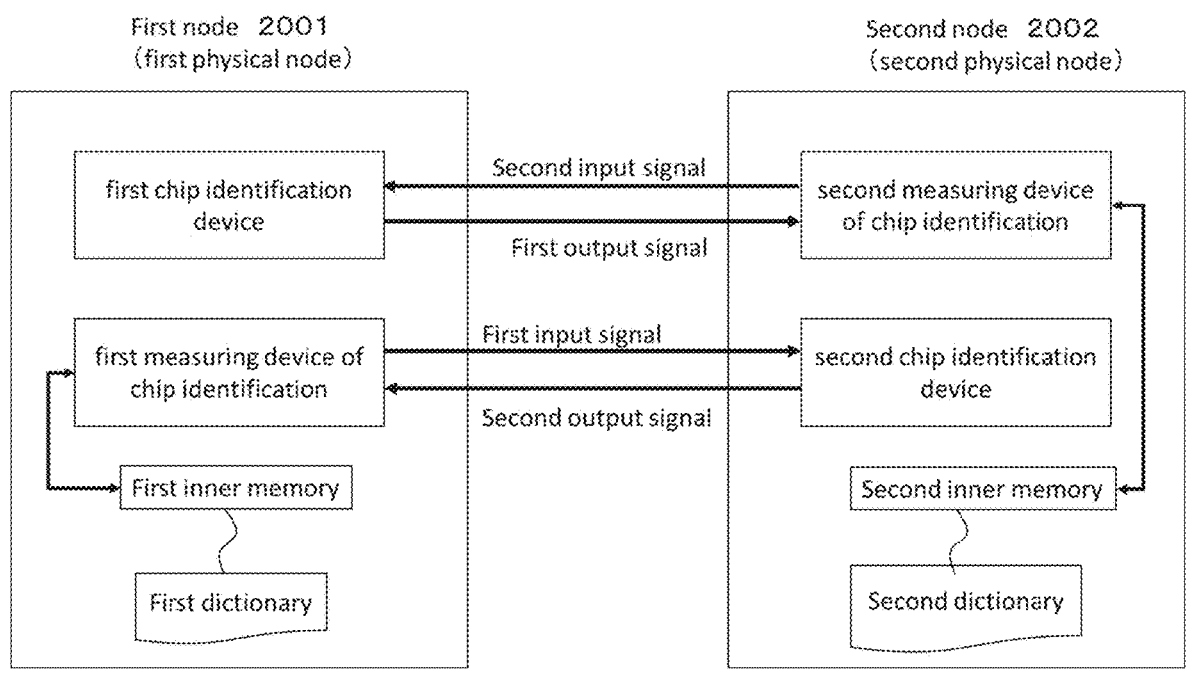
FIG. 102 is the drawing to illustrate the method to apply the chip identification (P-CID) of the present disclosure to mutual authenticate.

FIG. 102 is to illustrate a method to apply the chip identification (P-CID) of the present invention to the mutual communication. The first node 2001 and the second node 2002 are identical to those shown in FIGS. 1, 3, 5, 8, and 9. Or, the first and second chip identification devices are identical to one of those in FIGS. 89-91. Or the first and second chip identification devices are the first chip 110 shown in FIGS. 7 and 8. Or, the first and second chip identification devices are the chip 10 shown in FIG. 78 or the chip 400 shown in FIG. 79. The first and second measuring devices of chip identification are one of those shown in FIGS. 89-91. Or at least one of the first and second measuring devices of chip identification may be included in the stem node 400 shown in FIG. 10. Or at least one of the first and second measuring devices of chip identification may be included in the first to third stem nodes (1400, 2400, 3400) shown in FIG. 14. Or at least one of the first and second measuring devices of chip identification may be included in the stem node 400 shown in FIGS. 26 and 76.

Figure 19:
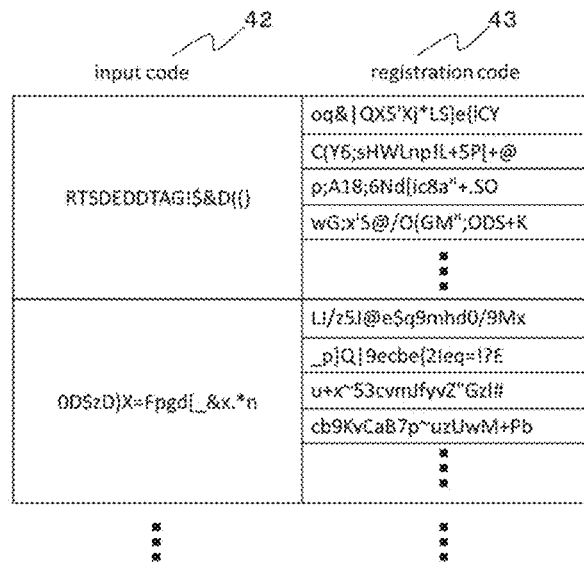
FIG. 19 is the drawing to illustrate an example of the correspondence list of input codes and registration codes.
Figure 27:
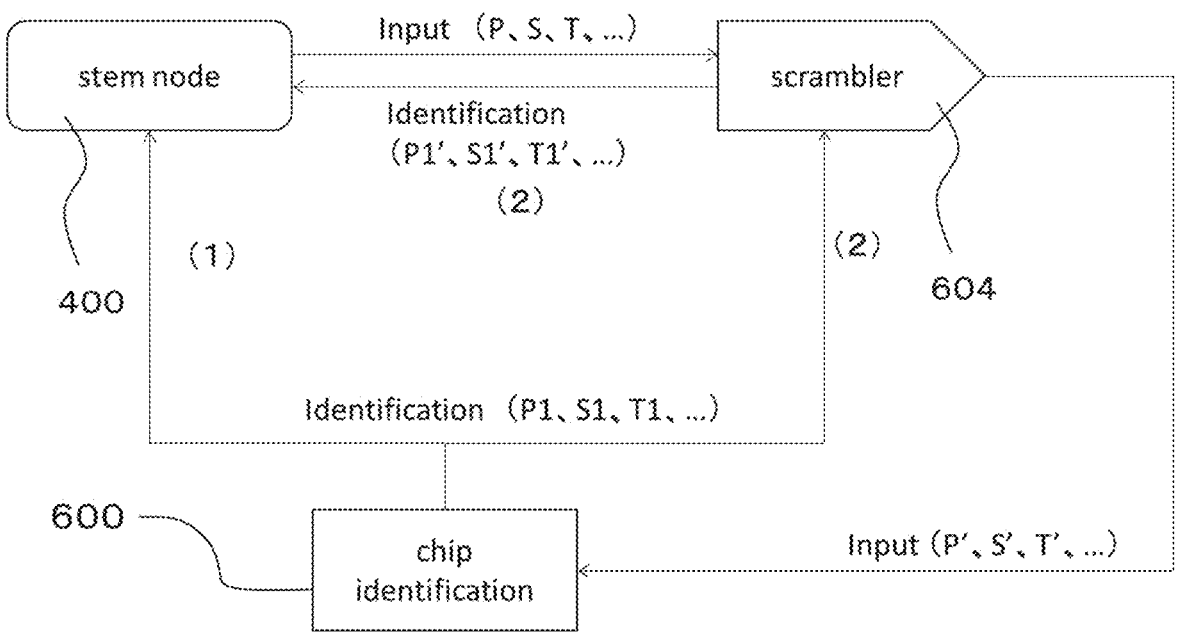
FIG. 27 is the drawing to illustrate an example of the concept of embodiment attached with a scrambler.
Figure 28:
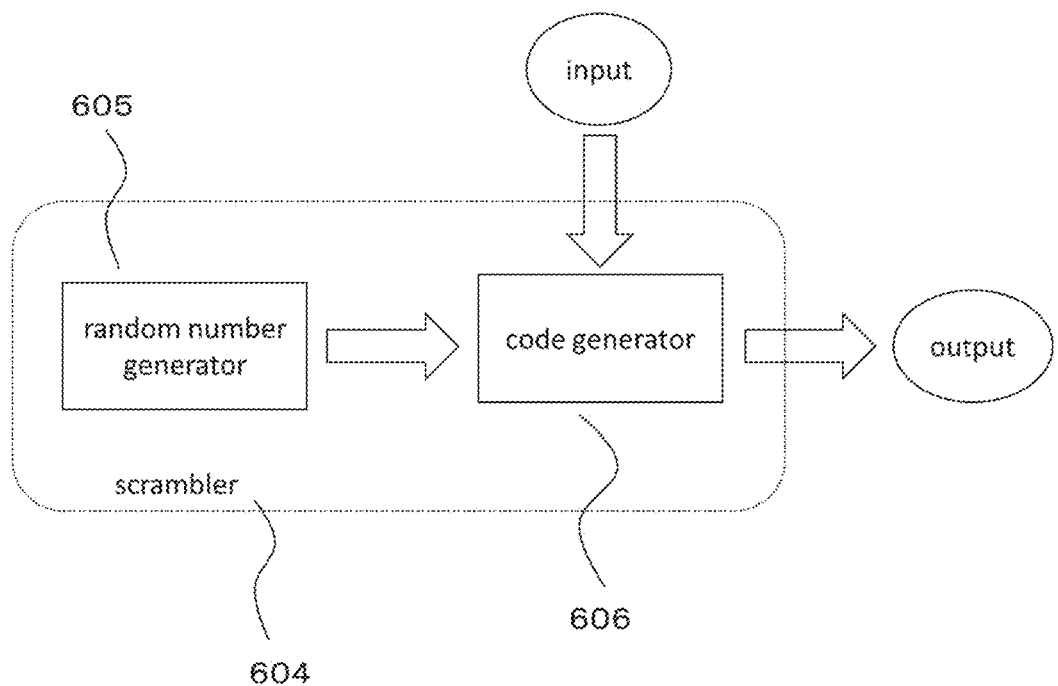
FIG. 28 is the drawing to illustrate an example of the basic configuration of scrambler.

The input signal shown in FIG. 102 includes at least special test code for extracting physical random number T and the input identification code Q as shown in FIG. 89. Or the input signal includes at least special test code for extracting physical random number T shown in FIGS. 90 and 91. Or, the input signal includes at least common passcode (P, S, T . . . ) shown in FIGS. 10 and 27. Or, the input signal includes at least common passcode 1410 shown in FIG. 11. Or the input signal includes at least first to third common passcodes (1410, 2410, and 3410) shown in FIG. 14. Or the input signal includes at least input signal Q shown in FIGS. 15 and 18. Or, the input signal includes at least an input signals C and D shown in FIG. 16. Or the input signal includes at least an input signals Q1 to Qn+1 shown in FIG. 17. Or the input signal may be regarded as identical to at least one of input codes listed up in FIG. 19. Or the input signal includes at least input code {a(i)} shown in FIGS. 24-26, 30, and 74-77. Or the input signal includes at least input code {b(i)} shown in FIGS. 24-26, and 30.

The output signal shown in FIG. 102 Ides at least one output identification code R shown in FIG. 89-91. Or the output signal includes at least identifications (P1, S1, T1 . . . ), (P2, S2, T2 . . . ), and (P3, S3, T3 . . . ) shown in FIG. 10. Or the output signal includes at least identifications (P1, S1, T1 . . . ), (P1', S1', T1' . . . ) . . . shown in FIG. 27. Or the output signal includes at least first to third identifications (4101, 4021 and 4301) shown in FIG. 12. Or the output signal includes at least first to third identifications (11, 12 and 13) shown in FIG. 14. Or the output signal includes at least output signals A or B shown in FIGS. 15 and 16. Or, the output signal includes at least output signal R shown in FIG. 18. Or the output signal may be regarded as identical to at least one of registration codes listed up in FIG. 19. Or the output signal includes at least output code {c(i,j)} shown in FIGS. 25, 26, and 30. Or, the output signal includes at least output code {c(i)} shown in FIGS. 75 and 76. Or, the output signal includes at least random number code {d(i,j)} shown in FIGS. 24-26 and 30. Or, the output signal includes at least random number code {d(i)} shown in FIGS. 75 and 76.

The first node 2001 includes the first chip identification device and the first measuring device of chip identification. The second node 2002 includes the second chip identification device and the second measuring device of chip identification. The second measuring device of chip identification inputs a second input signal to the first chip identification device. The first chip identification device returns a first output signal to the second measuring device of chip identification in response to the second input signal. The first measuring device of chip identification inputs a first input signal to the second chip identification device. The second chip identification device returns a second output signal to the first measuring device of chip identification in response to the first input signal.

The first measuring device of chip identification may be able to be included in a semiconductor chip (or chip) including the first chip identification device. However, in this event, the chip is included in the first node. Or the first measuring device of chip identification may be able to be included in a semiconductor chip (or chip) not including the first chip identification device. However, in this event, those chips including the first chip identification device and the first measuring device of chip identification are included in the first node together. Or the first chip identification device can be composed of plural semiconductor chips (or chip). Or the first measuring device of chip identification may be able to be a kind of chip set which comprises plurality of semiconductor chips (or chips). The second measuring device of chip identification may be able to be included in a semiconductor chip (or chip) including the second chip identification device. However, in this event, the chip is included in the second node. Or the second measuring device of chip identification may be able to be included in a semiconductor chip (or chip) not including the second chip identification device. However, in this event, those chips including the second chip identification device and the second measuring device of chip identification are included in the second node together. Or the second chip identification device can be composed of plural semiconductor chips (or chip). Or the second measuring device of chip identification may be able to be a kind of chip set which comprises plurality of semiconductor chips (or chips).

(The tenth embodiment) (network topology of physical nodes by mutual authentication) The first node 2001, having the first chip identification device and the first measuring device of chip identification, shown in FIG. 102, is regarded as the first physical node (IoT device). The second node 2002, having the second chip identification device and the second measuring device of chip identification, shown in FIG. 102, is regarded as the second physical node (IoT device). The said first physical node, further, includes the first inner memory. The said first measuring device of chip identification collects the authentication information of other physical nodes connecting to the network of physical nodes, writes it into the said first inner memory, and then records and stores it therein. The authentication information recorded and stored by this way is regarded as the first dictionary. Accordingly, it is unnecessary that the said first dictionary includes the authentication information of the said first physical node. The said second physical node, further, includes the second inner memory. The said second measuring device of chip identification collects the authentication information of other physical nodes connecting to the network of physical nodes, writes it into the said second inner memory, and then records and stores it therein. The authentication information recorded and stored by this way is regarded as the second dictionary. Accordingly, it is unnecessary that the said second dictionary includes the authentication information of the said second physical node. Like this, the measuring device of chip identification records (or appends) the collected authentication information in the dictionary stored in the inner memory. It is called "the registration to the dictionary". The second measuring device of chip identification sends an input signal (C2) to the first chip identification device mounted in the first chip, and then receives the response (R1). This set of (C2R) is compared with (C2R3), --- the set of input and output signals --- which have been recorded in the dictionary that is owned by the second physical node. If (C2R3) and (C2R)

are consistent, then the first physical node is authenticated as the physical node having been registered in advance. Otherwise, the first physical node is regarded as unauthenticated and then the access of the first physical node is denied, or the first physical node is to be re-registered as necessary.

Figure 103:
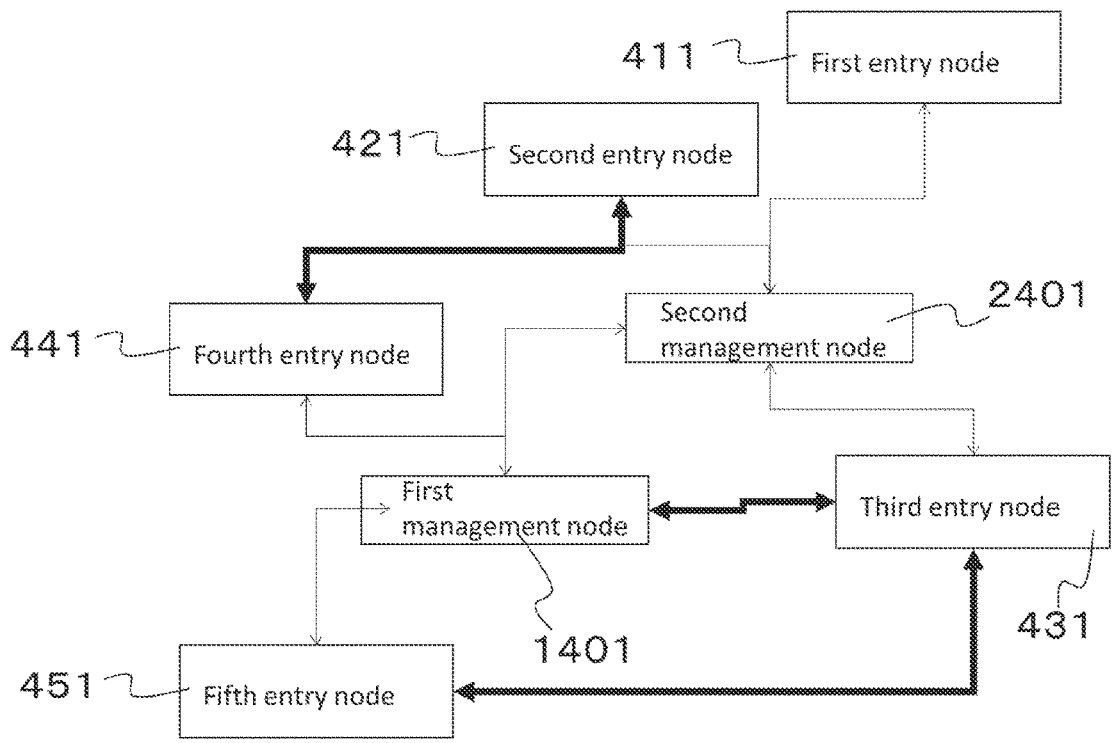
FIG. 103 is the drawing to illustrate an example of the physical network of the present invention.

It may be possible to make topology of physical network more flexible by permitting the mutual authentication of the first and second physical nodes in a similar way to the said embodiment. As an example, illustrated in FIG. 103, we consider a network comprising seven physical nodes. Those seven physical nodes are divided into five entry nodes (the first to fifth entry nodes 411-451) and the first and second management nodes (1401 and 2401). Letting the peripheral nodes and stem servers correspond to the entry ones and the management ones, respectively, it may be found that the network topology of FIG. 103 is different from that of FIG. 13. For example, in FIG. 103, the communication is approved between the second entry node 421 and the fourth entry node 441, and, between the third entry node 431 and the fifth entry node 451. By this flexibility, to be mentioned below, the central and decentralized controls of IoT devices (physical nodes) can coexist. It may be called partial central control or partial decentralized control.

To illustrate the concept of network topology of physical nodes (IoT topology) regarding the present disclosure, it may be necessary to revise the classification of nodes by using entry nodes and management nodes. All regular physical nodes connecting to a certain physical network (IoT network) is classified as management nodes and entry nodes. In this IoT topology, a management node appropriately (physically) restricts entry nodes which entry into the physical network that the management node manages. (For example, see 1401 and 2401 in FIG. 103.) The main object of the management node is to avoid the spoofing of an entry node by a forgery node. That is, the management node assures that entry nodes entering into the physical network that the management node manages are not spoofed as possible as it can. Moreover, an entry node appropriately (physically) restricts the management node of the network that the entry node should entry into. It is for suppressing the risk that the entry node is induced to connect to a wrong node and secret information and so forth is theft.

In the case that a management node monitors a communication between entry nodes, as illustrated in FIG. 103, the management node can be regarded as identical to a stem server which plays a central role in managing the physical network. However, in FIG. 103, the communication of the second and forth entry nodes is not always monitored. In this regard, the management node is not always identical to the stem server in FIG. 13.

Entry nodes are any of physical nodes that entry into the physical network without managing the physical network entirely. Entry nodes are not always identical to the peripheral nodes.

Both management node and entry node are regarded as a physical node having both a chip identification device and a measuring device of chip identification, as illustrated in FIG. 102. With this regard, the entry node has a different characteristic from the peripheral node. In other words, it may be good enough if peripheral nodes have a chip identification device and it may not matter even if peripheral nodes don't always have a measuring device of chip identification.

Both management node and entry node have an inner memory (or built-in memory). The set of input-output—the set of challenge C corresponding to input code (402, 42) and response R corresponding to output code (403, 43) in FIGS. 10 and 19—can be defined and then recorded (or registered) to dictionary stored in the said inner memory. Accordingly, the set of CR is not only one. Plural sets of CR can be stored in an inner memory, and in each set, C and R are respectively corresponded. The method that C and R correspond each other, as an example, may be like the set of input code 42 (C) and registration code 43 (R) in FIG. 19. To illustrate further concretely, "RTSDEDDTAG!$&D(( )" and "C(Y6; sHWLnp!L+5P[+@" turns out a set (CR1). "RTSDEDDTAG!$&D(( )" and "wG;x'5@/O(GM";ODS+K" turns out another set (CR2). "0D$zD)X=Fpgd[_&x.*n" and "_p]Q|9ecbe{2Ieq=!?E" turns out further another set (CR3). Of course, any two of CR1, CR2 and CR3 must be distinguishable. The set of such (CR)s may be denoted by {CR} and then called "dictionary". One of important roles of the measuring device of chip identification is to collect (CR)s from a closed physical network, to record it in the said inner memory, and to form, store and edit as necessary the dictionary {CR}.

(Entry node) One of characteristics of entry nodes, which is different from that of peripheral nodes, is able to store a set of challenge C and response R of a physical node other than itself into the inner memory (or storage) of itself. Since there are plural sets of CR like this, the set {CR} having been collected under certain conditions can be regarded as a kind of dictionary of physical network. Like this, the dictionary held by an entry node may be called "local dictionary". However, it may be unnecessary for a local dictionary to cover the entire of the physical nodes on the physical network that the entry node having the said local dictionary entries into. Because an entry node is not required to manage the whole of the physical network to which the said entry node entries. Furthermore, an entry node may not have CR regarding itself (the said entry node). An entry node uses a network service holding a service basepoint on the network which the said entry node entries into. The entry node is interested only in verifying truth or falsehood of the said service basepoint. The entry node is, for example, the second node 2002 (or the second physical node 2002) in FIG. 102. The service basepoint is, for example, the first node 2001 (or the first physical node 2001) in FIG. 102. The second physical node holds a local dictionary {CR} in its inner memory. The second measuring device of chip identification, mounted in the second physical node, may choose an input C corresponding to the first physical node (service basepoint) among the challenges in the local dictionary {CR} stored in the said inner memory, and may then input it into the first physical node (service basepoint) as the second input signal. The first chip identification device, mounted in the first physical node, may receive the second input signal C, generate output signal R using a random number which is specific to a chip mounted in the first physical node, and then return it to the second measuring device of chip identification, mounted in the second physical node, as the first output signal. The second physical node may compare the output signal R that the said second measuring device of chip identification has received and the R corresponding to the said input signal C among the local dictionary {CR} stored in the said inner memory. If the compared two Rs are inconsistent, then the first physical node is judged as false. If they are consistent, the second physical node may choose another second input signal by further using the said second measuring device of chip identification so that similar inspections may be iterated plural times, or the first physical node can be judged as true.

Entry node does not store the set of CR regarding the said entry node. Because, if it is stored, then the entry node may be able to return R corresponding to the input C without using the chip identification device. In other words, a wrong (fake) node has to include the CR regarding the node that it spoofs in the local dictionary of it. A regular (authorized) node does not need to store the CR regarding the said regular node in the local dictionary of it, because it may generate R from input C by using the chip identification device of it. It may enable the auto detection of a wrong (fake) node by using this characteristic. For example, when the first physical node reads the local dictionary {CR} of the second physical node (entry node), it may be checked if the set of CR stored in the first physical node and regarding the second physical node is included in this local dictionary {CR} of the second physical node. If it is included, the second physical node may be judged as a wrong (fake) node. A concrete example of the auto detection of a wrong (fake) node is, for example, illustrated in FIGS. 20 and 21, but not limited to these.

(Management Node) A management node may record the set (CR) of input C and output R of all entry nodes that entry into a physical network that the said management node manages in the inner memory of it. The collected sets of CR of all entry nodes that entry into a physical network that the said management node manages may be called "global dictionary". However, the CR of a management node may not be included in the global dictionary that this management node holds.

An entry node, the CR of which is not registered in the "global dictionary" recorded in the inner memory of the management node may be detected by the auto detection and thus automatically excluded from the physical network that the said management node manages. By this way, a physical network comprising the said management node and only the physical nodes registered in the global dictionary, may be called "closed physical network". Any physical nodes but the said management node, which are not registered in the global dictionary, cannot entry into this closed physical network. Thus, the management node is able to appropriately (physically) limit the entry nodes that can entry to the physical network that this management node manages.

To register an entry node to a closed physical network, it may be necessary to register the CR regarding the entry node into the global dictionary. The management node may decide the C to be input to an entry node to be registered. The R may be defined by a set of random number specific to the chip mounted in the entry node to be registered and the said C.

(Registration Method) Here, by using an example of FIG. 102, we illustrate the method that the second physical node stores (registers) the set of CR regarding the first physical node to the inner memory of the second physical node and thus a local dictionary is made in the second physical node. However, in this illustration of the registration method, the first physical node may be either of a management node or an entry node. Similarly, the second physical node may be either of a management node or an entry node.

First, the second node 2002 (the second physical node) passes an input C to the first node 2001 (the first physical node). This input C may correspond to the second input signal and may be defined by the second physical node using an arbitral method or a predetermined method. The first chip identification device, mounted in the first physical node, receives this input C, and then generates the output R using the input C and a random number specific to a chip composing the first chip identification device. That is, this output R may correspond to the first output signal and can be defined using a predetermined method from a random number specific to a chip mounted in the first physical node and the said input C defined by the second physical node. The first chip identification device may return this output R to the second measuring device of chip identification, mounted in the second physical node. By this way, the second physical node stores the set CR of this input C and output R in the inner memory of the second physical node. It may be able to perform this operation on one of the first physical nodes plural times. Or it may be able to perform this operation on plural first physical nodes plural times. By this way, plural sets of (CR), named, {CR} may be stored in the inner memory of the second physical node.

If the second physical node is an entry node, then this {CR} may be a local dictionary. If the second physical node is a management node, then this {CR} may be called a global dictionary. Neither global dictionary nor local one includes CR of the second physical node (i.e., the physical node holding that dictionary). Because it may be impossible for the second physical node to determine the CR corresponding to the second physical node, since a physical node other than the second physical node determines the Iut (C) corresponding to the second physical node.

For example, the said random number specific to a chip may be retrieved from the distribution of failure bits in the memory cell array mounted in the said first chip identification device. Or, as illustrated in FIG. 22, the said random number may be retrieved from the array of identification cells (e.g., FIGS. 23, 24, 29, 69, 72, 74, 77 and so forth), mounted in the said first chip identification device, by using the above-mentioned method (FIGS. 34-37, 70, 71 and so forth). Examples of the said identification cells may be illustrated in FIGS. 33, 38-68, 92-101 and so forth. Or the said random number can be retrieved by using a different method which is not described here. For example, the said predetermined method to determine the said output R from the set of the random number specific to the chip mounted in the first physical node and the said input C may be illustrated by using FIGS. 24-32 or FIGS. 72-79. Or the said output R may be determined by using a different method which has not been described here.

Besides, the number of management nodes is not only one in a closed physical network. It may be able for plural management nodes to manage entry nodes which entry into a closed physical node. In this event, two arbitral management nodes may manage the same one closed physical network. The whole of entry nodes that entry into the said closed physical network may be under the control of these two management nodes. Or either of these two management nodes may be able to manage the other. Or even though one of the management nodes malfunctions due to some cause, the other may be able to manage the physical network.

Peripheral nodes hold neither global dictionary nor local dictionary. Entry nodes and management nodes are a kind of stem nodes. Neither global dictionary nor local dictionary can be defined only with the input codes 402 and the registration codes 403 in FIG. 10. The global dictionary is an ensemble {CR} stored in the inner memory of the said management node and comprising plural sets of CR regarding all physical nodes but the said management node, which nodes entry into the physical network (closed physical network) under the control of the said management node. The local dictionary is an ensemble {CR} stored in the inner memory of an entry node entering into a closed physical network and comprising plural sets of CR regarding other physical nodes entering into the same closed physical network. The local dictionary may not need to cover the entire of the said closed physical network. However, both global dictionary and local dictionary may be required not to include CR of themselves. The local dictionary and global dictionary may be generically named just "dictionary".

(Inner Memory) One of basic properties that the inner memory is required to satisfy is that the inner memory is able to be read from the external. Copying doesn't matter. In effect, both global dictionary and local dictionary are public. However, it may be preferable that both global dictionary and local dictionary are non-editable from the external. Accordingly, it may be preferable that the inner memory is a one-time programmable memory (OTP).

Or it may be preferable to protect the dictionary—both global dictionary and local dictionary—by using another strong method. In this event, a hash value and electronic signature, which relate to the dictionary (either global or local dictionary) of a certain physical node, cannot be edited without using a secret key that is physically linked to the said physical node. Next, a block hash, which includes the up to date of the dictionary of the physical node, may be generated. Subsequently, this block hash may be shared with plural individual physical nodes. Finally, in order to illegally alter a dictionary of one of physical nodes, it may be required to deceive all physical nodes that shares the up to date of block hash relating to the dictionaries. This is different from the conventional blockchains and generates the blockchain of dictionaries.

Figure 104:
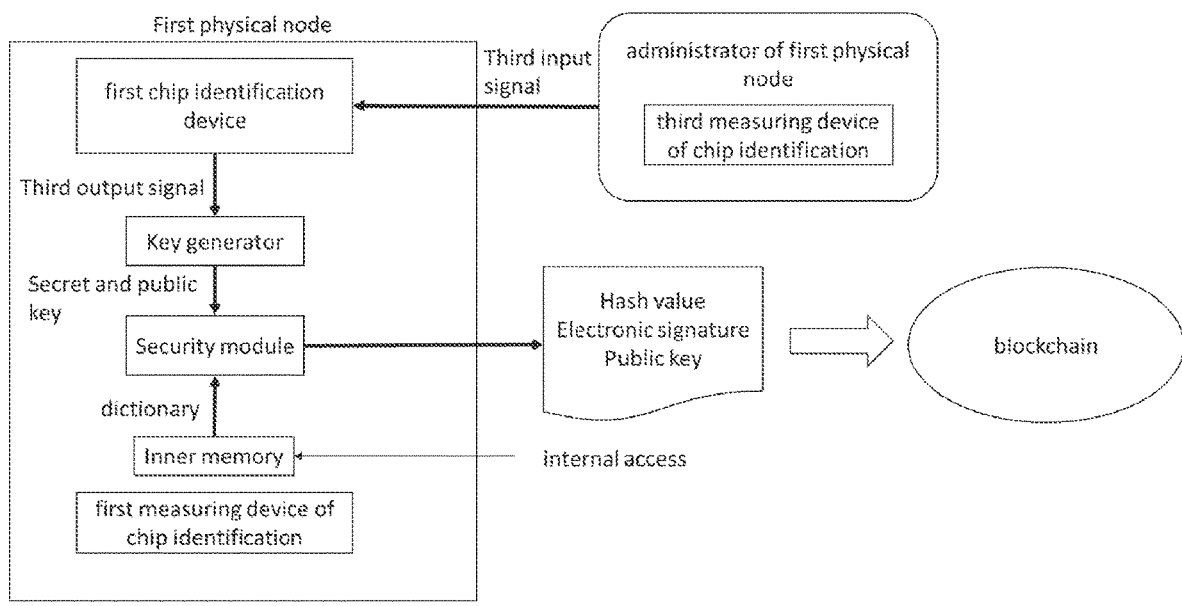
FIG. 104 is the drawing to illustrate an example of the method to realize the physical network of the present invention.
Figure 105:
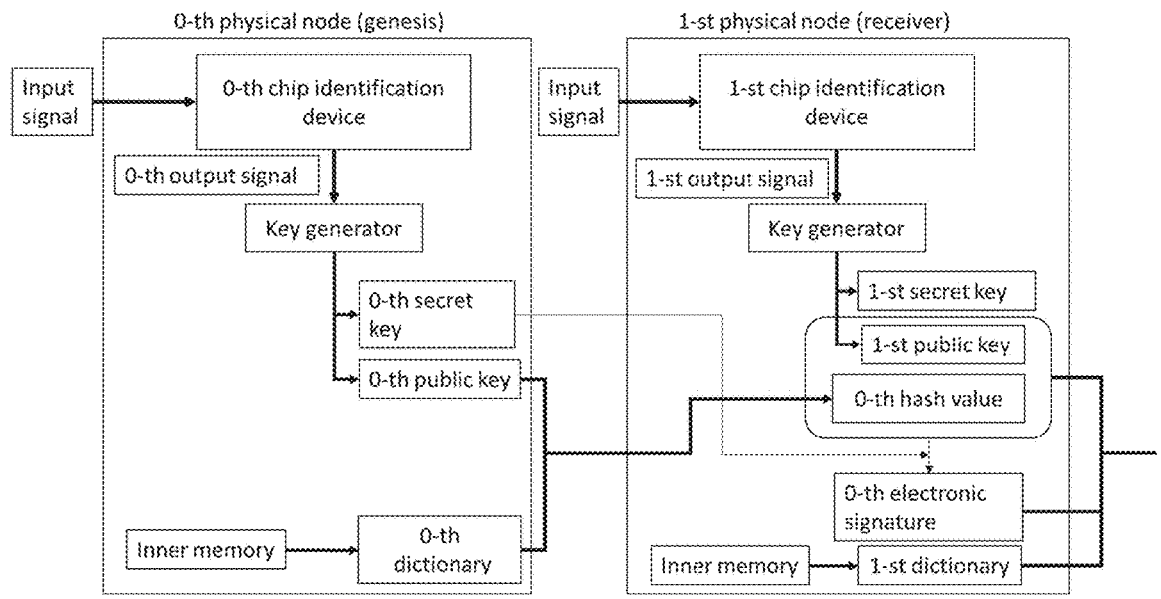
FIG. 105 is the drawing to illustrate an example of the method to realize the physical network of the present invention.

For this aim, it is preferable to adopt the chip identification device of the present invention. For example, as illustrated in FIG. 104, an administrator of the first physical node (the below-mentioned security node as an example) sends the third input signal to the first chip identification device by using the third measuring device of chip identification etc. The first chip identification device generates the third output signal using the third input signal and a specific physical randomness (specific random number) which is included in the first physical node. This third output signal is forwarded to a key generator. The said key generator generates a secret key and a public key according to a predetermined key generation algorithm. The said secret and public keys are passed to the security module that controls the encryption. Though not especially illustrated by drawings since it is self-evident, the said security module and the said key generator can be included in the security chip in FIG. 111. By this way, the said security chip can generate a hash value, can generate an electronic signature by using a secret key, and further can have a memory to store the security state having been generated inside. By using this security chip, the dictionary (global or local dictionary), stored in the inner memory of the first physical node, can be read, and then the hash value and the electronic signature, which relates to the said dictionary, can be generated according to a predetermined algorithm. It is preferable for the first physical node to adopt the said electronic signature, the said hash value, and the said public key in a network wherein a blockchain is used. Most noted here is that an electronic signature relating to the sharing of dictionary can be generated by using a secret key having been generated using the output from the first chip identification device.

FIGS. 105-110 are the drawings to illustrate an example of the said predetermined algorithm. The zero-th physical node is set as the genesis to form the said block hash. However, the zero-th physical node holds at least the zero-th chip identification device, the key generator, and the inner memory that stores the zero-th dictionary (global or local dictionary). Though not especially illustrated by drawings, the zero-th physical node can hold the zero-th measuring device of chip identification.

First, in some way, an input signal is input to this zero-th physical node. By using the zero-th chip identification device, the zero-th physical node receives the said input signal and then generates the zero-th output signal from the said input signal and a physical randomness which is specific to a chip mounted in the zero-th physical node (specific random number). This zero-th output signal is transferred to the key generator. The said key generator generates the zero-th secret key and the zero-th public key by using this zero-th output signal as the input to the key generator according to a predetermined algorithm. The zero-th public key and the zero-th dictionary are combined to generate the zero-th hash value by using a suitable hash function (SHA-256 and so forth as an example). Next, the zero-th physical node encrypts the zero-th hash value and the public key of the first physical node that is the receiver (the first public key) by using the zero-th secret key, and then generates the zero-th electronic signature. Finally, the zero-th physical node sends the zeroth-th hash value and the zero-th electronic signature to the first physical node that is the receiver. The first physical node can perform a similar manipulation for the second physical node. However, there is only one difference that, to generate the first hash value, the zero-th electronic signature and the zero-th hash value as well as the first public key and the first dictionary are combined. This is because the zero-th physical node is the genesis and, therefore, does not hold the received hash value and the received electronic signature.

Figure 106:
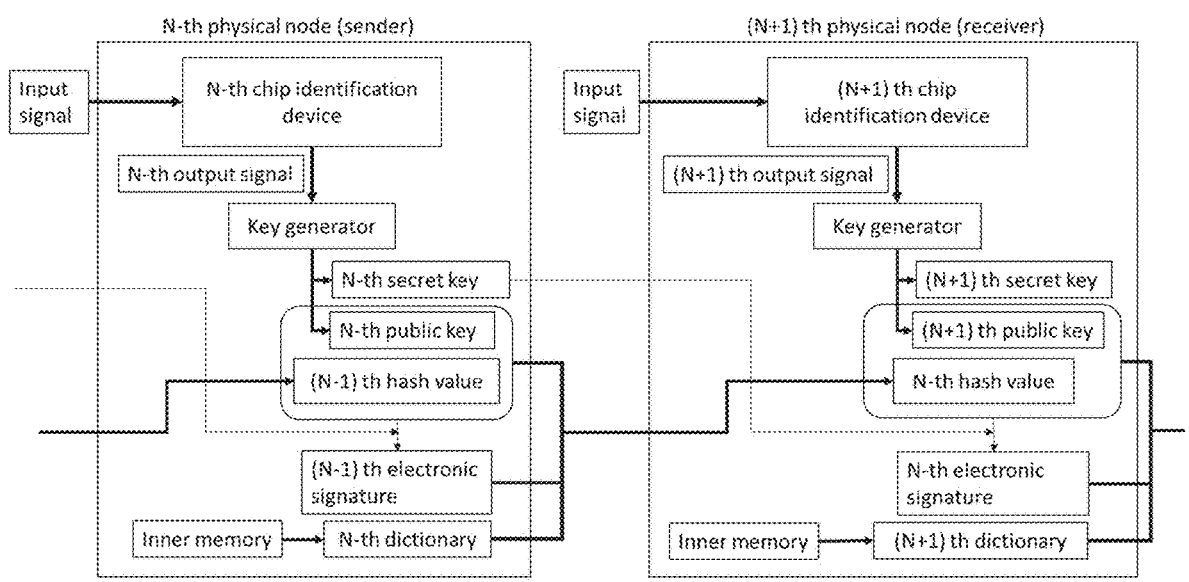
FIG. 106 is the drawing to illustrate an example of the method to realize the physical network of the present invention.

In FIG. 106, an example of transferring from the N-th physical node (sender) to the (N+1)-th physical node (receiver).

Figure 107:
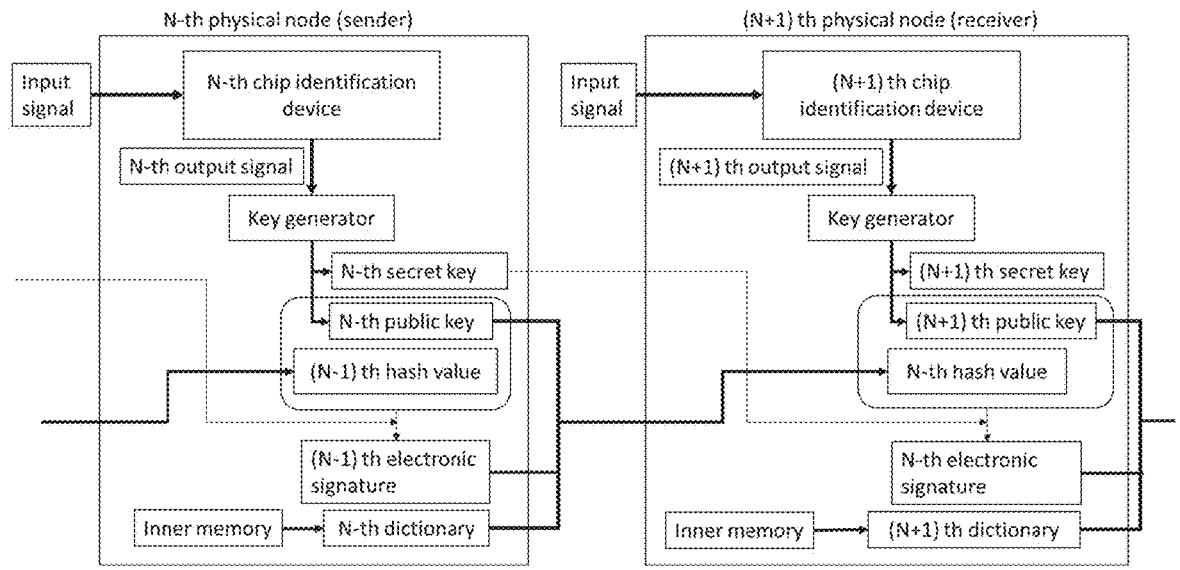
FIG. 107 is the drawing to illustrate an example of the method to realize the physical network of the present invention.
Figure 108:
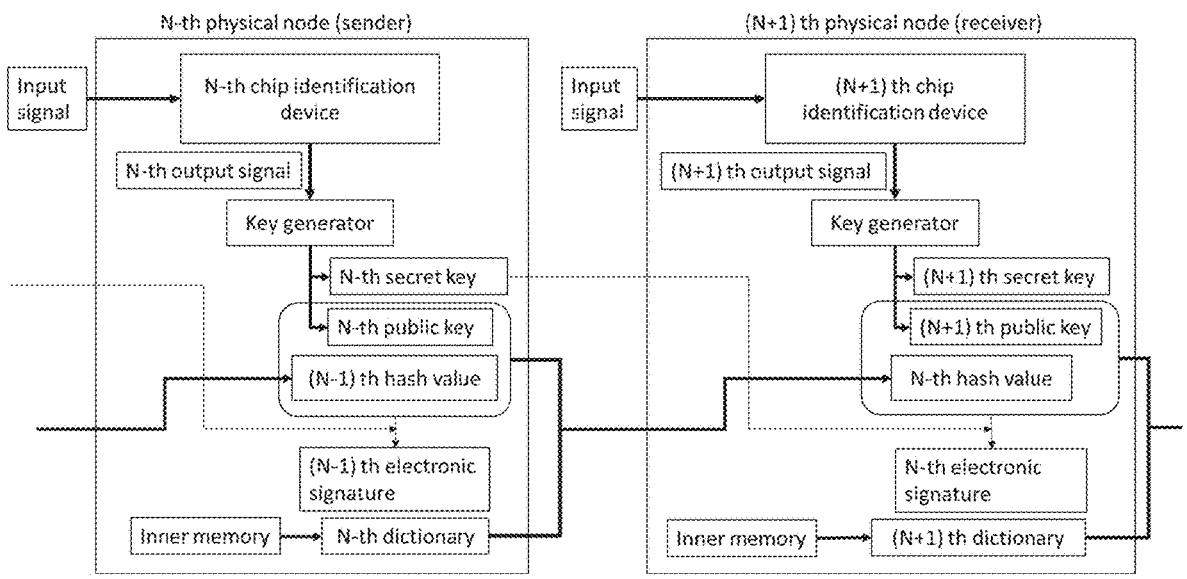
FIG. 108 is the drawing to illustrate an example of the method to realize the physical network of the present invention.
Figure 109:
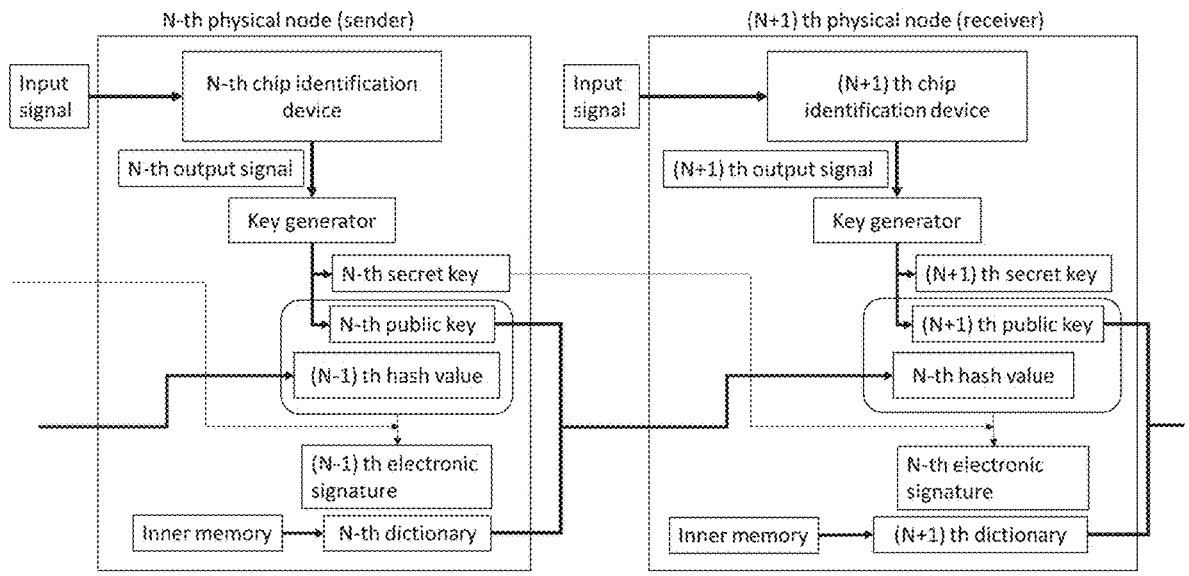
FIG. 109 is the drawing to illustrate an example of the method to realize the physical network of the present invention.

First, in some way, input signals are input to these N-th and (N+1)-th physical nodes. These two input signals may be the same or different. Both are approval. The N-th physical node receives (one of) the said input signal(s) by using the N-th chip identification device, and then generates the N-th output signal using and a physical randomness specific to a chip mounted in the N-th physical node (specific random number). This N-th output signal is forwarded to the key generator. The said key generator generates the N-th secret key and the N-th public key by using this N-th output signal as the input to the said key generator according to a predetermined algorithm. The N-th public key, the N-th dictionary, the (N−1)-th electronic signature and the (N−1)-th hash value are combined to generate the N-th hash value by using a suitable hash function (SHA-256 and so forth as an example). Next, the N-th physical node generates the N-th electronic signature by encrypting the N-th hash value and the public key of the (N+1)-th physical node (receiver), named, the (N+1)-th public key, using the N-th secret key. Finally, the N-th physical node sends the N-th hash value and the N-th electronic signature to the (N+1)-th physical node that is the receiver. The (N+1)-th physical node can perform a similar manipulation for the (N+2)-th physical node. However, N is a natural number with the maximum being L. Though not especially illustrated by drawings, furthermore, the N-th physical node can hold the N-th measuring device of chip identification. Moreover, it may be approved to omit either the (N−1)-th electronic signature or the (N−1)-th hash value in order to generate the N-th hash value. The characteristic of the present invention is to hash somewhat including at least the N-th dictionary to generate the N-th hash value. It is different from the conventional blockchain because it is approved to omit either the (N−1)-th hash value or the (N−1)-th electronic signature to generate the N-th hash value. This is because the subject of the present invention is not the transfer of crypt currency regarded as a hash value and linked to a public key, but the configuration of the blockchain of dictionary. FIG. 107 is a drawing to illustrate an example of generating the N-th hash value while omitting the (N−1)-th hash value. FIG. 108 is a drawing to illustrate an example of generating the N-th hash value while omitting the (N−1)-th electronic signature. FIG. 109 is a drawing to illustrate an example of generating the N-th hash value while omitting the (N−1)-th electronic signature and the (N−1)-th hash value.

It is dependent on the system design when the generation and transfer of the above-mentioned hash value and electronic signature is performed. As an example, it may be preferable that, when the N-th dictionary is updated, the N-th physical node generates the N-th hash value and the N-th electronic signature and then sends those to an arbitrarily chosen (N+1)-th node.

Figure 110:
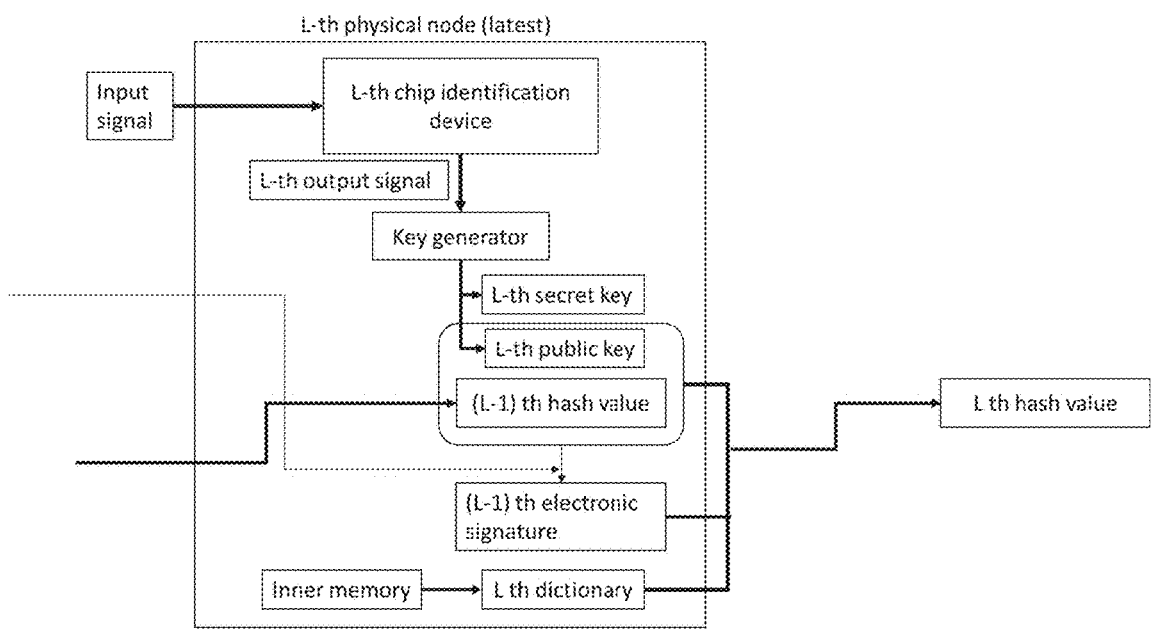
FIG. 110 is the drawing to illustrate an example of the method to realize the physical network of the present invention.

Anyway, when N arrived at the maximum, L, the transferring process results in illustrated in FIG. 110, where the L-th physical node is the final arrival location (latest) of such serial transfers. Accordingly, the L-th hash value includes the latest information of the serial dictionaries inside. This L-th hash value can be regarded as the representative code of the serial transaction records, named "Root of Merkel". Then, it may be preferable to generate a block hash and blockchain from this root of Merkle according to the algorithm of the conventional blockchain.

In the predetermined algorithm used to generate a public key and a secret key, for example, a certain integer may be added to the N-th output signal and then it may check if the sum of them turns out being a prime number. This procedure may be repeated until the sum becomes a prime number (p). Next, a certain integer may be subtracted from the N-th output signal and then it may check if the subtraction difference turns out being another prime number. This procedure may be repeated until the said subtraction difference becomes another prime number (q). Thus, it may be preferable to multiply these two prime numbers (to obtain pq). Then, it may be preferable to generate a secret key and a public key by using these prime numbers (p and q) according to the RSA method.

As an example, it may be preferable that the measuring device of chip identification of the management node gives input signals in FIGS. 105-110 as an input from the external. Or it may be approved to let the said input signals be a security parameter that the below-mentioned security node (See FIG. 111) gives. Anyway, the hash module in FIG. 111 can be included in the security module in FIG. 104. Further, the said security module may be used to generate the hash values in FIGS. 105-110. Like this, one module can be used for plural functions. This may be a significant advantage to suppress the product cost increase by implementing the security module. Or, as explained in the fourth embodiment, the input code that is input from the external to a peripheral node to generate P-CID (set of input-output) can be used as the input signals in FIGS. 105-110.

(Security state) The input signal to be input to the said chip identification device is especially called "challenge" C. The output signal that the said chip identification device generates in response to this challenge C is especially called "response" R. As having been mentioned above, the set of C and R (CR) can be determined dependently on a physical randomness specific to a chip composing a chip identification device (specific random number). This CR can change in response to the security state as well as it is dependent on the physical randomness specific to the chip.

Figure 30:
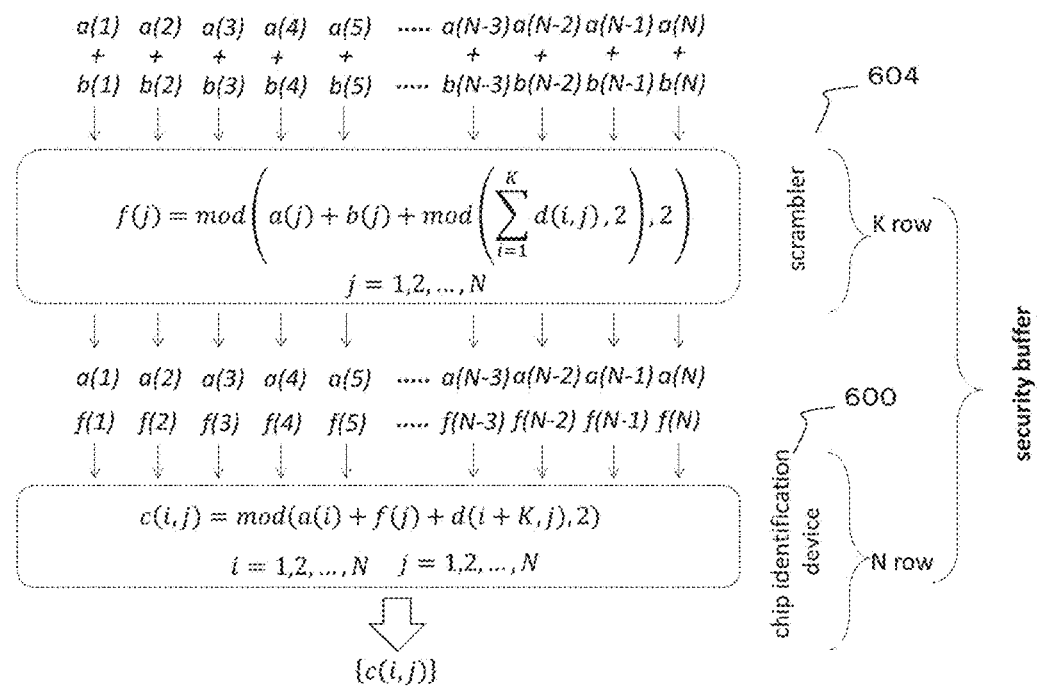
FIG. 30 is the drawing to illustrate an example of the operation mechanism of scrambler and chip identification device.
Figure 31:
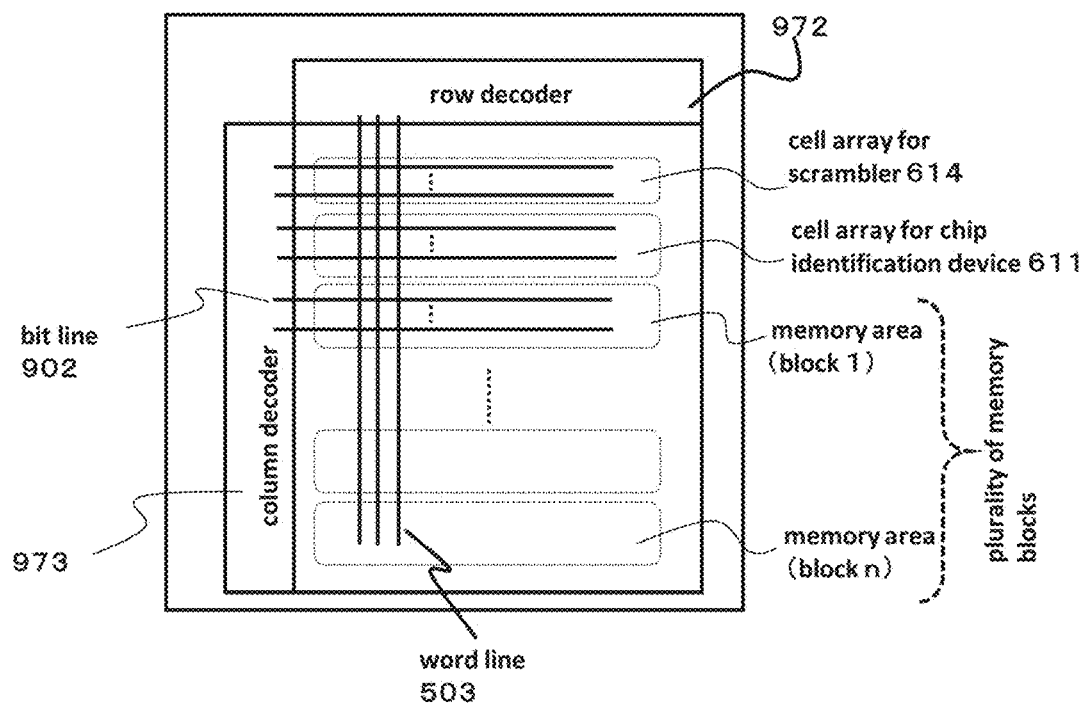
FIG. 31 is the drawing to illustrate an example of block array structure.
Figure 32:
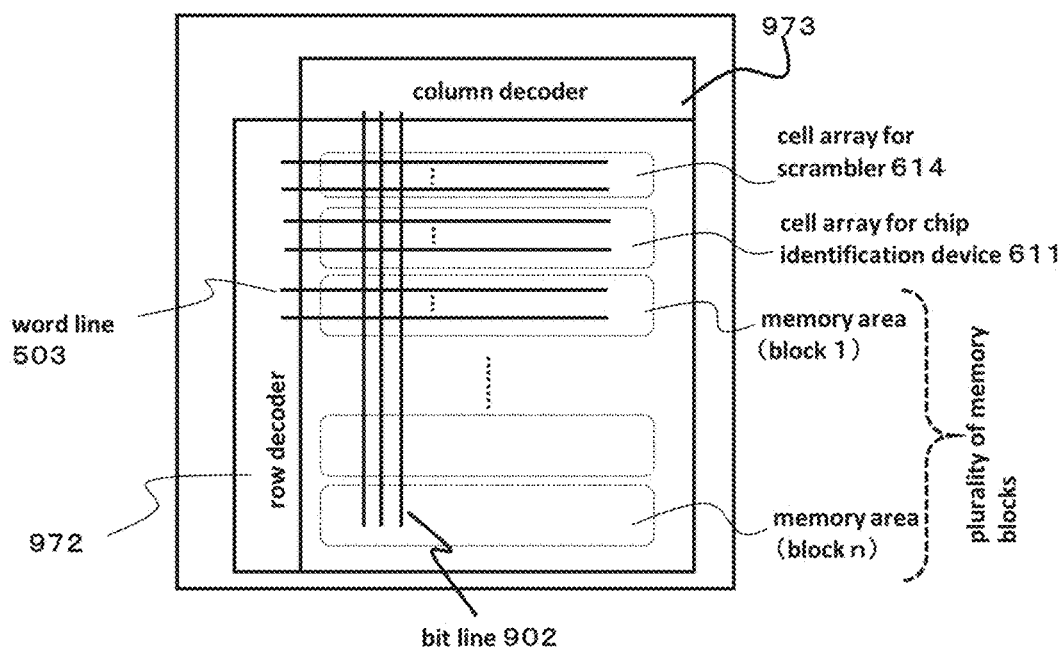
FIG. 32 is the drawing to illustrate an example of block array structure.
Figure 75:
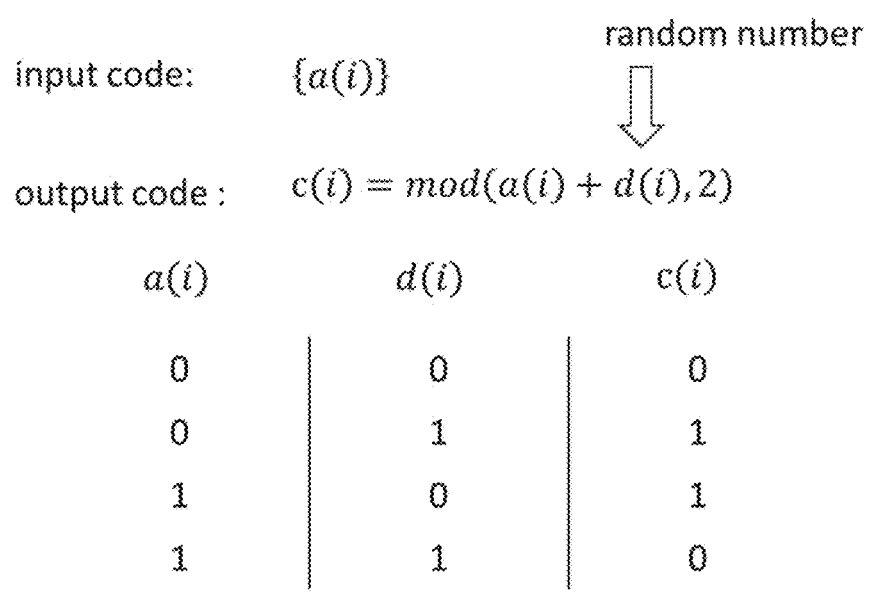
FIG. 75 is the drawing to illustrate an example of a relationship of input code, output code, and random number.

An example of the specific random numbers is, for example, illustrated as checkerboard patterns in FIGS. 22 and 26, d (i, j) in FIGS. 25, 26, and 30, an example of data in FIG. 35, random pattern of horizontal lines in FIGS. 73 and 76, d (i) in FIGS. 75 and 76, and so forth.

When a certain physical node is registered to a local or global dictionary (just say "dictionary"), the response R in response to the challenge C input to the said physical node may change dependent on the security state |Qj> of the physical node that is to be registered. For example, it may be written like C|Q1>=R1|Q1>, C|Q2>=R2|Q2>, . . . C|Qn>=Rn|Qn>, and so forth, where the suffix j to the state |Q> is an integer ranging from 1 to n.

The security state may be determined by the combination of a security parameter to be passed to each physical node and a randomness specific to a chip mounted in each physical node. The security parameter may be passed to each physical node by a management node. The management node to pass a security parameter to each physical node may be especially called the security node. Or it may be approved that an entry node to be assigned separately plays a role of a security node if it is unnecessary for the security node to hold a global dictionary. It may be approved that there are plural security nodes in one closed network.

The security node can alter the security state of each physical node by updating a security parameter and then passing it to each physical node. The security node can perform the update of the security state like this anytime. In one closed network, both local and global dictionaries may be updated every time that the security state is updated.

Figure 77:
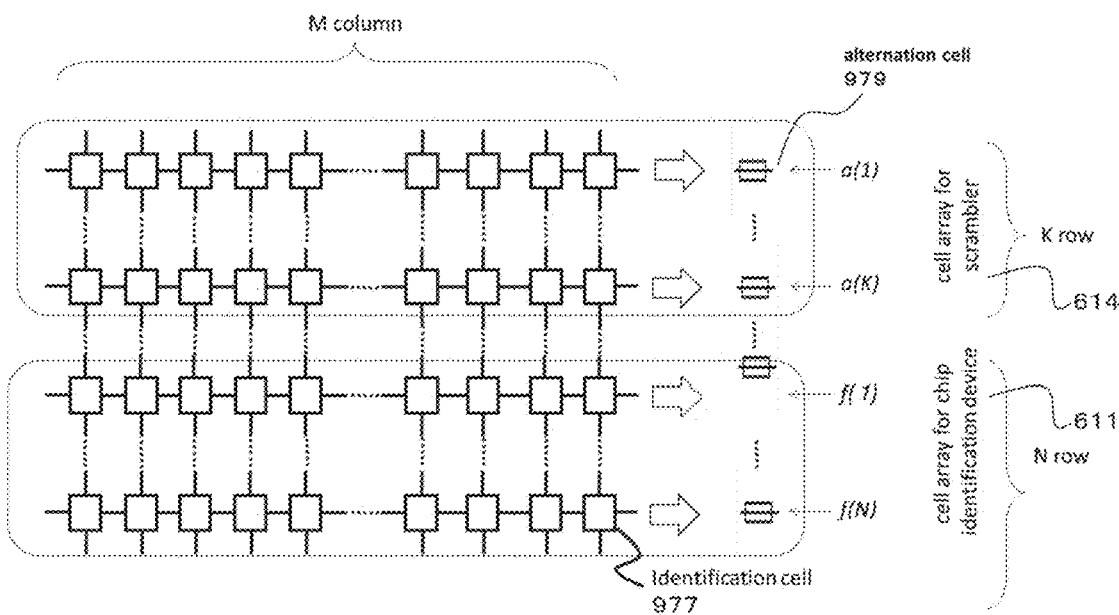
FIG. 77 is the drawing to illustrate an example of cell array including both scrambler and chip identification device.

The first example of implementation of the security parameter has been illustrated. For example, it may be a set of two integers (N, K) to divide a cell array in FIGS. 23 and 74 into the cell array for scrambler 614 and the cell array for chip identification device 611, as illustrated in FIGS. 29 and 77. However, K is a row number to be allocated to the cell array for scrambler 614 and N is a row number to be allocated to the cell array for chip identification device 611.

Figure 111:
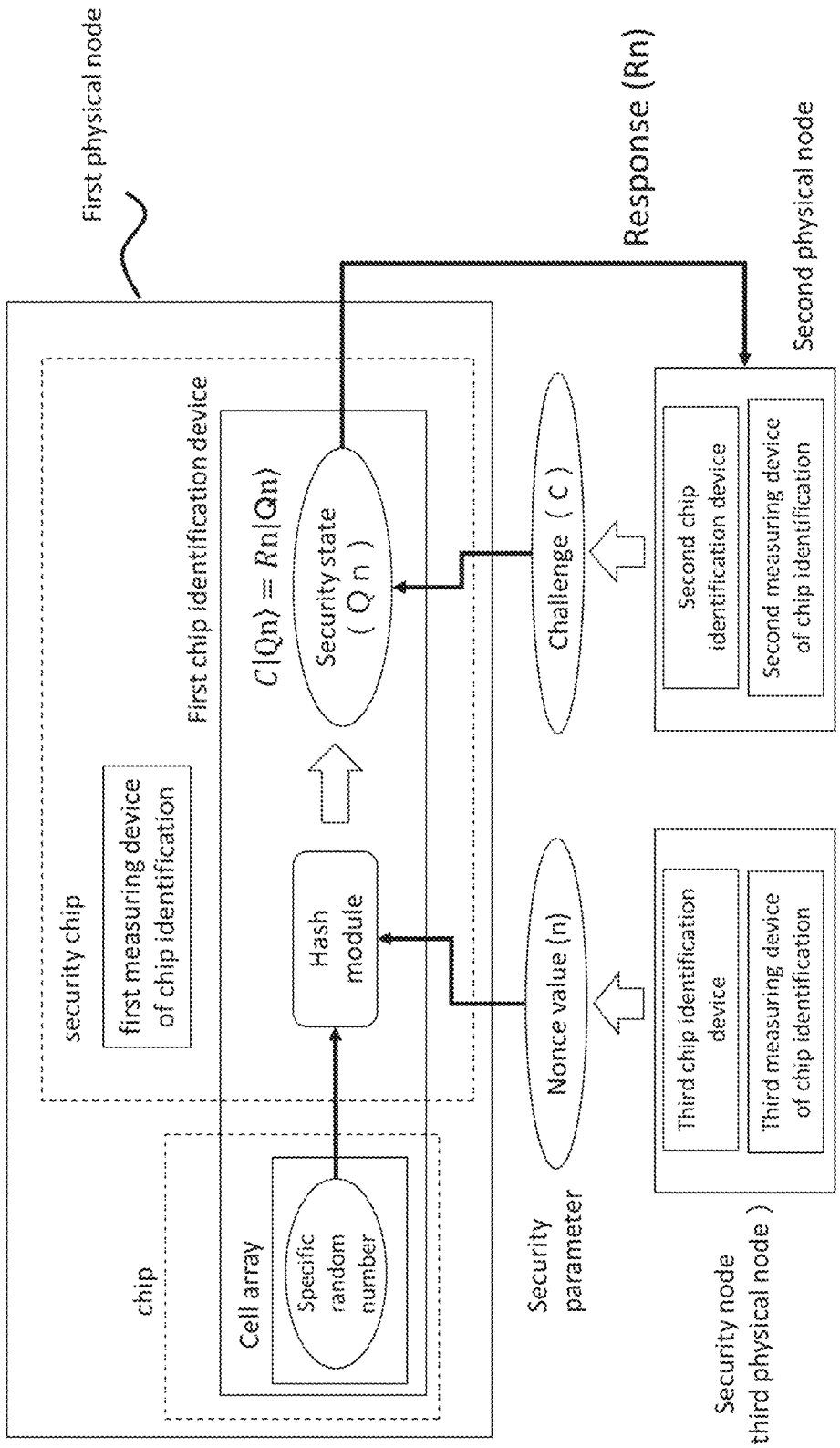
FIG. 111 is the drawing to illustrate an example of the function of the security node of the present invention.

FIG. 111 is a drawing to illustrate the concept of the second example to implement the security parameter. The first physical node may hold at least one chip. This chip may hold at least a cell array for identification cells (or just say a cell array) and may generate a random number from physical randomness specific to the said cell array (specific random number).

Figure 61:
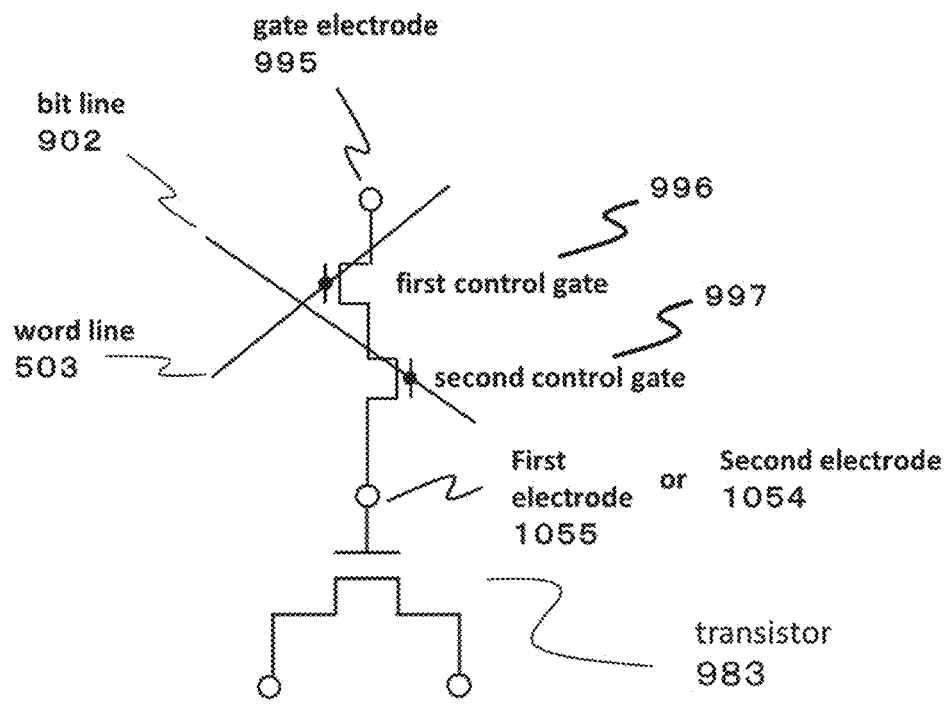
FIG. 61 is the drawing to illustrate an example of identification device (field-effect transistor).
Figure 62:
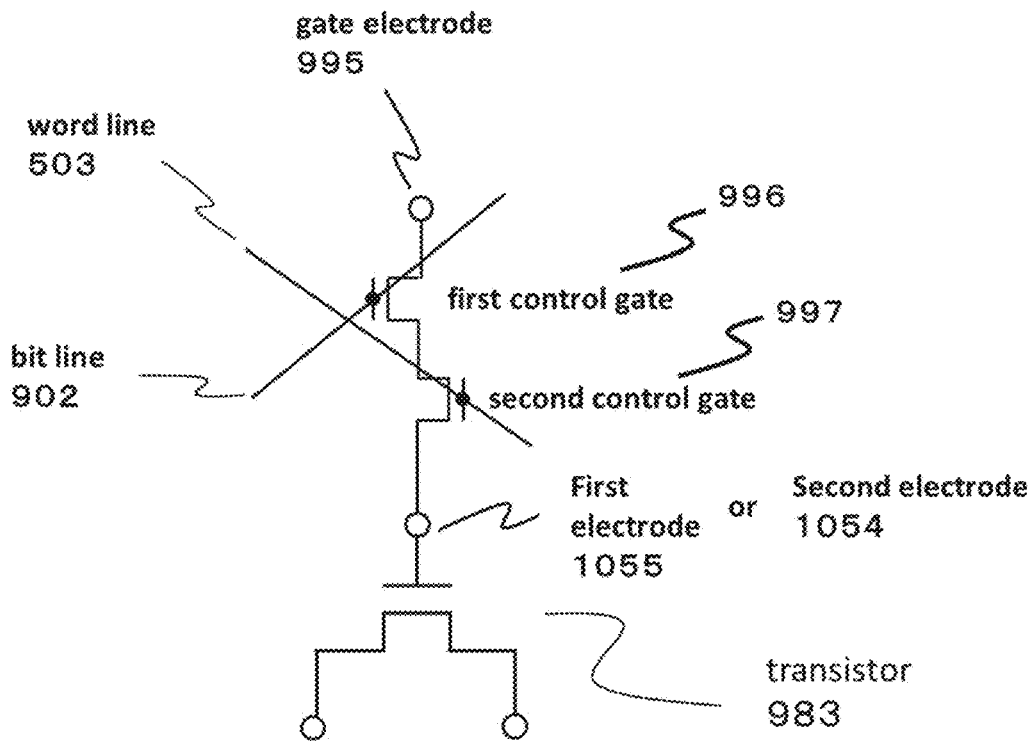
FIG. 62 is the drawing to illustrate an example of identification device (field-effect transistor).
Figure 63:
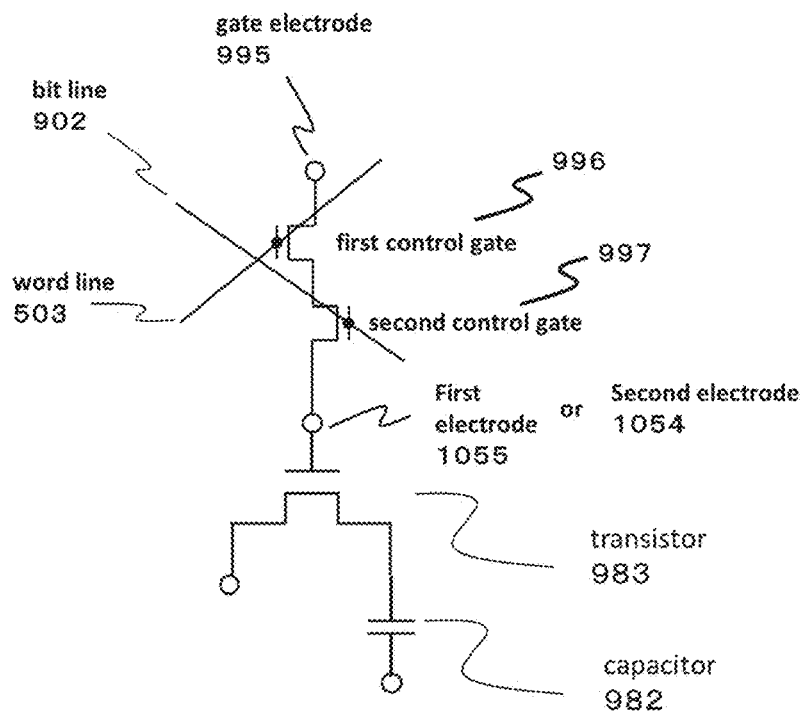
FIG. 63 is the drawing to illustrate an example of identification device (DRAM).
Figure 64:
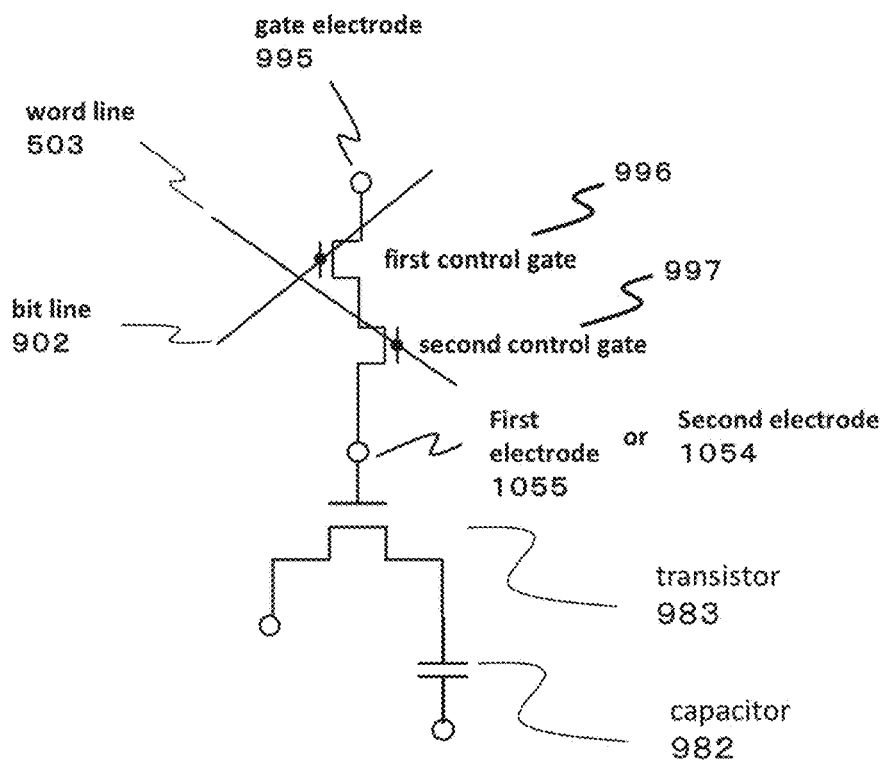
FIG. 64 is the drawing to illustrate an example of identification device (DRAM).
Figure 65:
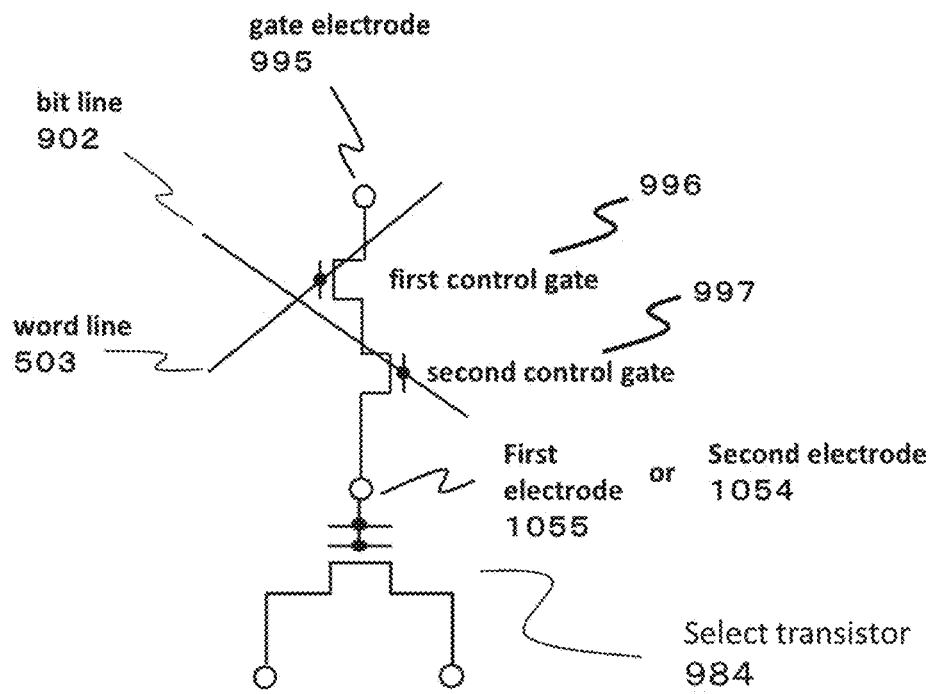
FIG. 65 is the drawing to illustrate an example of identification device (select transistor).
Figure 66:
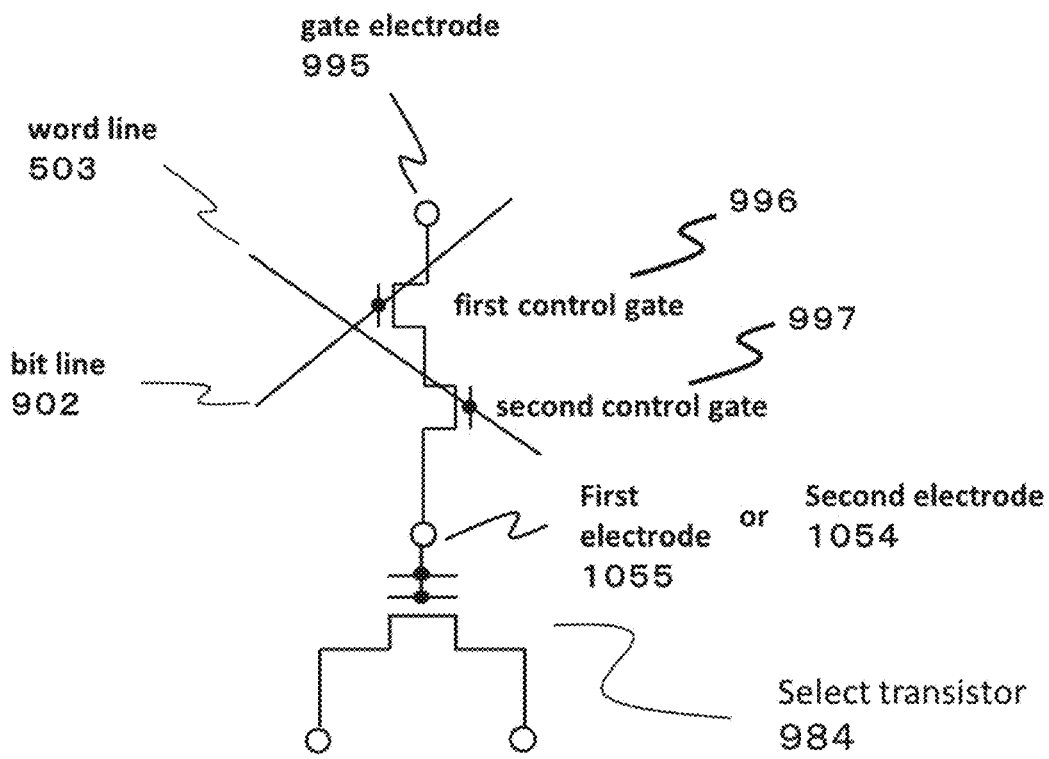
FIG. 66 is the drawing to illustrate an example of identification device (select transistor).
Figure 67:
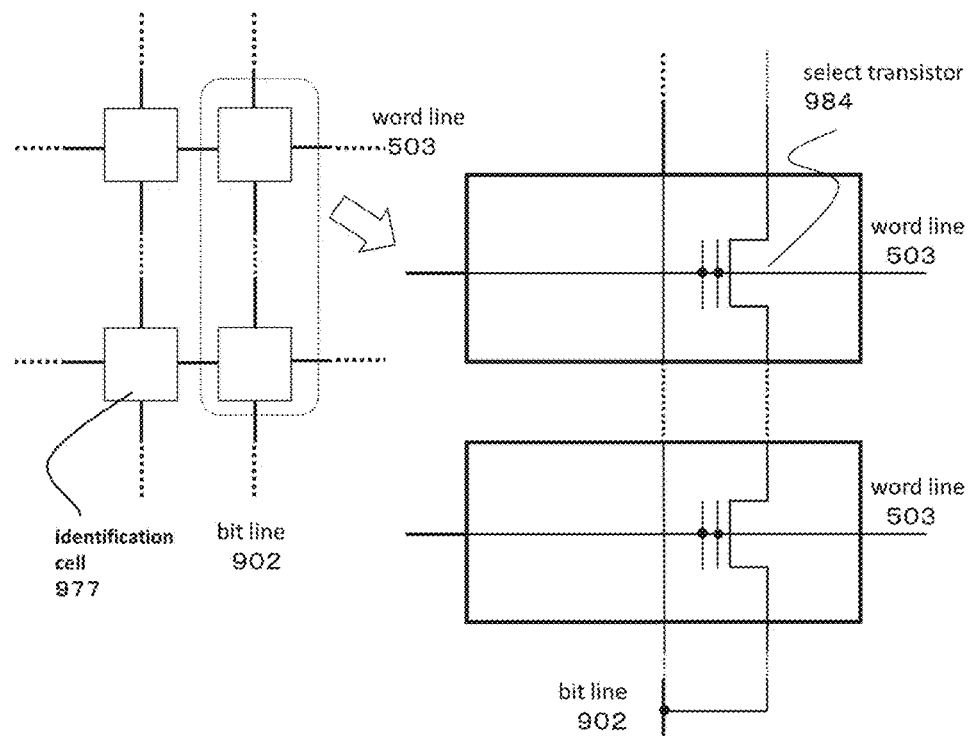
FIG. 67 is the drawing to illustrate an example of the layout in the case that identification cells are arrayed in NAND-type layout (select transistor).
Figure 68:
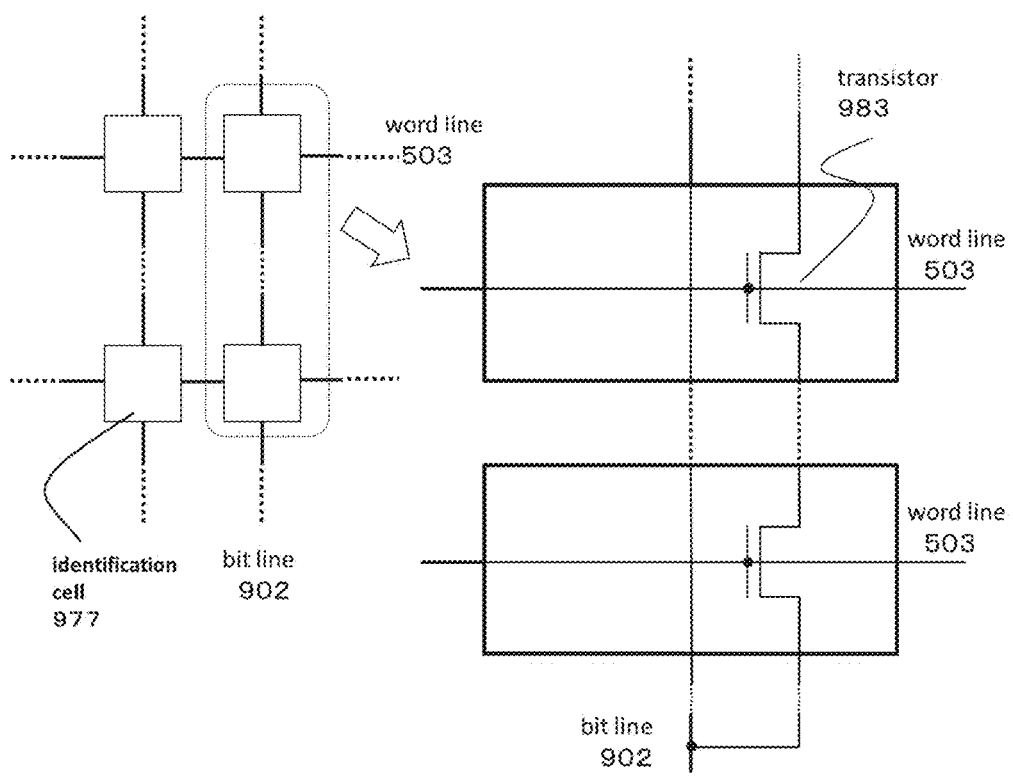
FIG. 68 is the drawing to illustrate an example of the layout in the case that identification cells are arrayed in NAND-type layout (field-effect transistor).
Figure 69:
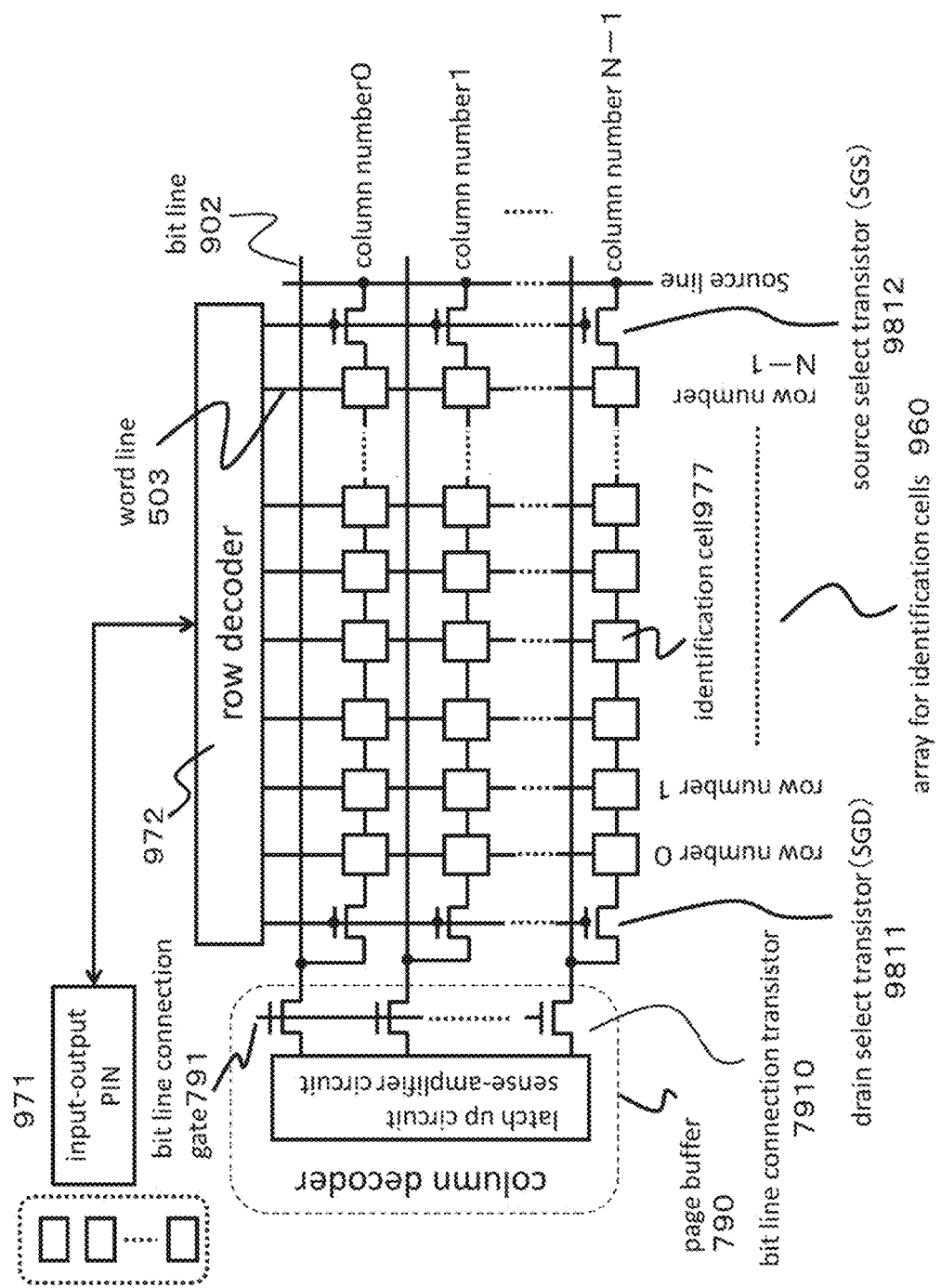
FIG. 69 is the drawing to illustrate an example of the layout in the case that identification cells are arrayed in NAND-type layout.
Figure 70:
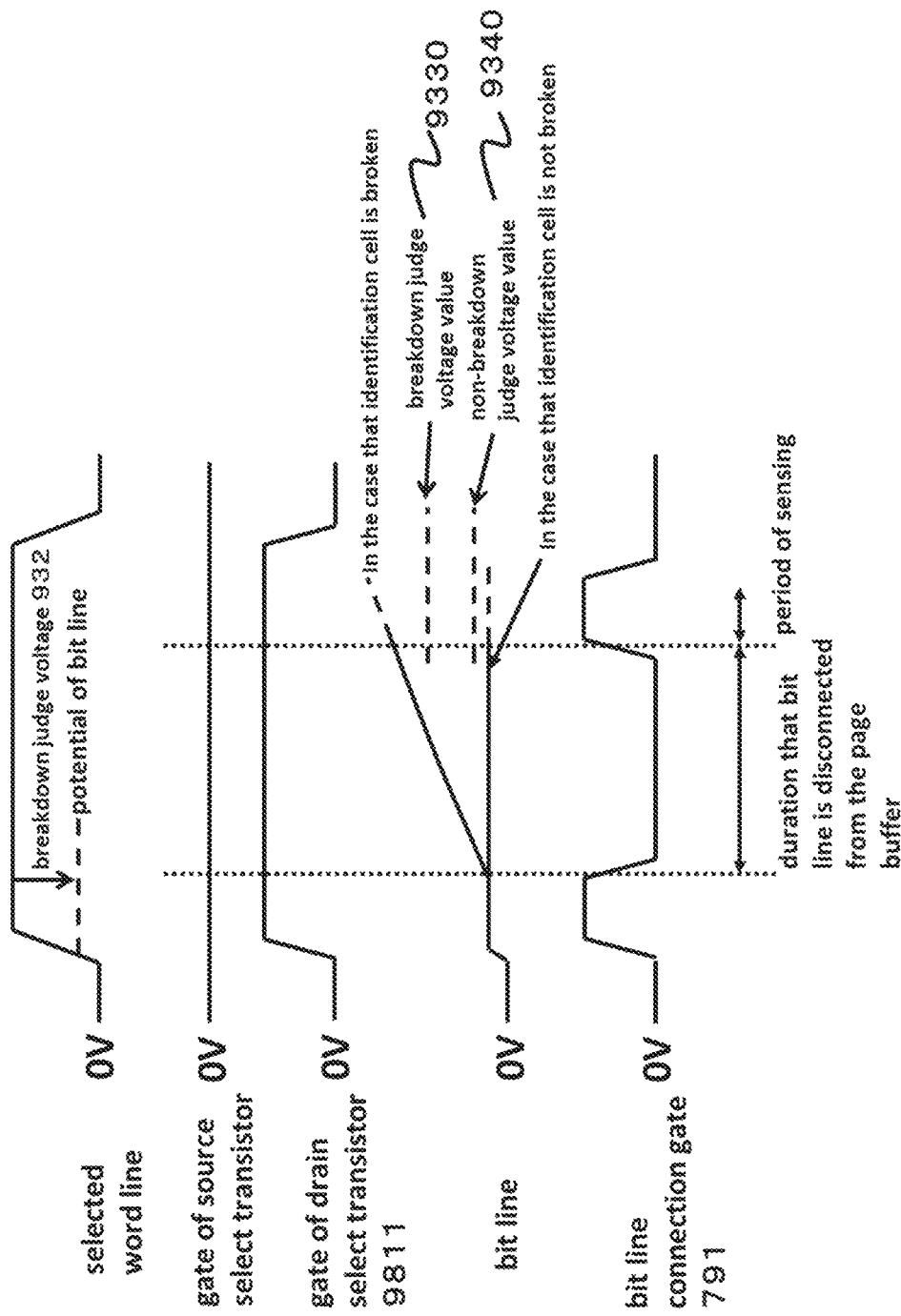
FIG. 70 is the drawing to illustrate an example of the method to read identification cell.
Figure 71:
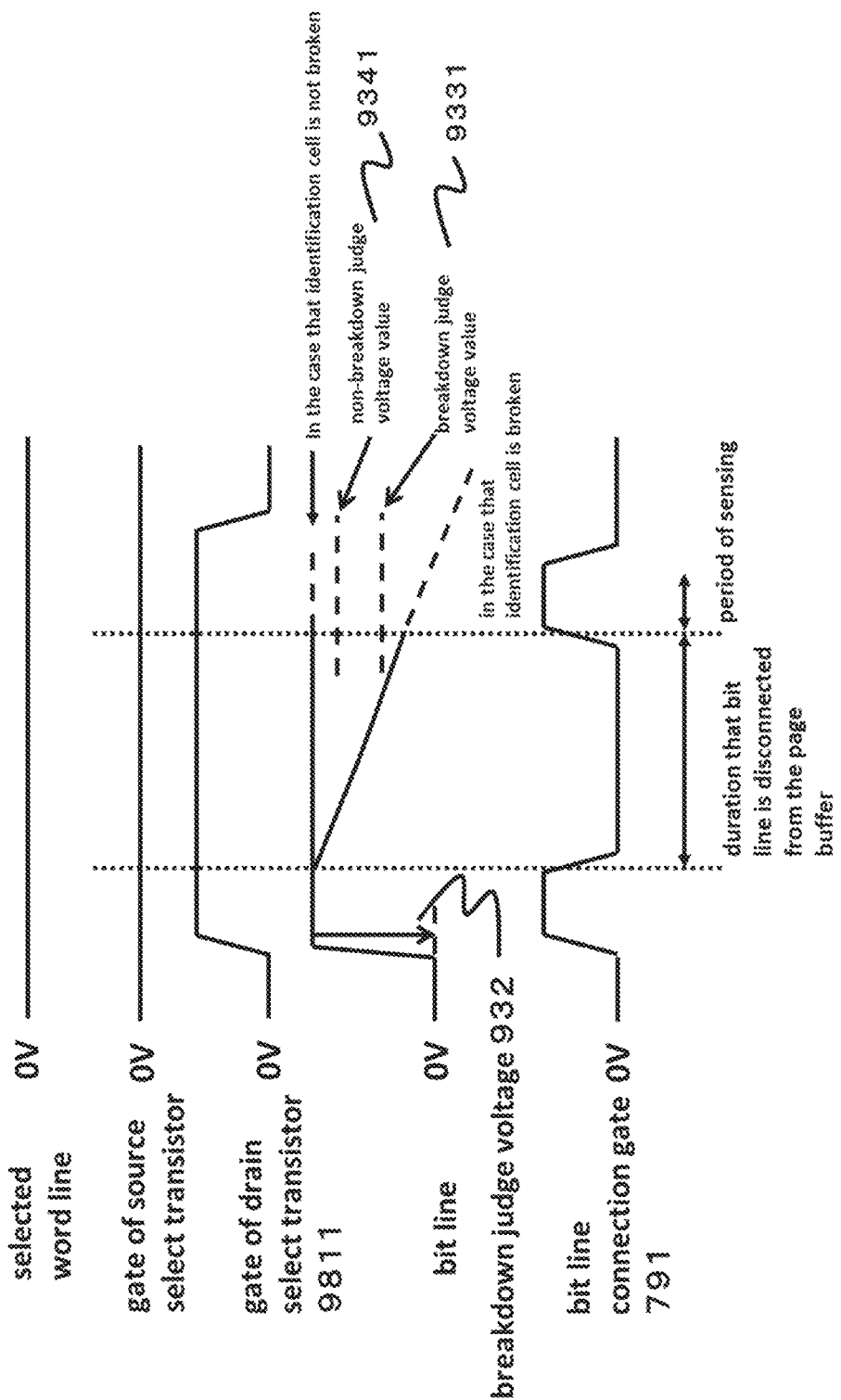
FIG. 71 is the drawing to illustrate an example of the method to read identification cell.
Figure 72:
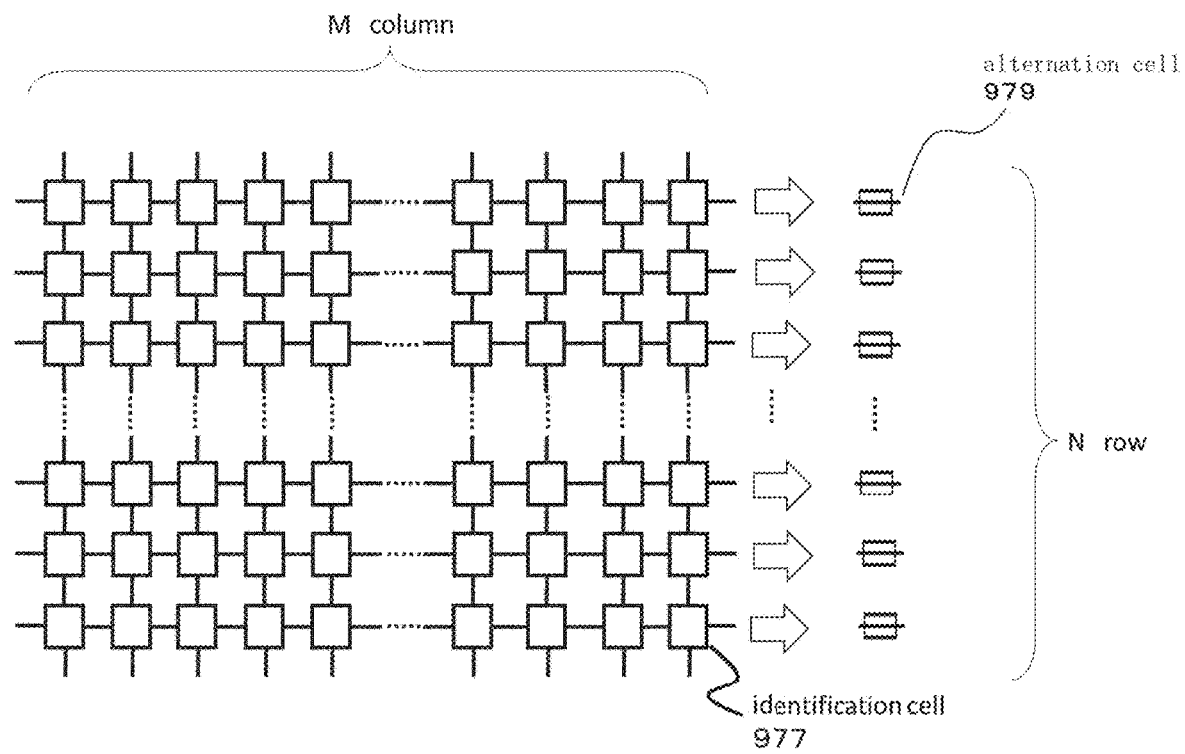
FIG. 72 is the drawing to illustrate an example of alternation cell.
Figure 97:
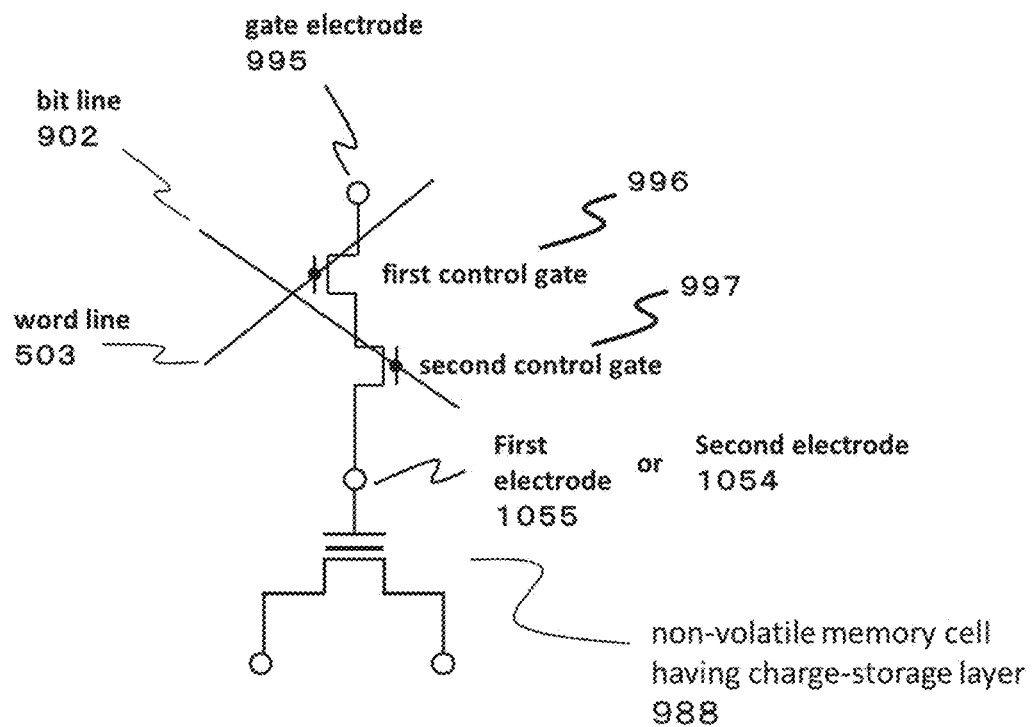
FIG. 97 is the drawing to illustrate an example of identification cell (non-volatile memory cell having charge-storage layer).

Examples of identification cells are, for example, the identification cell 977 in FIGS. 33, 38-52, 69, 72, 74, 77, 92-96, and 99, the capacitor 982 in FIGS. 53 and 54, the PN junction 986 in FIGS. 55 and 56, the Schottky junction 987 in FIGS. 57 and 58, the resistor 985 in FIGS. 59 and 60, the transistor 983 in FIGS. 61 and 62, the combination of transistor 983 and capacitor 982 in FIGS. 63 and 64, the select transistor 984 in FIGS. 65 and 66, the select transistor 984 in FIG. 67, the transistor 983 in FIG. 68, the non-volatile memory cell with charge storage layer 988 in FIGS. 97 and 98, the variable resistance 981 in FIGS. 100 and 101, and so forth.

Examples of cell array for identification cells are, for example, the cell array for identification cells 960 in FIGS. 23, 24, 69, 72, and 74, and the cell array in FIGS. 89-91 and 109-114.

The first physical node further holds a security chip. The said security chip holds a hash module. The cell array of the said chip and the hash module of the said security chip can compose the first chip identification device. Like this, the first chip identification device may be composed of at least two chips that are mounted together in the first physical node.

The said security node may pass a nonce value (n for example) to this hash module as the said security parameter. To generate the said nonce value, the said security node may hold a module for generating nonce values. Or it may be approved that the said security node sends the output signal from the measuring device of chip identification mounted in the said security node to the hash module as a nonce value. In this event, it may be self-evident that the second and third physical nodes in FIG. 111 would be the same if exchanging the challenge and the nonce value (n). That is, the role of the security node can be played by another entry node or management node.

Anyway, this hash module may generate a hash value from the said specific random number and this nonce value and then output it as a security state (Qn). If the challenge C is input from the second measuring device of chip identification, mounted in the second physical node, to this first physical node, then the said first chip identification device outputs the response (Rn) in response to the security state (Qn) having been determined as mentioned above. By doing this, the second measuring device of chip identification can obtain the set of this C and Rn (CRn).

The security node passes a new nonce value (m) to the first physical node and notices to the second physical node that the security parameter was updated. The second physical node inspects the identification of the first physical node. The second physical node may compare the set of (CRm) obtained this time with the set of (CRn) corresponding to the first physical node, stored in the dictionary (global or local dictionary) that the said second physical node holds. If they are inconsistent, then the second physical node may inspect the other physical nodes stored in the dictionary that it holds. By this way, if the CR sets of plural physical nodes whose identifications have been inspected are inconsistent, then the security parameter is regarded as updated indeed. Thus, a new CR set may be appended or overwritten to the dictionary. Whether overwritten or appended may be determined by a system engineer who designs and/or manages the said closed physical network.

(Protection from falsification of security parameters) In order to disable a hacker to illegally update security parameters, it is necessary that the first physical node inspects the chip identification of the security node that will send a nonce value to the first physical node in advance. For this aim, the security node is necessary to hold at least the third chip identification device. The method that the first measuring device of chip identification, mounted in the first physical node, inspects the third chip identification device may be similar to the inspection method that the first measuring device of chip identification inspects the second chip identification device, illustrated in FIG. 102.

It may be necessary that the second physical node inspects the chip identification of a security node which notifies the update of a security parameter. For this aim, the second measuring device of chip identification, mounted in the second physical node, may inspect the third chip identification device, mounted in the security node. The method that the second measuring device of chip identification inspects the third chip identification devices may be similar to the inspection method that the second measuring device of chip identification inspects the first chip identification device, as illustrated in FIG. 102.

It may be necessary that the security node inspects the chip identification of the second physical node, in order not to notice the update of a security parameter to a physical node of a hacker. For this aim, the third measuring device of chip identification, mounted in the security node, inspects the second chip identification device mounted in the second physical node. The inspection method that the third measuring device of chip identification inspects the second chip identification device may be the same as the inspection method that the first measuring device inspects the second chip identification device, as illustrated in FIG. 102.

It may be necessary that the security node inspects the chip identification of the first physical node, in order not to send an updated security parameter to a physical node of a hacker. For this aim, the third measuring device of chip identification, mounted in the security node, inspects the first chip identification device mounted in the first physical node. The inspection method that the third measuring device of chip identification inspects the first chip identification device may be the same as the inspection method that the second measuring device of chip identification inspects the first chip identification device, as illustrated in FIG. 102.

Even though a hacker successfully stole the identifications of a part of physical nodes in a closed physical network, the stolen identifications can be invalidated by updating a security parameter. Therefore, it may be preferable that the security node updates a security parameter anytime using the above-mentioned method. Or there may be plural security nodes in one closed physical network. It may be preferable to make it as hard to predict when, where, and who will update a security parameter as possible.

For example, suppose there are two security nodes in one closed physical network. If these security nodes distribute two different security parameters inside this closed physical network, then a management node may have two different global dictionaries and entry nodes may have two different local dictionaries.

Figure 112:
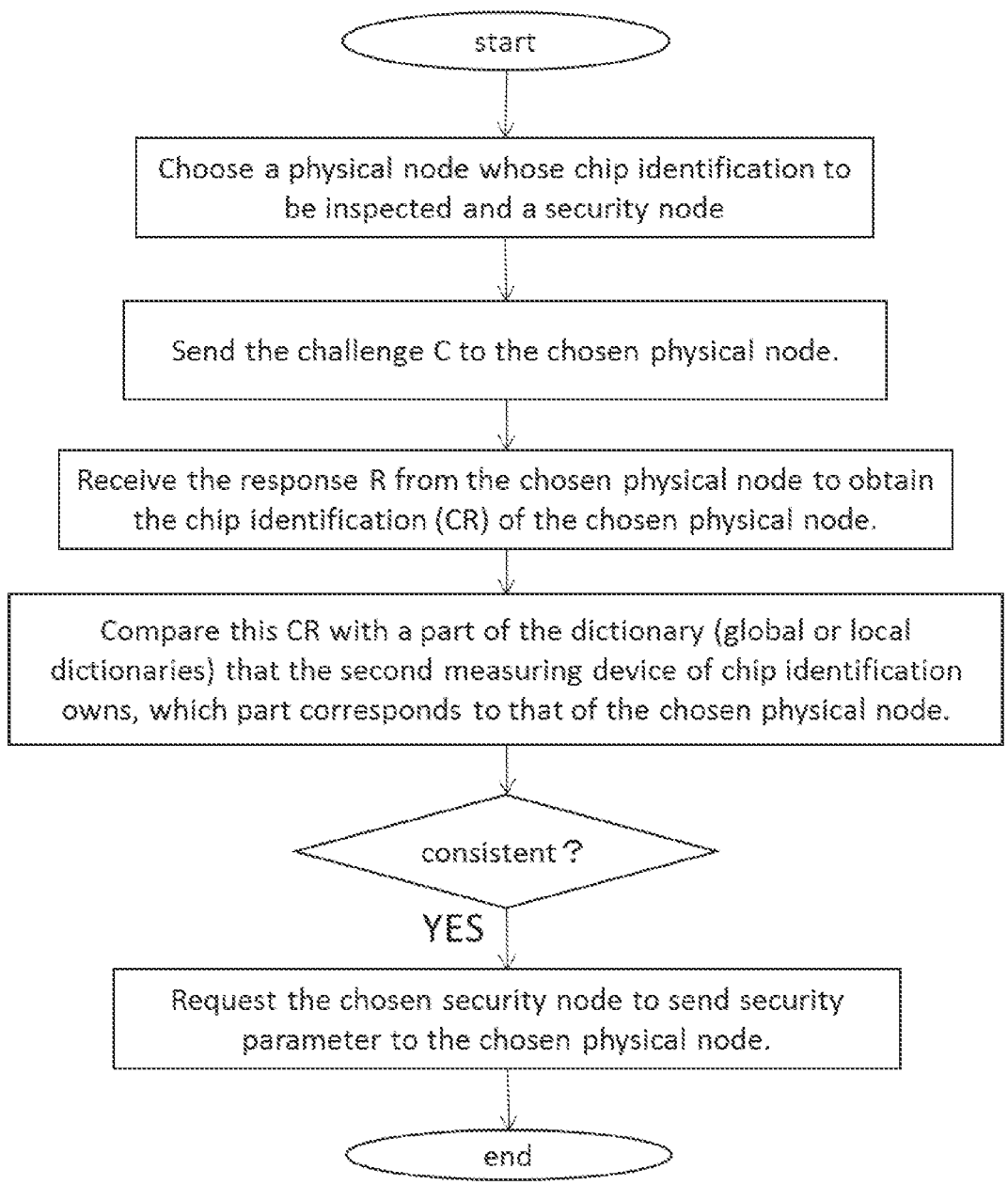
FIG. 112 is the drawing to illustrate an example of the method to use the security node of the present invention.

In order to avoid confusing the chip identification in such an event (e.g., with two security nodes), for example, in FIG. 111, the second measuring device of chip identification should perform the following procedure in advance of sending the challenge C to the first chip identification device. 1) One security node is chosen. 2) It is required that the said security node to send a nonce value to the first chip identification device. 3) Challenge C is sent from the second measuring device of chip identification to the first chip identification device. After that, the regular procedure may be continued. FIG. 112 is a drawing to illustrate an example of the recipe that the second measuring device of chip identification in FIG. 111 should do in concrete. First, the second measuring device of chip identification chooses a physical node, whose chip identification is to be inspected, and a security node. Next, the challenge C is sent to the chosen physical node. Further subsequently, the second measuring device of chip identification receives the response R from the chosen physical node and then obtains the chip identification (CR) of the chosen physical node. Then, this CR is compared with a part of the dictionary (global or local dictionary) owned by the second physical node, which part corresponds to the chosen physical node. If they turn out being consistent, then the chosen security node is required to send a security parameter to the chosen physical node to be inspected so that the inspection ends. Otherwise, the inspected physical node is deemed as different from the physical node registered in the dictionary, and then a predetermined procedure may be performed on the inspected physical node. As an example, the inspected physical node may be excluded from the network, or the registration procedure of the inspected physical node may be operated if necessary.

Figure 113:
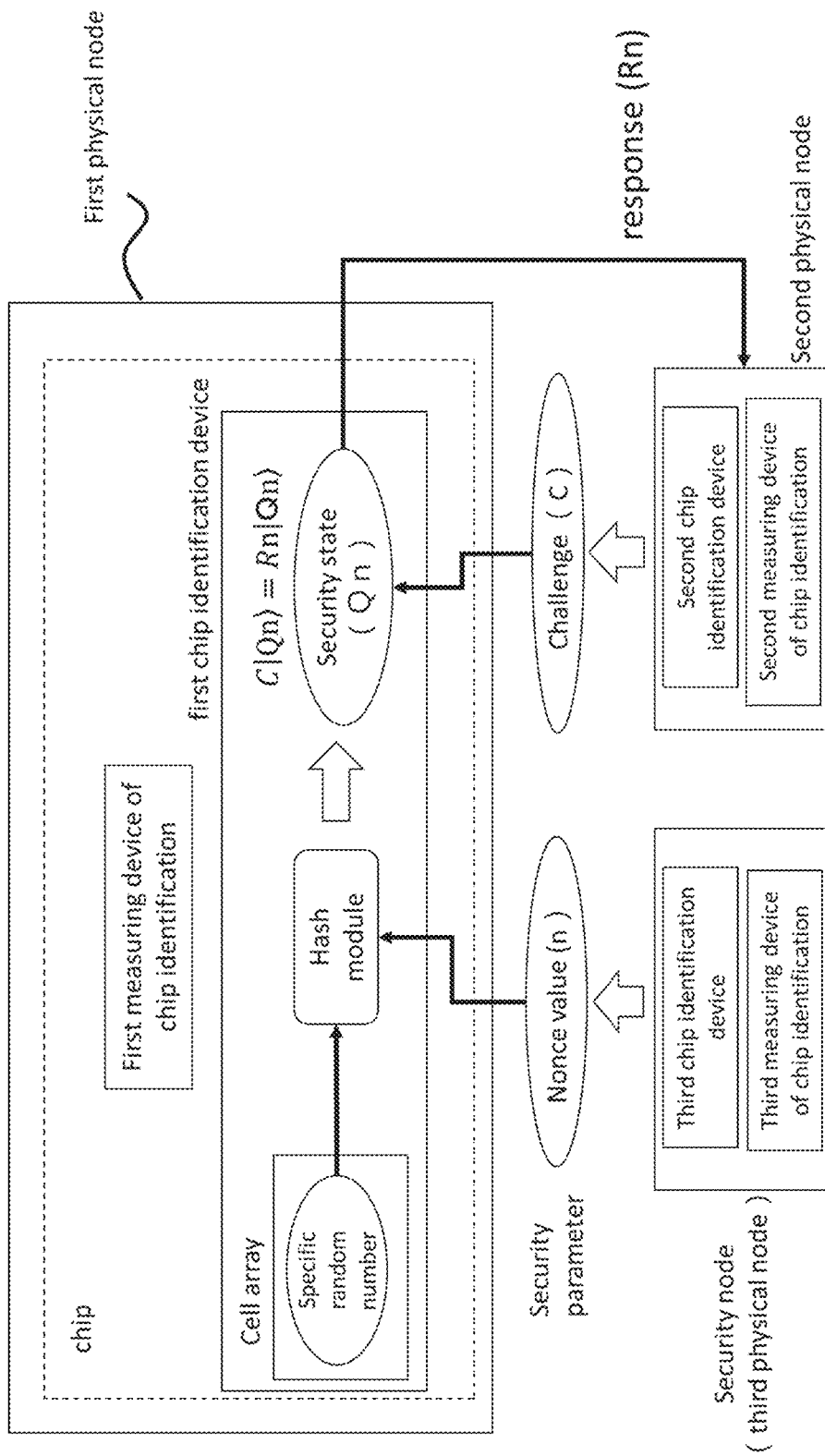
FIG. 113 is the drawing to illustrate an example of the function of the security node of the present invention.

FIG. 113 is a drawing to illustrate an example of integrating the first chip identification device into one chip. Like this, it may be possible to integrate the cell array for generating specific random number and the hash module as well as the first measuring device of chip identification into one chip. However, in this event, the development cost of chip may become expensive. Thus, the configuration in FIG. 111 may also make sense.

Or, though not especially illustrated since it may be self-evident, an emulator may also generate the said hash value and the security state (Qn) from a given nonce value (n). This means that software can play this role. However, at least the said specific random number must be generated from randomness specific to a chip being hardware.

(Auto-detection and auto-remove of fake node) As mentioned above, any physical nodes belonging to one closed physical network, whether it is a management node or an entry node, it may be prohibited to include the CR of itself (self CR) into the dictionary (global or local dictionary) of itself. Accordingly, there may be as many global different dictionaries as many management nodes. (Those dictionaries are different because of not including the self CR.) We have especially called a management node dealing with the update of a security parameter as a security node.

In contrast, a management node, which performs the auto-detection and automatically removes a fake node from the said closed physical network (auto-remove) if the fake node was detected on the said closed physical network, is especially called inspection node. There may be plural inspection nodes in one physical network. Here, the global dictionary held by an inspection node may be especially called inspection dictionary. That is, there may be plural inspection dictionaries for one closed physical network.

Figure 114:
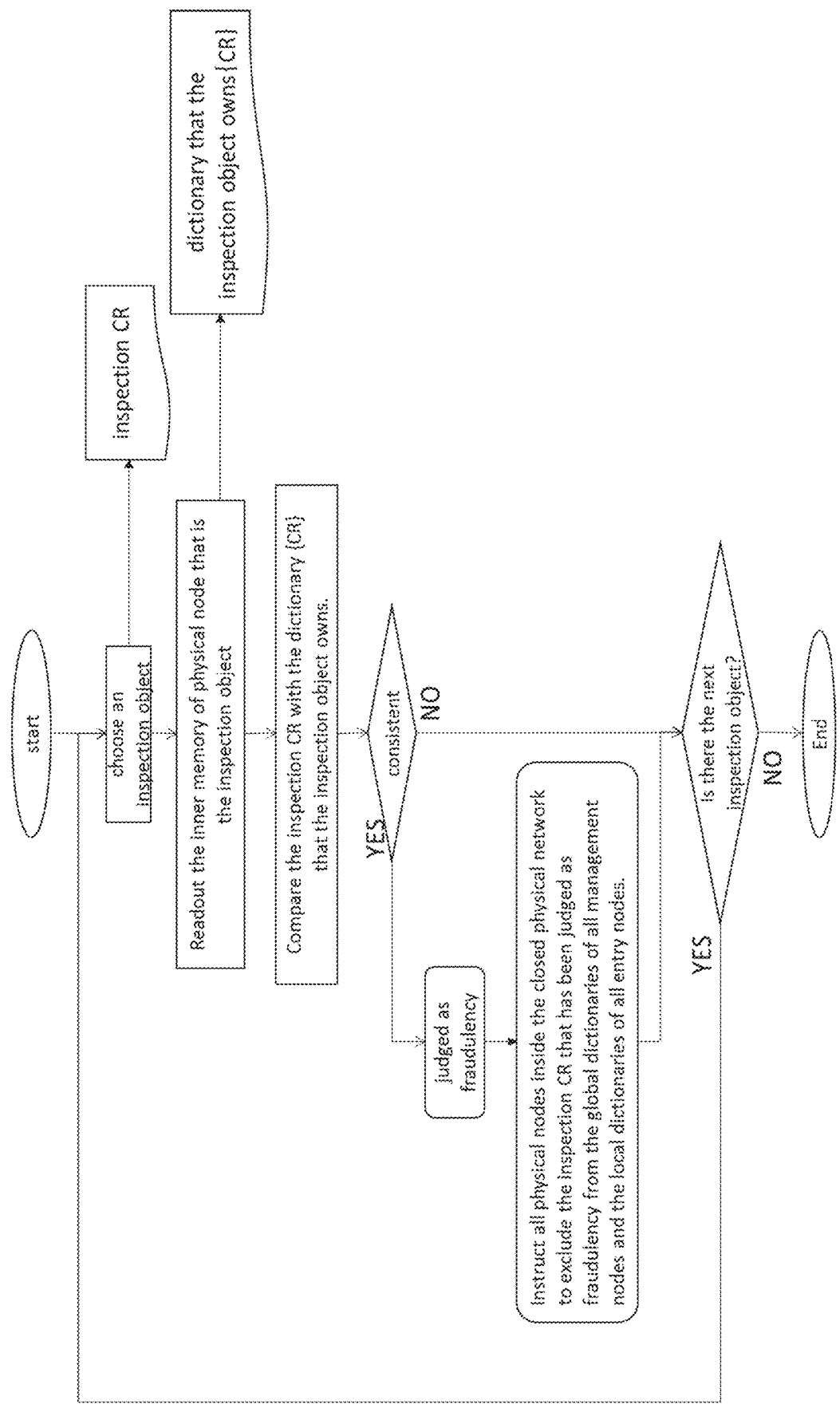
FIG. 114 is the drawing to illustrate an example of the inspection method of the present invention.

First, suppose that there are one inspection node and one inspection dictionary. FIG. 114 is a drawing to illustrate one of concrete examples of the method for auto-detection and auto-remove. First, a physical node to be inspected (inspection object) is chosen. The CR corresponding to the chosen physical node among the inspection dictionary (inspection CR) may be readout. Subsequently, the inner memory of the chosen physical node to be inspected is readout and then it is checked if there is the inspection CR or not therein. That is, the inspection CR is compared with the dictionary {CR} held by the physical node to be inspected. If the inspection CR is consistent with a part of the dictionary {CR} held by the physical node to be inspected, then the entire physical nodes in the closed physical network are required to remove all inspection CRs that were judged as illegal or fake from the global dictionaries of all management nodes and the local dictionaries of all entry nodes. Otherwise, it may be checked if the next physical node to be inspected can be chosen.

An inspection CR is necessary for a fake node to spoof a physical node to be inspected. On the other hand, it is unnecessary to store the inspection CR in the inner memory of the physical node to be inspected because the chip identification device can generate the inspection CR on every inspection if the physical node to be inspected is not a fake.

All physical nodes in the closed physical network may be instructed to remove the inspection CR of the physical node judged as fake or illegal from the global dictionaries of all management nodes and from the local dictionaries of all entry nodes. Then, it may be checked if a next physical node to be inspected can be chosen. If all physical nodes in the closed physical network have been inspected, then the inspection process is to end. Otherwise, a next physical node to be inspected is chosen.

(Sharing of management) Sometime, a management node may be either a security node to maintain security parameters or an inspection node to operate the said auto-detection and auto-remove. At other time, a management node may be both a security node and an inspection node.

Suppose a case that there are three closed physical networks having management nodes (A, B, and C, respectively). See FIG. 115. Any of these three management nodes are, sometime, either a security node or an inspection node, and at other times, both a security node and an inspection node.

Figure 115:
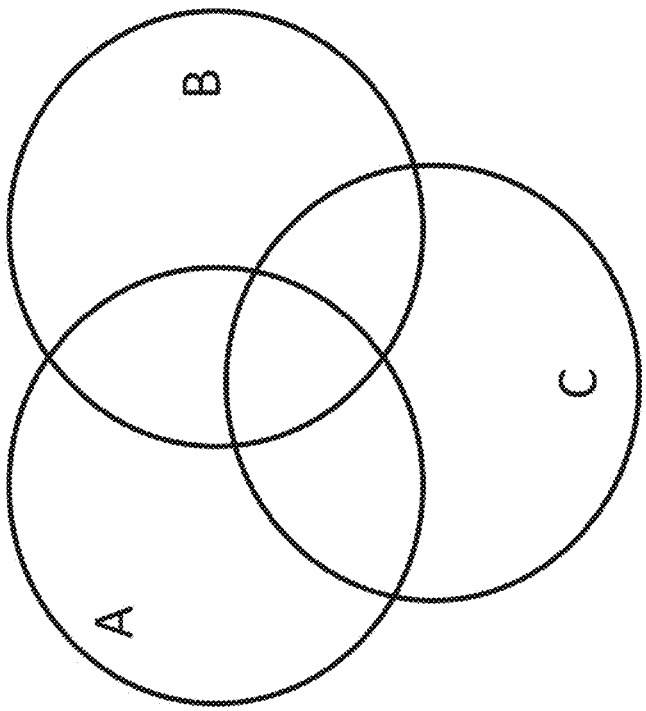
FIG. 115 is the drawing to illustrate an example of the configuration of the physical network of the present invention.

In FIG. 115, the region A is the management range of the management node A. The region B is the management range of the management node B. The region C is the management range of the management node C. The overlapping region of the management ranges A, B and C is the joint control range of the management nodes A, B and C (named, the management range ABC). The overlapping region of the management ranges A and B is the joint control range of the management nodes A and B (named, the management range AB). The overlapping region of the management ranges B and C is the joint control range of the management nodes B and C (named, the management range BC). The overlapping region of the management ranges C and A is the joint control range of the management nodes C and A (named, the management range CA).

The management range ABC can be regarded as a new closed physical network. In this event, there may be three management nodes A, B, and C in this closed physical network.

The management range AB can be regarded as a new closed physical network. In this event, there may be two management nodes A and B in this closed physical network.

The management range BC can be regarded as a new closed physical network. In this event, there may be two management nodes B and C in this closed physical network.

The management range CA can be regarded as a new closed physical network. In this event, there may be two management nodes C and A in this closed physical network.

We can regard the range under the management of the management node A and out of the management of the management nodes B and C as a new closed physical network. In this event, there may be one management node A in this closed physical network.

We can regard the range under the management of the management node B and out of the management of the management nodes C and A as a new closed physical network. In this event, there may be one management node B in this closed physical network.

We can regard the range under the management of the management node C and out of the management of the management nodes A and B as a new closed physical network. In this event, there may be one management node C in this closed physical network.

If we regard the region A or the region B as a new closed physical network, then neither the physical node A nor the physical node B cannot be a management node of this new closed physical network, because these nodes cannot hold (own) the global dictionary of the new closed physical network. However, if the local dictionaries of the physical node A (entry node A) and the physical node B (entry node B) can jointly cover this closed physical network (over the regions A and B), then the entry node A and the entry node B can jointly manage this closed physical network. By this way, in fact, the management by the cooperation of entry nodes may be possible with no management node. This enables the coexistence of the central management and decentralized management of physical nodes in a closed physical network. In this event, the local dictionary of the entry node A defines the map of the region A. The local dictionary of the entry node B defines the map of the region B.

In a case that, like this, two different entry nodes jointly manage one closed physical network, the update and management of security parameters and/or the auto-detection and auto-remove may be similar to explained above if replacing management nodes by entry nodes and replacing global dictionaries by local dictionaries. However, the local dictionaries of these two entry nodes define the maps of the ranges that they manage, respectively. And it is necessary that the maps defined by these two local dictionaries cover the entire of the closed physical network. This is an example of dividing one closed physical network into two parts.

When we regard the range A or the range B or the range C as a new closed physical network, neither the physical node A nor physical node B nor physical node C cannot be a management node of this closed network, because any of these nodes cannot hold (own) the global dictionary of this closed physical network. However, if the local dictionary of the physical node A (the map of the range A), the local dictionary of the physical node B (the map of the range B) and the local dictionary of the physical node C (the map of the range C) can jointly cover the entire of this one closed physical network, then the corporation of the entry nodes A, B and C (i.e., physical nodes A, B, and C, respectively) can jointly manage this closed physical network. Like this, the cooperation of entry nodes enables for managing the one closed physical network with no management node indeed. This is an example of dividing one closed physical network into three parts.

As mentioned above, one closed physical network can be decomposed into plural management ranges. In a case that one closed physical node is jointly managed by plural different entry nodes like this, the update and maintenance of security parameters and/or the auto-detection and auto-remove may be similar to what has been described in the above-mentioned explanation if replacing management nodes by entry nodes and replacing global dictionaries by local dictionaries. However, the local dictionaries of these plural entry nodes define the maps of the ranges that those entry nodes manage, respectively. And it is necessary that the maps defined by these plural local dictionaries cover the entire of the closed physical network. Anyway, the range of the closed physical network can be defined by defining the management ranges or the jointly management ranges. Whether or not a node can access to this range is dependent on if that node has a chip to be authenticated by the method of the present invention. By this way, the physical firewall can be configured by using the concept of the closed physical network of the present invention. The reason that we purposely mentioned "physical" is that what is managed inside this management range is NOT logical nodes and IS physical nodes indeed. Or, since plural management nodes can coexist, it may be preferable that different management nodes play roles of security node and inspection node, respectively. This aims to decentralize the power of management and is close to the idea of separation of three powers of the democracy.

By this way, a physical firewall can fence a closed physical network composed of only physical nodes under the central management by one or plural management nodes. By using a public key (a logical address) linked to a physical node inside this physical firewall and the dictionary, the logical decentralized management by blockchain of diction-aries can be configured. Like this, an ironlike physical network, wherein the central and decentralized managements can coexist, can be realized.

Figure 116:
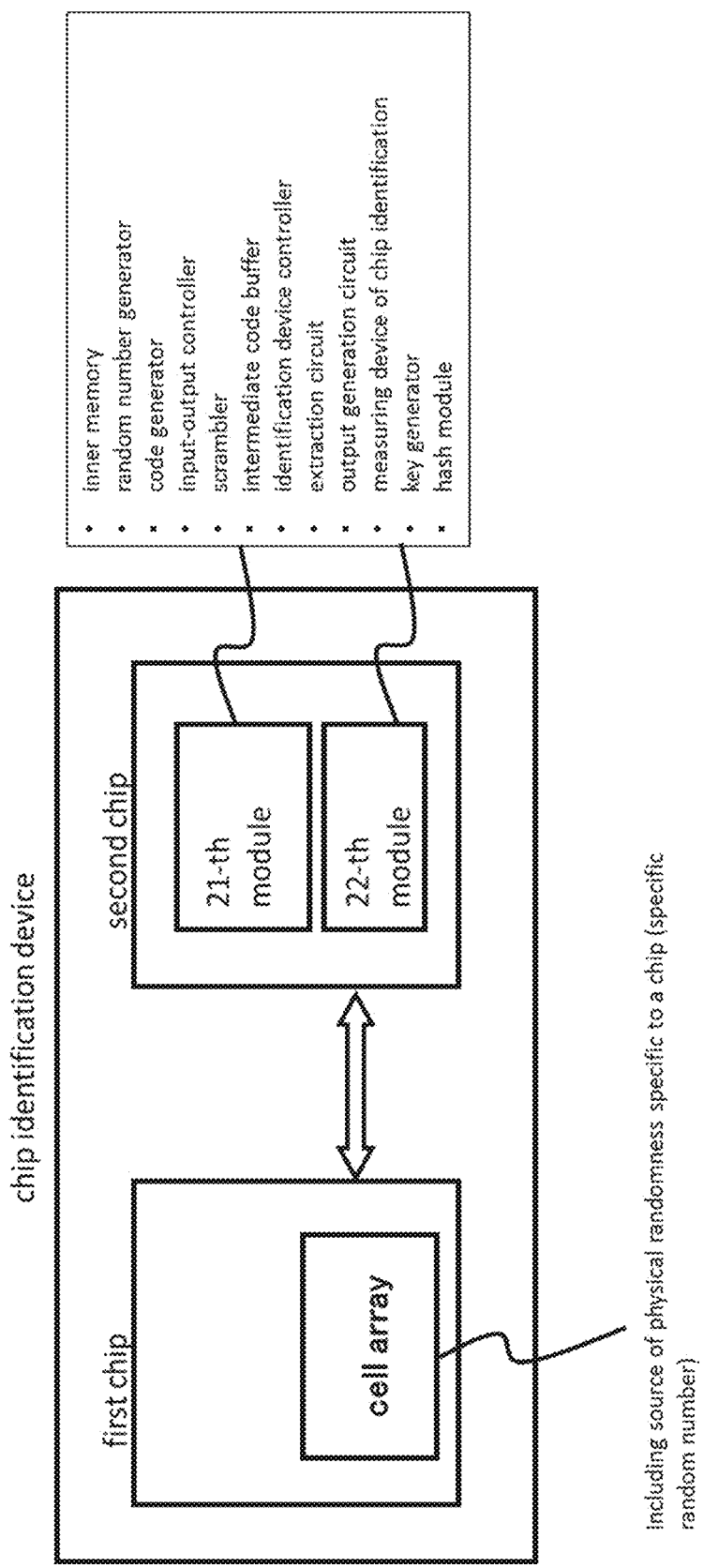
FIG. 116 is the drawing to illustrate an example of the method to realize the chip identification device of the present invention.

(Dividing design of chip identification device) The chip identification device of the present invention can be decomposed into plural chips. FIG. 116 is an example of it. In this figure, the chip identification device is divided into two chips (the first and second chips). The necessary cell array for generating the said specific random number (or the cell array for the identification cells) is mounted in the first chip. The 21-th and 22-th modules are mounted in the second chip. It corresponds to FIG. 111.

Figure 117:
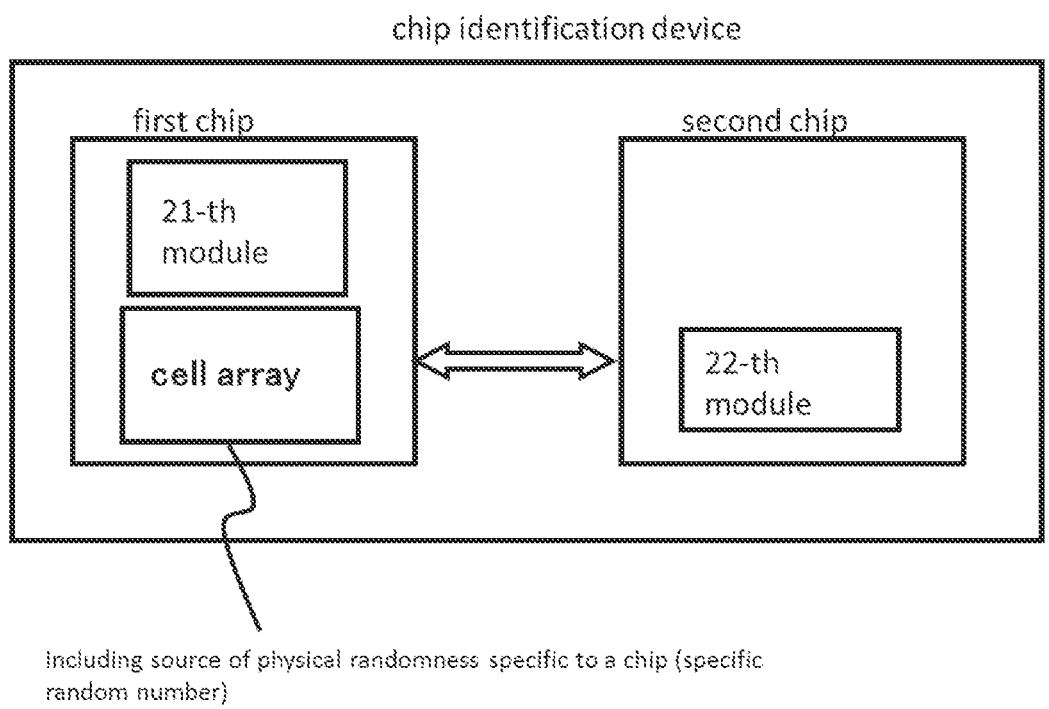
FIG. 117 is the drawing to illustrate an example of the method to realize the chip identification device of the present invention.

FIG. 117 is a drawing to illustrate another example. In this figure, the 21-th module as well as the cell array (or the cell array for the identification cells) are mounted in the first chip. The 22-th module is mounted in the second chip.

Figure 118:
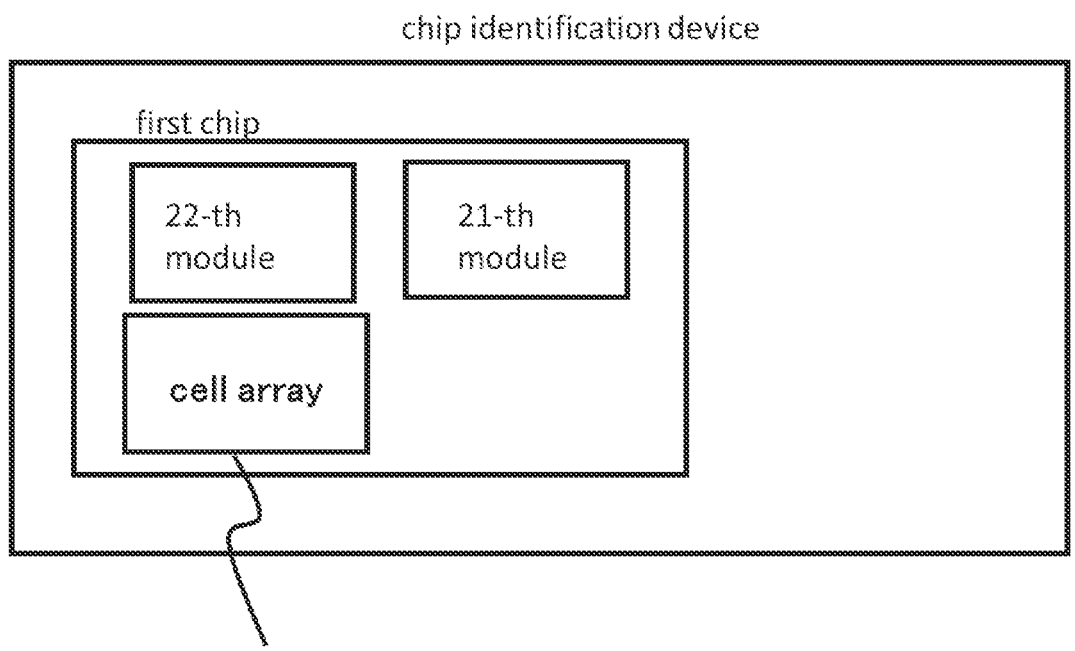
FIG. 118 is the drawing to illustrate an example of the method to realize the chip identification device of the present invention.

FIG. 118 is a drawing to illustrate another example. In this figure, the chip identification device is configured by one chip. All of the 21-th and 22-th modules and the cell array (or the cell array for the identification cells) are mounted in the said one chip. It corresponds to FIG. 113.

The said 21-th and 22-th modules are, for example, what are to be selected according to the design specification from the key generator (FIGS. 104-110), the hash module (FIGS. 111 and 113), the chip identification device (FIG. 102 and so forth), the extraction circuit (FIGS. 89-91 etc.), the random number generator 601 (FIGS. 26 and 76 etc.), the code generator 602 (FIGS. 26 and 76 etc.), 606 (FIG. 28 etc.), the random number generator 605 (FIG. 28 etc.), the input-output controller 800 (FIG. 78 etc.), the input-output controller 810 (FIG. 79 etc.), the scrambler 890 (FIG. 79 etc.), the intermediate code buffer 900 (FIG. 79 etc.), the identification device controller 880 (FIG. 79 etc.), the output generation circuit (FIGS. 89, 90 etc.) and so forth. However, it may be especially preferable to include the identification device controller 880 (FIG. 79 etc.) or the extraction circuit (FIGS. 89-91 etc.).

Figure 119:
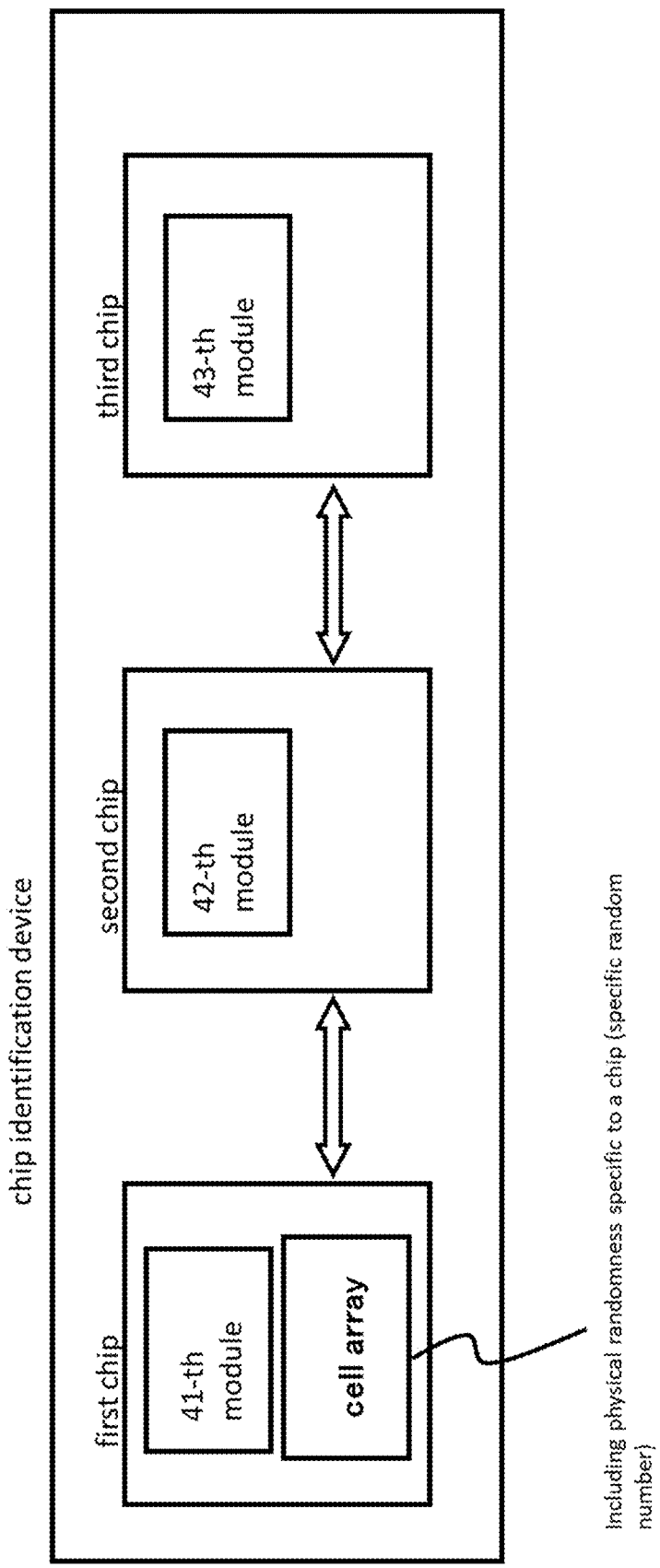
FIG. 119 is the drawing to illustrate an example of the method to realize the chip identification device of the present invention.
Figure 120:
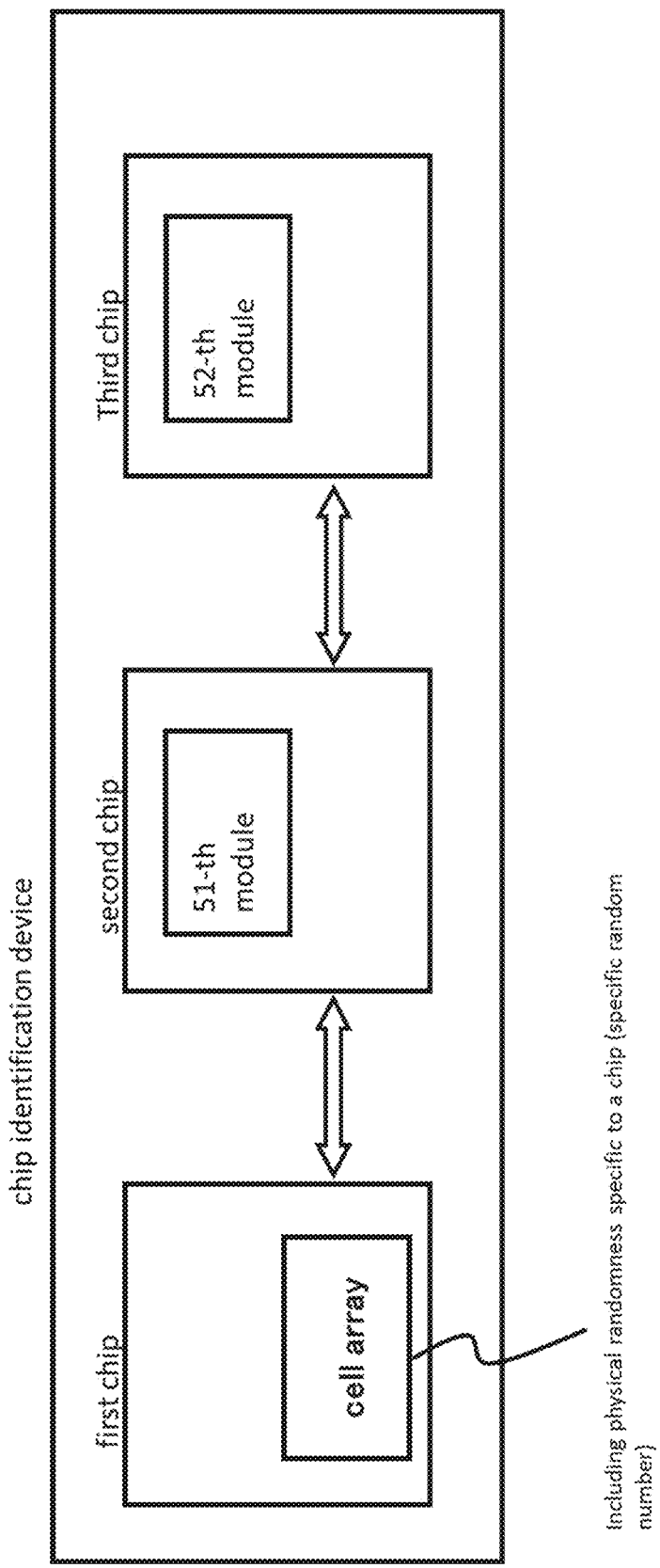
Figure 121:
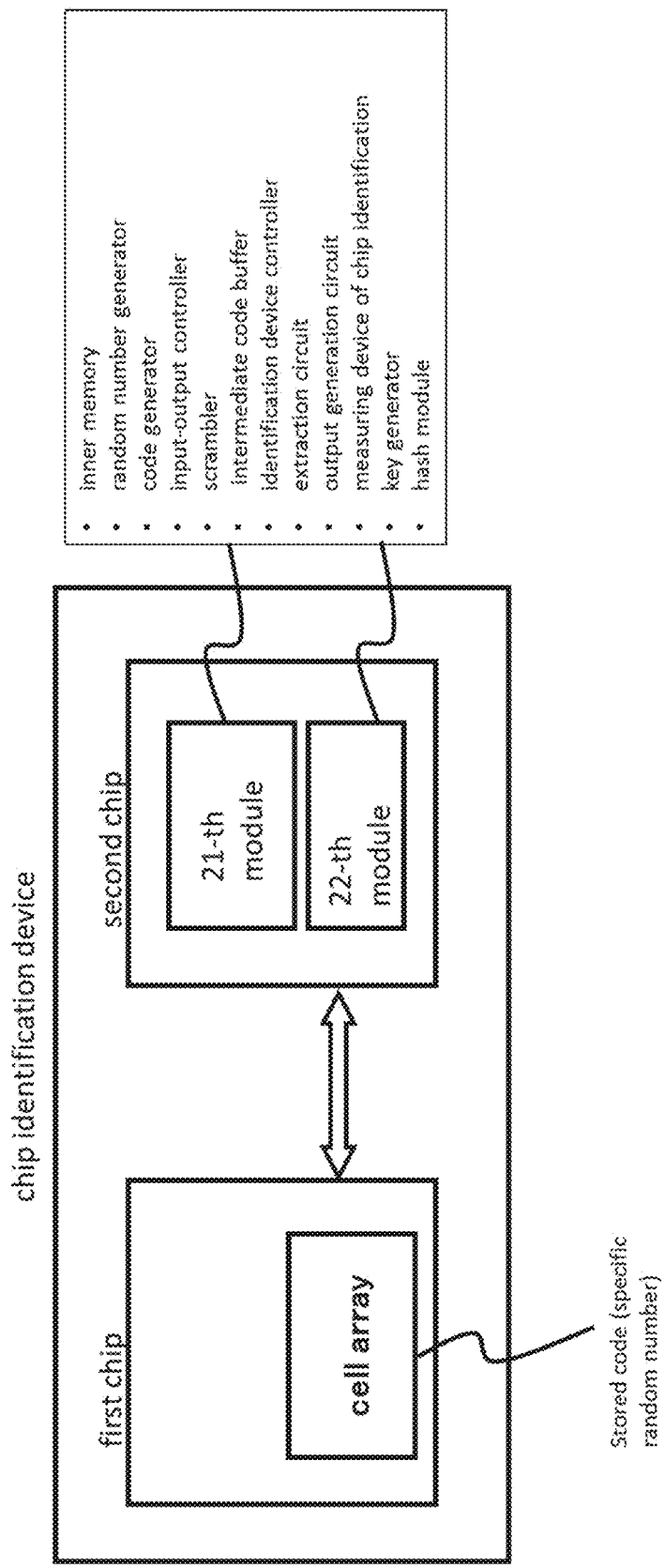
Figure 122:
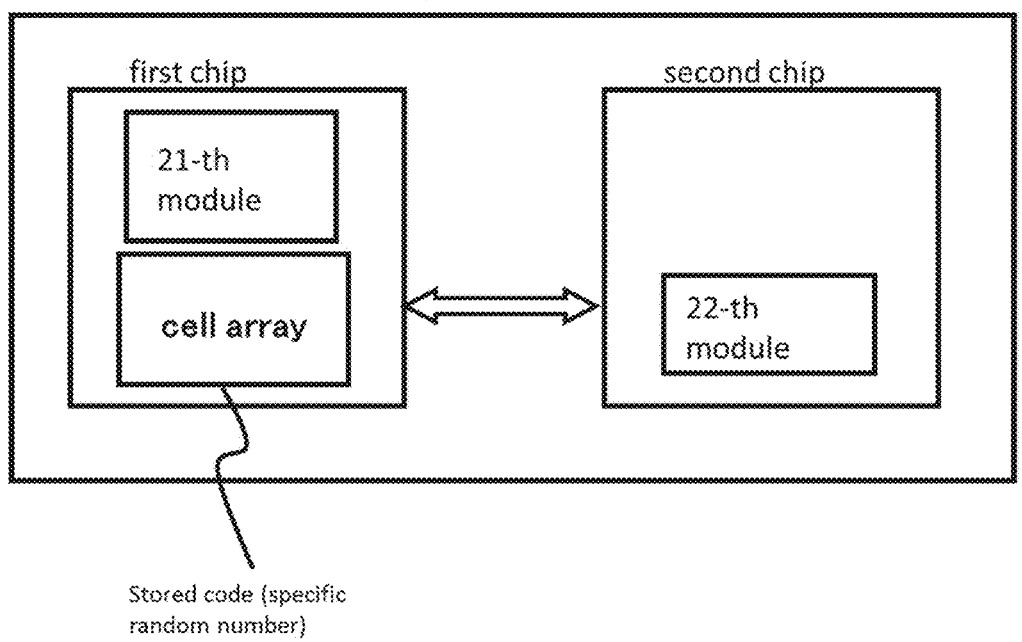
Figure 123:
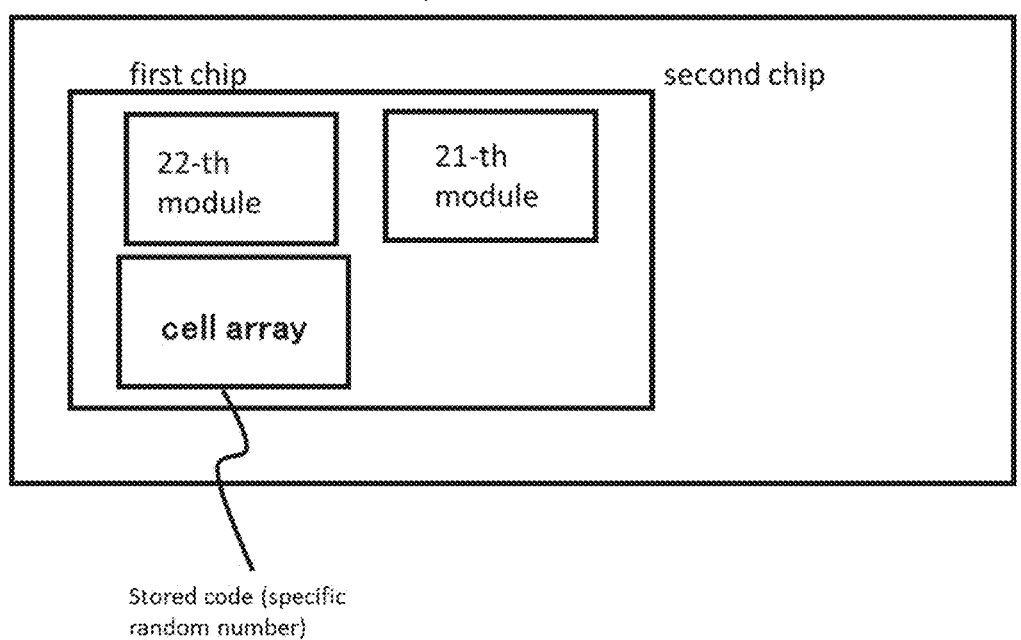
Figure 124:
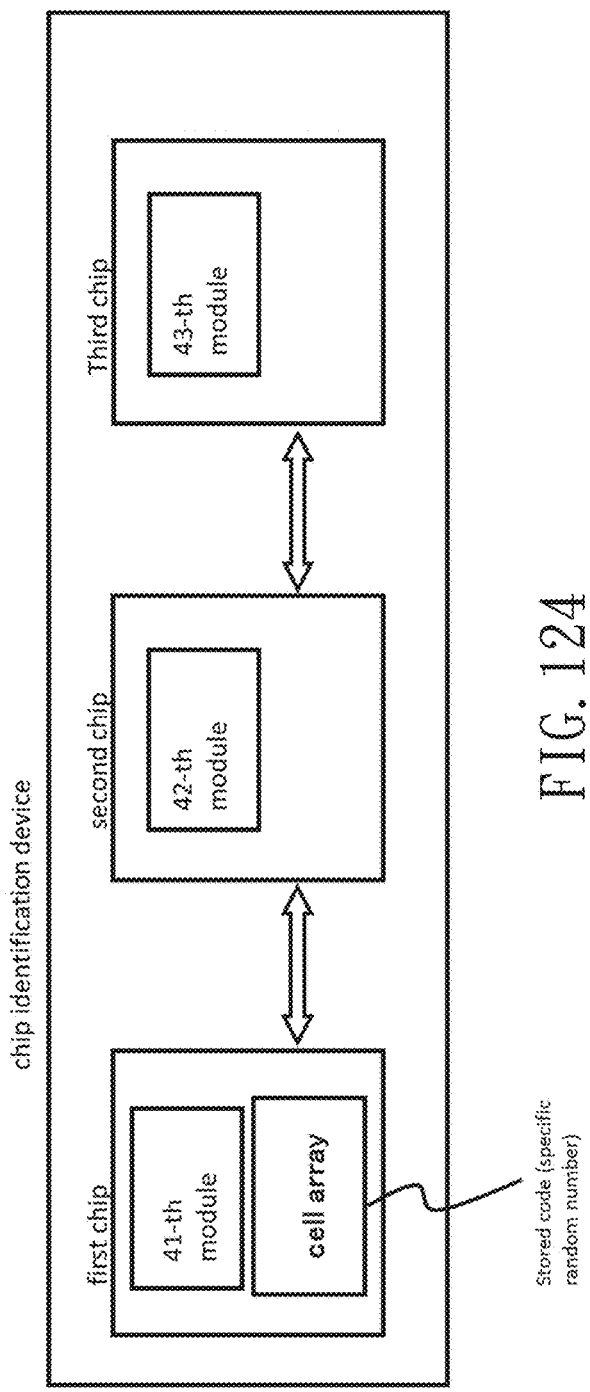
Figure 125:
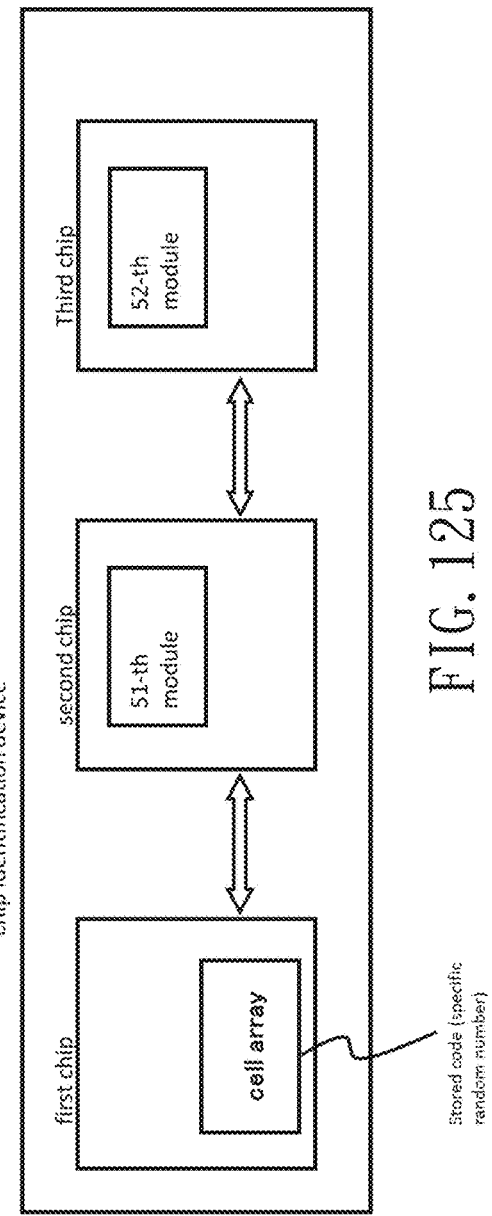

FIGS. 119 and 120 are the drawings to illustrate another example. In these figures, the chip identification device is composed by three chips (the first to the third chips). A difference of FIG. 120 from FIG. 119 is with or without the module other than the cell array (or the cell array for identification cells) in the first chip.

The said 41-th to 43-th modules or the said 51-th and 52-th modules are, for example, what are to be selected according to the design specification from the chip identification device (FIG. 102 etc.), the extraction circuit (FIGS. 89-91 etc.), the random number generator 601 (FIGS. 26 and 76 etc.), the code generators 602 (FIGS. 26 and 76 etc.), 606 (FIG. 28 etc.), the random number generator 605 (FIG. 28 etc.), the input-output controller 800 (FIG. 78 etc.), the input-output controller 810 (FIG. 79 etc.), the scrambler 890 (FIG. 79 etc.), the intermediate code buffer 900 (FIG. 79 etc.), the identification device controller 880 (FIG. 79 etc.), the output generation circuit (FIGS. 89, 90 etc.). However, it may be especially preferable to include the identification device controller 880 (FIG. 79 etc.) or the extraction circuit (FIGS. 89-91 etc.)

(Others) In the case that a main memory to collaborate with a CPU is a DRAM, for example, it may be preferable that DRAM cell is adopted as identification cell, as similar to FIG. 42, 63, or 64. In this event, as an example, the two-dimensional code type random number code may be adopted, as similar to FIG. 22. Or, in the example of FIG. 74 having alternation cells 979, it may be preferable that DRAM cell is adopted as identification cell to use the barcode type random number code of FIG. 73. Or it may be preferable that the barcode type random number code of FIG. 73 is adopted by utilizing fuse memory and so forth for DRAM redundancy.

As an example, an MOS-type transistor having been used for the illustration in the above-mentioned embodiments may comprise two spatially separated second conductive type diffusion layers formed on a first conducting type semiconductor substrate, a gate insulating film above the first conducting type semiconductor substrate, and a gate electrode on the gate insulating film. As an example, a non-volatile memory cell transistor also having been used for the illustration in the above-mentioned embodiment may comprise two spatially-separated second conductive type diffusion layers formed on a first conducting type semiconductor substrate, a tunnel film above the first conducting type semiconductor substrate, a charge-storage layer on the tunnel film, an inter-layer insulating film on the charge-storage layer, and a control gate electrode on the inter-layer insulating film. As an example, a select transistor also having used for the illustration may be formed by replacing a part of or whole of the inter-layer insulating film of the non-volatile memory cell transistor with an inter-layer conducting layer. Or it may be replaced with a conductive via to be formed by compensating conductive material into vertical hole going through the inter-layer insulating film. In NOR type cell array, one of said two second conductive type diffusion layers in each cell may be connected to a bit line. On the other hand, in NAND-type cell array, the said two second conductive type diffusion layers are respectively shared with adjoint cells to form a serial configuration on the substrate. One of two diffusion layers unshared at both ends of plurality of serially connected cells may be connected to a bit line across a drain-side select gate. The other may be connected to a source line across a source-side select gate. Moreover, in NAND-type cell array, the second conductive type diffusion layers distributed between cells may be replaced with dilute first conductive type diffusion layers or removed.

In the above-mentioned embodiments, the PN junction 986 having been used for the illustration may be formed by meeting a first conductive type semiconductor and a second conductive type semiconductor. As an example, a second conducting type diffusion layer to be formed on a first conductive type semiconductor substrate may just leave a PN junction at the interface between them. Accordingly, the PN junction may be automatically formed in MOS-type transistors, non-volatile memory cell transistors or select transistors as well.

In the above-mentioned embodiments, the Schottky junction 987 having been used for the illustration may be formed by meeting a semiconductor and a conductor (or metal). The PN junctions and the Schottky junctions may be kinds of diodes.

In the above, the first conductive type semiconductor substrate having been used to illustrate configurations of MOS-type transistors, non-volatile memory cell transistors, select transistors, PN junctions, Schottky junctions and so forth may be replaced with a first conductive type diffusion layer formed on a wide area on the substrate (usually, called well).

The said identification cells may be semiconductor cells to be integrated in a chip which is manufactured in the front-end-process of semiconductor fabrication.

It may be preferable that physical chip identification (P-CID) to be generated by the chip identification device 3040 is temporarily stored in cash memory and so forth before forwarded to a signal transmission pathway 1000.

Moreover, in an example of the present disclosure, in order to connect a stem node and a peripheral node with an identification, it may be necessary that the stem node sends a predetermined passcode to the peripheral node and then registers an output to be replied from the peripheral node (P-CID address or P-CID for example) in advance. Hereinafter, this stem node may adopt a set of the said predetermined passcode and a physical address (or P-CID) which is specific to a chip corresponding to said peripheral node, in order to connect to the said peripheral node with an identification. In the present disclosure, it is unnecessary to store a physical address (or P-CID) which is specific to a chip in non-volatile memory of peripheral node. This may make it hard to theft or edit physical address (or P-CID) which is specific to a chip of peripheral node by remote-control. Furthermore, in another example, it may be able to adopt PIN code owned by user of peripheral node in stead of passcode owned by stem node. It may be further able to associate this PIN code with the operating system of the peripheral node. For example, it may be used to boot the operating system or recover from sleep-mode.

In this disclosure, as an example, the network of electronic apparatuses is divided into groups of peripheral nodes and stem nodes which administrate registration status of those peripheral nodes; wherein the stem nodes are under central control, and each of the peripheral nodes out of central control is equipped with a semiconductor chip including a chip identification device to be manufactured in the front-end process of semiconductor manufacturing. The physical chip identifications to be generated by those chip identification devices enable for preventing remote-attack on peripheral nodes and improving the security of the whole system of network and flexible usage of physical addresses of physical nodes on the internet-of-things. However, the network is an aggregation of communication linkage among any electronic apparatuses (nodes) to be connected by the above-mentioned authenticated communication in the internal or external of a specialized system.

The physical chip identification (P-CID) to be generated by the chip identification device of the present disclosure may be able to serve as chip identification linked to physical substance, the traceability of chip to be circulated in supply-chain and the measure for chip counterfeit. It may also be able to complement the weak point of MAC address to ease the administration of LAN, and, as a result, to replace MAC address with a new physical address. Furthermore, since the bit number in address area is variable, it may be flexibly tunable to future advance of network technologies.

Or, as another example, the chip identification device shown in FIGS. 89-91 may be a chip set comprising at least a chip including a cell array from which physical random number can be extracted and another chip including an extraction circuit. Or the chip identification device shown in FIGS. 89-91 may be a chip set comprising at least a chip including a cell array from which physical random number can be extracted and chips respectively including an extraction circuit and an output generation circuit. Or the chip identification device shown in FIGS. 89-91 may be a chip set comprising at least a chip including a cell array from which physical random number can be extracted and a chip including an extraction circuit and an output generation circuit.

Or, as another example, the chip identification device shown in FIGS. 89-91 may be a chip set comprising at least a memory chip including a cell array from which physical random number can be extracted and another chip including an extraction circuit. Or the chip identification device shown in FIGS. 89-91 may be a chip set comprising at least a memory chip including a cell array from which physical random number can be extracted and chips respectively including an extraction circuit and an output generation circuit. Or the chip identification device shown in FIGS. 89-91 may be a chip set comprising at least a memory chip including a cell array from which physical random number can be extracted and a chip including an extraction circuit and an output generation circuit.

Or, as another example, the chip identification device shown in FIGS. 89-91 may be a chip including at least a cell array from which physical random number can be extracted, an extraction circuit and an output generation circuit.

Or, as another example, a stem node may have a measuring device of chip identification (e.g., the second measuring device of chip identification of the second node in FIG. 102) while recording an input code 402 and a registration code 403 in an inner memory 401. Peripheral node may have a chip identification device 60 (e.g., the first identification device of the first node in FIG. 102). By the way, a stem node to be equipped with a chip identification device may be similar to the second node as shown in FIG. 102. This second node may have the second chip identification device and the second measuring device of chip identification as well as the inner memory 401. On the other hand, a peripheral node to be equipped with a measuring device of chip identification may be similar to the first node as shown in FIG. 102. This first node may have the first measuring device of chip identification as well as the first chip identification device. By this way, peripheral nodes and stem nodes can be distinguished by checking if they have inner memories recording the input code 402 and the registration code 403. On the other hand, as shown in FIG. 102, two nodes respectively having chip identification device and measuring device of chip identification may be able to mutually authenticate. This may be helpful for two stem nodes to mutually authenticated. Moreover, it may be usable for two peripheral nodes to mutually authenticated.

(Separate generation of random number code) As illustrated in FIGS. 121-125, it may be possible to write and store a random number code having been separately generated in the external of a chip into a cell array of the chip identification device. However, the said random number code having been separately generated is required to satisfy "the property of output unpredictability". Furthermore, it should be prohibited to store a code which is identical to the said random code having been separately generated in another chip identification device. Moreover, it may be prohibited to write a same random code accidentally in cell arrays of two chips. Furthermore, in order to avoid the falsification of the said random number code having been separately generated, it may be necessary that the cell array storing the said random number code having been separately generated is non-rewritable. While these conditions are satisfied, the said random number code having been separately generated can be regarded as a random number specific to a chip and can be used as a random number specific to a chip in all embodiments satisfying the concept of the present invention.

Random number code, which has been regarded as specific to a chip like this, may be another example of random number of the present invention. It can be used to generate a response signal or response code (response) from the said chip identification device in response to an input signal or input code (challenge) to the chip identification device of the present invention (FIGS. 8, 15, 16-18, 26-28, 76, 78, 79, 89-91, 102, 104-111, 113, 116-125, etc.).

(The property of output unpredictability) In order to satisfy "the property of output unpredictability", a random number generator, which can generate a random number code arising from a factor of physical randomness, may be necessary. It may be possible to find such a physical randomness in the external of a chip. Though plural methods are allowable for the physical random number generator, the method using a quantum bit may be most unpredictable among them. There are both information states of "0" and "1" simultaneously in a quantum bit. According to theory of measurement problem in quantum mechanics, read state is decided to be either "0" or "1" stochastically at the readout. It is theoretically impossible to predict its readout result in advance. A random number code is a stringed out results of repeated readouts of "0" and "1" from a quantum bit. In the current technologies, it is still not easy to integrate many quantum bits in a semiconductor chip. Accordingly, it may be required to write a random number code to be generated by reading out a quantum bit having been prepared separately from the chip identification device of the present invention to a cell array of the chip identification device of the present invention. Of course, another physical mechanics may be allowable for the random number generation method.

Regardless of methods to generate a random number code in the external of chips, it should be prohibited to store a code which is identical to a random number code to be stored in the cell array of a certain chip identification device in the cell array of another chip identification device. It should be required to restrict the authority of writing a random number code having been generated in the external of a chip into the cell array inside the chip to the entities relating to the chip manufacturing, the chip distribution, the usage of chips, etc.

To avoid a same random number code to be accidentally written in the cell arrays of two different chips, the bit length of a random number code to be generated is large enough. Depicting this bit length and the number of chips having the cell arrays wherein random number codes are to be written, Q and U, respectively, it may be allowable if the quotient of two to the power of Q by U, is a large enough number. As an example, let us consider a specification fitting for trillion nodes. While U is ten trillion, the number of cases of random number code can be about one trillion for Q=40. Thus, it turns out that Q is at least much larger than 44. When Q is 50, the probability that two random numbers respectively written in two chip identification devices are accidentally identical among those having been written in globally distributed chip identification devices is lower than one-to-one million. That is, it may be preferable that the bit length of random number code is longer than 50.

In other words, as an example, it may be allowable to read a state of a quantum bit 50-times per one chip. Or it may be allowable to read states of two quantum bits 25-times per one chip. Or it may be allowable to read states of M quantum bits not smaller than 50/M-times per one chip. Thus, the readout results may be written in the cell array of a chip.

In order to avoid the falsification of once regularly written random number codes, the cell array to store the said random number code having been separately generated is required to be non-rewritable. It may be preferable that such a cell array is a one-time programmable (OTP) memory.

What is known as the most promising example of OTP is mask ROM. FIG. 41 is a typical example of bit cell structure of mask ROM. First, an address in the cell array is chosen according to the bit representation of a random number code having been separately generated by an external random number generator. Next, a considerable method may be that a PN junction of MOSFET of bit cell located at a chosen address is burn off to be short by laser or by applying a large electric current for long enough period. The bit cell having a broken PN junction loses the function of the rectification, so that the electric current can flow even by applying a reverse voltage. For example, the random number code represented in checker-board pattern as illustrated in FIG. 22 can be obtained by making broken and non-broken bit cells correspond to data-1 and data-0, respectively. Anyway, in the case that a random number code having been separately generated is written in a cell array, the PN junctions of MOSFETs at chosen addresses are required to be certainly broken.

It is allowable to adopt all bit cells including a PN junction (FIG. 39, 41-43, 55, 56, 61-68, 92-98 etc.) as an OTP. First, an address in the cell array is chosen according to the bit representation of a random number code having been separately generated by an external random number generator. Next, a considerable method is that a PN junction of MOSFET of bit cell located at a chosen address is burn off to be short by laser or by applying a large electric current for long enough period. The bit cell having a broken PN junction loses the function of the rectification, so that the electric current can flow even by applying a reverse voltage. For example, the random number code represented in the checker-board pattern as illustrated in FIG. 22 can be obtained by making broken and non-broken bit cells correspond to data-1 and data-0, respectively. Anyway, in the case that a random number code having been separately generated is written in a cell array, the PN junctions at chosen addresses are required to be certainly broken.

Or it is allowable to adopt all bit cells including a capacitor (FIG. 33, 38, 41-43, 53, 54, 61-68, 92-98 etc.) as an OTP. First, an address in the cell array is chosen according to the bit representation of a random number code having been separately generated by an external random number generator. Next, a considerable method is that an insulating film of a capacitor of the bit cell located at the chosen address is made hard breakdown by applying a large electric current through the capacitor for long enough period. The capacitor of bit cell having a broken insulating film loses the function of the electric non-conductance, so that the electric current can flow even by applying a direct voltage. For example, a random number code represented in the checker-board pattern as illustrated in FIG. 22 can be obtained by making broken and non-broken bit cells correspond to data-1 and data-0, respectively. Anyway, in the case that a random number code having been separately generated is written in a cell array, the capacitors at chosen addresses are required to be certainly hard-broken.

Or it is allowable to adopt all bit cells including a Schottky junction (FIG. 40, 57, 58 etc.) as an OTP. First, an address in the cell array is chosen according to the bit representation of a random number code having been separately generated by an external random number generator. Next, a considerable method is that a Schottky junction of the bit cell located at a chosen address is broken down by applying a large electric current for long enough period. The chosen bit cell loses the function of the rectification due the breakdown of the junction, so that the electric current can flow even by applying a reverse voltage. For example, the random number code represented in the checker-board pattern as illustrated in FIG. 22 can be obtained by making broken and non-broken bit cells correspond to data-1 and data-0, respectively. Anyway, in the case that a random number code having been separately generated is written in a cell array, the Schottky junctions at chosen addresses are required to be certainly broken.

Or it is allowable to adopt all bit cells including a resistor or resistive wires (FIG. 44, 46-48, 59, 60, 92, 93, 99-101, etc.) as an OTP. First, an address in the cell array is chosen according to the bit representation of a random number code having been separately generated by an external random number generator. Next, a considerable method is that a resistor or resistive wire of the bit cell located at a chosen address is burnout (short) by applying a large electric current for long enough period. The chosen bit cell cannot flow the electric current due to the burnout even though a moderate voltage is applied. For example, the random number code represented in the checker-board pattern as illustrated in FIG. 22 can be obtained by making burnout and non-burnout bit cells correspond to data-0 and data-1, respectively. Anyway, in the case that a random number code having been separately generated is written in a cell array, the resistors or resistive wires at chosen addresses are required to be certainly burnout.

Like this, it may be allowable to regard a random number code having been separately generated in the external of a chip as a specific random number which is specific to a chip identification device owning the concept of the present invention jointly or to a chip composing the said chip identification device. Of course, this specific random number can also play a role of the specific random number shown in FIGS. 111 and 113.

It may be allowable that where a random number code, which is a specific random number of the present invention, is written is the whole of or a part of the cell array that composes a part of the chip identification device owning the concept of the present invention jointly. In a case that the random number code is written in a part of the cell array, for example, it may be allowable to consider the methods illustrated in FIGS. 27, 29-32, 77, 79, etc.

In the above, there are mainly two methods to generate a specific random number, which is specific to a chip; one is to generate it simultaneously with the chip manufacturing and the other is to generate it separately from the chip manufacturing. In the former, a manufactured chip itself is included into or includes a chip identification device. In the latter, a separately generated specific random number is written into an OTP included into a chip identification device. While the output from the chip identification device, named, the response, is obtained by combining a specific random number and an input to the chip identification device, named, the challenge, any generation method of a specific random number is not deviating from the concept of the chip identification device of the present invention and its utilization method. Accordingly, in all the embodiment of the present invention, both generation methods can be used in a similar way.

Figure 20:
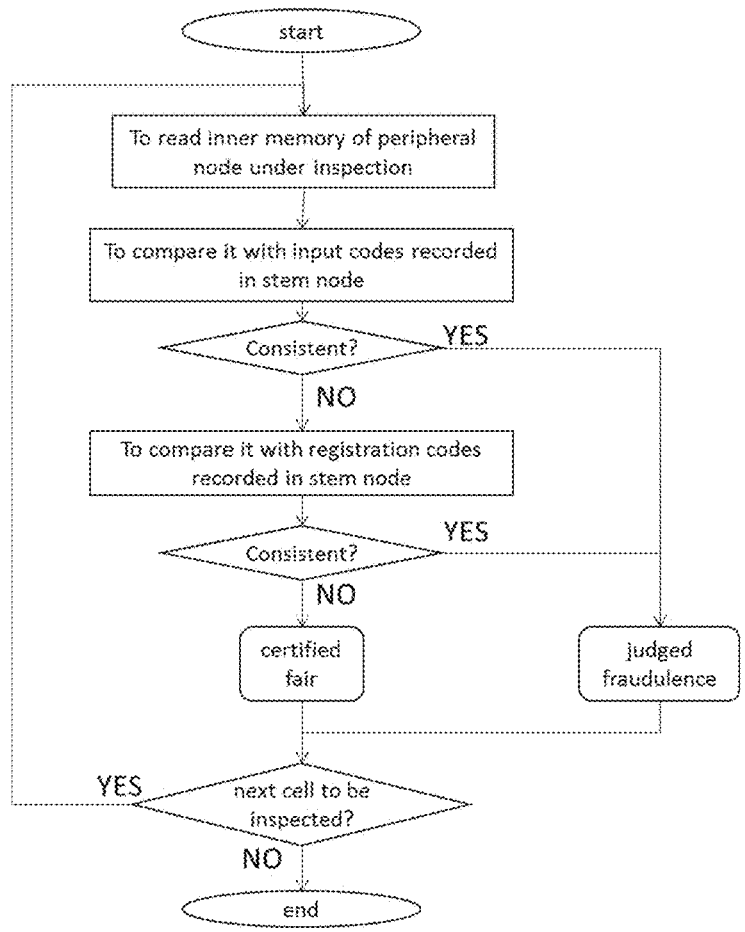
FIG. 20 is the drawing to illustrate an example of the execution process to inspect the validity of a peripheral node.
Figure 21:
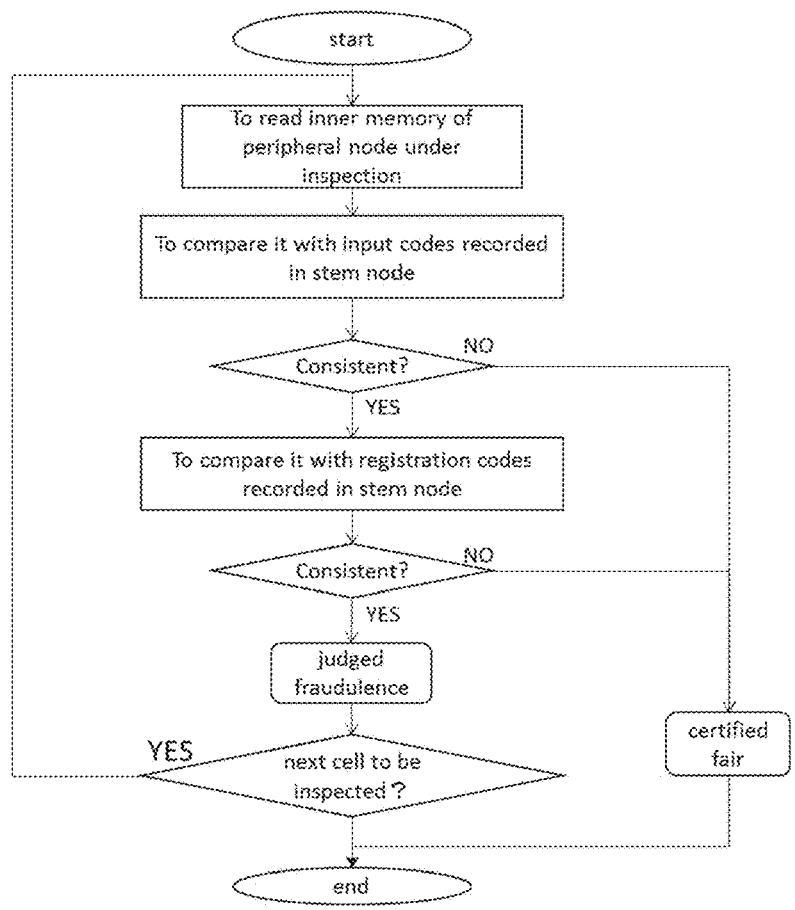
FIG. 21 is the drawing to illustrate an example of the execution process to inspect the validity of a peripheral node.

(Measure for spoofing) In the (Auto-detection and auto-remove of fake node) illustrated in FIG. 114, there may be methods other than FIGS. 20 and 21. A common point of FIGS. 20, 21, and 114 is that it is inspected if information that should not be stored in the inner memory of an inspection object is stored therein. Below a method to avoid the spoofing without inspecting the inner memory of an inspection object is explained.

Figure 126:
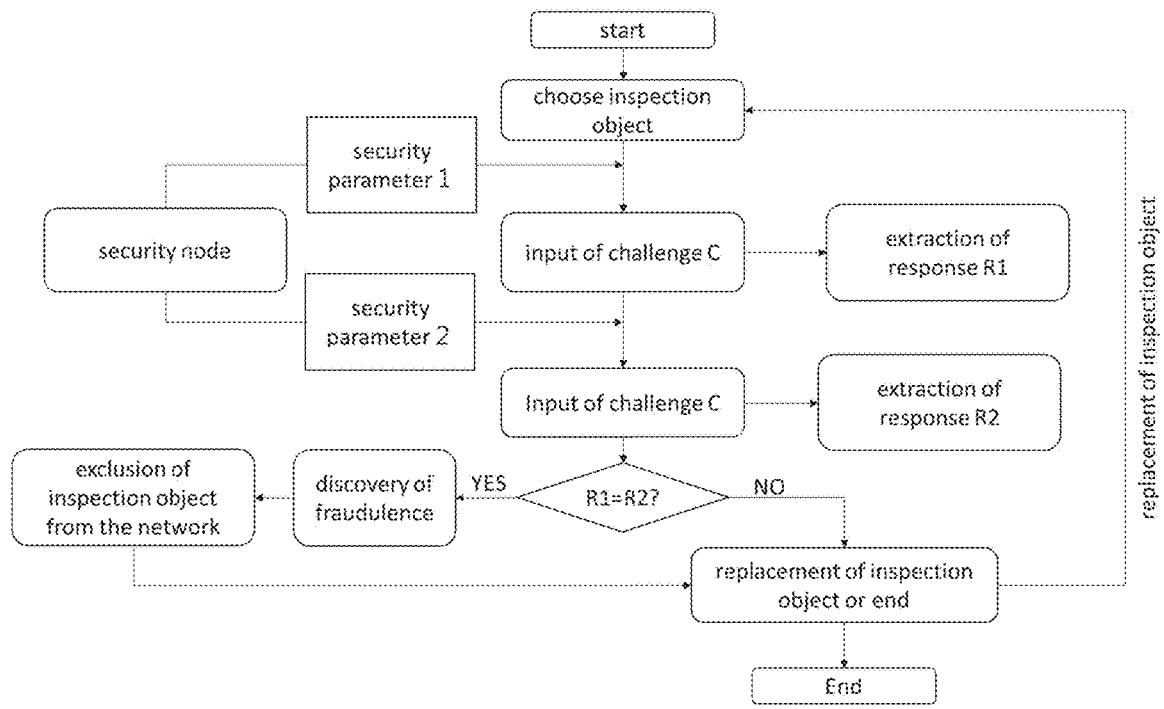

As illustrated in FIGS. 111 and 113, before and after the security node (the third physical node) changes the security parameter (nonce value), the response R from the chip identification device (the first chip identification device) included in the physical node that is the inspection object (the first physical node) must change. The response obtained by inputting the challenge C to the first chip identification device before the security node changes the security parameter is depicted by R1. The response obtained by inputting the challenge C to the first chip identification device after the security node changes the security parameter is depicted by R2. If R1 and R2 are identical, the first physical node that is the inspection object can be regarded as illegally accessing the network. FIG. 126 is a drawing to illustrate an example of the operation process of this inspection method.

(Authentication node) In FIGS. 10-14, 102, 111 and/or 113, the set (CR) of the challenge C to be input to a certain chip identification device and the response R that is output in response to the C from the said chip identification device may be used for the physical chip identification that relates to the present invention. One of the objectives of the present invention is to build a decentralized system composed of only physical nodes having been authenticated by the physical chip identification like this. Nevertheless, the present invention does not persist in building a decentralized system composed of only physical nodes having been authenticated by the physical chip identification of the present invention. For example, the communication between an entry node belonging to a management range controlled by one or plural management nodes and a physical or logical node belonging to the external of the said management range may not be prohibited. However, it may be allowable to issue an alert to the said entry node or to set a condition that this communication must be via the management node.

On the other hand, in FIGS. 104-110, an input signal to be input to a chip identification device in order to generate output R from the said chip identification device, which R is to be input (transferred) to a key generator, is not always necessary to be identical to the input signal to be input to the said chip identification device for the said physical chip identification. For example, an input signal to be input to a chip identification device for the physical chip identification is an inspection C. In response to this inspection C, the said chip identification device outputs an output signal (inspection R) as a response. By this way, the set of input and output signals (inspection C, inspection R) can enable for carrying out the physical chip identification of physical nodes using the said physical chip identification device.

On the other hand, in order to incorporate physical nodes authenticated like this into a decentralized system, an administrator to control the decentralized system, named, the signature node, may input an input signal (signature C) to the said chip identification device. The signature C corresponds to the third input signal in FIG. 104. However, the signature C is not always identical to the inspection C. To totally enforce the security of the system, it may be preferable that inspection C and signature C are different.

The said chip identification device outputs an output signal as a response (signature R) in response to an input signal (signature C). However, this response should be used only inside the physical node having received the signature C and not to be returned to the sender of the signature C, named, the signature node. This signature R is input to a key generator, and then the said key generator generates a secret key (S1) and public key (P1). See FIGS. 105-110. However, according to (the property of input independence), the signature R and the inspection R are required to be different while the signature C and the inspection C are different. P1 plays a role of a public key of the physical node having the said chip identification device on the network. It may be preferable that S1 is deleted after used and then regenerated every time that is to be used. Or it may be preferable that S1 is protected inside the physical node with no leakage of it to the external. Anyway, S1 is required to be secret from the external of the physical node. Or after generating the said S1 and P1, it may be preferable that the signature R is deleted or stored in an area which cannot be accessed from the external.

In order to authenticate the physical node, the inspection R is once output to the external of the physical node. For example, in FIG. 102, the second physical node inputs the second input signal (the inspection C in this case) to the first physical node, and the first physical node outputs the first output signal (the inspection R in this case) to the second physical node in response to this second input signal. Like this, the inspection R to be used for the physical chip identification is output to the external of a physical node (the second physical node in this case). In the case that the inspection C and the signature C are identical, since the signature R and the inspection R are identical, the signature R is also exposed to the external of the physical node for the aim of the physical chip identification. As illustrated in FIG. 104, the signature R (the third output signal in this case) is necessary to generate the secret key (S1) and the public key (P1). Accordingly, if a malicious hacker collects the signature R, he may be capable of easily regenerating the S1. Therefore, it may be preferable that the inspection C and the signature C are different.

It may be allowable that what inputs the inspection C and the signature C to a chip identification device is a same node or two different nodes. However, a physical node providing the inspection C to a chip identification device is a management node. In particular, a management node which performs the auto-detection is an inspection node. On the other hand, a physical node which provides a signature C to a chip identification device is a signature node. For example, the input signal input to the chip identification devices shown in FIGS. 105-110 is the signature C in this case. A physical node which provides this signature C is a signature node though this name "signature node" is not especially illustrated in FIGS. 105-110. Or as long as the inspection C and the signature C are different, this inspection node may be identical to the said signature node or not.

Figure 127:
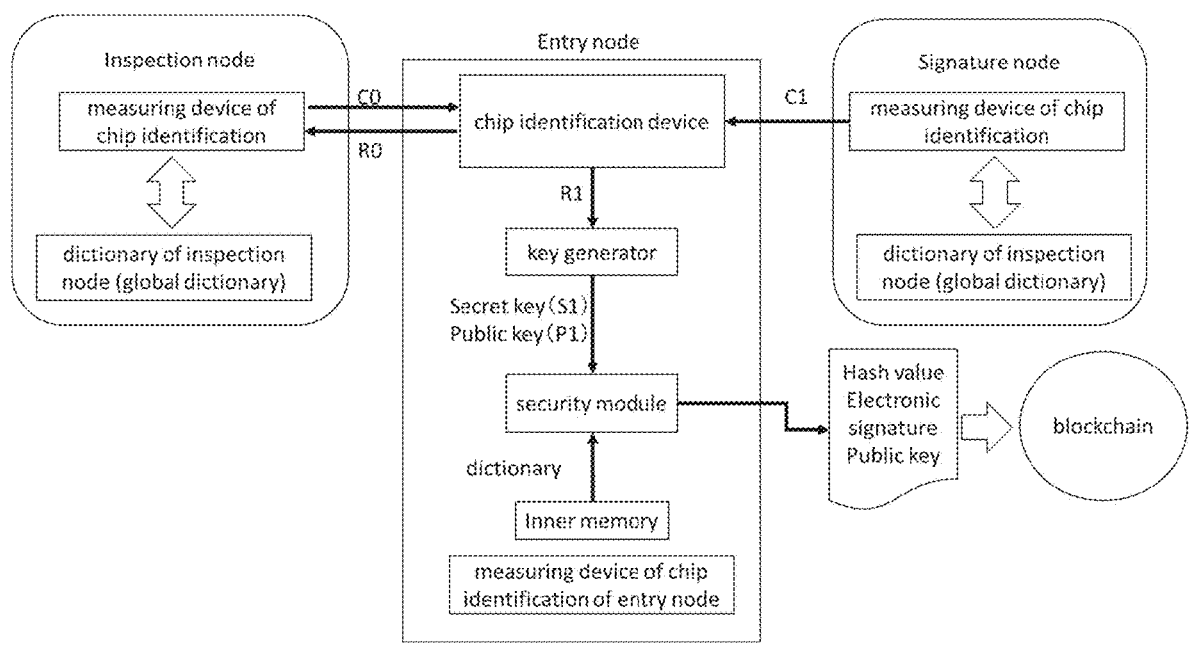

In general, a signature node is a kind of management nodes and has a global dictionary. As illustrated in FIG. 127, for example, the signature node inputs the said signature C (C1 in FIG. 127) to the chip identification device of an entry node having been registered in this global dictionary (the (N+1)-th physical node in FIG. 106 for example). However, the said inspection C (C0 in FIG. 127) is different from the input signal in FIG. 106 (C1 in FIG. 127). The entry node in FIG. 127 corresponds to the first physical node in FIG. 104. The chip identification device of this entry node outputs the signature R (R1 in FIG. 127) as a response in response to the input of the said signature C (C1 in FIG. 127). However, the first physical node in FIG. 104 is required not to respond this signature R (R1 in FIG. 127), i.e., the third output signal, to the sender of the said signature C (C1 in FIG. 127), i.e., the signature node. This signature R1 is passed to the key generator to generate the secret key (S1) and the public key (P1). These S1 and P1 are forwarded to the security module. Next, data relating to the dictionary is retrieved from the inner memory and then passed to the security module. The security module generates the hash value and the electronic signature from S1, P1 and the said dictionary in a predetermined method. These hash value and electronic signature are capable of being used for data transaction with the signature via this entry node.

Moreover, this entry node can be authenticated in advance by the inspection node. That is, the challenge C0 (inspection C) is input from the measuring device of chip identification of the inspection node to the chip identification device of the entry node. The said chip identification device outputs the response R0 (inspection R) in response to the said C0 (inspection C), and then returns it to the measuring device of chip identification of the said inspection node. The said inspection node compares the set of the said C0 (inspection C) and the said R0 (inspection R) with the global dictionary stored in the inner memory (which is not illustrated since it is self-evident), and then checks if the said entry node is a physical node having been permitted to regularly entry to the network.

As mentioned above, it is preferable that these inspection C (C0 in FIG. 127) and signature C (C1 in FIG. 127) are not identical. Moreover, it may be allowable that the global dictionary of a signature node and that of an inspection node are identical or not. Moreover, the chip identification device of an entry node, as illustrated in FIGS. 111 and 113, includes a hash module, receives a security parameter from a security node to update a security state, receives an inspection C from an inspection node as a challenge, generates an inspection R as a response at the updated security state, and then returns the said inspection R to the said inspection node. A main difference of the inspection node and the signature node is that, while the inspection node receives the inspection R as a response to the inspection C, the signature node does NOT receive the signature R in order to confine the signature R inside the receiver of the signature C or to delete the signature R.

Finally, the upper bound of the dictionary number that can be defined for one closed physical network is equal to or more than the number of physical nodes (electronic apparatus) that composes this closed physical network. These plural dictionaries can jointly distinguish the physical nodes (electronic apparatus) belonging to the said one closed physical network from the other nodes (electronic apparatus). By this way, these plural dictionaries can make the said one closed physical network be confined by a physical firewall. Though this physical firewall is similar to the conventional (logical) firewall regarding not to be defined geometrical, it is different from the logical firewall regarding what are confined inside are physical nodes and not logical nodes.

In addition, the scope of the present disclosure may not be limited within the above-mentioned embodiments and may be added with various modification within the field of concept related to the present disclosure. In particular, it may be effective in a business model wherein somewhat of SIM card of mobile phone is adopted in a peripheral node composing the internet-of-things.

INDUSTRIAL APPLICABILITY

The device-to-device authenticate in the network including countless number of peripheral nodes out of the central control may become securely realized in the chip level by utilizing the chip identification to be generated on the basis of physical randomness.

What is claimed is:

1. A network of electronic apparatuses comprising:
    at least, a first physical node, a second physical node, and a third physical node;
    wherein said first physical node is a first electronic apparatus, which has a first semiconductor chip, a first chip identification device, a first measuring device of chip identification, and a first inner memory;
    wherein said first semiconductor chip has a first cell array, and said first cell array generates a first specific random number using a predetermined manner;
    wherein said first inner memory stores a first dictionary, and said first chip identification device has a first hash module and said first cell array;
    wherein said second physical node is a second electronic apparatus, which has a second semiconductor chip, a second chip identification device, a second measuring device of chip identification, and a second inner memory;
    wherein said second semiconductor chip has a second cell array, and said second cell array generates a second specific random number using a predetermined manner;
    wherein said second inner memory stores a second dictionary, and said second chip identification device has a second hash module and said second cell array;
    wherein said third physical node is a third electronic apparatus, which has a third semiconductor chip, a third chip identification device, a third measuring device of chip identification, and a third inner memory;
    wherein said third semiconductor chip has a third cell array, and said third cell array generates a third specific random number using a predetermined manner;
    wherein said third inner memory stores a third dictionary, and said third chip identification device has a third hash module and the said third cell array;
    wherein said third physical node sends a first security parameter to said first hash module, and said first hash module generates a first security state from said first specific random number and said first security parameter; and
    wherein said second physical node sends a second input signal to said first physical node, said first physical node inputs said second input signal to said first chip identification device, said first chip identification device generates a first output signal from said second input signal and said first security state, said first physical node returns said first output signal to said second physical node; and
    wherein said second physical node inputs said first output signal to said second measuring device of chip identification, said second measuring device of chip identification defines a first set of input-output, which is a set of input and output signals, made of said second input signal and said first output signal, and said second physical node stores said first set of input-output into said second dictionary.

2. The network of electronic apparatuses as claimed in claim 1, further, comprising:
    a fourth physical node;
    wherein said second physical node sends said second input signal to said fourth physical node;
    wherein said fourth physical node is a fourth electronic apparatus, which has a fourth semiconductor chip, a fourth chip identification device, a fourth measuring device of chip identification, and a fourth inner memory;
    wherein said fourth semiconductor chip has a fourth cell array, and said fourth cell array generates a fourth specific random number using a predetermined manner;
    wherein said fourth inner memory stores a fourth dictionary, and said fourth chip identification device has a fourth hash module and said fourth cell array;
    wherein said second physical node requests said third physical node to issue said first security parameter and to send it to said fourth physical node;

wherein said third physical node issues said first security parameter and then sends it to said fourth hash module according to this request, and said fourth hash module generates a fourth security state from said fourth specific random number and said first security parameter;

wherein said fourth physical node inputs said second input signal to said fourth chip identification device, said fourth chip identification device generates a fourth output signal from said second input signal and said fourth security state, said fourth physical node returns said fourth output signal to said second physical node; and wherein said second physical node inputs said fourth output signal to said second measuring device of chip identification, said second measuring device of chip identification defines a fourth set of input-output, which is a set of input and output signals, made of said second input signal and said fourth output signal, said second physical node compares said fourth set of input-output with said first set of input-output, which is stored in said second dictionary, and said fourth physical node is identified as said first physical node if said fourth set of input-output is consistent with said first set of input-output.

3. The network of electronic apparatuses as claimed in claim 1, further, comprising:

a fifth physical node; and a sixth physical node;

wherein said first physical node has a first key generator;

wherein said fifth physical node is a fifth electronic apparatus, which has a fifth semiconductor chip, a fifth chip identification device, a fifth measuring device of chip identification, and a fifth inner memory;

wherein said fifth semiconductor chip has a fifth cell array, and said fifth cell array generates a fifth specific random number using a predetermined manner;

wherein said fifth inner memory stores a fifth dictionary, and said fifth chip identification device has a fifth hash module and said fifth cell array;

wherein said fifth measuring device of chip identification sends a 51-th input signal to said first physical node, said first physical node generates a 51-th output signal from said 51-th input signal and said first security state;

wherein said first physical node inputs the 51-th output signal to said first key generator, said first key generator generates a first secret key and a first public key, and said first hash module generates a first hash value by hashing said first public key and said first dictionary;

wherein said sixth physical node is a sixth electronic apparatus, which has a sixth semiconductor chip, a sixth chip identification device, a sixth measuring device of chip identification, a sixth inner memory, and a sixth key generator;

wherein said sixth semiconductor chip has a sixth cell array, and said sixth cell array generates a sixth specific random number using a predetermined manner;

wherein said sixth inner memory stores a sixth dictionary, and said sixth chip identification device has a sixth hash module and said sixth cell array;

wherein said third measuring device of chip identification sends a sixth security parameter to said sixth hash module, and said sixth hash module generates a sixth security state from said sixth specific random number and said sixth security parameter;

wherein said fifth measuring device of chip identification sends a 56-th input signal to said sixth physical node, said sixth physical node generates a sixth output signal from said 56-th input signal and said sixth security state, said sixth physical node inputs said sixth output signal to said sixth key generator, said sixth key generator generates a sixth secret key and a sixth public key;

wherein said first physical node encrypts said first hash value and said sixth public key using said first secret key and thus generates a first electronic signature; and wherein said first physical node sends said first hash value and said first electronic signature to said sixth physical node.

4. The network of electronic apparatuses as claimed in claim 1, further, comprising:

a seventh physical node and an eighth physical node;

wherein said seventh physical node is a seventh electronic apparatus, which has a seventh semiconductor chip, a seventh chip identification device, a seventh measuring device of chip identification, and a seventh inner memory;

wherein said seventh semiconductor chip has a seventh cell array, and said seventh cell array generates a seventh specific random number using a predetermined manner;

wherein said seventh inner memory stores a seventh dictionary, and said seventh chip identification device has a seventh hash module and said seventh cell array;

wherein said seventh dictionary registers a seventh management range, comprising an assemble of plural sets of input-output, and a physical node with its set of input-out belonging to said seventh management range is under the control of said seventh physical node;

wherein said eighth physical node is an eighth electronic apparatus, which has an eighth semiconductor chip, an eighth chip identification device, an eighth measuring device of chip identification, and an eighth inner memory;

wherein said eighth semiconductor chip has an eighth cell array, and said eighth cell array generates an eighth specific random number using a predetermined manner;

wherein said eighth inner memory stores an eighth dictionary, and said eighth chip identification device has an eighth hash module and said eighth cell array;

wherein said eighth dictionary registers an eighth management range, comprising an assemble of plural sets of input-output, and a physical node with its set of input-out belonging to said eighth management range is under the control of said eighth physical node;

wherein a physical node under the management of either said seventh physical node or said eighth physical node belongs to a joint management range that said seventh physical node and said eighth physical node jointly manage; and wherein said seventh physical node and/or said eighth physical node exclude a physical node, which are registered in neither said seventh dictionary nor said eighth dictionary, from said joint management range, and said joint management range is jointly managed as one closed physical network.

5. The network of electronic apparatuses as claimed in claim 4, wherein, said seventh physical node plays a role of said second physical node as an inspection node; and wherein said eighth physical node plays a role of said third physical node as a security node.

6. The network of electronic apparatuses as claimed in claim 1, wherein, said first cell array is a kind of identification cell arrays, which comprises plural identification cells, and has plural bit lines and plural word lines;
wherein the cross points of said plural bit lines and said plural word lines define addresses on said first cell array, and said plural identification cells are distributed on said addresses;
wherein some of said plural identification cells are broken identification cells due to the hard breakdown, and said broken identification cells are stochastically distributed on said addresses to form a physically random distribution pattern; and
wherein said first chip identification device converts said physically random distribution pattern of said broken identification cells to a code using a predetermined manner, and thus generates said first specific random number.

7. The network of electronic apparatuses as claimed in claim 1, wherein,
said first cell array comprises plural sub-blocks;
wherein said plural subblocks are divided to a first group of sub-blocks and a second group of sub-blocks;
wherein said first cell array comprises plural cells;
wherein said plural cells are distributed to said plural sub-blocks;
wherein one of said plural cells is a failure bit which fails a predetermined test;
wherein a sub-block belonging to said first group of sub-blocks is a failure sub-block including said failure bit;
wherein said first group of sub-blocks has plural of said failure sub-blocks; and
wherein said first specific random number is generated by choosing said plural of said failure sub-blocks among the plural sub-blocks composing said first group of sub-blocks.

8. The network of electronic apparatuses as claimed in claim 1, wherein,
said first chip identification device and said second chip identification device are different from each other;
wherein a same electronic signal is input as an input signal to said first chip identification device and said second chip identification device; and
wherein an output signal that said first chip identification device outputs in response to said input signal and an output signal that said second chip identification device outputs in response to said input signal are different.

9. The network of electronic apparatuses as claimed in claim 1, wherein,
said second measuring device of chip identification inputs said second input signal to said first chip identification device;
wherein said first chip identification device returns said first output signal to said second measuring device of chip identification in response to said second input signal;
wherein said third measuring device of chip identification inputs a third input signal to said first chip identification device;
wherein said first chip identification device returns a 31-th output signal to the third measuring device of chip identification in response to said third input signal; and
wherein said first and 31-th output signals are different from each other while said second input signal and third input signal are different.

10. The network of electronic apparatuses as claimed in claim 1, wherein,
said second measuring device of chip identification inputs plural different input signals to said first chip identification device;
wherein a first input group is the group of said plural different input signals;
wherein said first chip identification device respectively returns plural different output signals to said second measuring device of chip identification in response to said plural different input signals of said first input group;
wherein a first output group is the group of said plural different output signals;
wherein the number of elements of a second input group comprising plural input signals which does not belong to said first input signal group is N; and
wherein the probability to predict a test output signal that said first chip identification device will output in response to a test input signal, which belongs to said second input group, using the combination of said first input group and said first output group before said test input signal is input to said first chip identification device is less than or equal to $1/(N+1)$.

11. The network of electronic apparatuses as claimed in claim 1, wherein,
said second measuring device of chip identification inputs two different input signals to said first chip identification device;
wherein said first chip identification device respectively returns two output signals to said second measuring device of chip identification in response to said two different input signals; and
wherein an absolute value of difference of said two output signals is larger than an absolute value of an output signal error, which is mixed due to uncontrollable noise etc. relating to an input-output controlling circuit, when an absolute value of difference of said two different input signals is larger than an absolute value of input signal error, which is mixed due to uncontrollable noise etc. relating to the input-output controlling circuit.

12. The network of electronic apparatuses as claimed in claim 1, wherein,
said second measuring device of chip identification inputs a special test code for extracting physical random number to said first chip identification device;
wherein said special test code for extracting physical random number has an indication code as an argument, and said indication code is able to indicate an extraction area on said first cell array, or is able to indicate an execution mode to retrieve said first specific random number;
wherein said first chip identification device further has an extraction circuit, and said extraction circuit receives said special test code for extracting physical random number, reads said first specific random number from said first cell array according to said special test code for extracting physical random number, and then said first specific random number is the extraction result that the extraction circuit outputs to the external of said first chip identification device; and
wherein an output identification code that said second measuring device of chip identification receives is from said extraction result.

13. The network of electronic apparatuses as claimed in claim 12, wherein,
said first chip identification device further has an output generation circuit wherein said output generation circuit generates said output identification code from said extraction result and then output said output identification code to the external of said first chip identification device; and wherein said second measuring device of chip identification receives said output identification code.

14. The network of electronic apparatuses as claimed in claim 12, wherein, the second measuring device of chip identification inputs an input identification code to said output generation circuit;

wherein said output generation circuit generates said output identification code from said extraction result according to said input identification code, and then outputs said output identification code to the external of said first chip identification device; and wherein said second measuring device of chip identification receives said output identification device code.

15. The network of electronic apparatuses as claimed in claim 1, wherein, said second input signal is generated from digital code information including a passcode, a PIN code, a barcode, and a two-dimensional code; from biometric information to identify a regular user of said application including fingerprint information, finger vein information, retina information, DNA information; from voice and image information, extracted from a voice and a picture of a regular user for identification; from physical information extracted from physical characteristics of the regular user for identification; or from personal information for identifying the regular user, which are used to boot applications executing on said first physical node connecting to the network.

16. The network of electronic apparatuses as claimed in claim 1, wherein, said second input signal is generated from digital code information including a passcode, a PIN code, a barcode, and a two-dimensional code; from biometric information to identify a regular user of said application including fingerprint information, finger vein information, retina information, DNA information; from voice and image information extracted from a voice and a picture of said regular user for identification; from physical information extracted from physical characteristics of a regular user for identification; or from personal information for identifying the regular user and so forth, which are requested as necessary of applications executing on said first physical node connecting to the network.

17. The network of electronic apparatuses as claimed in claim 3, wherein, at least, either said a first input signal or said second input signal is generated from digital code information including a passcode, a PIN code, a barcode, and a two-dimensional code; from biometric information to identify a regular user of said application including fingerprint information, finger vein information, retina information, DNA information; from voice and image information extracted from a voice and a picture of a regular user for identification; from physical information extracted from physical characteristics of a regular user for identification; or from personal information for identifying the regular user, which are used to boot an information apparatus to which applications executing on said sixth physical node connecting to the network is installed.

18. The network of electronic apparatuses as claimed in claim 6, wherein, said plural identification cells are made from: a PN junction, a Schottky junction, a transistor, a capacitor, a variable resistance, a DRAM cell, a ReRAM cell, a FRAM, a PCRAM cell, a MRAM cell, a STT-MRAM cell, or a non-volatile memory cell with a charge storage layer.

19. The network of electronic apparatuses as claimed in claim 1, wherein, said first semiconductor chip is a main memory, which loads necessary information to execute an operating system controlling the execution of said first electronic apparatus;

wherein said main memory is composed of a memory chip, said first cell array is a memory cell array of said memory chip, said operating system controls said first chip identification device, and said first chip identification device receives said second input signal and then returns said first output signal to said second physical node;

wherein said operating system controls said first measuring device of chip identification;

wherein said first measuring device of chip identification sends a first input signal to said second physical node, said second physical node inputs said first input signal to said second chip identification device, said second chip identification device generates said second output signal, and then returns it to said first measuring device of chip identification; and wherein said first physical node compares said first input signal and the second output signal with said first dictionary.

20. The network of electronic apparatuses as claimed in claim 1, wherein, said first semiconductor chip is a chip of operational processing unit, which administers the execution of an operating system controlling said first electronic apparatus;

wherein said first cell array is embedded into said chip of operational processing unit;

wherein said operating system controls said first chip identification device, and said first chip identification device receives said second input signal and then returns said first output signal to said second physical node;

wherein said operating system controls said first measuring device of chip identification;

wherein said first measuring device of chip identification sends a first input signal to said second physical node, and said second physical node inputs said first input signal to said second chip identification device;

wherein said second chip identification device generates said second output signal, and then returns it to said first measuring device of chip identification; and wherein said first physical node compares said first input signal and said second output signal with said first dictionary.

21. The network of electronic apparatuses as claimed in claim 1, wherein, said first cell array is a kind of identification cell array, which comprises plural identification cells, and has plural bit lines and plural word lines;

wherein the cross points of said plural bit lines and said plural word lines define addresses on said first cell array;

wherein said plural identification cells are distributed on said addresses;

wherein some of said plural identification cells are broken identification cells, which are generated in a predetermined method;

wherein said broken identification cells are distributed on said addresses, based on physical random distribution; and wherein said first chip identification device converts said physical random distribution pattern of said broken identification cells to a code using a predetermined manner, and thus generates said first specific random number.

22. The network of electronic apparatuses as claimed in claim 21, wherein, said plural identification cells are electronic cells, made from a resistance, a resistive wire, a PN junction, a Schottky junction, a transistor, a capacitor, a variable resistance, a DRAM cell, a ReRAM cell, a FRAM, a PCRAM cell, a MRAM cell, a STT-MRAM cell or a non-volatile memory cell with a charge storage layer.

23. The network of electronic apparatuses as claimed in claim 21, wherein, said physical random distribution is generated due to the stochastic breakdown of said plural identification cells, on which an electrical stress or mechanical stress is applied.

24. The network of electronic apparatuses as claimed in claim 21, wherein, said physical random distribution is generated by selectively breaking identification cells on addresses which are chosen according to a random code that a random number generator separately generates.

25. The network of electronic apparatuses as claimed in claim 21, wherein, said physical random distribution is generated according to a manufacturing variance that occurs while said first semiconductor chip is manufactured.

26. The network of electronic apparatuses as claimed in claim 21, wherein, said physical random distribution is generated based on the distribution of failure bits, which are found in a test before shipment of said first semiconductor chip.

27. The network of electronic apparatuses as claimed in claim 1, wherein an inspection method of physical node is applicable, having;

step 1, wherein said second physical node chooses an inspection object, and said inspection object is said first physical node, step 2, wherein said third physical node sends said first security parameter to said first hash module, step 3, wherein said second physical node obtains a first response by inputting said second input signal to said inspection object, step 4, wherein said third physical node sends a second security parameter to said first hash module, step 5, wherein the second physical node obtains a second response by inputting said second input signal to said inspection object, step 6, wherein it is judged if said first and second responses are identical, step 7, wherein said inspection object is deemed as a wrong node and then excluded from said network of electronic apparatuses if said first and second responses are identical in the step 6, and step 8, wherein it is checked if the next inspection object can be found, and ends the inspection if the next inspection object cannot be found.

28. The network of electronic apparatuses as claimed in claim 3, wherein, said second input signal and said 51-th input signal are different from each other.

\* \* \* \* \*